United States Patent
Hoshino et al.

(10) Patent No.: US 10,503,797 B2
(45) Date of Patent: Dec. 10, 2019

(54) APPARATUS AND METHOD FOR SHARING INTRODUCTION INFORMATION

(71) Applicant: SONY CORPORATION, Tokyo (JP)

(72) Inventors: Masaaki Hoshino, Tokyo (JP); Kenichiro Kobayashi, Kanagawa (JP); Shouichi Doi, Kanagawa (JP); Akihiro Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 239 days.

(21) Appl. No.: 15/192,599

(22) Filed: Jun. 24, 2016

(65) Prior Publication Data

US 2016/0378873 A1    Dec. 29, 2016

Related U.S. Application Data

(63) Continuation of application No. 13/188,362, filed on Jul. 21, 2011, now abandoned.

(30) Foreign Application Priority Data

Jul. 23, 2010  (JP) ................... 2010-166327

(51) Int. Cl.
  *G06F 17/00*  (2019.01)
  *G06F 16/9535*  (2019.01)
  (Continued)

(52) U.S. Cl.
  CPC ........ *G06F 16/9535* (2019.01); *G06F 3/0484* (2013.01); *G06F 7/20* (2013.01);
  (Continued)

(58) Field of Classification Search
  CPC ............... G06Q 30/0631; G06Q 30/02; G06Q 30/0255; G06Q 30/0269; G06F 17/2735;
  (Continued)

(56) References Cited

U.S. PATENT DOCUMENTS 6,014,135 A    1/2000  Fernandes
6,064,980 A *  5/2000  Jacobi ................... G06Q 30/06
                                                        705/1.1

(Continued)

FOREIGN PATENT DOCUMENTS

JP    10-011457 A    1/1998

OTHER PUBLICATIONS

Non-Final Office Action cited in U.S. Appl. No. 15/192,568, dated Apr. 12, 2018, 17 pages.

(Continued)

*Primary Examiner* — Maikhanh Nguyen
(74) *Attorney, Agent, or Firm* — Chip Law Group

(57) ABSTRACT

An information processing apparatus includes a selection unit selecting at least a part of a text included in contents, an acquisition unit acquiring a processing result of natural language processing for the part of the text selected by the selection unit, a specifying unit specifying a predetermined part of the text based on the processing result acquired by the acquisition unit, a detection unit detecting a keyword from the predetermined part of the text based on the processing result acquired by the acquisition unit, a tag generation unit automatically generating a tag in accordance with the keyword detected by the detection unit, and an association unit associating the tag generated by the tag generation unit with the predetermined part of the text.

17 Claims, 43 Drawing Sheets

(51) Int. Cl.
    *G06F 16/58*     (2019.01)
    *G06F 16/903*     (2019.01)
    *G06F 17/27*     (2006.01)
    *G06F 3/0484*     (2013.01)
    *G06F 17/21*     (2006.01)
    *H04L 29/08*     (2006.01)
    *G06F 7/20*     (2006.01)
    *G06F 3/0482*     (2013.01)
    *G06F 17/28*     (2006.01)

(52) U.S. Cl.
    CPC ........ *G06F 16/58* (2019.01); *G06F 16/90348* (2019.01); *G06F 17/212* (2013.01); *G06F 17/271* (2013.01); *G06F 17/277* (2013.01); *G06F 17/2755* (2013.01); *G06F 17/2765* (2013.01); *H04L 67/18* (2013.01); *G06F 3/0482* (2013.01); *G06F 17/2881* (2013.01)

(58) Field of Classification Search
    CPC .. G06F 17/2755; G06F 3/0484; G06F 17/212; G06F 17/271; G06F 17/277; G06F 3/0482; G06F 7/20; G06F 17/2765; G06F 17/2881; G06F 17/30265; G06F 17/30867; G06F 17/30988; H04L 67/18
    See application file for complete search history.

(56) References Cited

U.S. PATENT DOCUMENTS

| | | | |
|---|---|---|---|
| 6,266,649 B1* | 7/2001 | Linden | G06Q 10/08345 705/14.51 |
| 6,321,221 B1* | 11/2001 | Bieganski | G06F 17/30699 705/26.7 |
| 6,489,968 B1* | 12/2002 | Ortega | G06F 3/0482 345/594 |
| 6,525,747 B1* | 2/2003 | Bezos | G06Q 10/107 715/751 |
| 6,567,830 B1 | 5/2003 | Madduri | |
| 6,732,090 B2 | 5/2004 | Shanahan et al. | |
| 6,738,076 B1 | 5/2004 | Mandavilli et al. | |
| 7,103,848 B2 | 9/2006 | Barsness et al. | |
| 7,151,551 B2 | 12/2006 | Mandavilli et al. | |
| 7,246,118 B2 | 7/2007 | Chastain et al. | |
| 7,284,192 B2 | 10/2007 | Kashi et al. | |
| 7,346,490 B2 | 3/2008 | Fass et al. | |
| 7,373,590 B2 | 5/2008 | Woolf et al. | |
| 7,925,993 B2 | 4/2011 | Williams | |
| 7,953,736 B2* | 5/2011 | Rinearson | G06F 17/30997 707/736 |
| 8,131,647 B2 | 3/2012 | Siegel et al. | |
| 8,280,892 B2 | 10/2012 | Marvit | |
| 8,285,589 B2* | 10/2012 | Snodgrass | G06Q 30/02 705/14.16 |
| 8,423,889 B1* | 4/2013 | Zagorie | G06F 17/30905 715/255 |
| 8,832,584 B1 | 9/2014 | Agarwal | |
| 8,949,109 B2* | 2/2015 | Hoshino | G06F 3/04883 704/9 |
| 9,087,032 B1 | 7/2015 | Killalea et al. | |
| 9,275,052 B2 | 3/2016 | Siegel et al. | |
| 2002/0007309 A1* | 1/2002 | Reynar | G06F 17/2785 705/14.23 |
| 2002/0010707 A1 | 1/2002 | Chang | |
| 2002/0052880 A1 | 5/2002 | Fruensgaard et al. | |
| 2002/0116420 A1 | 8/2002 | Allam | |
| 2003/0004941 A1 | 1/2003 | Yamada et al. | |
| 2003/0009459 A1 | 1/2003 | Chastain et al. | |
| 2004/0189700 A1 | 9/2004 | Mandavilli et al. | |
| 2004/0201633 A1 | 10/2004 | Barsness et al. | |
| 2004/0237033 A1 | 11/2004 | Woolf et al. | |
| 2004/0268231 A1 | 12/2004 | Tunning | |
| 2005/0289452 A1 | 12/2005 | Kashi et al. | |
| 2006/0010368 A1 | 1/2006 | Kashi et al. | |
| 2006/0015821 A1 | 1/2006 | Jacques Parker et al. | |
| 2006/0161578 A1 | 7/2006 | Siegel et al. | |
| 2006/0288041 A1* | 12/2006 | Plastina | G06Q 30/02 |
| 2007/0005437 A1* | 1/2007 | Stoppelman | G06F 17/30994 705/14.53 |
| 2007/0073553 A1* | 3/2007 | Flinn | G06N 99/005 705/1.1 |
| 2007/0074159 A1 | 3/2007 | Ueno | |
| 2007/0192310 A1 | 8/2007 | Takagi et al. | |
| 2007/0234209 A1 | 10/2007 | Williams | |
| 2007/0282598 A1 | 12/2007 | Waelti et al. | |
| 2007/0298399 A1 | 12/2007 | Shao et al. | |
| 2008/0046845 A1 | 2/2008 | Chandra | |
| 2008/0168055 A1 | 7/2008 | Rinearson et al. | |
| 2008/0168073 A1 | 7/2008 | Siegel et al. | |
| 2008/0243637 A1* | 10/2008 | Chan | G06Q 30/02 705/26.1 |
| 2009/0193327 A1 | 7/2009 | Roychoudhuri et al. | |
| 2009/0248672 A1 | 10/2009 | McIntire et al. | |
| 2012/0022854 A1* | 1/2012 | Hoshino | G06F 3/04883 704/9 |
| 2016/0070688 A1 | 3/2016 | Yao et al. | |

OTHER PUBLICATIONS

Final Office Action for U.S. Appl. No. 15/192,568 dated Jan. 11, 2019.

Non-Final Office Action for U.S. Appl. No. 15/192,568 dated Sep. 6, 2019.

Tyson, Herb, "Security, Tracking, and Comments" from "Word 2007 Bible", Mar. 2007, Wiley.

* cited by examiner

Prepare 20g of seaweed, 50g of dried bonito, and 40 liters of water.
First, the process of making the first stock will be described.
Dry surface of the seaweed quickly with a wet towel strongly squeezed.
Add seaweed and 2 liters water to the cooking pot and light the stove. At this time, adjust the flame of the stove to boil water in the cooking pot for about 10 minutes. Then, take out the seaweed and check the stiffness of the seaweed. At this time, check with a fingernail if it indents the thick part of the seaweed, you can determine that the seaweed is ready, and then take out the seaweed from the cooking pot.
After taking out the seaweed from the cooking pot, add a small amount of water when the water boils. When the boiling subsides, add the 40g dried bonito. Then, light the flame of the stove, once it comes back to the boil, extinguish the flame, and scoop up the dregs from the water. When the dried bonito starts sinking into the cooking pot, put a bamboo basket on a bowl, and strain soaked stock. Finally, the first stock is finished.
Next, the process of making a second stock from the remaining dried bonito will be described.
After draining the first soup, add the seaweed and the dried bonito, pour 2 liters of water, and light the flame of the stove.

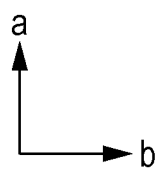

FIG. 5 small amount of water when the water boils. When the boiling subsides, add the 40g dried bonito. Then, light the flame of the stove, once it comes back to the boil, extinguish the flame, and scoop up the dregs from the water. When the dried bonito starts sinking into the cooking pot, put a bamboo basket on a bowl, ~~and strain soaked stock~~. Finally, the first stock is finished.
  Next, the process of making a second stock from the remaining dried bonito will be described.
  After draining the first soup, add the seaweed and the dried

FIG. 6 small amount of water when the water boils. When the boiling subsides, add the 40g dried bonito. Then, light the flame of the stove, once it comes back to the boil, extinguish the flame, and scoop up the dregs from the water. When the dried bonito starts sinking into the cooking pot, put a bamboo basket on a bowl, ~~and strain cooked stock~~. Finally, the first stock is finished.
  Next, the process of making a second stock from the remaining dried bonito will be described.
  After draining the first soup, add the seaweed and the dried

FIG. 7 small amount of water when the water boils. When the boiling subsides, add the 40g dried bonito. Then, light the flame of the stove, once it comes back to the boil, extinguish the flame, and scoop up the dregs from the water. When the dried bonito starts sinking into the cooking pot, put a bamboo basket on a bowl, and strain soaked stock. Finally, the first stock is finished.
  Next, the process of making a second stock from the remaining dried bonito will be described.
  After draining the first soup, add the seaweed and the dried

FIG. 8A small amount of water when the water boils. When the boiling
subsides, add the 40g dried bonito. Then, light the flame of
the stove, once it comes back to the boil, extinguish the flame,
and scoop up the dregs from the water. When the dried bonito
starts sinking into the cooking pot, put a bamboo basket on
a bowl, and strain soaked stock. Finally, the first stock is
finished.
  Next, the process of making a second stock from the
remaining dried bonito will be described.
  After draining the first soup, add the seaweed and the dried

FIG. 8B small amount of water when the water boils. When the boiling
subsides, add the 40g dried bonito. Then, light the flame of
the stove, once it comes back to the boil, extinguish the flame,
and scoop up the dregs from the water. When the dried bonito
starts sinking into the cooking pot, put a bamboo basket on
a bowl, and strain soaked stock. Finally, the first stock is
finished.
  Next, the process of making a second stock from the
remaining dried bonito will be described.
  After draining the first soup, add the seaweed and the dried

FIG. 13A

SP6 EP6 27 small amount of water when the water boils. When the boiling subsides, add the 40g dried bonito. Then, light the flame of the stove, once it comes back to the boil, extinguish the flame, and scoop up the dregs from the water. When the dried bonito starts sinking into the cooking pot, put a bamboo basket on a bowl, and strain soaked stock. Finally, the first stock is finished.
  Next, the process of making a second stock from the remaining dried bonito will be described.
  After draining the first soup, add the seaweed and the dried

SP7 EP7 27 small amount of water when the water boils. When the boiling subsides, add the 40g dried bonito. Then, light the flame of the stove, once it comes back to the boil, extinguish the flame, and scoop up the dregs from the water. When the dried bonito starts sinking into the cooking pot, put a bamboo basket on a bowl, and strain soaked stock. Finally, the first stock is finished.
  Next, the process of making a second stock from the remaining dried bonito will be described.
  After draining the first soup, add the seaweed and the dried

| CONTENT ID | CONTENT TYPE | NAME | PUBLISHER |
|---|---|---|---|
| 37 | 38 | 39 | 40 |
| 1 | BOOK | BASIC OF COOKING | SOMY PUBLICATION |
| ... | ... | ... | ... |

| MARK ID | CONTENT ID | PAGE | LINE | START COL | LENGTH | TEXT |
|---|---|---|---|---|---|---|
| 41 | 42 | 43 | 44 | 45 | 46 | 47 |
| 0 | 1 | 3 | 30 | 4 | 78 | DRIED BONITO |
| ... | ... | ... | ... | ... | ... | ... |

| KEYWORD ID (48) | KEYWORD (49) | WORD CLASS (50) | MEANING (51) | SCORE (52) |
|---|---|---|---|---|
| 50 | COOKING POT | NOUN | COOKING: COOKWARE | 1 |
| 51 | DRIED BONITO | NOUN | COOKING: FOOD | 2 |
| 52 | BOWL | NOUN | COOKING: COOKWARE | 1 |
| 53 | BAMBOO BASKET | NOUN | COOKING: COOKWARE | 1 |
| 54 | STOCK | NOUN | COOKING: FOOD | 3 |
| 55 | STRAIN | VERB | MOTION: REFINING | 1 |
| ... | ... | ... | ... | ... |

| TAG ID (53) | TAG TYPE (54) | TAG NAME (55) |
|---|---|---|
| 1 | USER SETTING | STUDY |
| 2 | USER SETTING | SMALL MATERIAL |
| 3 | USER SETTING | MEMO |
| 4 | USER SETTING | PRESENTATION MATERIAL |
| ... | ... | ... |
| 100 | AUTOMATIC SETTING | COOKING |
| 101 | AUTOMATIC SETTING | FOOD |
| ... | ... | ... |

Prepare 20g of seaweed, 50g of dried bonito, and 40 liters of water.
  First, the process of making the first stock will be described.
  Dry surface of the seaweed quickly with a wet towel strongly squeezed.
  Add seaweed and 2 liters water to the cooking pot and light the stove. At this time, adjust the flame of the stove to boil water in the cooking pot for about 10 minutes. Then, take out the seaweed and check the stiffness of the seaweed. At this time, check with a fingernail if it indents the thick part of the seaweed, you can determine that the seaweed is ready, and then take out the seaweed from the cooking pot.
  After taking out the seaweed from the cooking pot, add a small amount of water when the water boils. When the boiling subsides, add the 40g dried bonito. Then, light the flame of the stove, once it comes back to the boil, extinguish the flame, and scoop up the dregs from the water. When the dried bonito starts sinking into the cooking pot, put a bamboo basket on a bowl, and strain soaked stock. Finally, the first stock is finished.
  Next, the process of making a second stock from the remaining dried bonito will be described.
  After draining the first soup, add the seaweed and the dried bonito, pour 2 liters of water, and light the flame of the stove.

Prepare 20g of seaweed, 50g of dried bonito, and 40 liters of water.
 First, the process of making the first stock will be described.
 *Dry surface of the seaweed quickly with a wet towel strongly squeezed.*
 Add seaweed and 2 liters water to the cooking pot and light the stove. At this time, adjust the flame of the stove to boil water in the cooking pot for about 10 minutes. Then, take out the seaweed and check the stiffness of the seaweed. At this time, *check with a fingernail if it indents the thick part of the seaweed, you can determine that the seaweed is ready,* and then take out the seaweed from the cooking pot.
 After taking out the seaweed from the cooking pot, add a small amount of water when the water boils. When the boiling subsides, add the 40g dried bonito. Then, light the flame of the stove, once it comes back to the boil, extinguish the flame, and scoop up the dregs from the water. *When the dried bonito starts sinking into the cooking pot, put a bamboo basket on a bowl, and strain soaked stock. Finally, the first stock is finished.*
 *Next, the process of making a second stock from the remaining dried bonito will be described.*
 After draining the first soup, add the seaweed and the dried bonito, pour 2 liters of water, and light the flame of the stove.

FIG. 26

Prepare 20g of seaweed, 50g of dried bonito, and 40 liters of water.
First, the process of making the first stock will be described.
Dry surface of the seaweed quickly with a wet towel strongly squeezed.
Add seaweed and 2 liters water to the cooking pot and light the stove. At this time, adjust the flame of the stove to boil water in the cooking pot for about 10 minutes. Then, take out the seaweed and check the stiffness of the seaweed. At this time, check with a fingernail if it indents the thick part of the seaweed, you can determine that the seaweed is ready, and then take out the seaweed from the cooking pot.
After taking out the seaweed from the cooking pot, add a small amount of water when the water boils. When the boiling subsides, add the 40g dried bonito. The COOKING —TG
the stove, once it comes back to the boil, extinguish the flame, and scoop up the dregs from the water. When the dried bonito starts sinking into the cooking pot, put a bamboo basket on a bowl, and strain soaked stock. Finally, the first stock is finished.
Next, the process of making a second stock from the remaining dried bonito will be described.
After draining the first soup, add the seaweed and the dried bonito, pour 2 liters of water, and light the flame of the stove.

FIG. 27

Prepare 20g of seaweed, 50g of dried bonito, and 40 liters of water.
First, the process of making the first stock will be described.
Dry surface of the seaweed quickly with a wet towel strongly squeezed.
Add seaweed and 2 liters water to the cooking pot and light the stove. At this time, adjust the flame of the stove to boil water in the cooking pot for about 10 minutes. Then, take out the seaweed and check the stiffness of the seaweed. At this time, check with a fingernail if it indents the thick part of the seaweed, you can determine that the seaweed is ready, and then take out the seaweed from the cooking pot.
After taking out the seaweed from the cooking pot, add a small amount of water when the water boils. When the boiling subsides, add the 40g dried bonito. The the stove, once it comes back to the boil, and scoop up the dregs from the water. starts sinking into the cooking pot, put a a bowl, and strain soaked stock. Finally, finished.
Next, the process of making a second stock from the remaining dried bonito will be described.
After draining the first soup, add the seaweed and the dried bonito, pour 2 liters of water, and light the flame of the stove.

COOKING — TG
MAGICAL SEASONER
TODAY'S COOKED DISH
<MY COMMENT>
TIMING OF FILTERING OUT
SOUP STOCK IS IMPORTANT

<COOKING BASICS>

○ STRONGLY SQUEEZED · · ·

○ SEAWEED · · ·

○ IN THE COOKING POT · · ·

<WORDS>
- COOKING POT
- DRIED BONITO
- BOWL
- BAMBOO BASKET
- STOCK
- STRAIN

<MEANING>
- COOKING: COOKWARE
- COOKING: FOOD
- MOTION: REFINING

<DRIED BONITO>
- 2ND PAGE: 3RD LINE 7TH COLUMN
- 2ND PAGE: 32ND LINE 3RD COLUMN
- 3RD PAGE: 7TH LINE 8TH COLUMN
- 3RD PAGE: 15TH LINE 9TH COLUMN
- 3RD PAGE: 28TH LINE 1ST COLUMN
- 3RD PAGE: 30TH LINE 8TH COLUMN

One day, an accident occurred due to Ryoma's carelessness. As a result, Ryoma who had lost his most beloved mother grew strong after the accident. Ryoma who had came to Edo started learning swordsmanship under Chiba Sadakichi, a master of a Chiba sword school, and Chiba Jutaro. Just at that time, a big incident that shook Japan called the arrival of the black ships occurred. Ryoma doubted the worth of swordsmanship when he saw the blackships.
Ryoma grew through trials of life including his relationship with Yoshida Shoin, Katsura Jigoro, the imprisonment incident of Iwasaki Yataro, parting with his first lover, and the death of his father Yahei, amongst other things. When Japan's feudal government concluded the Japan-US treaty of Peace and Amity, people having been discontented with the treaty started the movement of advocating reverence for the Emperor and the expulsion of foreigners.
In Tosa Ban, Samurai made the political party of Tosa Kino-Tou and fought against Kyokai Sansei Yoshida Toyo. Meanwhile, Iwasaki Yataro selected Yoshida Toyo as the bureaucrat of the Ban

MARKER MENU

MEANING

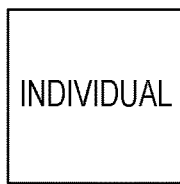
INDIVIDUAL

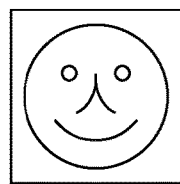

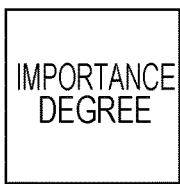
IMPORTANCE DEGREE

APPARATUS AND METHOD FOR SHARING INTRODUCTION INFORMATION

CROSS-REFERENCE TO RELATED APPLICATION

This application is a continuation application of U.S. patent application Ser. No. 13/188,362, filed on Jul. 21, 2011, which claims priority from Japanese Patent Application JP 2010-166327 filed in the Japan Patent Office on Jul. 23, 2010. Each of the above referenced applications is hereby incorporated by reference in its entirety.

BACKGROUND

The present disclosure relates to an information processing apparatus, an information processing method, and an information processing program, and more particularly, to an information display system structured using, for example, an information display terminal that displays an electronic book such as a novel or a magazine transferred as digital data.

A portable retrieval apparatus according to the related art reads and displays, as dictionary information, an English word translated from a Japanese word, or a usage or the like of the English word from a database for an electronic dictionary, for example, when a user inputs the Japanese word using a keyboard and operates a retrieval start key.

When the user operates a cursor key or a touch panel with an input pen to select desired words, a usage, or the like in the dictionary information in the state where the dictionary information is displayed, the portable retrieval apparatus underlines the selected words, the usage, or the like.

Thus, the portable retrieval apparatus can be used just as a user underlines desired words, a usage, or the like in a paper dictionary with a pencil (for example, Japanese Unexamined Patent Application Publication No. 10-11457 (pages 3, 5, and 6)).

SUMMARY

When a user selects desired words, a usage, or the like of the dictionary information, the portable retrieval apparatus with the above-described configuration maintains information indicating the selected words, usage, or the like.

Therefore, even when the portable retrieval apparatus displays the words, usage, or the like once selected again, the portable retrieval apparatus can underline the selected words, usage, or the like.

However, when the portable retrieval apparatus displays the selected words, usage, or the like again, problems may arise in that it is difficult to easily distinguish the selected words, usage, or the like and usability is poor.

It is desirable to provide an information processing apparatus, an information processing method, and an information processing program capable of improving usability.

According to an embodiment of the disclosure, there is provided an information processing apparatus including: a selection unit selecting at least a part of a text included in contents; an acquisition unit acquiring a processing result of natural language processing for the part of the text selected by the selection unit; a specifying unit specifying a predetermined part of the text based on the processing result acquired by the acquisition unit; a detection unit detecting a keyword from the predetermined part of the text based on the processing result acquired by the acquisition unit; a tag generation unit automatically generating a tag in accordance with the keyword detected by the detection unit; and an association unit associating the tag generated by the tag generation unit with the predetermined part of the text.

According to the embodiment of the disclosure, it is possible to associate the tag with the predetermined part of the text and easily identify where the predetermined part of the text is located based on the tag.

According to the embodiment of the disclosure, it is possible to realize an information processing apparatus, an information processing method, and an information processing program. The information processing apparatus includes: a selection unit selecting at least a part of a text included in contents; an acquisition unit acquiring a processing result of natural language processing for the part of the text selected by the selection unit; a specifying unit specifying a predetermined part of the text based on the processing result acquired by the acquisition unit; a detection unit detecting a keyword from the predetermined part of the text based on the processing result acquired by the acquisition unit; a tag generation unit automatically generating a tag in accordance with the keyword detected by the detection unit; and an association unit associating the tag generated by the tag generation unit with the predetermined part of the text. Accordingly, since it is possible to associate the tag with the predetermined part of the text and easily identify where the predetermined part of the text is located based on the tag, usability can be improved.

BRIEF DESCRIPTION OF THE DRAWINGS

FIG. 4 is a diagram schematically illustrating a display of an electronic book image.

FIG. 5 is a diagram schematically illustrating an instruction (1) of a desired part of a text by a slide operation.

FIG. 6 is a diagram schematically illustrating an instruction (2) of the desired part of the text by a slide operation.

FIG. 7 is a diagram schematically illustrating an instruction (3) of the desired part of the text by a slide operation.

FIGS. 8A and 8B are diagrams schematically illustrating an instruction (4) of the desired part of the text by a slide operation.

FIGS. 13A and 13B are diagrams schematically illustrating the detection of the instruction range when the desired part of the text is surrounded.

FIG. 18 is a diagram schematically illustrating the configuration of a book registration table.

FIG. 19 is a diagram schematically illustrating the configuration of a desired part registration table.

FIG. 20 is a diagram schematically illustrating the configuration of a keyword registration table.

FIG. 21 is a diagram schematically illustrating the configuration of a tag registration table.

FIG. 24 is a diagram schematically illustrating an emphasis display (1) of a desired part.

FIG. 25 is a diagram schematically illustrating an emphasis display (2) of desired parts.

FIG. 26 is a diagram schematically illustrating a display of a tag.

FIG. 27 is a diagram schematically illustrating a display of association information.

FIG. 28 is a diagram schematically illustrating the configuration of a first hierarchical index image.

FIG. 29 is a diagram schematically illustrating the configuration of a second hierarchical index image.

FIG. 30 is a diagram schematically illustrating the configuration of a third hierarchical index image.

FIG. 35 is a diagram schematically illustrating a display of an emphasis display menu image.

DETAILED DESCRIPTION OF EMBODIMENTS

Hereinafter, preferred embodiments (hereinafter, simply referred to as embodiments) of the disclosure will be described with reference to the drawings. The description will be made in the following order.
1. Overview of Embodiments
2. First Embodiment
3. Second Embodiment
4. Modified Examples 1. Overview of Embodiments First, the overview of the embodiments will be described. After the overview of the embodiments is described, first and second embodiments will be described as specific examples.

Figure 1:
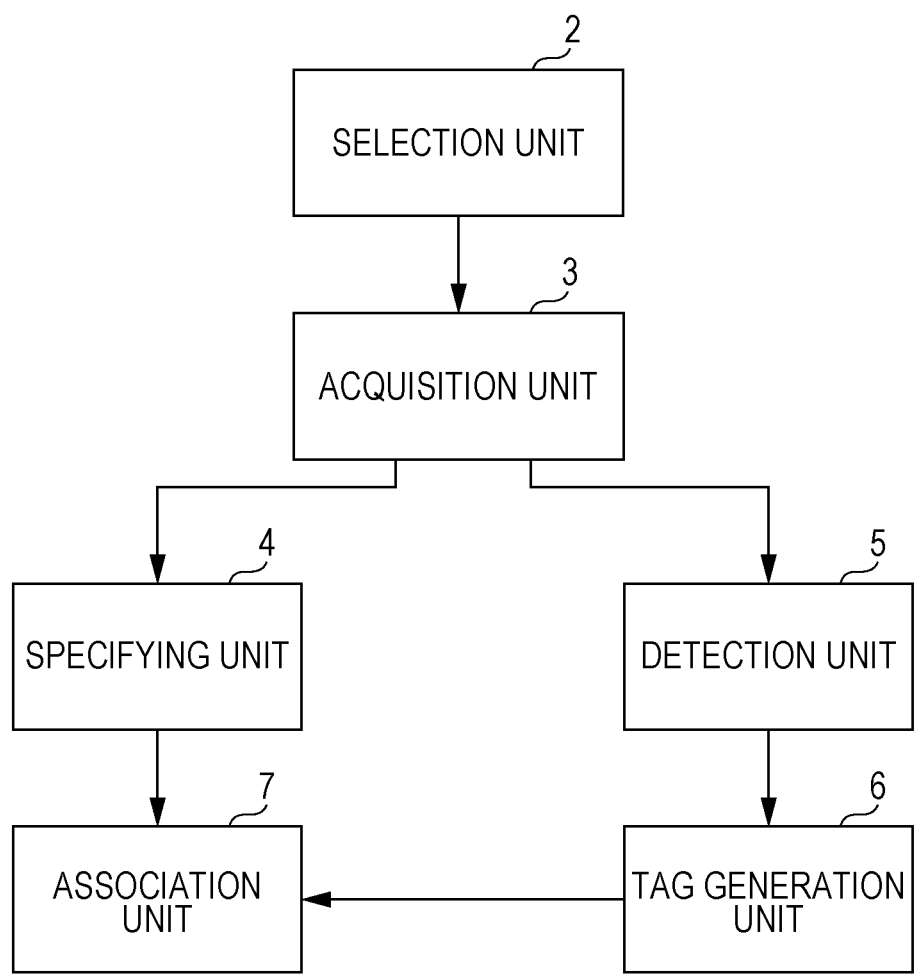
FIG. 1 is a block diagram illustrating an overview of the circuit configuration of an information processing apparatus according to embodiments.

In FIG. 1, Reference Numeral 1 denotes an information processing apparatus according to the embodiments. A selection unit 2 of the information processing apparatus 1 selects at least a part of a text included in contents. An acquisition unit 3 of the information processing apparatus 1 acquires a processing result of natural language processing for the part of the text selected by the selection unit 2.

A specifying unit 4 of the information processing apparatus 1 specifies a predetermined part of the text base on the processing result acquired by the acquisition unit 3. A detection unit 5 of the information processing apparatus 1 detects a keyword in the predetermined part of the text based on the processing result acquired by the acquisition unit 3.

A tag generation unit 6 of the information processing apparatus 1 automatically generates a tag corresponding to the keyword detected by the detection unit 5. An association unit 7 of the information processing apparatus 1 associates the tag generated by the tag generation unit 6 with the predetermined part of the text.

The information processing apparatus 1 is capable of associating the tag with the predetermined part of the text and easily identifying where the predetermined part of the text is located based on the tag. Thus, the information processing apparatus 1 can improve usability.

2. First Embodiment 2-1. Configuration of Information Display System

Figure 2:
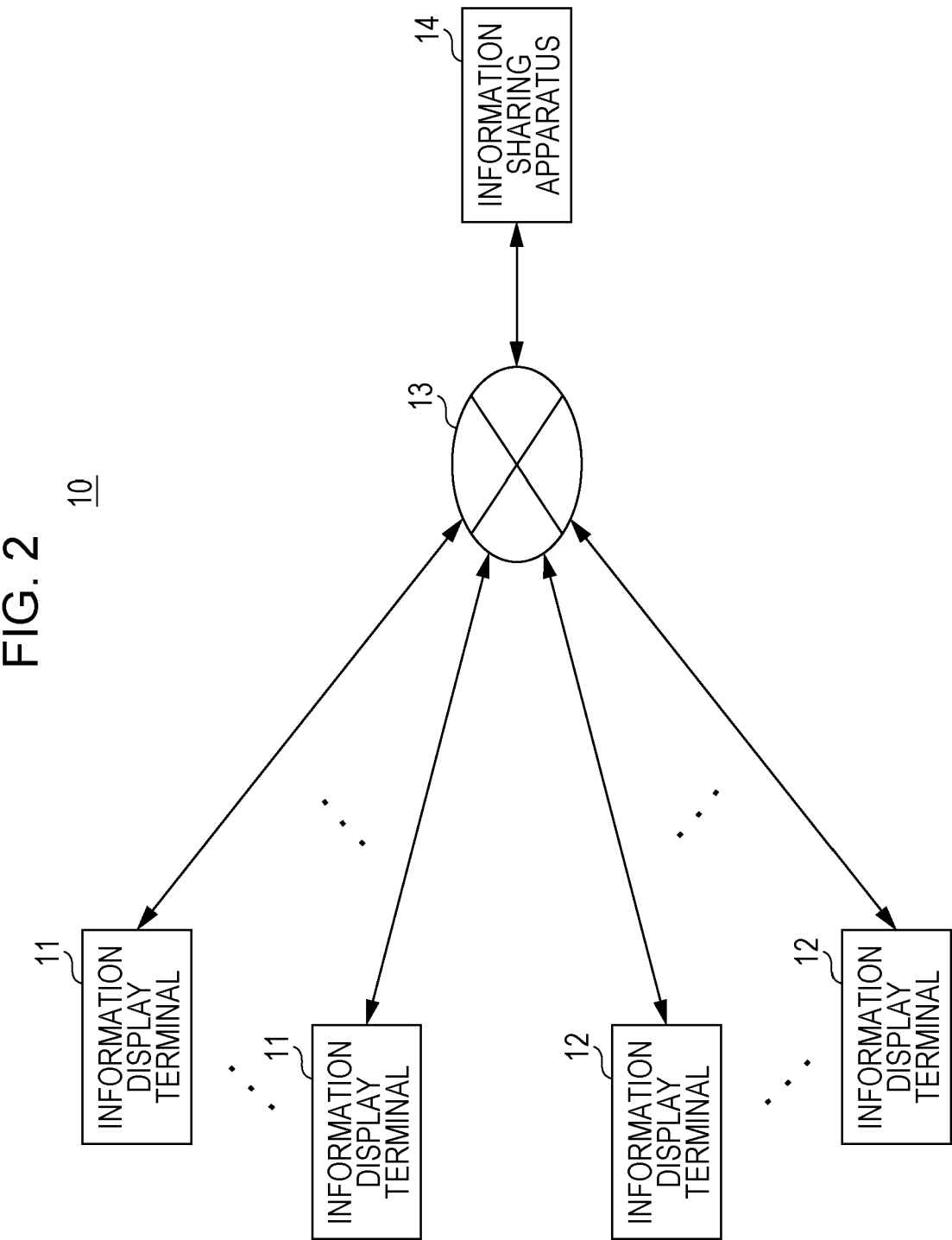
FIG. 2 is a block diagram illustrating the configuration of an information display system according to a first embodiment.

In FIG. 2, Reference Numeral 10 denotes an information display system according a first embodiment. In the information display system 10, for example, two kinds of information display terminals 11 and 12, which are specific examples of the information processing apparatus 1 described above, can communicate with an information sharing apparatus 14 via a network 13.

The information display terminals 11 and 12 receive and store (that is, acquire) electronic book data of an electronic book such as novels, magazines, or learning materials transferred as digital data from the information sharing apparatus 14 or an electronic book supply apparatus (not shown) via the network 13. Moreover, the electronic book such as learning materials may be a textbook, a reference book, or the like.

The information display terminals 11 and 12 can also receive and store a home page, a report, or the like publicized as digital data on the network 13 as the electronic book data of an electronic book from an information supply apparatus (not shown) via the network 13.

Here, the electronic book includes a single or a plurality of pages. In the individual pages of the electronic book, only text may be disposed and generated throughout a plurality of rows, or a text and a photo image for a sheet cover or insertion, an illustration image, or the like are disposed and generated through a plurality of rows.

The electronic book data of the electronic book includes book attribute data, text data of a text for each page, and image data of a photo image for a cover sheet or insertion, an illustrated image, or the like.

The book attribute data stores book identification information used to individually identify electronic books, the kinds of electronic book (hereinafter, also referred to as book types) such as books or magazines, the titles of the electronic books (hereinafter, also referred to as book titles), publisher names of the electronic books, and the like.

The text data for each page includes a page number, a text generated with a plurality of kinds of characters such as Hiragana and Katakana characters (Japanese script), Japanese Kanji characters, punctuations, and blanks through a plurality of rows, and character location information indicating the positions of the characters in the text with row and column numbers.

In the text data for each page, individual characters (actually, character codes for characters) of the text match the character position information indicating the positions of these characters in the text.

When the information display terminals 11 and 12 receive an instruction to display an electronic book in the state of acquiring the electronic book data, the information display terminals 11 and 12 appropriately display the text for each page of the electronic book together with a photo image for a cover sheet or insertion, an illustration image, or the like as electronic book image based on the electronic book data.

When the information display terminals 11 and 12 display the electronic book image, the information display terminals 11 and 12 are configured so that users can select a predetermined part (hereinafter, also referred to as a desired part) of a desired paragraph, a desired clause, a desired word, or the like in the text of this electronic book image.

When the information display terminals 11 and 12 receive an instruction to display a desired part in the text of the electronic book image from the users in a state of displaying the electronic book image, as described below, the information display terminals 11 and 12 specify and display the desired part in the text in the emphasis manner.

When the information display terminals 11 and 12 display the desired part of the text in the emphasis manner, the information display terminals 11 and 12 generate and store desired part registration data to register the desired part displayed in the emphasis manner.

In this way, when the users select the desired part in the text of the electronic book image being displayed, the information display terminals 11 and 12 can maintain the selected desired part as the desired part registration data.

Accordingly, when the users displays the electronic book image in which the desired part is selected from the text again, the information display terminals 11 and 12 can display the desired part in the emphasis manner in the text of the electronic book image again based on the desired part registration data so that the users can confirm the previously selected desired part.

Moreover, the information display terminals 11 and 12 transmit book-associated data, which includes the electronic book in which the users select the desired part or various kinds information regarding the desired part, to the information sharing apparatus 14 via the network 13.

When the information sharing apparatus 14 receives the book-associated data transmitted from the information display terminals 11 and 12, the information sharing apparatus 14 stores the book-associated data. For example, when the information sharing apparatus 14 receives a request for supplying information regarding desired parts selected with other information display terminals 11 and 12 from the information display terminals 11 and 12, the information sharing apparatus 14 generates desired part information supply data for supplying the information regarding the desired parts based on the book-associated data.

The information sharing apparatus 14 transmits the desired part information supply data to the information display terminals 11 and 12. Thus, the information sharing apparatus 14 displays the desired parts selected in the text of the emphasis manner in the electronic book by the other information display terminals 11 and 12 in the text of the same electronic book image based on the desired part information supply data in the information display terminals 11 and 12.

Thus, when the plurality of information display terminals 11 and 12 share the desired parts selected by the other information display terminals 11 and 12 using the information sharing apparatus 14 and display the same electronic book image, the information display terminals 11 and 12 can display the shared desired parts in the emphasis manner.

2-2. Hardware Configuration of Function Circuit Block of One Information Display Terminal Next, the hardware configuration of the function circuit block of one information display terminal 11 of the two kinds of information display terminals 11 and 12 will be described with reference to FIG. 3.

Figure 3:
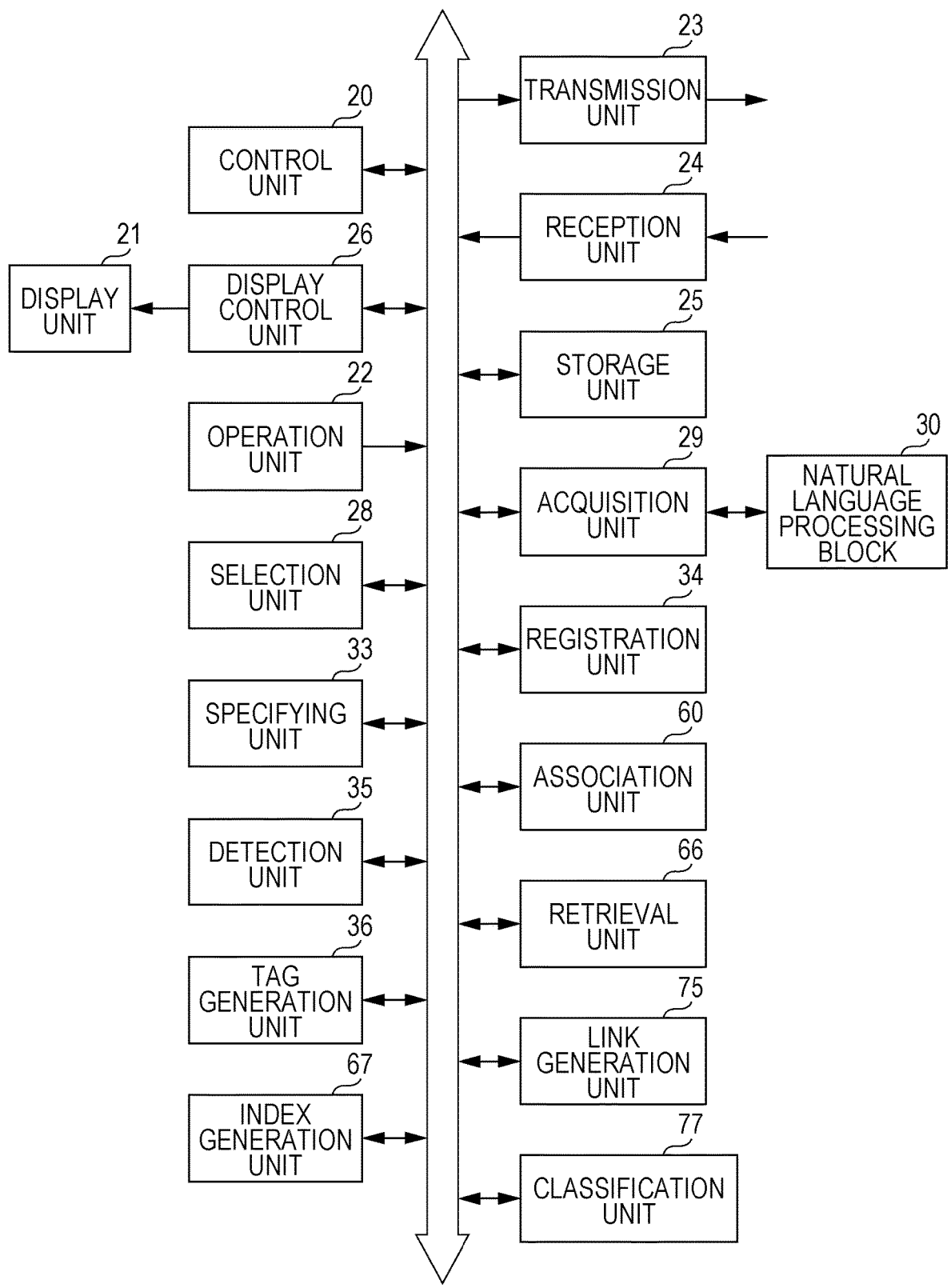
FIG. 3 is a block diagram illustrating the circuit configuration (1) of a function circuit block of an information display terminal.

As shown in FIG. 3, the one information display terminal 11 includes a control unit 20 that controls the entire information display terminal 11. The information display terminal 11 includes a display unit 21 that displays various operation images or an electronic book image.

The information display terminal 11 further includes an operation unit 22 that is configured by a touch panel installed so as to cover a display surface of the display unit 21 or operation keys installed on the housing surface of the information display terminal 11.

When the operation unit 22 is operated by key operation such as pressing or rotating of the operation keys, the operation unit 22 transmits an operation command corresponding to the key operation to the control unit 20. Thus, the control unit 20 performs a process corresponding to the operation command given from the operation unit 22.

The touch panel serving as the operation unit 22 is configured to input various commands or instructions by touching the surface of the touch panel with a finger, a stylus pen, or the like just as a user touches the display surface of the display unit 21.

The user executes touch operations of inputting various commands or instructions by touching the surface of the touch panel. For example, the user can touch the surface of the touch panel at one point with the tip of a single finger, the tip of a single stylus pen, or the like and immediately detaches his or her finger or the stylus pen.

Moreover, the user can execute the touch operation of touching the surface of the touch panel with the tip of a single finger, the tip of a single stylus pen, or the like, immediately executing an operation rapidly in an arbitrary direction from the touch position, and then detaching his or her finger or the stylus from the surface of the touch panel.

Moreover, the user can execute the touch operation by touching the surface of the touch panel with the tip of a single finger, the tip of a single stylus pen, or the like and moving the finger or the stylus pen in a desired line such as a straight line or a circle in the touched state (that is, moving the tip of his or her finger or the like smoothly on the surface).

In the following description, in particular, a tap operation is a touch operation of touching nearly a single point of the surface of the touch panel with the tip of a single finger, the tip of a single stylus pen, or the like and immediately detaching his or her finger or the stylus pen from the surface of the touch panel.

For example, the tap operation is an operation that is executed on the operation image or the electronic book image displayed on the display unit 21 to instruct an instruction item such as an icon or a button disposed in the operation image or the electronic book image.

In the following description, in particular, a flick operation is a touch operation of touching the surface of the touch panel with the tip of a single finger, the tip of a single stylus pen, or the like, immediately detaching his or her finger, the stylus pen, or the like from the surface of the touch panel, and executing an operation rapidly in an arbitrary direction from the touch position.

For example, the flick operation is an operation that is executed to change over a page of an electronic book image displayed on the display unit 21, as if turning a page of a book, and is executed to change (scroll) a display range when the entirety of the electronic book image corresponding to one page may not be displayed on the display unit 21.

In the following description, in particular, a slide operation is a touch operation of touching the surface of the touch panel with the tip of a single finger, the tip of a single stylus pen, or the like and moving his or her finger, the stylus pen, or the like in a desired line such as a circle in the touched state.

For example, the slide operation is an operation that is executed to instruct selection of a desired part in the text of an electronic book image displayed on the display unit 21.

In the following description, when the tap operation, the flick operation, and the slide operation may not particularly be distinguished from each other, these operations are simply referred to as a touch operation.

The operation unit 22 detects the touch position of the tip of his or her finger, the tip of a stylus pen, or the like as the coordinates of the pixel position on the display surface of the display unit 21 at a constant time interval such as a few [µsec], which is very short between the start and the end of the touch operation, when the user touches the surface of the touch panel.

At this time, the operation unit 22 detects the touch position as the coordinates (that is, two dimensional coordinates) of the pixel position expressed on the assumption that an x axis is parallel to the vertical direction of the display surface and a y axis is parallel to the horizontal direction of the display surface. In the following description, the vertical direction of the display surface is also referred to as a display surface vertical direction and the horizontal direction of the display surface is also referred to as a display surface horizontal direction.

The operation unit 22 transmits touch position information indicating the detected touch position to the control unit 20 whenever the operation unit 22 detects the touch position.

When the control unit 20 receives the touch position information from the operation unit 22, for example, the control unit 20 detects a time of receiving the touch position information as a time (hereinafter, also referred to as a touch operation time) in which the touch operation is executed from the start to the end of the touch operation.

For example, the control unit 20 detects a displacement amount of touch position indicated by the touch position information while the touch information is given, as a touch position displacement amount indicating how much the touch position is displayed from the start to the end of the touch operation.

The control unit 20 determines which touch operation is executed based on the touch operation time and the touch position displacement amount. That is, the control unit 20 determines whether the touch operation executed at this time is the tap operation of touching nearly one point with the tip of a finger or the like and detaching the finger or the like within a predetermined very short time.

The control unit 20 also determines whether the touch operation executed at this time is the flick operation of moving the tip of a finger or the like only by a very short distance and detaching the finger or the like within a predetermined very short time or is the slide operation of moving the tip of a finger or the like for a predetermined time or more or by a predetermined distance or more and detaching the finger or the like.

When the control unit 20 determines that the touch operation executed at this time is the tap operation, the control unit 20 determines an instruction item instructed through the tap operation in an image being displayed on the display unit 21 based on the touch position of the tap operation.

The control unit 20 detects a command which can be assigned in advance to the instruction item (that is, the determined instruction time) instructed through the tap operation and perform processing in response to the detected command.

When the control unit 20 determines that the touch operation executed at this time is the flick operation or the slide operation, as described below, the control unit 20 performs processing in response to the flick operation or the slide operation.

Thus, the control unit 20 performs various kinds of processing corresponding to a key operation or a touch operation in response to this key operation of the operation key of the operation unit 22 or this touch operation of the touch panel of the operation unit 22.

In effect, when the control unit 20 receives a request for acquiring a desired electronic book through the key operation or the tap operation, the control unit 20 transmits acquisition request data used to make the request for acquiring this electronic book from the transmission unit 23 to the information sharing apparatus 14, the electronic book supply apparatus, or the information supply apparatus via the network 13.

As a consequence, when the reception unit 24 receives the transmitted electronic book data of the electronic book asked from the information sharing apparatus 14, the electronic book supply apparatus, or the information supply apparatus, the control unit 20 transmits the received electronic book data to the storage unit 25 to store the electronic book data.

When the control unit 20 acquires a home page, a report, or the like publicized on the network 13 from the information supply apparatus, the control unit 20 displays the home page, the report, or the like on the display unit 21 without storing the home page, the report, or the like in the storage unit 25.

At this time, the control unit 20 can allow the user to execute a predetermined operation of selecting a part of interest in the text of the home page, the report, or the like by scrap or the like, in a state where the home page, the report, or the like is displayed.

Moreover, the control unit 20 may store the selected part as the electronic book data of the electronic book in the storage unit 25, when the user selects the part of the text of the home page, the report, or the like.

Thus, the control unit 20 can acquire a plurality of electronic book data from the external information sharing apparatus 14, the electronic book supply apparatus, or the information supply apparatus and store the plurality of electronic book data in the storage unit 25.

When the user operates the key operation or the tap operation to select an electronic book to be displayed and gives a request for displaying this electronic book, the control unit 20 reads the electronic book data of the electronic book selected from the storage unit 25 and transmits the electronic book data to the display control unit 26.

At this time, the display control unit 26 generates an electronic book image data corresponding to one page based on the electronic book data. For example, the display control unit 26 transmits at least a part of the electronic book image data as data of a display image to the display unit 21 in accordance with the size or resolution of the display surface of the display unit 21.

Thus, as shown in FIG. 4, the display control unit 26 displays at least a part of an electronic book image 27, which includes a one-page text (a photo image or an illustration image displayed together with a one-page text) which is based on the electronic book image data, across the entire display surface of the display unit 21.

Moreover, the display control unit 26 displays at least a part of the electronic book image 27 on the display surface of the display unit 21 by setting the display surface vertical direction to be parallel to the image vertical direction and the display surface horizontal direction to be parallel to the image horizontal direction.

In the following description, between one end and the other end of the image vertical direction parallel to the display surface vertical direction in the electronic book image 27 (see FIG. 4), the one end indicated by an arrow a is also referred to as an image upper side and the other end opposite to the one end indicated by the arrow a is also referred to as an image lower side.

In the following description, between one end and the other end of the image horizontal direction parallel to the display surface horizontal direction in the electronic book image 27 (see FIG. 4), the one end indicated by an arrow b is also referred to as an image right side and the other end opposite to the one end indicated by the arrow b is also referred to as an image left side.

When the electronic book data is generated intentionally to display a horizontally written text, as shown in FIG. 4, the horizontally written text of the electronic book image 27 is displayed on the display surface of the display unit 21 so that the individual rows of the text are parallel to the image horizontal direction.

In the case where the text is horizontally written, for example, characters located at the same position from the left side of the image in the respective lines can be aligned as a column parallel to the image vertical direction.

When the electronic book data is generated intentionally to display a vertically written text, the vertically written text of the electronic book image 27 is displayed on the display surface of the display unit 21 so that the individual lines of the text are parallel to the image vertical direction.

In the case where the text is vertically written, for example, characters located at the same position from the upper side of the image in the respective lines can be aligned as a column parallel to the image horizontal direction.

In the following description, irrespective of the horizontally written text and the vertically written text, the beginning side of the text in the electronic book image 27 is simply referred to as a front side and the finishing side of the text is simply referred to as a rear side.

When the user operates a touch operation in the state where the electronic book image 27 is displayed and the control unit 20 determines that the touch operation is the flick operation, the control unit 20 detects a displacement direction (hereinafter, also referred to as a touch position displacement direction) of the touch position through the flick operation.

The control unit 20 controls the display control unit 26 so as to newly change over the display of the electronic book image 27, when the detected touch position displacement direction is a direction to be displaced from the image right side to the image left side or is a direction to be displaced from the image left side to the image right side.

At this time, the display control unit 26 generates new electronic book image data based on the electronic book data in the touch position displacement direction and transmits the generated electronic book image data to the display unit 21.

Thus, the display control unit 26 newly changes over the electronic book image 27 being currently displayed on the display unit 21 to display the electronic book image one page before or one page after in the touch position displacement direction.

In this way, the display control unit 26 newly changes over the electronic book images 27 displayed on the display unit 21, as if the pages of the book were sequentially turned, in response to the flick operation on the touch panel.

The control unit 20 controls the display control unit 26 to change the display range of the electronic book image 27, when the detected touch position displacement direction is a direction to be displaced from the image upper side to the image lower side or is a direction to be displaced from the image lower side to the image upper side.

At this time, the display control unit 26 changes the transmitted part of the electronic book image data transmitted to the display unit 21 into a part thereof to be transmitted to the display unit 21 in response to the displacement direction of the touch position.

Thus, the display control unit 26 changes the display range of the electronic book image 27 by scrolling the electronic book image 27 displayed on the display unit 21 toward the lower side of the image or the upper side of the image.

In this way, the display control unit 26 can change the display range of the electronic book image 27 in response to the flick operation on the touch panel, even when the entire one-page electronic book image 27 may not be displayed across the entire display surface of the display unit 21.

2-2-1. Emphasis Display Process

Next, an emphasis display process of registering and displaying a desired part selected in the text of the electronic book by the user in an emphasis manner will be described.

The control unit 20 can instruct a desired part of the text, even when the user executes the slide operation on the surface of the touch panel with the tip of his or her finger by using one of various smooth operations in the state where the electronic book image 27 is displayed on the display unit 21.

As shown in FIG. 5, for example, the user can execute the slide operation to instruct a desired part of the text with the tip of his or her finger or the like by tracing the desired part of the text in a substantially straight line shape to instruct the desired part of the text.

As shown in FIG. 6, for example, the user can execute the slide operation to instruct the desired part of the text with the tip of his or her finger or the like by tracing the desired part of the text in a wavy shape to instruct the desired part of the text.

As shown in FIG. 7, for example, the user can execute the slide operation to instruct a desired part of the text with the tip of his or her finger or the like by drawing a pair of parentheses on the desired part of the text to instruct the desired part of the text.

As shown in FIGS. 8A and 8B, for example, the user can execute the slide operations to instruct the desired part of the text with the tip of his or her finger or the like by drawing a line of a desired shape such as a rectangular shape or a circular shape surrounding the desired part of the text to instruct the desired part of the text.

However, even when the user executes the slide operation in accordance with any method in the state where the electronic book image 27 is displayed on the display unit 21, the user may not instruct the desired part of the text by using a method of holding the information display terminal 11 or his or her dominant hand at the time of operating the slide operation.

For example, when the user executes the slide operation to trace the desired part of the text in the substantially straight line shape with his or her finger or the like, the user may trace the desired part obliquely with respect to the line direction of the plurality of characters of the desired part or in an arched shape and thus may trace a part deviated from the desired part.

Moreover, when the user executes the slide operation to trace the desired part of the text in the wavy shape, the user may trace a part deviated from the desired part due to a variation in the height of the wavy shape during the slide operation or may trace a part gradually deviated from the desired part.

As a consequence, when the user executes the slide operation to trace the desired part of the text with the tip of his or her finger or the like in a nearly straight line shape or a nearly wavy shape, the user may instruct a part other than the desired part of the text due to touching of the tip of his or her finger or the like to a line adjacent to the desired part in the upper or lower direction of the image.

When the user executes the slide operation to trace the desired part of the text with the tip of his or her finger or the like in a nearly straight line shape or a nearly wavy shape, for example, the user may trace both the desired part and a part before or after the desired part due to the fact that the user may not view the characters due to shadow of his or her finger or the like. In this case, the user instructs both the desired part and the part other than the desired part of the text.

For example, when the user does not view the characters due to the shading of his or her finger or the like, the user may trace a part between the head and the tail of the desired part and thus may actually instruct the part shorter than the desired part.

When the user executes the slide operation to parenthesize the desired part of the text with his or her finger or the like, the user may parenthesize a part before or after the desired part and may thus instruct both the desired part and the part other than the desired part.

Moreover, when the user executes the side operation to parenthesize the desired part of the text, the user may parenthesize the desired part up to a line adjacent to the desired part in the upper or lower direction of the image and thus may instruct both the desired part and the line.

When the user executes the slide operation to parenthesize the desired part of the text, the user may parenthesize only a part between the head to the tail of the desired part and thus may actually instruct the part shorter than the desired part.

When the user executes the slide operation to surround the desired part of the text with his or her finger or the like, the user may surround both the desired part and a part before or after the desired part and thus may instruct both the desired part and the part other than the desired part.

Moreover, when the user executes the slide operation to surround the desired part of the text with his or her finger or the like, the user may surround both the desired part and a line adjacent to the desired part in the upper or lower direction and thus may instruct both the desired part and the line.

Furthermore, when the user executes the slide operation to surround the desired part of the text with his or her finger or the like, the user may surround only a part between the head and the tail of the desired part and thus may actually instruct the part shorter than the desired part.

Therefore, when the user instructs the desired part in the state where the electronic book image 27 is displayed, the control unit 20 controls the selection unit 28 to select a part estimated to be instructed for selection of the desired part from the text as an analysis target used to specify the desired part. In the following description, the part estimated to be instructed for selection of the desired part from the text is also referred to as an instruction estimated part.

In effect, when the control unit 20 determines whether the touch operation executed on the surface of the touch panel is the slide operation in the state where the electronic book image 27 is displayed, the control unit 20 detects whether the user operates the slide operation again within a predetermined time selected in advance from the time of this determination.

In the following description, a time at which it is determined that the touch operation executed on the touch panel is the slide operation is referred to as an operation determination time.

The predetermined time in which time measurement starts at the operation determination time is appropriately selected in advance by supposing a time necessary when the user executes the slide operation continuously twice and instructs to draw a pair of parentheses on the desired part of the text.

The control unit 20 determines that the slide operation has been executed once to trace or surround the desired part of the text in the electronic book image 27, when the slide operation is not executed again within the predetermined time from the operation determination time.

At this time, the control unit 20 detects the trajectory (hereinafter, also referred to as a touch trajectory) of the touch position displaced from the start to the end of the slide operation based on the touch position information indicating the touch position detected during the one slide operation.

The control unit 20 determines which slide operation is executed (how the tip of the finger or the like is moved in the slide operation) based on the detected touch trajectory at this time.

That is, based on the touch trajectory, the control unit 20 determines whether the slide operation performed at this time is the slide operation of tracing the desired part of the text with the tip of the finger or the like in a nearly straight line.

Based on the touch trajectory, the control unit 20 also determines whether the slide operation executed at this time is the slide operation of tracing the desired part of the text with the tip of the finger or the like in a wavy shape or is the slide operation of surrounding the desired part of the text with the tip of the finger or the like.

The control unit 20 transmits, to the selection unit 28, both the determination result obtained by determining which slide operation is executed and touch position information indicating all of the touch positions detected during the slide operation (that is, from the start to the end of the slide operation).

At this time, the control unit 20 extracts book attribute data from the electronic book data read from the storage unit 25. Moreover, the control unit 20 asks the display control unit 26 for a page number of the one-page text data used to generate the electronic book image data for display.

The control unit 20 also extracts text data (which is one-page text data and is also referred to as display use text data below) of the page number given from the display control unit 26 among the text data for each page included in the electronic book data from the electronic book data.

Moreover, the control unit 20 acquires, from the display control unit 26, display region information which indicates that a display region of each character (that is, each character within the display range) being currently displayed is expressed by the coordinates of the pixel position on the display surface of the display unit 21.

That is, the control unit 20 acquires the display region information regarding each character of the entire text from the display control unit 26, when the entirety of the one-page text is displayed.

The control unit 20 acquires the display region information regarding each character of a part of the text from the display control unit 26, when only the part of the one-page text is displayed. Thus, the control unit 20 allows the display region information regarding the individual characters to correspond to the characters within the display range in the display use text data.

The control unit 20 also transmits the display use text data (hereinafter, also referred to as region correspondence text data) of the one-page text, in which the display region information is made to correspond to the characters within the display range, and the book attribute data to the selection unit 28.

On the other hand, when the control unit 20 determines that the touch operation is the slide operation within the predetermined time from the operation determination time (executes the slide operation again), the control unit 20 determines that the slide operation performed at this time is the slide operation of parenthesizing the desired part of the text.

The control unit 20 transmits, to the selection unit 28, the determination result obtained by determining which slide operation is executed at this time and the touch position information indicating all of the touch positions detected during each of the slide operations executed twice (from the start to the end of each slide operation).

The control unit 20 prepares the book attribute data and generates the region correspondence text data, as described above. Then, the control unit 20 also transmits the region correspondence text data and the book attribute data to the selection unit 28.

When the selection unit 28 receives the determination result obtained by determining which slide operation is executed, the touch position information, the region correspondence text data, and the book attribute data from the control unit 20, the selection unit 28 performs a range detection process to detect an instruction range instructed in the text being displayed.

Hereinafter, a case will be described in which horizontally written sentences are displayed as a text of the electronic book image 27 on the display surface of the display unit 21, as in the description made with reference to FIG. 4.

Figure 9:
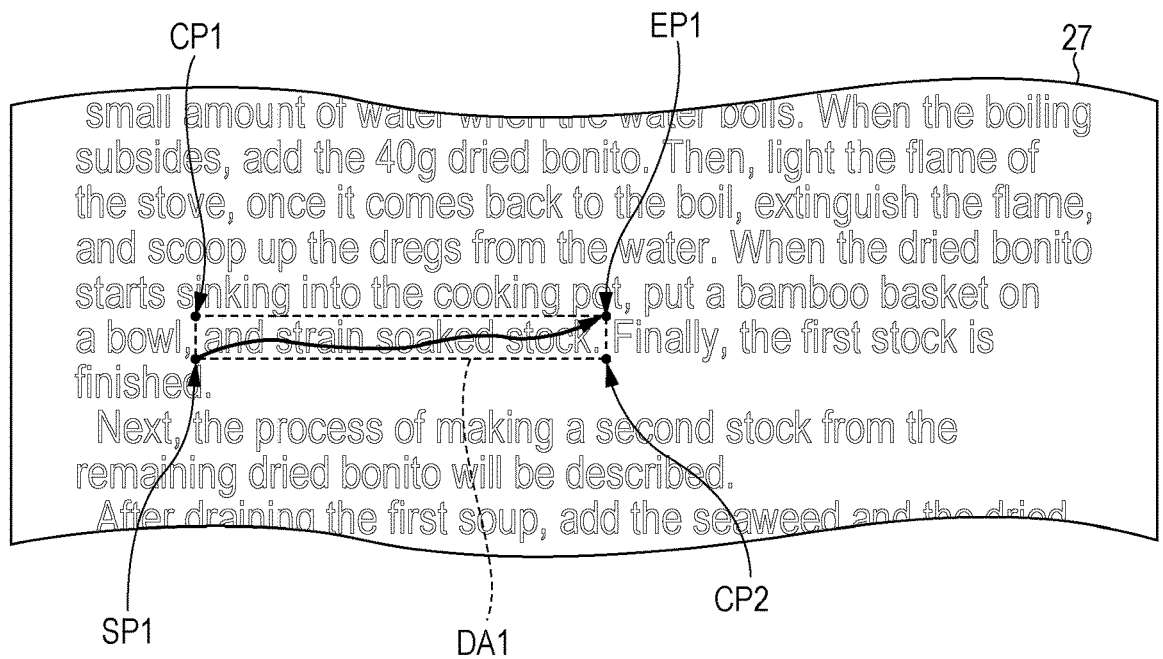
FIG. 9 is a diagram schematically illustrating the detection (1) of an instruction range when the desired part of the text is traced in a straight line shape.

As shown in FIG. 9, the selection unit 28 specifies a touch position SP1 at the start time of the slide operation and a touch position EP1 at the end time of the slide operation based on the touch position information, when the user execute the slide operation to trace the desired part of the text in a straight line.

In the following description, the touch position SP1 at the start time of the slide operation is also referred to as an operation start touch position SP1 and the touch position EP1 at the end time of the slide operation is also referred to as an operation termination touch position EP1.

The selection unit 28 determines whether the specific operation start touch position SP1 and the specific operation termination touch position EP1 are located on one straight line (hereinafter, referred to as a horizontal straight line) parallel to the image horizontal direction.

As a consequence, when the operation start touch position SP1 and the operation termination touch position EP1 are not located on the one horizontal straight line, the selection unit 28 sets the operation start touch position SP1 and the operation termination touch position EP1 as one and the other vertexes of one diagonal line of a rectangle.

The selection unit 28 detects an intersection point CP1 between a straight line passing through the operation start touch position SP1 and parallel to the image vertical direction and a straight line passing through the operation termination touch position EP1 and parallel to the image horizontal direction.

Moreover, the selection unit 28 also detects an intersection point CP2 between a straight line passing through the operation start touch position SP1 and parallel to the image horizontal direction and a straight line passing through the operation termination touch position EP1 and parallel to the image vertical direction.

The selection unit 28 sets the two detected intersection points CP1 and CP2 as the two remaining vertexes of the rectangle. Then, the selection unit 28 detects, as an instruction range DA1, the range of the rectangle which has the operation start touch position SP1, the operation termination touch position EP1, and the two intersection points CP1 and CP2 within the display range of the electronic book image 27.

Figure 10:
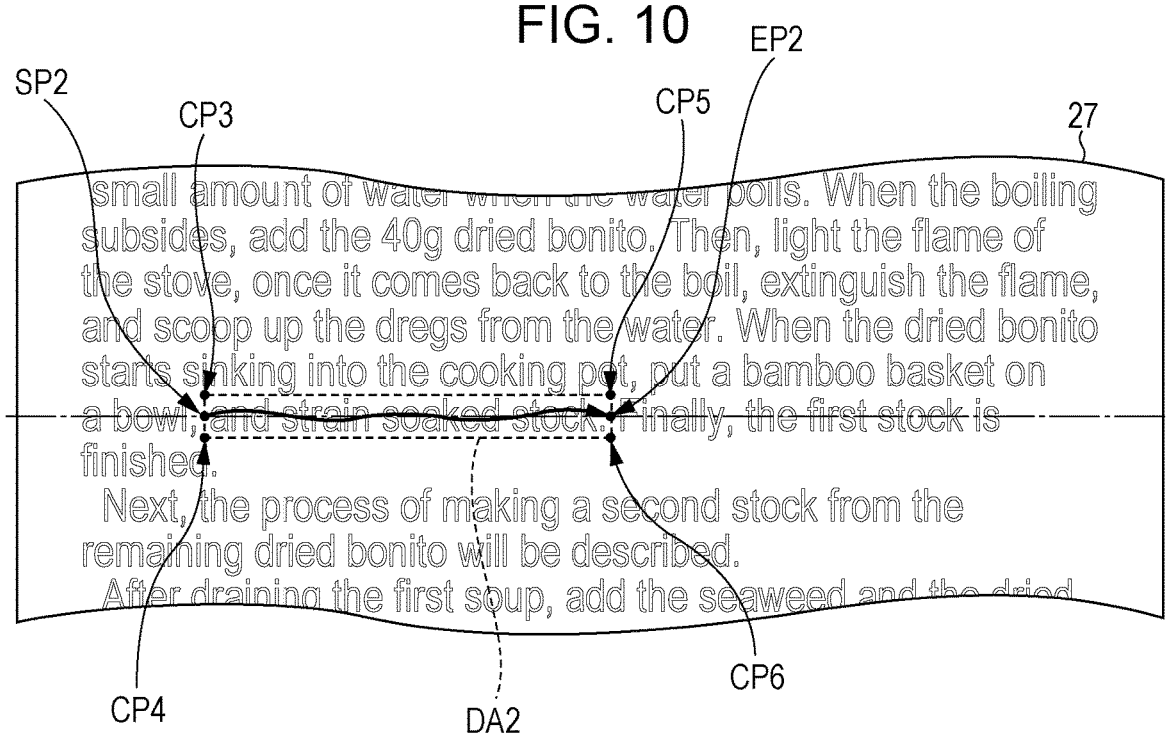
FIG. 10 is a diagram schematically illustrating the detection (2) of an instruction range when the desired part of the text is traced in a straight line shape.

When an operation start touch point SP2 and an operation termination touch position EP2 are located on one horizontal straight line, as shown in FIG. 10, the selection unit 28 detects the upper and lower ends of the display region of the characters on which the display position is located on this horizontal straight line.

The selection unit 28 detects two intersection points CP3 and CP4 between a straight line passing through the operation start touch position SP2 and parallel to the image vertical direction and a straight line passing though the detected upper and lower ends and parallel to the image horizontal direction.

The selection unit 28 also detects two intersection points CP5 and CP6 between a straight line passing through an operation termination touch position EP2 and parallel to the image vertical direction and a straight line passing through the detected upper and lower ends and parallel to the image horizontal direction.

Then, the selection unit 28 sets the detected four intersection points CP3 to CP6 as four vertexes of the rectangle. Thus, the selection unit 28 detects, as an instruction range DA2, the range of the rectangle which has the detected four intersection points CP3 to CP6 as the four vertexes within the display range of the electronic book image 27.

Figure 11:
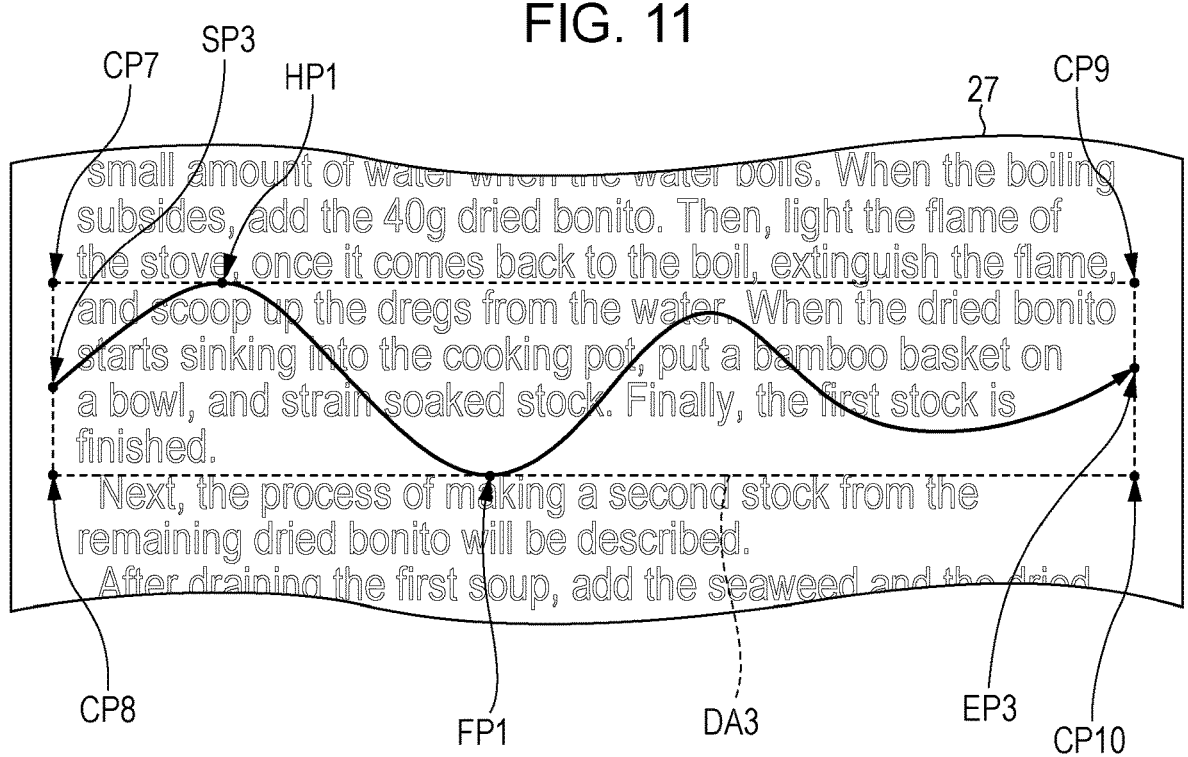
FIG. 11 is a diagram schematically illustrating the detection of an instruction range when the desired part of the text is traced in a wave line shape.

When the user executes the slide operation to trace the desired part of the text in a wavy shape, as shown in FIG. 11, the selection unit 28 specifies an operation start touch position SP3 and an operation termination touch position EP3 of the slide operation based on the touch position information.

Based on the touch position information, the selection unit 28 also specifies a touch position HP1 closest to (in this case, the uppermost side of an image) the line of the beginning side of the text being displayed among a plurality of touch positions.

Based on the touch position information, the selection unit 28 also specifies a touch position FP1 closest to (in this case, the lowermost side of the image) the line of the finishing side of the text in the electronic book image 27 among the plurality of touch positions.

In the following description, the touch position HP1 closest to the line of the beginning side of the text being displayed is also referred to as a beginning touch position HP1 and the touch position FP1 closest to the line of the finishing side of the text being displayed is also referred to as a finishing touch position FP1.

The selection unit 28 also detects an intersection point CP7 between a straight line passing through the operation start touch position SP3 and parallel to the image vertical direction and a straight line passing through the beginning touch position HP1 and parallel to the image horizontal direction.

The selection unit 28 also detects an intersection point CP8 between a straight line passing through the operation start touch position SP3 and parallel to the image vertical direction and a straight line passing through the finishing touch position FP1 and parallel to the image horizontal direction.

The selection unit 28 also detects an intersection point CP9 between a straight line passing through the operation termination touch position EP3 and parallel to the image vertical direction and a straight line passing through the beginning touch position HP1 and parallel to the image horizontal direction.

The selection unit 28 also detects an intersection point CP10 between a straight line passing through the operation termination touch position EP3 and parallel to the image vertical direction and a straight line passing through the finishing touch position FP1 and parallel to the image horizontal direction.

Then, the selection unit 28 sets the detected four intersection points CP7 to CP10 as the four vertexes of the rectangle. Thus, the selection unit 28 detects, as an instruction range DA3, the range of the rectangle which has the detected four intersection points CP7 to CP10 as the four vertexes within the display range of the electronic book image 27.

Figure 12:
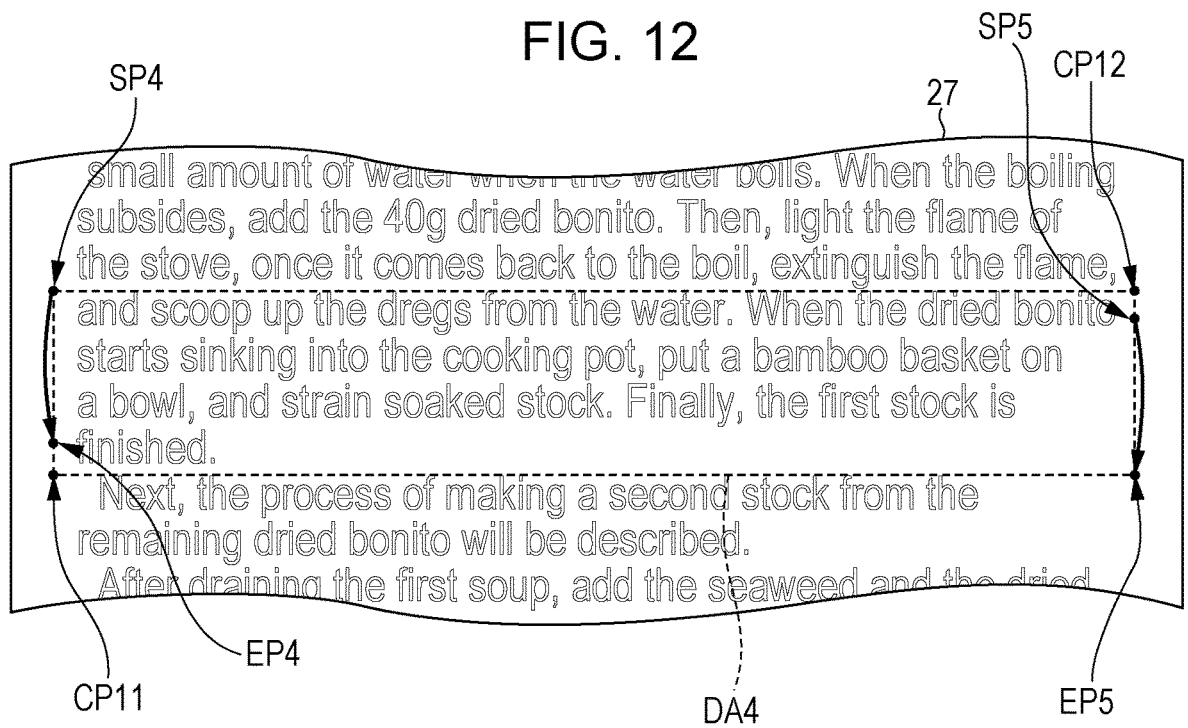
FIG. 12 is a diagram schematically illustrating the detection of the instruction range when the desired part of the text is parenthesized.

When the user executes the slide operation twice to draw a pair of parentheses on the desired part of the text, as shown in FIG. 12, the selection unit 28 specifies an operation start touch position SP4 of the first slide operation based on the touch position information obtained through the first slide operation.

The selection unit 28 also specifies an operation termination touch position EP4 of the first slide operation based on the touch position information obtained through the first slide operation.

The selection unit 28 also specifies an operation start touch position SP5 and an operation termination touch position EP5 of the second slide operation based on the touch position information obtained through the second slide operation.

The selection unit 28 also detects one position (in this case, the operation termination touch position EP4 located on the left upper side of the image), which is located on the beginning side of the text being displayed, between the operation start touch position SP4 and the operation termination touch position EP4 of the first slide operation.

The selection unit 28 also detects one position (in this case, the operation termination touch position EP5 located on the right lower side of the image), which is located on the finishing side of the text being displayed, between the operation start touch position SP5 and the operation termination touch position EP5 of the second slide operation.

Then, the selection unit 28 sets the operation start touch position SP4 detected on the beginning side of the text and the operation termination touch position EP5 detected on the finishing side of the text as two vertexes which are one end and the other end of one diagonal line of the rectangle.

The selection unit 28 also detects an intersection point CP11 between a straight line passing through the operation start touch position SP4 detected on the beginning side of the text and parallel to the image vertical direction and a straight line passing through the operation termination touch position EP5 detected on the finishing side of the text and parallel to the image horizontal direction.

The selection unit 28 also detects an intersection point CP12 between a straight line passing through the operation start touch position SP4 detected on the beginning side of the text and parallel to the image horizontal direction and a straight line passing through the operation termination touch position EP5 detected on the finishing side of the text and parallel to the image vertical direction.

Then, the selection unit 28 sets the two detected intersection points CP11 and CP12 as the two remaining vertexes of the rectangle. Thus, the selection unit 28 detects, as an instruction range DA4, the range of the rectangle which has the operation start touch position SP4 on the beginning side of the text, the operation termination touch position EP5 on the finishing side of the text, and the two intersection points CP11 and CP12 as the four vertexes within the display range of the electronic book image 27.

When the user executes the slide operation to surround the desired part of the text, as shown in FIGS. 13A and 13B, the selection unit 28 specifies operation start touch positions SP6 and SP7 and operation termination touch positions EP6 and EP7 based on the touch position information.

For example, the selection unit 28 detects the touch trajectories from the operation start touch posiions SP6 and SP7 to the operation termination touch positions EP6 and EP7, respectively. Thus, the selection unit 28 detects the ranges surrounded by the touch trajectories as instruction ranges DA5 and DA6 in the display range of the electronic book image 27.

When the selection unit 28 detects the instruction ranges DA1 to DA6 in response to the kinds of slide operations, the selection unit 28 continues performing a selection process of selecting the instruction estimated part from the text in the electronic book image 27 being displayed, based on the instruction ranges DA1 to DA6.

As a method of selecting the selection process, for example, there are three kinds of first to third selection methods. A first selection method is an effective method of narrowing the instruction ranges DA1 to DA6 and selecting the instruction estimated part, for example, when the user tends to instruct the desired part of the text and the part before and after the desired part.

A second selection method is an effective method of enlarging the instruction ranges DA1 to DA6 and selecting the instruction estimated part, for example, when the user tends to instruct only a part between the head and the tail of the desired part of the text.

A third selection method is an effective method of selecting the instruction estimated part from the instruction range DA1 to DA6 in consideration of a variation in the desired part of the text, when the user tends to variably instruct a part larger than the desired part of the text or a part narrower than the desired part of the text.

Accordingly, for example, the control unit 20 allows the user in advance to select one of the first to third selection methods to select the instruction estimated part from the text and execute the selection process and sets the selected method.

Hereinafter, the selection process performed in accordance with the first to third selection methods executed by the selection unit 28 based on the setting details of the selection method will sequentially be described.

First, the selection process performed in accordance with the first selection method will be described. When the selection process is set to be performed in accordance with the first selection method, the selection unit 28 detects the characters within the instruction ranges DA1 to DA6 based on the instruction ranges DA1 to DA6 detected previously and the region correspondence text data.

At this time, for example, the selection unit 28 detects characters (hereinafter, also referred to as in-range characters), of which the display region completely enters the instruction ranges DA1 to DA6, as the characters within the instruction ranges DA1 to DA6.

For example, the selection unit 28 detects characters (hereinafter, also referred to as edge characters), of which the display region is located on the edge of the instruction ranges DA1 to DA6, as characters within the instruction ranges DA1 to DA6.

Figure 14A:
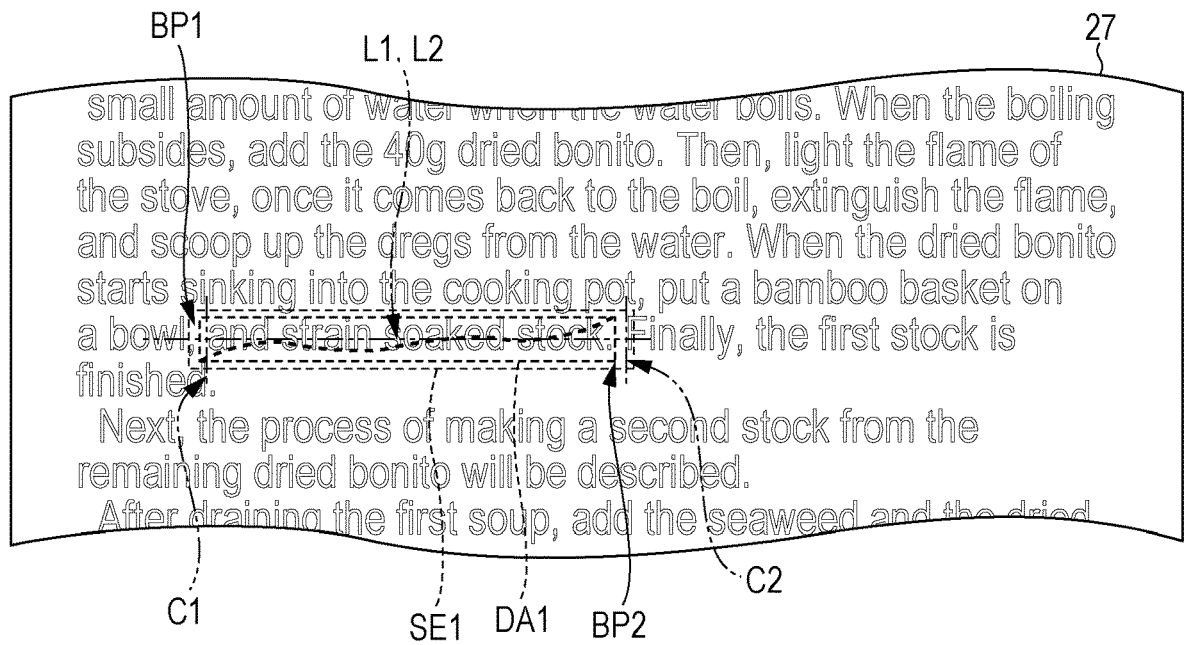
FIGS. 14A and 14B are diagrams schematically illustrating the detection of a search range in accordance with a first selection method.
Figure 14B:
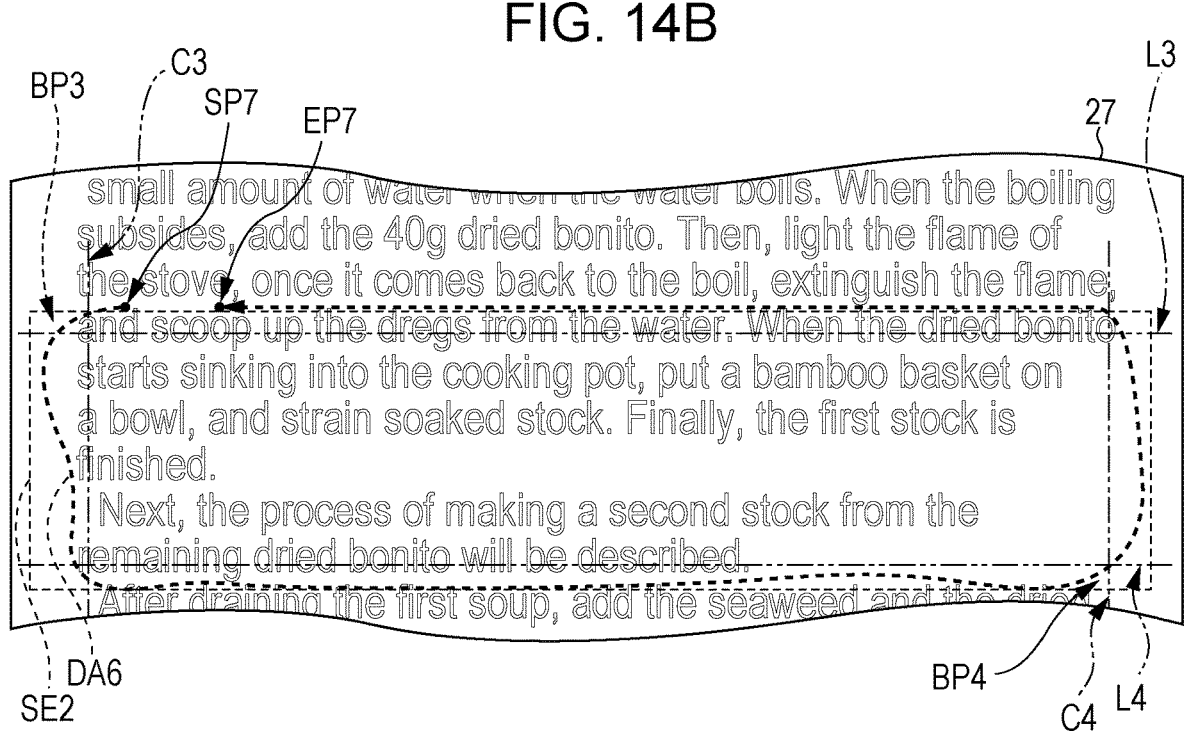

That is, when the in-range characters are present and no edge characters are present, as shown in FIGS. 14A and 14B, the selection unit 28 detects only the in-range characters as the characters within the instruction range DA1.

When the in-range characters are present and the edge characters are present, the selection unit 28 detects both the in-range characters and the edge characters as the characters within the instruction range DA6.

The selection unit 28 detects one line (in this case, one line close to the upper side of the image) closest to the beginning side and one line (in this case, one line close to the lower side of the image) closest to the finishing side among the lines of the characters within the instruction ranges DA1 to DA6.

When the characters are located in only one line within the instruction range DA1, the selection unit 28 (see FIG. 14A) detects both one line closest to the beginning side and one line closest to the finishing side.

The selection unit 28 detects one row (in this case, one row close to the leftmost side of the image) closest to the front side of the row with the maximum number of characters and one column (in this case, one column close to rightmost side of the image) closest to the finishing side of the row with the maximum number of characters among the lines of the characters within the instruction ranges DA1 to DA6.

Moreover, the selection unit 28 (see FIGS. 14A and 14B) detects one character located at the intersection point between one row L1 or L3 closest to the beginning side and one column C1 or C3 closest to the front side of the row with the maximum number of characters, as a reference point BP1 or BP3 from which the front character of the instruction estimated part is started to be searched within the text.

In the following description, the reference points BP1 and BP3 from which the front characters of the instruction estimated part are searched within the text are also referred to as the front reference characters BP1 and BP3, respectively.

Moreover, the selection unit 28 (see FIGS. 14A and 14B) detects one character located at the intersection point between one row L2 or L4 closest to the finishing side and one column C2 or C4 closest to the finishing side of the row with the maximum number of characters, as a reference point BP2 or BP4 from which the rear character of the instruction estimated part is searched within the text.

In the following description, the reference points BP2 and BP4 from which the rear characters of the instruction estimated part are searched within the text are also referred to as the rear reference characters BP2 and BP4, respectively.

Thus, the selection unit 28 (see FIGS. 14A and 14B) sets the ranges from the front reference characters BP1 and BP3 to the rear reference characters BP2 and PB4 in the text of the display range, as search ranges SE1 and SE2 used to search the front and rear characters of the instruction estimated part, respectively.

Here, as described above, the user instructs a desired word as the desired part in the text of the display range. Moreover, the user instructs a desired phrase, clause, or the like including two or more words in some cases.

Accordingly, the selection unit 28 searches for characters indicating separations of a sentence, such as a period, a comma, and a blank, among various characters within the search range SE1 or SE2 by using the region correspondence text data. In the following description, the characters indicating separations of a sentence, such as a period, a comma, and a blank are also referred to as separation characters.

In effect, the selection unit 28 searches for the separation character, while sequentially determining the kinds of characters from the front reference characters BP1 and BP3 to the rear reference characters BP2 and BP4 within the search ranges SE1 and SE2, respectively, character by character.

As a consequence, when the selection unit 28 detects one separation character from the front reference characters BP1 and BP3 to the rear reference characters BP2 and BP4, respectively, the selection unit 28 terminates the search for the separation character at the detection time in a direction from the front reference characters BP1 and BP3 and the rear reference characters BP2 and BP4, respectively.

Likewise, the selection unit 28 searches for the separation character, while sequentially determining the kinds of characters from the rear reference characters BP2 and BP4 to the front reference characters BP1 and BP3 within the search ranges SE1 and SE2, respectively, character by character.

When the selection unit 28 detects one separation character from the front reference characters BP1 and BP3 to the rear reference characters BP2 and BP4, respectively, at this time, the selection unit 28 searches for the separation character in a direction from the rear reference characters BP2 and BP4 and the front reference characters BP1 and BP3, respectively.

As a consequence, when the selection unit 28 detects one separation character from the rear reference characters BP2 and BP4 to the front reference characters BP1 and BP3, respectively, the selection unit 28 terminates the search for the separation character at the detection time in the direction from the rear reference characters BP2 and BP4 and the front reference characters BP1 and BP3, respectively.

Then, when the selection unit 28 detects the separation character within the search ranges SE1 and SE2, the selection unit 28 compares the display position of the separation character detected from the front reference characters BP1 and BP3 to the display position of the separation character detected from the rear reference characters BP2 and BP4.

In the following description, one separation character searched and detected from the front reference characters BP1 and BP3 is also referred to as a front separation character and one separation character searched and detected from the rear reference characters BP2 and BP4 is also referred to as a rear separation character.

As a consequence, the selection unit 28 sets, as the instruction estimated part, the character string within the range from the front separation character to the rear separation character, when the display position of the front separation character is different from the display position of the rear separation character (that is, the front separation character is closer to the beginning side than the rear separation character).

That is, the selection unit 28 detects the front separation character and the rear separation character as the front and rear characters of the instruction estimated part from the text of the display range and selects a phrase, a clause, or the like of the range from the front separation character to the rear separation character as the instruction estimated part.

On the other hand, the selection unit 28 sets, as the instruction estimated part, a character string of the range from the front reference characters BP1 and BP3 to the rear reference characters BP2 and BP4, when the display position of the front separation character accords with the display position of the rear separation character, and the front separation character and the rear separation character are the same separation characters at the same position.

That is, the selection unit 28 detects the front reference characters BP1 and BP3 and the rear reference characters BP2 and BP4 as the front and rear characters of the instruction estimated part from the text of the display range.

The selection unit 28 selects, as the instruction estimated part, for example, a predetermined part or the like within one word, one separation, or the like of the range from the front reference characters BP1 and BP3 to the rear reference characters BP2 and BP4 from the text of the display range.

When the selection unit 28 does not detect the front separation character in the searching from the front reference characters BP1 and BP3 to the rear reference characters BP2 and BP4, the selection unit 28 also sets, as the instruction estimated part, the character string of the range from the front reference characters BP1 and BP3 to the rear reference characters BP2 and BP4.

That is, the selection unit 28 also detects the front reference characters BP1 and BP3 and the rear reference characters BP2 and BP4 as the front and rear characters of the instruction estimated part from the text of the display range.

The selection unit 28 selects, as the instruction estimated part, for example, a predetermined part or the like within one word, one separation, or the like of the range from the front reference characters BP1 and BP3 to the rear reference characters BP2 and BP4 from the text of the display range.

Thus, the selection unit 28 can select, as the instruction estimated part, the part estimated to be instructed by the user very accurately as the instruction estimated part from the text of the display range, even when the user tends to instruct the desired part of the text and the part before and after the desired part.

Figure 15A:
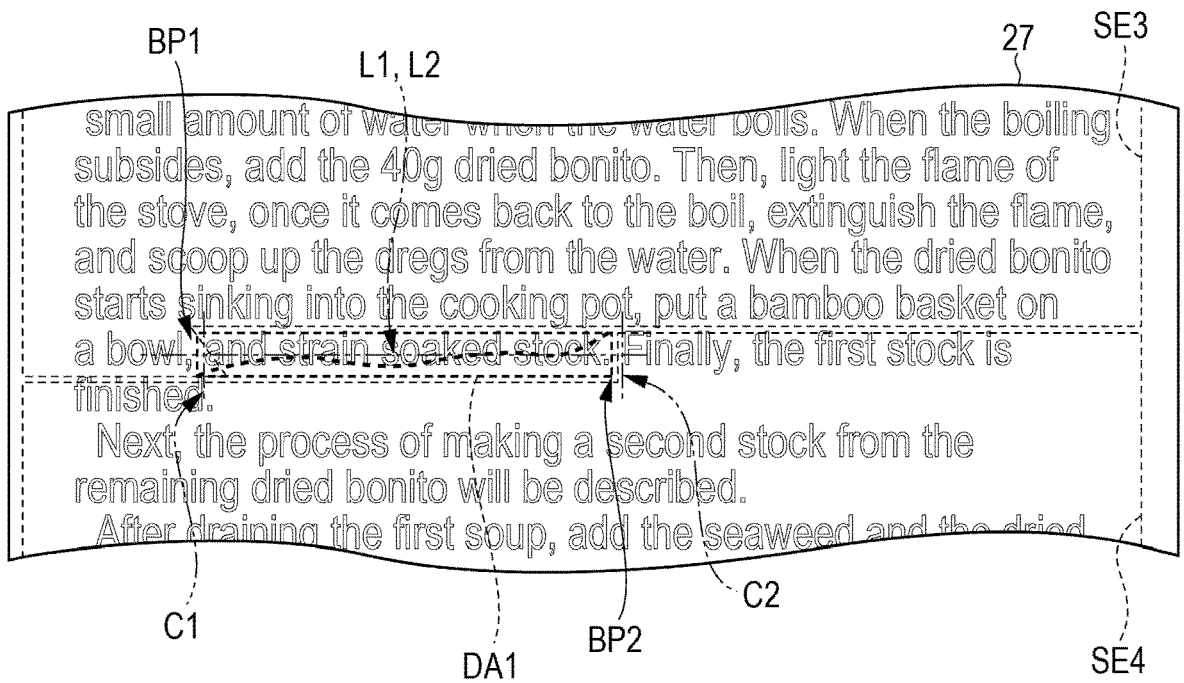
FIGS. 15A and 15B are diagrams schematically illustrating the detection of the search range in accordance with a second selection method.
Figure 15B:
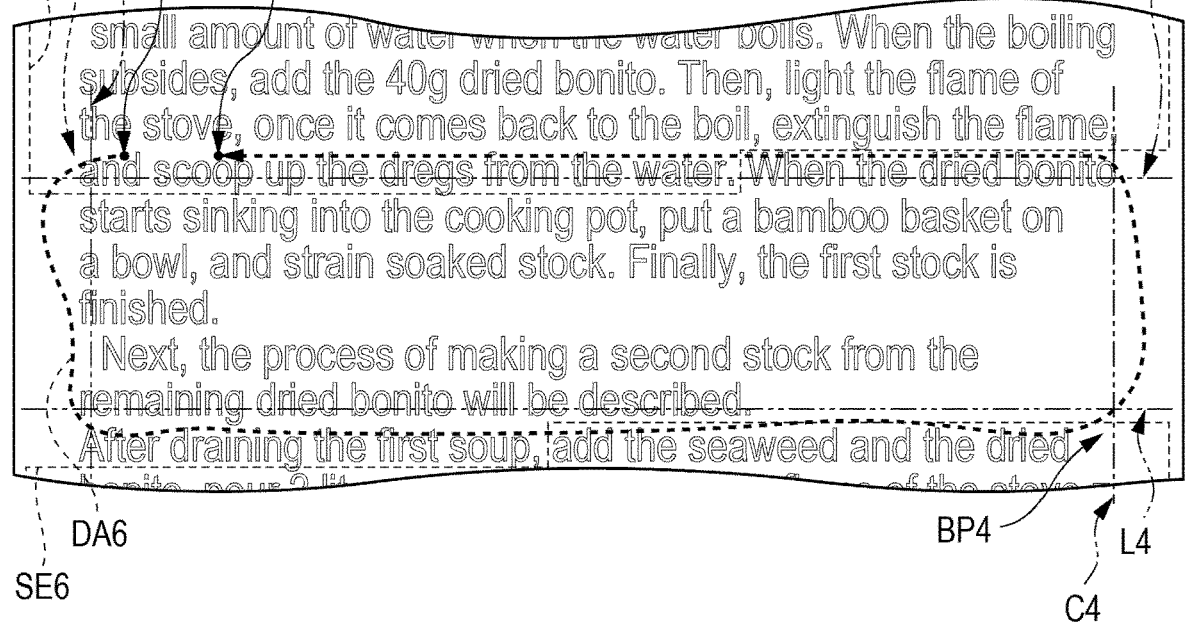

Next, the selection process performed in accordance with the second selection method will be described, as shown in FIGS. 15A and 15B. When the selection process is set to be performed in accordance with the second selection method, the selection unit 28 detects the characters within the instruction ranges DA1 to DA6, as in the first selection method described above.

As in the first selection method described above, the selection unit 28 detects one row closest to the beginning side, one row closest to the finishing side, one column closest to the front side of the row with the maximum number of characters, and one column closest to the finishing side of the row with the maximum number of characters among the lines of the characters within the instruction ranges DA1 to DA6.

As in the first selection method described above, the selection unit 28 detects the front reference characters BP1 and BP3 and the rear reference characters BP2 and BP4 based on the detection results, respectively.

At this time, the selection unit 28 sets the characters of the front reference characters BP1 and BP3 in the text of the display range to the front character in the display range as search ranges (hereinafter, also referred to as beginning search ranges) SE3 and SE5 used to search the front character of the instruction estimated part.

Moreover, the selection unit 28 sets the rear reference characters BP2 and BP4 in the text of the display range to the rear character in the display range as search ranges (hereinafter, also referred to as finishing search ranges) SE4 and SE6 used to search for the rear character of the instruction estimated part.

The selection unit 28 searches for the separation character, while sequentially determining the kinds of characters from the front reference characters BP1 and BP3 in the beginning search ranges SE3 and SE5 to the front characters of the display ranges, respectively, character by character by using the region correspondence text data.

As a consequence, when the selection unit 28 detects one separation character from the front reference characters BP1 and BP3 to the front characters of the display range, respectively, the selection unit 28 terminates the search for the separation character at the detection time in a direction from the front reference characters BP1 and BP3 and the front characters of the display range, respectively.

Moreover, the selection unit 28 searches for the separation character, while sequentially determining the kinds of characters from the rear reference characters BP2 and BP4 in the finishing search ranges SE4 and SE6 to the rear characters of the display ranges, respectively, character by character by using the region correspondence text data.

As a consequence, when the selection unit 28 detects one separation character from the rear reference characters BP2 and BP4 to the rear characters of the display range, respectively, the selection unit 28 terminates the search for the separation character at the detection time in the direction from the rear reference characters BP2 and BP4 and the rear characters of the display range, respectively.

In the following description, a separation character searched and detected from the front reference characters BP1 and BP3 is also referred to as a front separation character and a separation character searched and detected from the rear reference characters BP2 and BP4 is also referred to as a rear separation character.

Thus, the selection unit 28 sets, as the instruction estimated part, the character string within the range from the front separation character to the rear separation character, when the selection unit 28 detects the front separation character and the rear separation character.

That is, the selection unit 28 detects the front separation character and the rear separation character as the front and rear characters of the instruction estimated part from the text of the display range and selects a phrase, a clause, or the like of the range from the front separation character to the rear separation character as the instruction estimated part.

When the user selects the second selection method in advance and the front separation character or the rear separation character may not be detected within the display range, the control unit 20 permits selecting whether the search range is changed and sets the change.

When the search range is changed, the control unit 20 permits selecting whether the front reference characters BP1 and BP3 to the rear reference characters BP2 and BP4 is set as the search range or the end of the search range is changed from the front and rear character of the display range to the front and rear character of one page.

However, when both of the front separation character and the rear separation character may not be detected within the display range, the control unit 20 applies the change in the search range to the search for both of the front and rear characters of the instruction estimated part.

When the rear separation character can be detected within the display range and the front separation character may not be detected within the display range, the control unit 20 applies the change in the search range to the search for only the front character of the instruction estimated part.

Moreover, when the front separation character can be detected within the display range and the rear separation character may not be detected within the display range, the control unit 20 applies the change in the search range to the search for only the rear character of the instruction estimated part.

Accordingly, when the selection unit 28 does not detect the front separation character within the beginning search ranges SE3 and SE5, the selection unit 28 determines whether the search range is changed in accordance with the previous setting details.

As a consequence, when the selection unit 28 does not detect the front separation character within the beginning search ranges SE3 and SE5 and the search range is set not to be changed, the selection unit 28 sets the front character of the display range as the front character of the instruction estimated part.

When the selection unit 28 does not detect the front separation character within the beginning search ranges SE3 and SE5 and the ends of the beginning search ranges SE3 and SE5 are set to be changed, the selection unit 28 determines whether the front character of the display range is the front character of one page including the display range.

As a consequence, when the front character of the current display range is the front character (that is, a predetermined range from the front character of one page is the display range currently) of one page, the selection unit 28 sets the front character of the display range as the front character of the instruction estimated part.

On the other hand, when the front character of the current display range is different from the front character (that is, a predetermined range except for the front character of one page is the display range currently) of one page, the selection unit 28 changes the ends of the beginning search ranges SE3 and SE5 to the front character of one page.

At this time, the selection unit 28 searches for the front separation character, while sequentially determining the kinds of characters from the character adjacent to the beginning side to the front character of one page character by character in the front characters of the display range within a new front search range by using the region correspondence text data. In the following description, the character adjacent to the front character of the display range on the beginning side is also referred to as a display range preceding character.

As a consequence, when the selection unit 28 detects one front separation character from the display range preceding character to the front character of one page, the selection unit 28 terminates the search for the front separation character in a direction from the display range preceding character to the front character of one page at the detection time.

The selection unit 28 sets one front separation character detected from the display range preceding character to the front character of one page (that is, a new beginning search range) as the front character of the instruction estimated character.

On the other hand, when the selection unit 28 detects no front separation character even in the search for the display range preceding character to the front character of one page (that is, within the new beginning search range), the selection unit 28 sets the front character of one page as the front character of the instruction estimated character.

When the selection unit 28 detects no rear separation character within the finishing search ranges SE4 and SE6, the selection unit 28 determines whether the search range is changed in accordance with the previous setting details.

As a consequence, when the selection unit 28 detects no rear separation character within the finishing search ranges SE4 and SE6 but the search range is set not to be changed, the selection unit 28 sets the rear character of the display range as the rear character of the instruction estimated part.

Moreover, when the selection unit 28 detects no rear separation character within the finishing search ranges SE4 and SE6 and the ends of the finishing search ranges SE4 and SE6 are set to be changed, the selection unit 28 determines whether the rear character of the display range is the rear character of one page including the display range.

As a consequence, when the rear character of the current display range is the rear character of one page (that is, a predetermined range on the beginning side from the rear character of one page is the display range), the selection unit 28 sets the rear character of the display range as the rear character of the instruction estimated part.

On the other hand, when the rear character of the current display range is different from the rear character of one page (that is, the predetermined range except for the rear character of one page is the display range), the selection unit 28 changes the ends of the finishing search ranges SE4 and SE6 to the rear character of one page.

At this time, the selection unit 28 searches for the rear separation character, while sequentially determining the kinds of characters from the character adjacent to the finishing side to the rear character of one page character by character in the rear characters of the display range within a new finishing search range by using the region correspondence text data. In the following description, the character adjacent to the rear character of the display range on the finishing side is also referred to as a display range subsequent character.

As a consequence, when the selection unit 28 detects one rear separation character from the display range subsequent character to the rear character of one page, the selection unit 28 terminates the search for the rear separation character in a direction from the display range subsequent character to the rear character of one page at the detection time.

The selection unit 28 sets one rear separation character detected from the display range subsequent character to the rear character of one page (that is, a new finishing search range) as the rear character of the instruction estimated character.

On the other hand, when the selection unit 28 detects no rear separation character even in the search for the display range subsequent character to the rear character of one page (that is, within the new finishing search range), the selection unit 28 sets the rear character of one page as the rear character of the instruction estimated character.

Thus, the selection unit 28 appropriately detects, as the front character of the instruction estimated part, the front separation character, the front character of the display range, and the front character of one page from the text of the display range or one page.

Moreover, the selection unit 28 appropriately detects, as the rear character of the instruction estimated part, the rear separation character, the front character of the display range, and the rear character of one page from the text of the display range or one page. Then, the selection unit 28 selects, as the instruction estimated part, the phrase, the clause, or the like of the range from the detected front character to the detected rear character from the text of the display range or one page.

When the selection unit 28 does not detect the front separation character within the beginning search ranges SE3 and SE5 and the front reference characters BP1 and BP3 to the rear reference characters BP2 and BP4 are set as the search ranges, the selection unit 28 searches for the front separation character, as in the first selection method described above.

That is, the selection unit 28 searches for the front separation character, while sequentially determining the kinds of characters from the front reference characters BP1 and BP3 to the rear reference characters BP2 and BP4 character by character within the search range by using the region correspondence text data.

As a consequence, when the selection unit 28 detects one front separation character from the front reference characters BP1 and BP3 to the rear reference characters BP2 and BP4, the selection unit 28 terminates the search for the front separation character at the detection time.

Moreover, when the selection unit 28 searches for the rear separation character, while sequentially determining the kinds of characters from the rear reference characters BP2 and BP4 to the rear character of the display range or one page character by character, as described above.

At this time, when the selection unit 28 detects the rear character of the instruction estimated part from the rear reference characters BP2 and BP4 to the rear character of the display range or one page, as described above, the selection unit 28 sets the front separation character as the front character of the instruction estimated part.

On the other hand, when the selection unit 28 detects no front separation character even in the searching from the front reference characters BP1 and BP3 to the rear reference characters BP2 and BP4 (that is, within the search range), the selection unit 28 terminates the search for the front separation character at the detection time.

At this time, when the selection unit 28 detects the rear character of the instruction estimated part from the rear reference characters BP2 and BP4 to the rear character of the display range or one page, the selection unit 28 sets the front reference characters BP1 and BP3 as the front character of the instruction estimated part.

Moreover, when the selection unit 28 detects no rear separation character within the finishing search ranges SE4 and SE6 and the rear reference characters BP1 and BP3 to the rear reference characters BP2 and BP4 are set as the search range, respectively, the selection unit 28 searches for the rear separation character, as in the first selection method described above.

That is, the selection unit 28 searches for the rear separation character, while sequentially determining the kinds of characters from the rear reference characters BP2 and BP4 to the front reference characters BP1 and BP3 character by character within the search range by using the region correspondence text data.

As a consequence, when the selection unit 28 detects one rear separation character from the rear reference characters BP2 and BP4 to the front reference characters BP1 and BP3, the selection unit 28 terminates the search for the rear separation character at the detection time.

At this time, when the selection unit 28 detects the front character of the instruction estimated part from the front reference characters BP1 and BP3 to the front character of the display range or one page, as described above, the selection unit 28 sets the rear separation character as the rear character of the instruction estimated character.

On the other hand, when the selection unit 28 detects the front separation character from the front reference characters BP1 and BP3 to the rear reference characters BP2 and BP4, the selection unit 28 compares the display position of the front separation character to the display position of the rear separation character, as in the first selection method described above.

As a consequence, the selection unit 28 sets, as the instruction estimated part, the character string within the range from the front separation character to the rear separation character, when the display position of the front separation character is different from the display position of the rear separation character (that is, the front separation character is closer to the beginning side than the rear separation character).

That is, the selection unit 28 detects the front separation character and the rear separation character as the front and rear characters of the instruction estimated part from the text of the display range and selects a phrase, a clause, or the like of the range from the front separation character to the rear separation character as the instruction estimated part.

On the other hand, the selection unit 28 sets, as the instruction estimated part, a character string of the range from the front reference characters BP1 and BP3 to the rear reference characters BP2 and BP4, when the display position of the front separation character accords with the display position of the rear separation character and the front separation character and the rear separation character are the same separation characters at the same position.

That is, the selection unit 28 detects the front reference characters BP1 and BP3 and the rear reference characters BP2 and BP4 as the front and rear characters of the instruction estimated part from the text of the display range.

The selection unit 28 selects, as the instruction estimated part, for example, a predetermined part or the like within one word, one phrase, or the like of the range from the front reference characters BP1 and BP3 to the rear reference characters BP2 and BP4 from the text of the display range.

When the selection unit 28 does not detect the rear separation character even in the searching from the rear reference characters BP2 and BP4 to the front reference characters BP1 and BP3 (that is within the search range), the selection unit 28 also sets the rear reference characters BP2 and BP4 as the rear character of the instruction estimated part.

That is, the selection unit 28 appropriately detects, as the front character of the instruction estimated part, the front separation character, the front character of the display range, or the front character of one page from the text of the display range or one page and detects the rear reference characters BP2 and BP4 as the rear character of the instruction estimated part.

The selection unit 28 selects, as the instruction estimated part, a phrase, a clause, or the like of the range from the detected front character to the detected rear character from the text of the display range or one page.

Thus, the selection unit 28 can select, as the instruction estimated part, the part estimated to be instructed by the user very accurately from the text of the display range or one page, even when the user tends to instruct only a part of the desired part of the text.

Next, the selection process performed in accordance with the third selection method will be described. When the selection process is set to be performed in accordance with the third selection method, the selection unit 28 detects the characters within the instruction ranges DA1 to DA6, as in the first selection method described above.

As in the first selection method described above, the selection unit 28 detects one row closest to the beginning side, one row closest to the finishing side, one column closest to the front side of the row with the maximum number of characters, and one column closest to the rear side of the row with the maximum number of characters among the lines of the characters within the instruction ranges DA1 to DA6.

As in the first selection method described above, the selection unit 28 detects the front reference characters BP1 and BP3 and the rear reference characters BP2 and BP4 based on the detection results, respectively.

Then, the selection unit 28 basically performs the same processing as that of the first selection method described above. That is, the selection unit 28 sets the range from the front reference characters BP1 and BP3 to the rear reference characters BP2 and BP4 as the search ranges SE1 and SE2, respectively, and searches for the front separation character within search ranges SE1 and SE2.

At this time, when the selection unit 28 does not detect the front separation character even in the searching of the range from the front reference characters BP1 and BP3 to the rear reference characters BP2 and BP4, respectively, the selection unit 28 sets, as the instruction estimated part, a character string from the front reference characters BP1 and BP3 to the rear reference characters BP2 and PB4.

That is, the selection unit 28 detects the front reference characters BP1 and BP3 and the rear reference characters BP2 and BP4 as the front and rear characters of the instruction estimated part from the text of the display range.

The selection unit 28 selects, as the instruction estimated part, for example, a predetermined part or the like within one word, one phrase, or the like of the range from the front reference characters BP1 and BP3 to the rear reference characters BP2 and BP4 from the text of the display range.

Moreover, when the selection unit 28 detects one front separation character from the front reference characters BP1 and BP3 to the rear reference characters BP2 and BP4, the selection unit 28 terminates the searching of the front separation character at the detection time and continues searching for the rear separation character within the search ranges SE1 and SE2.

When the selection unit 28 detects one separation character from the rear reference characters BP2 and BP4 to the front reference characters BP1 and BP3, the selection unit 28 terminates the search for the rear separation character at the detection time and compares the display position of the front separation character to the display position of the rear separation character.

As a consequence, the selection unit 28 sets, as the instruction estimated part, the character string within the range from the front separation character to the rear separation character, when the display position of the front separation character is different from the display position of the rear separation character at the same position.

That is, the selection unit 28 detects the front separation character and the rear separation character as the front and rear characters of the instruction estimated part from the text of the display range and selects a phrase, a clause, or the like of the range from the front separation character to the rear separation character as the instruction estimated part.

On the other hand, the selection unit 28 basically continues performing the same processing as that of the second selection method described above, when the display position of the front separation character accords with the display position of the rear separation character and the front separation character and the rear separation character are the same separation characters.

That is, the selection unit 28 sets, as the beginning search ranges SE3 and SE5, the front reference characters BP1 and BP3 in the text of the display range to the front character of the display range and sets the rear reference characters BP2 and BP4 to the rear character of the display range as the finishing search ranges SE4 and SE6.

Thus, when the selection unit 28 searches for the front separation character within the beginning search ranges SE3 and SE5 and detects the front separation character, the selection unit 28 terminates the search for the front separation character and searches for the rear separation character within the finishing search ranges SE4 and SE6.

When the selection unit 28 detects the rear separation character, the selection unit 28 terminates the search for the rear separation character at the detection time and sets, as the instruction estimated part, the character string of the range from the front separation character to the rear separation character.

That is, the selection unit 28 detects the front separation character and the rear separation character as the front and rear characters of the instruction estimated part from the text of the display range and selects a phrase, a clause, or the like of the range from the front separation character to the rear separation character as the instruction estimated part.

When the user selects the third selection method in advance and the front separation character or the rear separation character may not be detected within the display range, the control unit 20 permits selecting whether the search range is changed and sets the change.

However, when the change in the search range is selected, the control unit 20 automatically changes only the end of the search range from the front and rear characters of the display range to the front and rear characters of one page and sets the change.

Moreover, when both of the front separation character and the rear separation character are not be detected within the display range, the control unit 20 applies the change in the search range to the search for both of the front and rear characters of the instruction estimated part.

When the rear separation character can be detected within the display range and the front separation character may not be detected within the display range, the control unit 20 applies the change in the search range to the searching of only the front character of the instruction estimated part.

Moreover, when the front separation character can be detected within the display range and the rear separation character may not be detected within the display range, the control unit 20 applies the change in the search range to the search for only the rear character of the instruction estimated part.

Accordingly, when the selection unit 28 does not detect the front separation character within the beginning search ranges SE3 and SE5, the selection unit 28 determines whether the beginning search ranges SE3 and SE5 are changed in accordance with the previous setting details and performs the same processing as that of the second selection method described above.

However, when the selection unit 28 changes the beginning search ranges SE3 and SE5, the selection unit 28 changes only the ends of the beginning search ranges SE3 and SE5 and does not perform the processing of using the search ranges SE1 and SE2 again.

Moreover, when the selection unit 28 does not detect the rear separation character within the finishing search ranges SE4 and SE6, the selection unit 28 determines whether the search ranges are changed in accordance with the previous setting details and performs the same processing as that of the second selection method described above.

However, when the selection unit 28 changes the finishing search ranges SE4 and SE6, the selection unit 28 changes only the ends of the finishing search ranges SE4 and SE6 and does not perform the processing of using the search ranges SE1 and SE2 again.

Thus, the selection unit 28 appropriately detects, as the front character of the instruction estimated part, the front separation character, the front character of the display range, and the front character of one page from the text of the display range or one page.

Moreover, the selection unit 28 appropriately detects, as the rear character of the instruction estimated part, the rear separation character, the rear character of the display range, and the rear character of one page from the text of the display range or one page.

Then, the selection unit 28 selects, as the instruction estimated part, for example, the phrase, the clause, or the like of the range from the detected front character to the detected rear character from the text of the display range or one page.

Thus, even when the method of instructing the desired part of the text by the user tends to be varied, the selection unit 28 can reasonably accurately select the part estimated to be instructed by the user as the instruction estimated part from the text of the display range or one page.

When the selection unit 28 performs the selection processes in this manner to select the instruction estimated part from the text of the display range or the text of one page, the selection unit 28 extracts a page number from the region correspondence text data.

The selection unit 28 also extracts, from the region correspondence text data, the instruction estimated part (that is, the plurality of characters expressing the instruction estimated part) and the character position information (that is, regarding the plurality of characters expressing the instruction estimated part) regarding the instruction estimated part.

Moreover, the selection unit 28 stores the page number, the instruction estimated part, and the character position information and generates instruction estimated part data indicating the instruction estimated part. Then, the selection unit 28 transmits both the instruction estimated part data and the book attribute data to the acquisition unit 29.

When the acquisition unit 29 receives the instruction estimated part data and the book attribute data from the selection unit 28, the acquisition unit 29 transmits the instruction estimated part data to the natural language processing block 30 and asks the natural language processing block 30 to perform natural language processing on the instruction estimated part data.

Moreover, the acquisition unit 29 temporarily maintains the book attribute data until the acquisition unit 29 asks the natural language processing block 30 to analyze the instruction estimated part data and obtains the analysis result.

Figure 16:
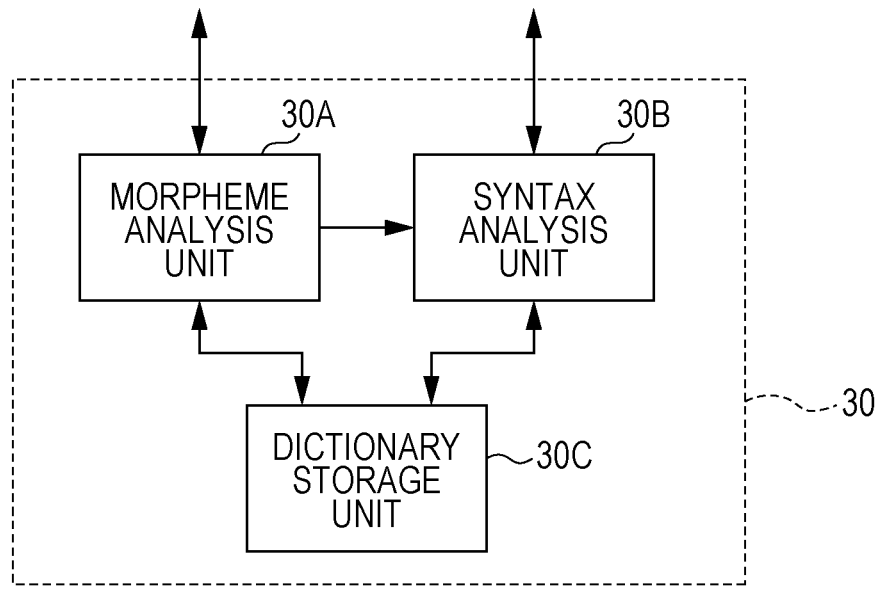
FIG. 16 is a block diagram illustrating the configuration of a natural language processing block.

As shown in FIG. 16, the natural language processing block 30 includes a morpheme analysis unit 30A, a syntax analysis unit 30B, and a dictionary storage unit 30C. The dictionary storage unit 30C in advance stores morpheme dictionary data generated by matching reading, word classes, and the like of the morphemes to a plurality of morphemes of various word classes such as nouns, verbs, auxiliary words, and adverbs.

A morpheme refers to a minimum unit that has a meaning as a language. Examples of the morpheme include a morpheme that singly forms a word, a morpheme that forms a word in combination with another morpheme, and a morpheme that does not singly form a word and does not form a word in combination with another morpheme.

The dictionary storage unit 30C in advance stores semantic dictionary data indicating a specific word of the word classes such as nouns and verbs and hierarchically indicating the meaning of this word in a superordinate concept.

For example, when a specific word is a noun "ramen" (noodles) or "udon" (wheat noodles), the semantic dictionary data indicates two hierarchical meanings of the superordinate concept "cooking: kind of noodles" as the meaning of the word.

For example, when a specific word is a verb "eat", the semantic dictionary data indicates two hierarchical meanings of the superordinate concept "motion: meal" as the meaning of the word.

The morpheme analysis unit 30A of the natural language processing block 30 acquires the instruction estimated part data from the acquisition unit 29 and reads the morpheme dictionary data and the semantic dictionary data from the dictionary storage unit 30C in response to the acquisition.

Based on the morpheme dictionary data, the morpheme analysis unit 30A analyzes the instruction estimated part (that is, the character string) which is based on the instruction estimated part data. Then, the morpheme analysis unit 30A separates the instruction estimated part into a plurality of morphemes and specifies the respective word classes of the plurality of morphemes.

Based on the plurality of morphemes, the word classes of the morphemes, and the semantic dictionary data, the morpheme analysis unit 30A determines a single or a plurality of morphemes that form a specific word with the word class such as a noun or a verb among the plurality of morphemes. Moreover, the morpheme analysis unit 30A specifies the meaning of the word formed by the determined single or plurality of morphemes.

The morpheme analysis unit 30A generates morpheme analysis result data indicating the analysis result (the plurality of morphemes and word classes, the single or plurality of morphemes forming the determined word among the plurality of morphemes, and the meaning of the word formed by the single or plurality of morphemes) of the instruction estimated part. The morpheme analysis unit 30A transmits both the morpheme analysis result data and the instruction estimated part data to the syntax analysis unit 30B.

When the syntax analysis unit 30B receives the morpheme analysis result data and the instruction estimated part data from the morpheme analysis unit 30A, the syntax analysis unit 30B analyzes the syntax of the instruction estimated part, which is based on the instruction estimated part data, based on the morpheme analysis result data.

Then, the syntax analysis unit 30B specifies the grammatical role of the morpheme of the instruction estimated part and specifies this morpheme, modification of the morpheme, and the like in the instruction estimated part.

The syntax analysis unit 30B generates syntax analysis result data indicating the analysis result (the grammatical role of the morphemes of the instruction estimated part and the modification or the like of the morpheme) of the instruction estimated part.

The syntax analysis unit 30B transmits the estimated part analysis result data and the instruction estimated part data as an estimated part analysis result data, which indicates the natural language processing result of the instruction estimated part, together with the syntax analysis result data and the morpheme analysis result data to the acquisition unit 29.

When the acquisition unit 29 receives the estimated part analysis result data and the instruction estimated part data from the natural language processing block 30, the acquisition unit 29 transmits the estimated part analysis result data and the instruction estimated part data together with the temporarily maintained book attribute data to the specifying unit 33.

When the specifying unit 33 receives the estimated part analysis result data, the instruction estimated part data, and the book attribute data from the acquisition unit 29, the specifying unit 33 performs a process of specifying the desired part selected by the user in the instruction estimated part, which is based on the instruction estimated part data, based on the estimated part analysis result data.

Figure 17:
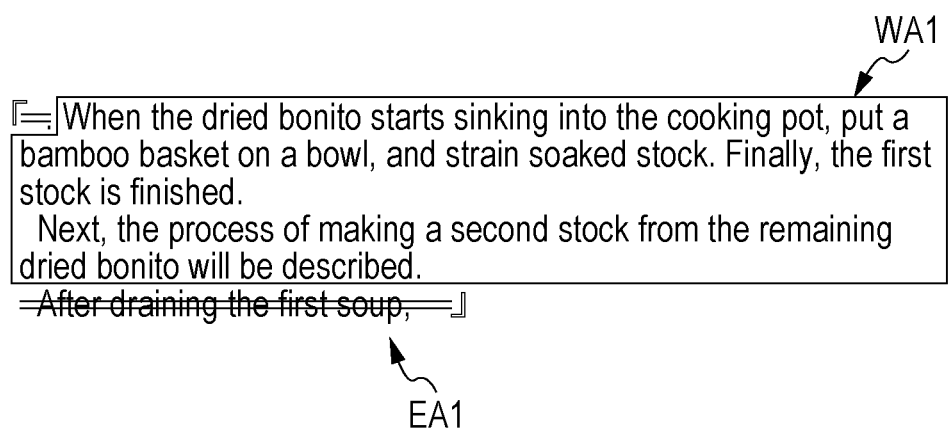
FIG. 17 is a diagram schematically illustrating specifying of a desired part in an instruction estimation part.

As shown in FIG. 17, the specifying unit 33 specifies a desired part WA1, such as a phrase or clause, in the instruction estimated part EA1 based on the morphemes, the modification of a word, or the like included in the instruction estimated part EA1.

Then, the specifying unit 33 extracts a page number from the instruction estimated part data, when the specifying unit 33 specifies a part of the instruction estimated part EA1 as the desired part WA1.

Moreover, the specifying unit 33 extracts, from the instruction estimated part data, the desired part WA1 (that is, the character codes of a plurality of characters expressing the desired part WA1) and the character position information (regarding the plurality of characters expressing the desired part WA1) corresponding to the desired part WA1.

The specifying unit 33 stores the page number, the desired part WA1, and the character position information and generates desired part data indicating the desired part A1. Then, the specifying unit 33 transmits both the desired part data and the book attribute data to the registration unit 34.

The specifying unit 33 extracts book identification information from the book attribute data and also extracts the page number and character position information (hereinafter, also referred to as front character position information) regarding the position of the front character of the desired part WA1 from the instruction estimated part data.

Moreover, the specifying unit 33 extracts all of the information indicating the analysis results of the morpheme analysis and the syntax analysis of the desired part WA1 from the estimated part analysis result data.

The specifying unit 33 stores the book identification information, the page number, the front character position information, and information indicating the analysis results of the morpheme analysis and the syntax analysis of the desired part WA1 and generates desired part analysis result data indicating the analysis result of the desired part WA1. Then, the specifying unit 33 transmits the desired part analysis result data to the detection unit 35.

When the specifying unit 33 specifies the entire instruction estimated part EA1 as the desired part WA1, the specifying unit 33 transmits the instruction estimated part data and the desired part data together with the book attribute data without change to the registration unit 34.

At this time, the specifying unit 33 extracts the book identification information from the book attribute data and extracts the page number and the front character position information from the instruction estimated part data.

The specifying unit 33 adds the book identification information, the page number, and the front character position information to the estimated part analysis result data, generates the desired part analysis result data indicating the analysis result of the desired part WA1, and transmits the generated desired part analysis result data to the detection unit 35.

When the detection unit 35 receives the desired part analysis result data from the specifying unit 33, the detection unit 35 performs a keyword detection process of detecting important keywords from the desired part WA1 in understanding the details of the desired part WA1 based on the desired part analysis result data.

For example, the detection unit 35 maintains a list of word classes (hereinafter, also referred to as word class list) of the morphemes of predetermined word classes, such as auxiliary words or adverbs, which have been detected through learning of using various sentences in advance and do not contribute to the understanding of the contents of the sentences.

For example, the detection unit 35 maintains a list (hereinafter, also referred to as a meaning list) of the meanings of the words which have been detected through learning of using various sentences in advance and contribute no understanding of the contents of the sentences.

Accordingly, the detection unit 35 excludes, from keyword candidates, the morphemes of the word classes registered in the word class list among the plurality of morphemes included in the desired part WA1 since the morphemes registered in the word class list are not important to the understanding of the contents of the desired part WA1.

The detection unit 35 also excludes, from the keyword candidates, single or a plurality of morphemes forming meaningful words registered in the meaning list among the plurality of words included in the desired part WA1, since the single or plurality of morphemes registered in the meaning list are not important to the understanding of the contents of the desired part WA1.

The detection unit 35 specifies the morphemes, which are not important to the understanding of the contents of the desired part WA1 in the context of the desired part WA1, among the plurality of morphemes of the desired part WA1 based on the grammatical role and the modification or the like of the plurality of morphemes of the desired part WA1. Then, detection unit 35 excludes the specified morphemes from the keyword candidates.

Thus, the detection unit 35 detects the words, such as nouns or verbs, forming the remaining single or plurality of morphemes among the plurality of morphemes of the desired part A1 without excluding the remaining morphemes, as keywords important to the understanding of the contents of the desired part WA1.

When the detection unit 35 detects the keywords, the detection unit 35 summarizes the detection result and gives a request of the number of detected keywords for each keyword (that is, respective different keywords).

That is, when the detected keyword is different from the detected other keyword, the detection unit 35 considers the number of detected keywords to be one.

When the detected same keyword is two or more, the detection unit 35 summarizes the keywords and considers the number of detected keywords to be two or more.

The detection unit 35 appropriately weights the number of detected keywords for each keyword based on the grammatical role of the words formed by the keywords (that is, single or a plurality of morphemes) within the desired part WA1. For example, when the keyword is the subject of a clause in the desired part WA1, the detection unit 35 weights the number of detected keywords by one.

Thus, the detection unit 35 assigns the weighted number of detected keywords to the keyword as a score, which indicates how important a keyword is to the understanding of the contents of the desired part WA1, for each keyword.

When the detection unit 35 assigns the score to the keyword, the detection unit 35 extracts the detected keyword (that is, the word (the plurality of characters expressing the word including single or a plurality of morphemes) detected as the keyword) from the desired part analysis result data so as not to overlap.

The detection unit 35 extracts a character string (hereinafter, also referred to as a meaning word) expressing the meaning of the keyword from the desired part analysis result data and also extracts the book identification information, the page number, and the front character position information from the desired part analysis result data.

The detection unit 35 stores the keyword, the meaning word, the score, the book identification information, the page number, and the front character position information for each keyword and generates keyword detection data indicating the detection result of the keyword. Then, the detection unit 35 transmits the keyword detection data to the registration unit 34 and the tag generation unit 36.

When the tag generation unit 36 receives the keyword detection data from the detection unit 35, the tag generation unit 36 performs a tag generation process of automatically generating a word (hereinafter, also referred to as a tag) expressing the contents of the desired part WA1 using the meaning word expressing the meaning of the keyword.

At this time, for example, the tag generation unit 36 extracts the meaning word for each keyword from the keyword detection data. Moreover, the tag generation unit 36 decomposes the meaning word hierarchically indicating the meaning of each keyword in the superordinate concept into words expressing one meaning.

However, since the two meanings of the keyword are expressed in the superordinate concept, at least one meaning is the same as at least one meaning of another keyword in some cases.

Therefore, when the tag generation unit 36 decomposes the meaning word expressing two meanings of a keyword into two words and obtains the two or more same words, the same words are set to be one word so as not to overlap with each other.

For example, the tag generation unit 36 maintains a list (hereinafter, also referred to as a word list) of words which have been detected through a learning of using various sentences in advance, which do not express the contents of the sentence easily, and express a predetermined meaning.

Accordingly, the tag generation unit 36 excludes the word, which is the same as the word registered in the word list among the words expressing the individual meanings of the keywords, from tag candidates, since it is difficult to express the contents of the desired part WA1.

The tag generation unit 36 sets the remaining single or plurality of words, which are not excluded among the words expressing the individual meanings of the keywords, as the tag expressing the contents of the desired part WA1.

Thus, when the tag generation unit 36 generates the tag, the tag generation unit 36 extracts the score assigned to the meaning keyword expressed by the tag from the keyword detection data.

The tag generation unit 36 summarizes the scores assigned to the single or plurality of keywords of the meaning expressed by the tag. Then, the tag generation unit 36 assigns the scores summarized for each tag to the tags as the scores indicating how accurately the tag expresses the contents of the desired part WA1.

As for two words expressing two meanings of one keyword, the tag generation unit 36 sets the score of the one keyword as the scores of two respective words.

When the tag generation unit 36 generates the tag and assigns the score to the tag, the tag generation unit 36 extracts the book identification information, the page number, and the front character position information from the keyword detection data.

The tag generation unit 36 stores the tag, the score, the book identification information, the page number, and the front character position information for each of the generated tags and generates tag generation data indicating the generation result of the tag. Then, the tag generation unit 36 transmits the tag generation data to the registration unit 34.

The storage unit 25 stores an electronic book with the selected desired part and a book registration database configured to register the desired part. In the storage unit 25, a data table used to register an electronic book and a data table used to register the desired part are actually generated in the book registration database.

In the following description, the data table used to register an electronic book is also referred to as a book registration table and the data table used to register the desired part is also referred to as a desired part registration table.

The storage unit 25 further stores a keyword registration database configured to register the keywords detected from the desired part. In the storage unit 25, a data table used to register the keywords and a data table used to associate the keywords with the detected desired parts are actually generated in the keyword registration database.

In the following description, the data table used to register the keywords is also referred to as a keyword registration table and the data table used to associate the keywords with the detected desired parts is also referred to as a keyword association table.

The storage unit 25 further stores a tag registration database configured to register the tags generated for the desired parts. In the storage unit 25, a data table used to register the tags and a data table used to associate the tags with the detected desired parts, in which the contents are expressed by the tags, are actually generated in the tag registration database.

In the following description, the data table used to register the tags is also referred to as a tag registration table and the data table used to associate the tags with the desired parts is also referred to as a tag association table.

As shown in FIG. 18, a book registration table DT1 in the book registration database includes, as information registration items, a book identification information registration item 37 used to register the book identification information and a book kind registration item 38 used to register the kinds of electronic books.

The book registration table DT1 further includes, as information registration items, a title registration item 39 used to register the titles of books and a publisher name registration item 40 used to register the publisher names of the electronic books.

When the registration unit 34 receives the desired part data and the book attribute data from the specifying unit 35, the registration unit 34 extracts the book identification information from the book attribute data. Then, based on the book identification information, the registration unit 34 determines whether the electronic book with the selected desired part has already been registered in the book registration table DT1 of the storage unit 25.

As a consequence, when the registration unit 34 detects that the electronic book with the selected desired part has not yet been registered in the book registration table DT1 of the storage unit 25, the registration unit 34 transmits the book attribute data as the book registration data to the storage unit 25.

Then, the registration unit 34 associates the book identification information, the kinds of books, the titles of books, and the publisher names stored in the book registration data with each other and stores the book identification information, the kinds of books, the titles of books, and the publisher names in the information registration item corresponding to the book registration table DT1.

At this time, the registration unit 34 stores the book registration data indicating the electronic book with the selected desired part in the book registration table DT1 of the book registration database and registers the electronic book with the selected desired part.

On the other hand, when the registration unit 34 detects that the electronic book with the selected desired part has already been registered in the book registration table DT1 of the storage unit 25, the registration unit 34 does not register the electronic book in the book registration table DT1.

Then, when registration unit 34 detects that the registration of the electronic books is completed or the registration has already been completed, the registration unit 34 continues issuing identification information (hereinafter, also referred to as desired part identification information) used to individually identify the desired part indicated by the desired part data.

The registration unit 34 extracts the page number, the front character position information indicating the position of the front character of the desired part, and the desired part from the desired part data and detects the number of characters of the desired part based on the character position information stored in the desired part data.

The registration unit 34 further extracts the book identification information from the book attribute data. Moreover, the registration unit 34 stores the desired part identification information, the book identification information, the page number, the front character position information, the number of characters, and the desired part (that is, the plurality of characters expressing the desired part) and generates the desired part registration data for the desired part registration. Then, the registration unit 34 transmits the desired part registration data to the storage unit 25.

As shown in FIG. 19, a desired part registration table DT2 in the book registration database includes, as information registration items, a desired part identification information registration item 41 used to register the desired part identification information and a book identification information registration item 42 used to register the book identification information.

The desired part registration table DT2 includes, as information registration items, a page number registration item 43 used to register the page number of a page where the desired part is present and a line number registration item 44 used to register the line number of the line where the front character of the desired part is located.

The desired part registration table DT2 further includes, as information registration items, a column number registration item 45 used to register the column number of the column where the front character of the desired part is located and a character number registration item 46 used to register the number of characters of the desired part.

The desired part registration table DT2 further includes, as an information registration item, a desired part registration item 47 used to register the desired part itself as a character string.

The registration unit 34 associates the desired part identification information, the book identification information, the page number, the row number, the column number, the number of characters, and the desired part stored in the desired part registration data with each other. The registration unit 34 stores the desired part identification information, the book identification information, the page number, the row number, the column number, the number of characters, and the desired part in the information registration item corresponding to the desired part registration table DT2.

The registration unit 34 stores the desired part registration data indicating the selected desired part in the desired part registration table DT2 of the book registration database and registers the desired part.

When the registration unit 34 receives the keyword detection data from the detection unit 35, the registration unit 34 issues identification information (hereinafter, also referred to as keyword identification information) used to individually identify the keywords stored in the keyword detection data.

The registration unit 34 extracts a keyword (that is, a plurality of characters expressing the keyword), the morpheme attribute information of the keyword, and the score of the keyword from the keyword detection data.

The registration unit 34 stores the keyword identification information, the keyword, the morpheme attribute information, and the score and generates the keyword registration data for keyword registration. Then, the registration unit 34 transmits the keyword registration data to the storage unit 25.

As shown in FIG. 20, a keyword registration table DT3 in the keyword registration database includes, as an information registration item, a keyword identification information registration item 48 used to register the keyword identification information.

The keyword registration table DT3 further includes, as information registration items, a keyword registration item 49 used to register the keyword itself as the character string and a word class registration item 50 used to register the word class of the keyword.

The keyword registration table DT3 further includes, as information registration items, a meaning registration item 51 used to register the meaning (in effect, a meaning word expressing the meaning) of the keyword and a keyword score registration item 52 used to register the score of the keyword.

Then, the registration unit 34 associates the keyword identification information, the keyword, the word class, the meaning word, and the score stored in the keyword registration data with each other for each keyword. The registration unit 34 stores the keyword identification information, the keyword, the word class, the meaning word, and the score in the information registration items corresponding to the keyword registration table DT3.

At this time, the registration unit 34 stores the keyword registration data indicating the keyword detected from the desired part in the keyword registration table DT3 of the keyword registration database and registers the keyword.

When the registration unit 34 receives the tag generation data from the tag generation unit 36, the registration unit 34 issues identification information (hereinafter, also referred to as tag identification information) used to individually identify the tags stored in the tag generation data. The registration unit 34 extracts the tag (that is, the plurality of characters expressing the tag) from the tag generation data.

The registration unit 34 stores the tag identification information, the tag, and generation kind information indicating that the tag is automatically generated by the tag generation unit 36 and generates the tag registration data for tag registration. Then, the registration unit 34 transmits the tag registration data to the storage unit 25.

As shown in FIG. 21, a tag registration table DT4 in the tag registration database includes, as an information registration item, a tag identification information registration item 53 used to register the tag identification information.

The tag registration table DT4 further includes, as information registration items, a generation kind registration item 54 used to register the generation kind information and a tag registration item 55 used to register the tag as a character string.

The registration unit 34 associates the tag identification information, the generation kind information, and the tag stored in the tag registration data with each other for each tag and stores the tag identification information, the generation kind information, and the tag in the information registration item corresponding to the tag registration table DT4.

At this time, the registration unit 34 stores the tag registration data indicating the tag automatically generated for addition to the desired part in the tag registration table DT4 of the tag registration database and registers the tag.

The tags added to the desired part include not only the tags automatically generated by the tag generation unit 36 but also tags, such as "study", "small material", "memo", and "presentation material", selected arbitrarily by the user and added to the desired part.

Accordingly, the control unit 20 generates the tag generation data, when the desired part is selected by the user or the electronic book image with the selected desired part is displayed again and when the user executes a predetermined operation to select the desired part and single or a plurality of tags added to the desired part. The control unit 20 transmits the tag generation data to the registration unit 34.

That is, the control unit 20 extracts the book identification information, the page number, and the front character position information indicating the position of the front character of the desired part from the book attribute data or the text data of the electronic book with the selected desired part to which the tags are added.

The control unit 20 automatically assigns the score indicating a predetermined value selected in advance to the tag. Then, the control unit 20 generates the tag generation data, which stores the tag (that is, single or a plurality of words expressing the tag), the score of the tag, the book identification information, the page number, the front character position information, and transmits the tag generation data to the registration unit 34.

When the registration unit 34 receives the tag generation data from the control unit 20, the registration unit 34 issues the tag identification information used to individually identify the tags stored in the tag generation data, as described above. Then, the registration unit 34 extracts the tags from the tag generation data.

The registration unit 34 generates the tag registration data, which stores the tag identification information, the tags, and the generation kind information indicating that the tag selected by the user is set to be added to the desired part. Then, the registration unit 34 transmits the tag registration data to the storage unit 25.

The registration unit 34 associates the tag identification information, the generation kind information, and the tag stored in the tag registration data with each other for each tag. The registration unit 34 stores the tag identification information, the generation kind information, and the tag in the information registration item corresponding to the tag registration table DT4.

The registration unit 34 stores the tag registration data indicating the tag selected for the addition to the desired part by the user in the tag registration table DT4 of the tag registration database and registers the tag.

When the registration unit 34 registers the keywords in the keyword registration table DT3, the registration unit 34 extracts the book identification information, the page number, and the front character position information from the keyword detection data.

The registration unit 34 stores the book identification information, the page number, and the front character position information together with the keyword identification information of the registered keywords and generates keyword association request data giving a request for associating the keywords with the desired part. Then, the registration unit 34 transmits the keyword association request data to the association unit 60.

When the association unit 60 receives the keyword association request data from the registration unit 34, the association unit 60 extracts the book identification information, the page number, and the front character position information from the keyword association request data.

Based on the book identification information, the page number, and the front character position information, the association unit 60 retrieves the desired part identification information of the desired part corresponding to the keyword registered in the registration unit 34 from the desired part registration table DT2 of the storage unit 25.

The association unit 60 extracts the keyword identification information from the keyword association request data and generates keyword association data for the keyword association in which the keyword identification information is stored together with the retrieved desired part identification information. Then, the association unit 60 transmits the keyword association data to the storage unit 25.

Figure 22:
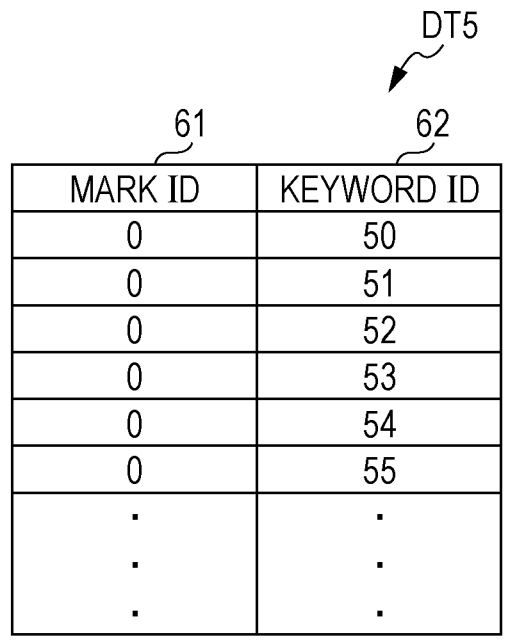
FIG. 22 is a diagram schematically illustrating the configuration of a keyword association table.

As shown in FIG. 22, a keyword association table DT5 in the keyword registration database includes, as an information registration item, a desired part identification information registration item 61 used to register the desired part identification information.

The keyword association table DT5 includes, as in information registration item, a keyword identification information registration item 62 used to register the keyword identification information.

Accordingly, the association unit 60 associates the desired part identification information and the keyword identification information stored in the keyword association data with each other for each keyword and stores the desired part identification information and the keyword identification information in the information registration item corresponding to the keyword association table DT5.

The association unit 60 associates the desired part with the keywords detected from the desired part using the keyword association table DT5 of the keyword registration database.

When the registration unit 34 registers the tags in the tag registration table DT4, the registration unit 34 extracts the book identification information, the page number, and the front character position information from the tag generation data. Then, the registration unit 34 extracts the score for each tag from the tag generation data.

The registration unit 34 stores the scores of each book identification information, each page number, each front character position information, and each tag extracted from the tag generation data together with the tag identification information for each tag issued at this time and generates tag association request data used to make a request for associating the tags with the desired part. Then, the registration unit 34 transmits the tag association request data to the association unit 60.

When the association unit 60 receives the tag association request data from the registration unit 34, the association unit 60 extracts the book identification information, the page number, and the front character position information from the tag association request data.

Based on the book identification information, the page number, and the front character position information, the association unit 60 retrieves the desired part identification information of the desired part corresponding to the tags registered in the registration unit 34 at this time from the desired part registration table DT2 of the storage unit 25.

The association unit 60 extracts the tag identification information and the scores from the tag association request data and generates tag association data for tag association in which the tag identification information and the scores are stored together with the retrieved desired part identification information. Then, the association unit 60 transmits the tag association data to the storage unit 25.

Figure 23:
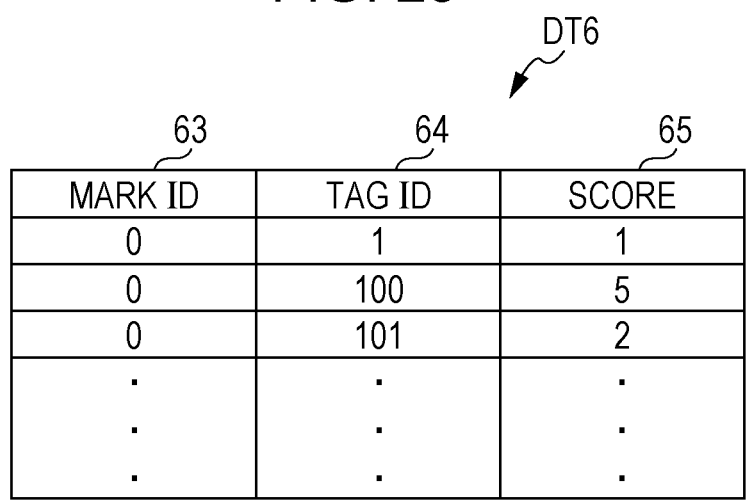
FIG. 23 is a diagram schematically illustrating the configuration of a tag association table.

As shown in FIG. 23, a tag association table DT6 in the tag registration database includes, as information registration items, a desired part identification information registration item 63 used to register the desired part identification information and a tag identification information registration item 64 used to register the tag identification information.

The tag association table DT6 includes, as an information registration item, a tag score registration item 65 used to register the scores of the tags.

The association unit 60 associates the desired part identification information, the tag identification information, and the scores stored in the tag association data with each other for each tag and stores the desired part identification information, the tag identification information, and the scores in the information registration item corresponding to the tag association table DT6.

The association unit 60 associates the desired part with the tags (that is, the tags automatically generated and the tags selected by the user) added to the desired part using the tag association table DT6 of the tag registration database.

For example, when the association unit 60 completely associates the desired part and the tags, the association unit 60 stores the desired part identification information used for the association and generates desired part retrieval request data used to give a request for retrieving the desired part. Then, the association unit 60 transmits the desired part retrieval request data to the retrieval unit 66.

When the retrieval unit 66 receives the desired part retrieval request data from the association unit 60, the retrieval unit 66 extracts the desired part identification information from the desired part retrieval request data. Moreover, the retrieval unit 66 retrieves and reads, from the storage unit 25, the row number, the column number, and the number of characters associated with the desired part identification information in the book registration table DT1.

Here, the row number, the column number, and the number of characters associated with the desired part identification information are information indicating the position of the desired part identified by the desired part identification information in the text.

The retrieval unit 66 stores the desired part position information (that is, the row number, the column number, the number of characters) indicating the position of the desired part in the text together with the desired part identification information and generates desired part notification data used to give a notification of the desired part. Then, retrieval unit 66 transmits the desired part notification data to the control unit 20.

When the control unit 20 received the desired part notification data from the retrieval unit 66, the control unit 20 extracts the desired part position information and the desired part identification information from the desired part notification data.

The control unit 20 stores the desired part position information and the desired part identification information, generates emphasis display control data used to control the desired part so as to be emphasized, and transmits the generated emphasis display control data to the display control unit 26.

When the display control unit 26 receives the emphasis display control data from the control unit 20, the display control unit 26 processes the electronic book image data generated for display based on the emphasis display control data and transmits the processed electronic book image data to the display unit 21.

Thus, as shown in FIG. 24, the display control unit 26 displays the desired part designated based on the emphasis display control data in the emphasis manner so as to show the desired part to the user in the electronic book image 27 being displayed on the display unit 21.

Thus, when the user selects the desired part on the electronic book image 27, the control unit 20 controls each circuit unit at each time to perform the series of processes described above.

Thus, the control unit 20 specifies the selected desired part and registers various kinds of information regarding the desired part in the various databases in the storage unit 25. In addition, the control unit 20 can displays the desired part in the electronic book image 27 in the emphasis manner.

When the display control unit 26 displays the desired part in the emphasis manner in the electronic book image 27 displayed on the display unit 21, the display control unit 26 terminates the display of the electronic book image 27 and maintains the emphasis display until the electronic book image being displayed on the display unit 21 is newly switched.

As shown in FIG. 25, while one electronic book image 27 is displayed on the display unit 21, whenever the sequentially desired parts are selected on the electronic book image 27, the display control unit 26 newly displays the additionally selected desired part without a change in the emphasis display until that point.

Thus, when the user selects the desired parts, the control unit 20 can display the desired parts in the emphasis manner in the electronic book image 27 with the same sense as a sense of marking the desired parts using a marker on a page of a book made of paper during the display of the electronic book image 27 on the display unit 21.

The control unit 20 extracts the book identification information from the book attribute data, when the electronic book image 27 being displayed on the display unit 21 is newly switched or a newly selected electronic book is displayed.

Moreover, the control unit 20 also extracts the page number from the one-page text data being displayed at this time. Then, the control unit 20 stores the book identification information and the page number, generates the desired part retrieval request data used to give a request for retrieving the desired part, and the transmits the generated desired part retrieval request data to the retrieval unit 66.

At this time, when the retrieval unit 66 receives the desired part retrieval request data from the control unit 20, the retrieval unit 66 extracts the desired part identification information and the page number from the desired part retrieval data.

The retrieval unit 66 searches for the desired part position information corresponding to the desired part identification information and the page number in the book registration table DT1 of the storage unit 25 based on the desired part identification information and the page number.

As a consequence, when the desired part position information corresponding to the desired part identification information and the page number is not registered in the book registration table DT1 of the storage unit 25, the retrieval unit 66 notifies the control unit 20 the fact that the desired part position information is not registered.

At this time, the control unit 20 detects that no desired part is selected in the text of the electronic book image in response to the notification from the retrieval unit 66. In this case, the control unit 20 does not control the display control unit 26 so as to display the desired part in the emphasis manner in response to the detection result.

On the other hand, when the retrieval unit 66 retrieves the desired part position information associated with the desired part identification information and the page number in the book registration table DT1 of the storage unit 25, the retrieval unit 66 reads the desired part position information from the storage unit 25.

The retrieval unit 66 stores both the desired part position information and the desired part identification information, generates the desired part notification data used to give a notification of the desired part, and transmits the generated desired part notification data to the control unit 20.

When the control unit 20 receives the desired part notification data from the retrieval unit 66, as described above, the control unit 20 generates the emphasis display control data based on the desired part notification data and transmits the emphasis display control data to the display control unit 26.

Then, the display control unit 26 processes the electronic book image data based on the emphasis display control data transmitted from the control unit 20, transmits the processed electronic book image data to the display unit 21, and displays single or a plurality of desired parts in the emphasis manner in the electronic book image 27 displayed on the display unit 21.

Thus, when the control unit 20 newly switches the electronic book image 27 displayed on the display unit 21 and newly displays an electronic book and when the desired part has already been selected in the electronic book image 27 newly displayed on the display unit 21, the control unit 20 can display the desired part in the emphasis manner.

Since the control unit 20 prepares for plural kinds of method of emphasizing and displaying the desired part, the user is permitted to arbitrarily select and set the kinds of method of emphasizing and displaying the desired part.

Thus, when the display unit 21 is capable of realizing color display, as shown in FIGS. 24 and 25, the control unit 20 can superimpose arbitrary colors and shapes on the desired part to display the desired part in the emphasis manner.

When the display unit 21 is capable of realizing color display, the control unit 20 can underline the desired part with the arbitrary kinds of line (straight line, wavy line, and the like) to display the desired part in the emphasis manner.

When the display unit 21 is capable of realizing color display, the control unit 20 can surround the desired part with a frame of an arbitrary color and an arbitrary shape (formed by a straight line or a curved line) to display the desired part in the emphasis manner.

When the display unit 21 is capable of realizing color display, the control unit 20 can display the characters of the desired part with an arbitrary color different from the color of the characters of another part to display the desired part in the emphasis manner.

When the display unit 21 is capable of realizing color display, the control unit 20 can mark the upper or lower of the individual characters and the sides of the front and rear characters in the desired part with an arbitrary color and an arbitrary shape (such as a circle, a star, and a rectangle) to display the desired part in the emphasis manner.

When the display unit 21 is capable of realizing color display, the control unit 20 can periodically vary at least one of the color, font, size, style, and the like of the character of the desired part to display the desired part in the emphasis manner.

When the display unit 21 is capable of realizing monochromic display, the control unit 20 can underline the desired part with the arbitrary kinds of line (straight line, wavy line, and the like) to display the desired part in the emphasis manner.

When the display unit 21 is capable of realizing monochromic display, the control unit 20 can surround the desired part with a frame of an arbitrary color and an arbitrary shape (formed by a straight line or a curved line) to display the desired part in the emphasis manner.

When the display unit 21 is capable of realizing monochromic display, the control unit 20 can mark the upper or lower of the individual characters and the sides of the front and rear characters in the desired part with an arbitrary color and an arbitrary shape (such as a circle, a star, and a rectangle) to display the desired part in the emphasis manner.

When the display unit 21 is capable of realizing monochromic display, the control unit 20 can periodically vary at least one of the color, font, size, style, and the like of the character of the desired part to display the desired part in the emphasis manner.

When the display unit 21 is capable of realizing color display and monochromic display, the control unit 20 can allow at least one of the font, size, style, and the like of the character of the desired part to differ from that of another character to display the desired part in the emphasis manner.

When the association unit 60 completely associates the keywords and the desired part and then completely associates the keywords, the generated tags, and the desired part with each other, the association unit 60 generates association information retrieval request data used to give a request for retrieving information associated with the desired part.

At this time, the association unit 60 stores the keyword identification information and the desired part identification information used to associate the keywords and the desired part with each other and generates the association information retrieval request data. Then, the association unit 60 transmits the association information retrieval request data to the retrieval unit 66.

When the retrieval unit 66 receives the association information retrieval request data from the association unit 60, the retrieval unit 66 extracts the keyword identification information from the association information retrieval request data. Moreover, the retrieval unit 66 retrieves and reads the keywords identified with the keyword identification information in the keyword registration table DT3 from the storage unit 25.

The retrieval unit 66 stores the keywords as retrieval keys and also stores the upper limit designation information used to designate the preset upper limit of a retrieval number. The retrieval unit 66 generates retrieval request data used to ask a retrieval apparatus (not shown) on the network 13 to retrieve association information regarding the desired part.

The retrieval unit 66 transmits the retrieval request data to the transmission unit 23. Then, the transmission unit 23 transmits the retrieval request data transmitted from the retrieval unit 66 to the retrieval apparatus via the network 13.

At this time, the retrieval apparatus receives the retrieval request data transmitted from the information display terminal 11 and extracts the keywords from the received retrieval request data. Then, the retrieval apparatus retrieves the association information (having a text including retrieval keys) associated with the desired part within the designated upper limit of the retrieval number from various kinds of information read from a home page or the like publicized on the network 13, by using the keywords as the retrieval keys.

The association information retrieved by the retrieval apparatus is information that is generally publicized on the network 13, as described above. In the following description, the association information retrieved by the retrieval apparatus is also referred to as open association information.

The retrieval apparatus generates retrieval result data stored by matching the title (hereinafter, also referred to as an association information title) of the open association information with a network address used to access the open association information for each title of the retrieved open association information. The retrieval apparatus replies the retrieval result data to the information display terminal 11 via the network 13.

Then, the reception unit 24 receives the retrieval result data received from the retrieval apparatus and transmits the received retrieval result data to the retrieval unit 66.

When the retrieval unit 66 receives the retrieval result data from the reception unit 24, the retrieval unit 66 extracts the association information title and the network address of each of the open association information retrieved by the retrieval apparatus from the retrieval result data.

The retrieval unit 66 extracts the desired part identification information from the association information retrieval request data. The retrieval unit 66 retrieves and reads the tag identification information associated with the desired part identification information in the tag association table DT6 from the storage unit 25.

The retrieval unit 66 stores the association information title and the network address for each of the open association information retrieved by the retrieval apparatus together with the retrieved tag identification information and generates association information registration data used to register the open association information. Then, the retrieval unit 66 transmits the association information registration data to the association unit 60.

Here, association information registration database is constructed in advance in the storage unit 25. Moreover, the association information registration database includes a data table (hereinafter, also referred to as an information association table) used to associate the tags of the desired part with the association information of the desired part.

The association unit 60 transmits the association information registration data transmitted from the retrieval unit 66 to the storage unit 25. The association unit 60 associates the association information title of each of the open association information stored in the association information registration data, the network address, and the tag identification information and stores the result in the information association table in the storage unit 25.

Thus, the association unit 60 registers the open association information associated with the desired part in association with the tags of the desired part by using the information association table of the association information registration database.

When the retrieval unit 66 generates the association information registration data indicating the open association information, as described above, and transmits the association information registration data to the association unit 60, the retrieval unit 66 continues retrieving the electronic book as the association information associated with the desired part among the electronic books which have already been stored in the storage unit 25.

At this time, based on the keywords read from the storage unit 25, the retrieval unit 66 detects whether the same keywords as these keywords are registered in the keyword registration table DT3 of the storage unit 25.

The keywords read from the storage unit 25 by the retrieval unit 66 are detected from the desired part by the detection unit 35 and are newly registered in the keyword registration table DT3 by the registration unit 34. In the following description, keywords read from the storage unit 25 by the retrieval unit 66 are also referred to as new registration keyword.

As a consequence, when the retrieval unit 66 retrieves the same keywords as the new registration keywords among the keywords having already registered in the keyword registration table DT3, the retrieval unit 66 reads the keyword identification information of the keywords retrieved from the storage unit 25.

In the following description, the keywords which are retrieved as the new registration keyword among the keywords having already registered and are same as the new registration keywords are also referred to identical keywords. In the following description, keyword identification information of the identical keyword is also referred to as registered keyword identification information.

The retrieval unit 66 retrieves and reads, from the storage unit 25, the desired part identification information (hereinafter, also referred to as registered desired part identification information) associated with the registered keyword identification information in the keyword association table DT5.

The retrieval unit 66 retrieves and reads, from the storage unit 25, the book identification information (hereinafter, also referred to as a retrieval book identification information) associated with the registered desired part identification information in the desired part registration table DT2.

At this time, the retrieval unit 66 retrieves and reads, from the storage unit 25, the book identification information associated with the desired part identification information in the desired part registration table DT2 based on the desired part identification information extracted from the association information retrieval request data.

The desired part identification information extracted from the association information retrieval request data by the retrieval unit 66 is information that is newly registered in the desired part registration table DT2 by the registration unit 34. In the following description, the desired part identification information extracted from the association information retrieval request data by the retrieval unit 66 is also referred to as new registration desired part identification information.

The book identification information associated with the new registration desired part identification information is the book identification information of the electronic book (hereinafter, also referred to as an electronic book being displayed) with the selected desired part identified with the new registration desired part identification information. In the following description, the book identification information associated with the new registration desired part identification information is also referred to as book identification information being displayed.

The retrieval unit 66 compares the retrieval book identification information and the book identification information being displayed, which have been read from the storage unit 25, to each other. Based on the comparison result, the retrieval unit 66 determines whether another electronic book, which is different from the electronic book being displayed and includes the same keywords as the new registration keywords in the text, is retrieved as the retrieval book identification information.

That is, the retrieval unit 66 determines whether there is retrieved the electronic book associated with the desired part in which the new registration keywords are detected since the electronic book is different from the electronic book being displayed, but includes the identical keywords which are the same as the new registration keywords in the text.

When the retrieval unit 66 retrieves the association electronic book, the retrieval unit 66 reads, from the storage unit 25, the page number and the desired part position information associated with the registered desired part identification information used to retrieve the retrieval book identification information of the association electronic book in the desired part registration table DT2.

Based on the retrieval book identification information of the association electronic book, the retrieval unit 66 also reads the book title associated with the retrieval book identification information in the book registration table DT1 from the storage unit 25.

Based on the registered desired part identification information used to retrieve the retrieval book identification information of the association electronic book, the retrieval unit 66 retrieves and reads the tag identification information associated with the registered desired part identification information in the tag association table DT6 from the storage unit 25.

The retrieval unit 66 stores the book title, tag identification information, the retrieval book identification information, the page number, and the desired part position information read from the storage unit 25, generates the association information registration data indicating the association electronic book, and transmits the generated association information registration data to the association unit 60.

Thus, the retrieval unit 66 retrieves the association electronic book associated with the desired part in which the new registration keywords of the electronic book being displayed are detected among the electronic books stored in the storage unit 25.

At this time, the association unit 60 transmits the association information registration data transmitted from the retrieval unit 66 to the storage unit 25. The association unit 60 associates the tag identification information with the book title, the retrieval book identification information, the page number, and the desired part position information of each association electronic book stored in the association information registration data and stores the result in the information association table in the storage unit 25.

The association unit 60 registers the association electronic book associated with the selected desired part in association with the tag of the desired part by using the information association table of the association information registration database.

When the user selects both the desired part and an arbitrary tag added to the desired part, the control unit 20 can permit an input of an arbitrary comment (hereinafter, also referred to as an association comment) as the association information associated with the desired part.

Therefore, when the user selects both the desired part and an arbitrary tag added to the desired part and executes a predetermined operation to input the association comment, the control unit 20 generates the tag generation data that further stores the association comment. Then, the control unit 20 transmits the tag generation data to the association unit 60.

At this time, the registration unit 34 registers the tag selected by the user so as to be added to the desired part in the tag registration table DT4 by generating the tag registration data based on the tag generation data and transmitting the tag registration data to the storage unit 25, as described above.

When the user inputs the association comment, the registration unit 34 extracts the book identification information, the page number, the front character position information, the score of each tag, and the association comment from the tag generation data.

Moreover, the registration unit 34 generates tag association request data in which the book identification information, the page number, the front character position information, the score of each tag, and the association comment extracted from the tag generation data are stored together with the tag identification information of each tag issued at this time. Then, the registration unit 34 transmits the tag association request data to the association unit 60.

When the association unit 60 receives the tag association request data from the registration unit 34, as described above, the association unit 60 associates the desired part with the tag added to the desired part using the tag association table DT6 based on the tag association request data.

At this time, the association unit 60 extracts the association comment of each tag from the tag association request data. Moreover, the association unit 60 stores both the association comment of each tag and the tag identification information extracted from the tag association request data at this time and generates the association information registration data indicating the association comment.

Then, the association unit 60 transmits the association information registration data to the storage unit 25. Thus, the association unit 60 associates the association comment of each tag stored in the association information registration data with the tag identification information and stores the result in the information association table in the storage unit 25.

Thus, the association unit 60 registers the association comment associated with the desired part selected at this time in association with the tag of the desired part by using the information association table of the association information registration database.

When the association information associated with the desired part can be associated with the tag of the desired part, the control unit 20 can display the association information in response to, for example, a tap operation on the electronic book image being displayed on the display unit 21.

In effect, the control unit 20 instructs the display control unit 26 to display the desired part in the emphasis manner based on the desired part notification data described above. Accordingly, the display control unit 26 displays the desired part in the emphasis manner in the electronic book image being displayed on the display unit 21 in response to the instruction to display the desired part in the emphasis manner.

In this case, the display control unit 26 generates desired part display region information indicating the display region of the desired part using the coordinates of the pixel position of the display surface of the display unit 21, while the display control unit 26 displays the desired part in the emphasis manner in the electronic book image 27 being displayed on the display unit 21.

The display control unit 26 transmits both the desired part display region information of the desired part and the desired part identification information of the desired part to the control unit 20.

While the desired part is displayed in the emphasis manner, the control unit 20 matches the desired part display region information and the desired part identification information of the desired part transmitted from the display control unit 26 with each other and maintains the desired part display region information and the desired part identification information.

When the desired part is displayed in the emphasis manner in the electronic book image 27 being displayed on the display unit 21 and the user taps the surface of the touch panel, the control unit 20 compares the touch position of the tap operation to the display region of the desired part indicated by the desired part display region information.

As a consequence, the control unit 20 determines the desired part is instructed by the tap operation, when the control unit 20 detects that the tap operation within the display region of the desired part.

At this time, the control unit 20 detects the desired part identification information matched with the desired part display region information based on the desired part display region information indicating the tapped display region.

The control unit 20 stores the desired part identification information (that is, the desired part identification information of the instructed desired part) detected in response to the tap operation and generates tag request data used to give a request of the tag of the desired part. Then, the control unit 20 transmits the tag request data to the retrieval unit 66.

When the retrieval unit 66 receives the tag request data from the control unit 20, the retrieval unit 66 extracts the desired part identification information from the tag request data. The retrieval unit 66 retrieves and reads, from the storage unit 25, the tag identification information and the score associated with the desired part identification information in the tag association table DT6.

Moreover, the retrieval unit 66 reads, from the storage unit 25, the tag associated with the tag identification information in the tag registration table DT4 based on the tag identification information read from the storage unit 25.

The retrieval unit 66 generates tag supply data, which stores the tag, the score, and the tag identification information of each tag and the desired part identification information extracted from the tag request data, and returns the generated tag supply data to the control unit 20.

When the control unit 20 receives the tag supply data from the retrieval unit 66, the control unit 20 extracts the desired part identification information and the tag, the score, the tag identification information of each tag from the tag supply data.

Based on the desired part identification information, the control unit 20 specifies the desired part display region information indicating the display region of the desired part (that is, the desired part instructed at this time) identified with the desired part identification information.

The control unit 20 stores the tag and the tag identification information added to the instructed desired part together with the desired part display region information indicating the display region of the desired part and generates tag display control data used to match the tag with the instructed desired part and display the tag and the instructed desired part.

Here, when only one tag is added to the instructed desired part, the control unit 20 generates tag display control data which stores the one tag together with the tag identification information and the desired part display region information.

Moreover, when a plurality of tags are added to the desired part, the control unit 20 permits the user to arbitrarily select a method of displaying the tags, such as a method of displaying all of the tags, a method of displaying the tags with a score equal to or greater than a predetermined score selected in advance, and a method of displaying one tag with the highest score.

Therefore, when the plurality of tags is added to the instructed desired part, the control unit 20 selects the tags to be displayed in response to the previous setting. Then, the control unit 20 generates the tag display control data which stores the selected tags together with the tag identification information and the desired part display region information.

Thus, when the control unit 20 generates the tag display control data, the control unit 20 transmits the generated tag display control data to the display control unit 26.

When the display control unit 26 receives the tag display control data from the control unit 20, the display control unit 26 processes the electronic book image data generated for display so as to further display the tags based on the tag display control data and transmits the processed electronic book image data to the display unit 21.

As shown in FIG. 26, the display control unit 26 displays a tag TG added to the desired part instructed by the user on the electronic book image 27 being displayed on the display unit 21 by matching the tag TG with the desired part.

Thus, the control unit 20 can exhibit the tag TG expressing the contents of the desired part to the user together with the desired part (that is, the emphasized desired part) via the electronic book image 27 being displayed on the display unit 21.

While the display control unit 26 displays the tag TG on the electronic book image 27 being on the display unit 21, the display control unit 26 generates tag display region information indicating the display region of the tag TG being displayed with the coordinates of the pixel position on the display surface of the display unit 21. Then, the display control unit 26 transmits both the tag display region information of the tag TG and the tag identification information of the tag TG to the control unit 20.

During the display of the tag TG, the control unit 20 maintains the tag display region information and the tag identification information of the tag TG transmitted from the display control unit 26 by matching the tag display region information with the tag identification information.

Therefore, when the user taps the surface of the touch panel during the display of the tag TG on the electronic book image 27 being displayed on the display unit 21, the control unit 20 compares the touch position of the tap operation to the display region of the tag TG indicated by the tag display region information.

As a consequence, when the control unit 20 detects that user taps the display region of the tag TG, the control unit 20 determines that the tag TG is instructed by the tap operation.

At this time, the control unit 20 detects the tag identification information matched with the tag display region information based on the tag display region information indicating the tapped display region.

The control unit 20 stores the tag identification information (that is, the tag identification information of the instructed tag TG) detected in response to the tap operation and generates association information request data giving a request of the association information. Then, the control unit 20 transmits the association information request data to the retrieval unit 66.

When the retrieval unit 66 receives the association information request data from the control unit 20, the retrieval unit 66 extracts the tag identification information from the association information request data. At this time, when the open association information can be associated with the instructed tag TG, the retrieval unit 66 retrieves and reads, from the storage unit 25, the association information title and the network address of each open association information associated with the tag identification information in the information association table.

When the association electronic book can be associated with the instructed tag TG, the retrieval unit 66 also retrieves and reads, from the storage unit 25, the book title, the book identification information, the page number, the desired part position information of each association electronic book associated with the tag identification information in the information association table.

When the association comment can be associated with the instructed tag TG, the retrieval unit 66 also retrieves and reads, from the storage unit 25, the association comment associated with the tag identification information in the information association table.

Moreover, the retrieval unit 66 generates association information supply data, which stores the tag identification information used in the retrieving, the association information title and the network address of each of the open association information, the book title of each association electronic book, the book identification information, the page number, the desired part position information, and the association comment. Then, the retrieval unit 66 returns the association information supply data to the control unit 20.

At this time, the control unit 20 extracts, from the association information supply data, the tag identification information, the association information title and the network address of each of the open association information, the book title of each association electronic book, the book identification information, the page number, the desired part position information, and the association comment.

Moreover, based on the tag identification information, the control unit 20 specifies the tag display region information indicating the display region of the tag TG (that is, the tag TG instructed at this time) identified with the tag identification information.

The control unit 20 stores the association information title or the book title, the association comment, and the specified tag display region information and generates association information display control data used to display the association information title or the book title and the association comment by matching the association information title or the book title and the association comment with the tag TG. Then, the control unit 20 transmits the association information display control data to the display control unit 26.

When the display control unit 26 receives the association information display control data from the control unit 20, the display control unit 26 processes the electronic book image data generated at this time for display so as to further display the association information based on the association information display control data and transmits the processed electronic book image data to the display unit 21.

As shown in FIG. 27, the display control unit 26 displays the association information title of each of the open association information or the book title of each association electronic book together with the association comment on the electronic book image 27 being displayed on the display unit 21 by matching the association information title or the book title and the association comment with the tag TG instructed by the user.

Thus, the control unit 20 can notify the user of the tag TG expressing the contents of the desired part and various kinds of association information associated with the desired part together with desired part (that is, the desired part displayed in the emphasis manner) via the electronic book image 27 being displayed on the display unit 21.

That is, when the control unit 20 displays the desired part in the emphasis manner in the electronic book image 27 being displayed on the display unit 21 and there is the open association information associated with the desired part, the control unit 20 can inform the user which association electronic book exists using the book title on the electronic book image 27.

Moreover, when the control unit 20 displays the desired part in the emphasis manner in the electronic book image 27 being displayed on the display unit 21 and there is the association electronic book associated with the desired part, the control unit 20 can notify the user of the existence of the association electronic book by the book title on the electronic book image 27.

Furthermore, when control unit 20 displays the desired part in the emphasis manner in the electronic book image 27 being displayed on the display unit 21 and there is the association comment associated with the desired part, the control unit 20 can exhibit the association comment on the electronic book image 27.

When the display control unit 26 displays the association information title of each of the open association information on the electronic book image 27 being displayed, the display control unit 26 generates title display region information indicating the display region of the association information title for each association information title by using the coordinates of the pixel position of the display surface of the display unit 21. Then, the display control unit 26 transmits both the title display region information and the corresponding association information title to the control unit 20.

When the display control unit 26 displays the book title of each association electronic book on the electronic book image 27 being displayed, the display control unit 26 also generates title display region information indicating the display region of the book title for each book title by using the coordinates of the pixel position of the display surface of the display unit 21. Then, the display control unit 26 transmits both the title display region information and the corresponding book title to the control unit 20.

While the association information title is displayed, the control unit 20 specifies the network address corresponding to the association information title based on the association information title and the association information supply data transmitted together with the title display region information from the display control unit 26.

While the association information title is displayed, the control unit 20 maintains the title display region information of the association information title transmitted from the display control unit 26 by matching the title display region information with the network address specified by the association information title.

While the book title is displayed, the control unit 20 specifies the book identification information, the page number and the desired part position information corresponding to the book title based on the book title and the association information supply data transmitted together with the title display region information from the display control unit 26.

When the book title is displayed, the control unit 20 maintains the title display region information of the book title transmitted from the display control unit 26 by matching the title display region information with the book identification information, the page number, and the desired part position information specified by the book title.

Therefore, the user taps the surface of the touch panel during the display of the association information title or the book title on the electronic book image 27 being displayed on the display unit 21, the control unit 20 compares the touch position by the tap operation to the display region indicated by the title display region information.

As a consequence, when the control unit 20 detects that the display region of the association information title is tapped, the control unit 20 determines that the association information title is instructed by the tap operation.

At this time, the control unit 20 detects the network address matched with the title display region information based on the title display region information indicating the tapped display region.

Then, the control unit 20 generates the information request data used to give a request of the open association information of the instructed association information title and transmits both the generated information request data and the detected network address to the transmission unit 23.

Based on the network address transmitted from the control unit 20, the transmission unit 23 transmits the information request data transmitted from the control unit 20 to the information supply apparatus (not shown) publicizing the open association information of the instructed association information title via the network 13.

As a consequence, the reception unit 24 receives the open association information and transmits the open association information to the control unit 20, when the open association information is transmitted from the information supply apparatus via the network 13 in response to the reception of the information request data.

When the control unit 20 receives the open association information from the reception unit 24, the control unit 20 transmits the open association information to the display control unit 26. Then, when the display control unit 26 receives the open association information from the control unit 20, the display control unit 26 changes the open association information into the electronic book image data generated at this time and transmits the electronic book image data to the display unit 21.

Thus, the display control unit 26 changes the electronic image data into the electronic book image and displays the open association information on the display unit 21. Thus, when the association information title is instructed on the electronic book image being displayed on the display unit 21, the control unit 20 can change the electronic image data into the electronic book image and displays the open association information associated with the desired part in the electronic book image to exhibit the open association information to the user.

When the user executes a predetermined operation in the state where the open association information is displayed on the display unit 21, the control unit 20 controls the display control unit 26 in response to the predetermined operation, switches the information into the open association information on the display unit 21, and again displays the electronic book image having been displayed before display change.

When the control unit 20 compares the touch position of the tap operation to the display region indicated by the title display region information and detects that the display region of the book title is tapped, the control unit 20 determine that the book title is instructed by the tap operation.

At this time, based on the title display region information indicating the tapped display region, the control unit 20 detects the book identification information, the page number, and the desired part position information matched with the title display region information.

Based on the detected book identification information, the control unit 20 reads the electronic book data of the electronic book associated with the book title instructed at this time from the storage unit 25. The control unit 20 transmits the electronic book data together with the page number and the desired part position information detected at this time to the display control unit 26.

That is, the control unit 20 transmits, to the display control unit 26, the electronic book data of the association electronic book together with the page number and the desired part position information instructing the page of the text including the desired part with the detected identical keyword and the position of the desired part in the text.

In the following description, a one-page text including the desired part with the detected identical keyword in the association electronic book is referred to as an association page and the desired part with the detected identical keyword is also referred to as an association desired part.

When the display control unit 26 receives the page number and the desired part position information together with the electronic book data from the control unit 20, the display control unit 26 generates the electronic book image data of the page instructed with the page number based on the electronic book data.

The display control unit 26 processes the electronic book image data so as to display the desired part instructed with the desired part position information in the emphasis manner and transmits the processed electronic book image data to the display unit 21.

Thus, the display control unit 26 changes the electronic image data into the electronic book image being displayed on the display unit 21 and displays, as an association electronic book image, a part including at least the association desired part in the association page of the association electronic book.

At this time, the display control unit 26 displays the association desired part in the emphasis manner in the association electronic book image being displayed on the display unit 21. When there is the desired part as well as the association desired part in the association electronic book image, the display control unit 26 displays the other desired part in the emphasis manner. In this case, the display control unit 26 displays the association desired part in the emphasis manner in a display state different from that of the other desired part.

Thus, when the book title corresponding to the desired part instructed by the electronic book image being displayed on the display unit 21, the control unit 20 can switch the image into the electronic book image of the book title and can display and exhibit the association electronic book image including the association desired part of the association electronic book associated with the desired part.

At this time, the control unit 20 can confirm the association desired part actually associated to the contents of the desired part in the association electronic book image by emphasizing and displaying the association desired part in the association electronic book image associated with the desired part on the electronic book image.

When the user executes a predetermined operation in the state where the association electronic book image is displayed on the display unit 21, the control unit 20 also controls the display control unit 26, switches the image into the association electronic book image on the display unit 21, and displays the electronic book image having been displayed before the display switch again.

When the display region of the desired part is tapped once in the electronic book image 27 being displayed on the display unit 21, as described above, the control unit 20 controls the display control unit 26 in response to the tap operation and displays the tag TG so as to correspond to the desired part.

Accordingly, there is a plurality of desired part selected in the electronic book image 27 being displayed on the display unit 21, the control unit 20 can display the plurality of desired parts by corresponding to the tags TG thereof and can simultaneously exhibit the tags TG of the respective desired parts.

When the display region of the tag TG is tapped once in the electronic book image 27 being displayed on the display unit 21, as described above, the control unit 20 controls the display control unit 26 to correspond to the tag TG in response to the tap operation and displays the association information title, the book title, or the like.

Accordingly, when there is the plurality of desired parts selected in the electronic book image 27 being displayed on the display unit 21, the control unit 20 can display the plurality of desired parts by corresponding to the association information titles or the like of the plurality of desired parts of the respective tags TG and can simultaneously exhibit the association information titles or the like of the respective tags TG.

For example, when the tag TG is displayed on the electronic book image 27 and the user executes a tap operation continuously twice to instruct the tag TG, the control unit 20 controls the display control unit 26 in response to the tap operation. At this time, the control unit 20 deletes the tag TG instructed by the twice tap operation from the electronic book image 27.

For example, when the tag TG and the association information title or the like corresponding to the tag TG are displayed on the electronic book image 27 and the user executes a tap operation continuously twice to instruct the tap TG, the control unit 20 controls the display control unit 26 in response to the tap operation.

At this time, the control unit 20 deletes the tag TG twice instructed by the tap operation and the association information title or the like corresponding to the tag TG from the electronic book image 27 en bloc.

For example, when the plurality of tags TG is displayed on the electronic book image 27 and user taps a region other than the display regions of the tags TG continuously twice, the control unit 20 controls the display control unit 26 in response to the tap operation. Accordingly, the control unit 20 deletes all of the tags TG from the electronic book image 27 en bloc.

For example, when the plurality of tags TG and the association information titles or the like corresponding to the plurality of tags TG are displayed on the electronic book image 27 and the user taps a region other than the display regions of the tags TG or the association information titles or the like continuously twice, the control unit 20 controls the display control unit 26. Accordingly, the control unit 20 deletes all of the tags TG and all of the association information titles or the like from the electronic book image 27 en bloc.

Thus, the control unit 20 can display the tag TG, the association information title, or the like on the electronic book image 27 and can delete the tag TG, the association information title, or the like en bloc by a simple operation.

Accordingly, when the text in the electronic book image 27 is read or a photo image or an illustration image is viewed, the control unit 20 can easily prevent the tag TG, the association information title, or the like from being interfered.

2-2-2. Index Generation Process

Next, an index generation process of generating an individual index of a user for an electronic book will be described. When the electronic book image 27 is displayed on the display unit 21 in response to a request for display the electronic book, as described above, the control unit 20 can hierarchically generate an individual index of the user for the electronic book in response to user selection of the desired part.

In effect, the control unit 20 executes the index generation process when a key operation or a tap operation is executed to select an electronic book for which an index is generated and the request for generating an index is given. At this time, the control unit 20 transmits, from the storage unit 25, reads the electronic book data of the selected electronic book and transmits the electronic book data to the display control unit 26.

Based on the electronic book data, the display control unit 26 generates the electronic book image data corresponding to one page. Then, the display control unit 26 transmits, to the display unit 21, the electronic book image data as data of an image of which at least a part can be displayed in accordance with, for example, the size or resolution of the display surface of the display unit 21.

Thus, as described above with reference to FIG. 4, the display control unit 26 displays at least a part of the electronic book image formed of a one-page text which is based on the electronic image data across the entire display surface of the display unit 21.

When the user executes a slide operation on the electronic book image to instruct the desired part in this state, the control unit 20 the determination result of the kind of slide operation described above and the touch position information indicating all of the touch positions detected during the slide operation to the selection unit 28.

At this time, the control unit 20 also generates the region correspondence text data and transmits the generated region correspondence text data and the book attribute data to the selection unit 28.

The selection unit 28 executes the selection process, as described above, and selects the instruction estimated part from the text of the text of the display range or one page. Then, the selection unit 28 generates the instruction estimated part data indicating the instruction estimated part and transmits both the generated instruction estimated part data and the book attribute data to the acquisition unit 29.

At this time, the control unit 20 extracts the book identification information from the book attribute data of the electronic book selected for generating the index thereof in response to the instruction of the desired part.

The control unit 20 adds the book identification information to the text data corresponding to all of the pages of the electronic book for which the index is generated. Then, the control unit 20 transmits, to the acquisition unit 29, the text data (hereinafter, also referred to as whole text data) corresponding to all of the pages to which the book identification information is added.

When the acquisition unit 29 receives all of the text data from the control unit 20, the acquisition unit 29 transmits all of the text data to the natural language processing block 30 and asks the natural language processing block 30 to process all of the text data.

Thus, in the natural language processing block 30, the morpheme analysis unit 30A analyzes the morphemes of the text (hereinafter, also referred to as a whole book text) corresponding to all of the pages which is based on all of the text data, as described above, and generates the morpheme analysis result data indicating the analysis result. Then, the morpheme analysis unit 30A transits both the morpheme analysis result data and all of the text data to the syntax analysis unit 30B.

As described above, based on the morpheme analysis result data, the syntax analysis unit 30B analyzes the syntax of the whole book text which is based on all of the text data and generates the syntax analysis result data indicating the analysis result.

Then, the syntax analysis unit 30B returns, to the acquisition unit 29, the morpheme analysis part data and the syntax analysis part data as whole passage analysis result data which indicates the processing result of the natural language processing on the whole book text together with all of the text data.

When the acquisition unit 29 receives the whole passage analysis result data and all of the text data from the natural language processing block 30, the acquisition unit 29 temporarily maintains the whole passage analysis result data and all of the text data and transmits the whole passage analysis result data and all of the text data to the retrieval unit 66.

When the acquisition unit 29 receives the instruction estimated part data and the book attribute data from the selection unit 26, the acquisition unit 29 specifies information indicating the analysis results of the morpheme analysis and the syntax analysis of the instruction estimated part from the whole passage analysis result data temporarily maintained based on the instruction estimated part data.

The acquisition unit 29 cuts out, as the estimated part analysis result data, the specified information indicating the analysis results of the morpheme analysis and the syntax analysis of the instruction estimated part from the whole passage analysis result data. Then, the acquisition unit 29 transits the estimated part analysis result data together with the instruction estimated part data and the book attribute data to the specifying unit 33.

As described above, based on the estimated part analysis result data transmitted from the acquisition unit 29, the specifying unit 33 specifies the desired part selected by the user in the instruction estimated part which is based on the instruction estimated part data transmitted from the acquisition unit 29.

The specifying unit 33 generates the desired part data indicating the specified desired part based on the instruction estimated part data and transmits both the generated desired part data and the book attribute data to the registration unit 34.

The specifying unit 33 generates the desired part analysis result data indicating the analysis result of the desired part based on the book attribute data and the estimated part analysis result data and transmits the generated desired part analysis result data to the detection unit 35.

Here, when the desired part data and the book attribute data are transmitted from the specifying unit 33, the registration unit 34 appropriately registers the electronic book with the selected desired part in the book registration table DT1 of the book registration database in the storage unit 25, as described above.

At this time, the registration unit 34 registers the desired part selected from the electronic book in the desired part registration table DT2 of the book registration database in the storage unit 25, as described above.

When the registration is completed, the registration unit 34 adds, to the desired part data, the desired part identification information issued for the desired part and the book identification information and the book title of the electronic book with the selected desired part and generates registration desired part data indicating the registered desired part. Then, the registration unit 34 transmits the registered desired part data to the index generation unit 67.

When the detection unit 35 receives the desired part analysis result data from the specifying unit 33, the detection unit 35 detects a word important to the understanding of the contents of the desired part from the desired part in accordance with the same method as that of the keyword detection process described above based on the desired part analysis result data.

When the detection unit 35 detects the word important to the understanding of the contents of the desired part from the desired part, the detection unit 35 also detects the meaning of the detected word (hereinafter, also referred to as a detection word).

The detection unit 35 extracts the detection words (plurality of characters expressing a word including single or plurality of morphemes) from the desired part analysis result data without repetition and extracts the meaning word expressing the meaning of the detection word without repetition.

Here, the detection unit 35 extracts, from the desired part analysis result data, the book identification information, the page number of a page with the desired part present in the whole book text, and the front character position information indicating the position of the front character of the desired part.

The detection unit 35 stores the book identification information, the page number, and the front character position information, generates the identification information retrieval request data used to give a request for retrieving the desired part identification of the desired part, and transmits the generated identification information retrieval request data to the retrieval unit 66.

Then, the retrieval unit 66 retrieves and reads the desired part identification information used to give the request for the retrieval from the storage unit 25 based on the identification information retrieval request data transmitted from the detection unit 35.

The retrieval unit 66 stores the retrieved desired part identification information together with the book identification information, the page number, and the front character position information of the identification information retrieval request data, generates identification information notification data used to give a notification of the retrieved desired part identification information, and returns the identification information notification data to the detection unit 35.

At this time, when the detection unit 35 receives the identification information notification data from the retrieval unit 66, the detection unit 35 confirms whether the desired part identification information used to give the request for retrieval can be obtained based on the book identification information, the page number, and the front character position information stored in the identification information notification data.

As a result, when the desired part identification information used to give the request for retrieval is stored in the identification information notification data, the detection unit 35 extracts the desired part identification information from the identification information notification data.

At this time, the detection unit 35 stores both the detection word and the desired part identification information for each detection word extracted from the desired part analysis result data without repetition and generates word detection data indicating the detection result of the detection word. Then, the detection unit 35 transmits the word detection data to the retrieval unit 66.

At this time, the detection unit 35 stores both the meaning word and the desired part identification information for each meaning word extracted from the desired part analysis result data without repetition and generates meaning word detection data indicating the detection result of the meaning word. Then, the detection unit 35 transmits the meaning word detection data to the retrieval unit 66.

When the retrieval unit 66 receives the whole passage analysis result data and all of the text data from the acquisition unit 29, the retrieval unit 66 temporarily maintains the whole passage analysis result data and all of the text data. When the retrieval unit 66 receives the word detection data from the detection unit 35, the retrieval unit 66 extracts the detection word and the desired part identification information from the word detection data.

Then, based on the detection word, the retrieval unit 66 retrieves all of the detection words and the words (including the shame character string) having the same structure from the whole book text, which is based on all of the text data, and detects the positions of the detected words in the whole book text.

At this time, the retrieval unit 66 also retrieves the detection words detected from the desired part by the detection unit 35 and detects the positions of the detection words in the whole book text. In the following description, the word having the same structure as that of the detection word is also referred to as an identically structured word. In the following description, the position of a word having the same structure word is also referred to as an identical structure word position.

In effect, the retrieval unit 66 detects the identical structure word position of the identical structure word in the whole book text as the page number of a page where the identical structure word is present, the front character position information (row number and column number) indicating the position of the front character of the identical structure word, and the character number of identical structure word.

When the retrieval unit 66 receives the meaning word detection data from the detection unit 35, the retrieval unit 66 extracts the meaning word and the desired part identification information from the meaning word detection data.

Based on the meaning word and the meaning word corresponding to various words obtained based on the whole passage analysis result data, the retrieval unit 66 retrieves, from the whole book text, all of the words which have a structure different from that of the detection word and the same meaning as that of the detection word.

That is, the retrieval unit 66 retrieves, from the whole book text, all of the words (having the same meaning as that of the detection word), to which the meaning word identical to the meaning word expressing the meaning of the detection word is matched, excluding the identical structure word. Then, the retrieval unit 66 detects the position of the detected word in the whole book text.

In the following description, the word that has a structure different from that of a word (that is, the detection word) and the same meaning as that of the detection word is also referred to as an identical meaning word. Moreover, in the following description, the position of the identical meaning word in the whole book text is also referred to as an identical meaning word position.

In effect, the retrieval unit 66 also detects the identical meaning word position of the identical meaning word in the whole book text as the page number of a page where the identical meaning word is present, the front character position information (row number and column number) indicating the position of the front character of the identical meaning word, and the character number of identical meaning word.

Thus, based on the detection word, the retrieval unit 66 retrieves the identical structure word from the whole book text for each detection word detected from the desired part without repetition by the detection unit 35 and detects the identical structure word position of the identical structure word.

Moreover, the retrieval unit 66 retrieves the identical meaning word from the whole book text for each detection word detected from the desired part without repetition by the detection unit 35 based on the meaning word and detects the identical meaning word position of the identical meaning word.

The retrieval unit 66 stores the detection word, an identical structure word position information indicating the identical structure word position of the identical structure word retrieved with the detection word, and the desired part identification information for each detection word and generates identical structure word retrieval data indicating the retrieval result of the identical structure word.

Moreover, the retrieval unit 66 stores the meaning word, an identical meaning word position information indicating the identical meaning word position of the identical meaning word retrieved with the meaning word, and the desired part identification information for each meaning word and generates identical meaning word retrieval data indicating the retrieval result of the identical meaning word.

Then, the retrieval unit 66 transmits the identical structure word retrieval data and the identical meaning word retrieval data generated for each detection word to the index generation unit 67.

In this way, the control unit 20 allows the selection unit 28, the acquisition unit 29, the specifying unit 33, the detection unit 35, the registration unit 34, and the retrieval unit 66 to perform the same processing, whenever the user instructs the desired part on the electronic book image being displayed on the display unit 21.

Whenever the index generation unit 67 receives the registration desired part data from the registration unit 34 during the index generation process, the index generation unit 67 temporarily maintains the registration desired part data.

Whenever the index generation unit 67 receives the identical structure word retrieval data and the identical meaning word retrieval data for each detection word from the retrieval unit 66 during the index generation process, the index generation unit 67 temporarily also stores the identical structure word retrieval data and the identical meaning word retrieval data of each detection word.

When the control unit 20 detects that the selection of the desired part from the electronic book for which the index is generated ends in response to a predetermined operation of the user, the control unit 20 notifies the index generation unit 67 of the fact that the selection of the desired part ends.

When the index generation unit 67 is notified of the fact that the selection of the desired part ends from the control unit 20, the index generation unit 67 extracts the desired part, the desired part identification information, the book identification information, and the book title from each registration desired part data temporarily maintained at that time in response to the notification.

The index generation unit 67 generates a desired part list indicating the desired part together with the corresponding desired part identification information in a sequence from the front side to the rear side of the whole book text.

The index generation unit 67 generates an index, which indicates the electronic book for which the index is generated and the desired part selected from the electronic book, as a first hierarchical index which is the highest layer of the indexes of the hierarchical structure, by adding the book identification information and the book title to the desired part list.

Moreover, the index generation unit 67 extracts the desired part identification information from the identical structure word retrieval data and the identical meaning word retrieval data maintained temporarily up to the present time.

Based on the desired part identification information, the index generation unit 67 classifies the identical structure word retrieval data and the identical meaning word retrieval data for each desired part.

For example, the index generation unit 67 extracts the detection word and the meaning word from the identical structure word retrieval data and the identical meaning word retrieval data organized from one desired part and issues identification information used to individually identify the detection words and the meaning words.

In the following description, the identification information used to individually identify the detection words is referred to detection word identification information and the identification information used to individually identify the meaning words is referred to meaning word identification information.

The index generation unit 67 displays the detection words detected from the desired part and the corresponding detection word identification information and generates a detection word list which displays the meaning words detected based on the desired part and the corresponding meaning word identification information after the detection words.

The index generation unit 67 adds the desired part identification information to the detection word list and associates the detection word list with the desired part corresponding to the first hierarchical index based on the desired part identification information.

The index generation unit 67 generates an index, which indicates the detection words detected from the desired part, the meaning words detected based on the desired part, and the desired part, as a second hierarchical index lower than the first hierarchical index, among the indexes of the hierarchical structure.

At this time, the index generation unit 67 processes each desired part in the first hierarchical index in the same way as the above-described way and generates the second hierarchical index having the same structure and associated with the desired part.

Subsequently, for example, the index generation unit 67 extracts the identical structure word position information of each identical structure word from one piece of identical structure word retrieval data among the identical structure word retrieval data organized from one desired part.

The index generation unit 67 generates an identical structure word position list which displays the identical structure word position information in sequence from the identical structure word position on the front side of the whole book text to the identical structure word position on the rear side of the whole book text.

The index generation unit 67 adds, to the identical structure word position list, the detection word used for retrieving the identical structure word and the detection word identification information of the detection word and associates the identical structure word position list with the detection word corresponding to the second hierarchical index based on the detection word identification information.

Thus, the index generation unit 67 generates an index, which indicates the detection words detected from the desired part and the identical structure word position of the identical structure word retrieved with the detection word in the whole book text, as a third hierarchical index lower than the first and second hierarchical indexes, among the indexes of the hierarchical structure.

At this time, the index generation unit 67 processes each detection word in the second hierarchical index in the same way as the above-described way and generates the third hierarchical index which has the same configuration and is associated with the detection word.

For example, the index generation unit 67 extracts the identical meaning word position information of each identical meaning word from one piece of identical meaning word retrieval data among the identical meaning word retrieval data organized from one desired part.

The index generation unit 67 generates an identical meaning word position list which sequentially displays the identical meaning word position information in the arrangement sequence from the identical meaning word position on the front side of the whole book text to the identical meaning word position on the rear side of the whole book text.

The index generation unit 67 adds, to the identical meaning word position list, the meaning word used for retrieving the identical meaning word and the meaning word identification information of the meaning word and associates the identical meaning word position list with the meaning word corresponding to the third hierarchical index based on the meaning word identification information.

Thus, the index generation unit 67 also generates an index, which indicates the meaning words detected from the desired part and the identical meaning word position of the identical meaning word retrieved with the meaning word in the whole book text, as a third hierarchical index lower than the first hierarchical index by one layer, among the indexes of the hierarchical structure.

At this time, the index generation unit 67 processes each meaning word in the second hierarchical index in the same way as the above-described way and generates the third hierarchical index which has the same configuration and is associated with the meaning word.

Thus, when the index generation unit 67 generates the first to third hierarchical indexes, the index generation unit 67 transmits the generated first to third hierarchical indexes as first to third hierarchical index data to the storage unit 25. The index generation unit 67 stores the first to third hierarchical index data in the storage unit 25.

When the first to third hierarchical index are completely generated and stored, the index generation unit 67 notifies the control unit 20 of the fact that the first to third hierarchical index are completely generated and stored. Then, the control unit 20 ends the index generation process performed with each circuit unit so that the first to third hierarchical indexes can be used.

For example, when the user executes a predetermined operation to select the electronic book, which has generated the individual index of the user, so as to be displayed and gives a request for display of the index, the control unit 20 stores the book identification information of the electronic book and generates first hierarchical index request data to give a request of the first hierarchical index. The control unit 20 transmits the first hierarchical index request data to the retrieval unit 66.

When the retrieval unit 66 receives the first hierarchical index request data from the control unit 20, the retrieval unit 66 reads the first hierarchical index request data including the book identification information from the storage unit 25 based on the book identification information stored in the first hierarchical index request data and transmits the first hierarchical index request data to the control unit 20.

When the control unit 20 receives the first hierarchical index data from the retrieval unit 66, the control unit 20 extracts the book title and the desired part list from the first hierarchical index data.

The control unit 20 generates first hierarchical index image data based on the book title and the desired part list. Then, the control unit 20 transmits the first hierarchical index image data to the display control unit 26.

When the display control unit 26 receives the first hierarchical index image data from the control unit 20, the display control unit 26 transmits the first hierarchical index image data to the display unit 21. Thus, the display control unit 26 displays a first hierarchical index image 70 shown in FIG. 28 on the display unit 21 based on the first hierarchical index image data.

At this time, for example, a book title 71 is displayed on the upper side of the first hierarchical index image 70 and a plurality of desired parts arranged in the desired part list is displayed on the lower side of the book title 71 in an image vertical direction.

Then, the control unit 20 can give a notification of the desired part already selected in the electronic image to be displayed, so as to confirm the desired part by the first hierarchical index image 70.

At this time, the display control unit 26 generates desired part display region information indicating the display region of the desired part in the first hierarchical index image 70 being displayed on the display unit 21 with the coordinates of the pixel position of the display surface of the display unit 21.

The display control unit 26 transmits the desired part display region information of the desired part together with the desired part identification information of the desired part to the control unit 20.

During the display of the first hierarchical index image 70, the control unit 20 maintains the desired part display region information and the desired part identification information of the desired part transmitted from the display control unit 26 by matching the desired part display region information with the desired part identification information.

When the user taps the surface of the touch panel during the display of the first hierarchical index image 70, the control unit 20 compares the touch position of the tap operation to the display region of the desired part indicated by the desired part display region information.

As a consequence, when the control unit 20 detects that the user taps the display region of the desired part, the control unit 20 determines that the desired part is instructed by the tap operation.

At this time, the control unit 20 detects the desired part identification information matched with the desired part display region information based on the desired part display region information indicating the tapped display region.

The control unit 20 stores the desired part identification information (that is, the desired part identification information of the instructed desired part) detected in response to the tap operation and generates second hierarchical index request data used to give a request of the second hierarchical index data. Then, the control unit 20 transmits the second hierarchical index request data to the retrieval unit 66.

When the retrieval unit 66 receives the second hierarchical index request data from the control unit 20, the retrieval unit 66 reads the second hierarchical index data including the desired part identification information from the storage unit 25 based on the desired part identification information stored in the second hierarchical index request data and transmits the second hierarchical index data to the control unit 20.

When the control unit 20 receives the second hierarchical index data from the retrieval unit 66, the control unit 20 extracts the detection word list from the second hierarchical index data. Moreover, the control unit 20 generates second hierarchical index image data based on the detection word list. Then, the control unit 20 transmits the second hierarchical index image data to the display control unit 26.

When the display control unit 26 receives the second hierarchical index image data from the control unit 20, the display control unit 26 transmits the second hierarchical index image data to the display unit 21. Thus, the display control unit 26 displays a second hierarchical index image 71 shown in FIG. 29 on the display unit 21 based on the second hierarchical index image data.

At this time, in the second hierarchical index image 71, for example, single or a plurality of detection words detected from the corresponding desired part and the meaning words detected based on the desired part are sequentially displayed in the arrangement sequence of the detection word list in the image vertical direction.

Thus, the control unit 20 can give a notification of the detection words detected based on the instructed desired part and the meanings of the detection words, so as to confirm the detection words and the meanings of the detection words by the second hierarchical index image 71.

At this time, the display control unit 26 generates word display region information indicating the display region of the detection word in the second hierarchical index image 71 being displayed on the display unit 21 with the coordinates of the pixel position of the display surface of the display unit 21. Then, the display control unit 26 transmits the word display region information of the detection word together with the detection word identification information of the detection word to the control unit 20.

At this time, the display control unit 26 also generates meaning word display region information indicating the display region of the meaning word in the second hierarchical index image 71 being displayed on the display unit 21 with the coordinates of the pixel position of the display surface of the display unit 21. Then, the display control unit 26 transmits the meaning word display region information of the meaning word together with the meaning word identification information of the meaning word to the control unit 20.

During the display of the second hierarchical index image 71, the control unit 20 maintains the word display region information and the detection word identification information of the detection words transmitted from the display control unit 26 by matching the word display region information with the detection word identification information.

Moreover, during the display of the second hierarchical index image 71, the control unit 20 maintains the meaning word display region information and the meaning word identification information of the meaning words transmitted from the display control unit 26 by matching the meaning word display region information with the meaning word identification information.

When the user taps the surface of the touch panel during the display of the second hierarchical index image 71, the control unit 20 compares the touch position of the tap operation to the display region of the detection word indicated by the word display region information. At this time, the control unit 20 also compares the touch position of the tap operation to the display region of the meaning word indicated by the meaning word display region information.

As a consequence, for example, when the control unit 20 detects that the user taps the display region of the detection word, the control unit 20 determines that the detection word is instructed by the tap operation.

At this time, the control unit 20 detects the detection word identification information matched with the word display region information based on the word display region information indicating the tapped display region.

The control unit 20 stores the detection word identification information (that is, the detection word identification information of the instructed detection word) detected in response to the tap operation and the desired part identification information obtained based on the second hierarchical index data and generates third hierarchical index request data used to give a request of the third hierarchical index data. Then, the control unit 20 transmits the third hierarchical index request data to the retrieval unit 66.

When the retrieval unit 66 receives the third hierarchical index request data from the control unit 20, the retrieval unit 66 reads the third hierarchical index data including the detection word identification information and the desired part identification information from the storage unit 25 based on the detection word identification information and the desired part identification information stored in the third hierarchical index request data. Then, the retrieval unit 66 transmits the third hierarchical index data to the control unit 20.

When the control unit 20 receives the third hierarchical index data from the retrieval unit 66, the control unit 20 extracts the detection word and the identical structure word position list from the third hierarchical index data.

Moreover, the control unit 20 generates third hierarchical index image data based on the detection words and the identical structure word position list. Then, the control unit 20 transmits the third hierarchical index image data to the display control unit 26.

When the display control unit 26 receives the third hierarchical index image data from the control unit 20, the display control unit 26 transmits the third hierarchical index image data to the display unit 21. Thus, the display control unit 26 displays a third hierarchical index image 72 shown in FIG. 30 on the display unit 21 based on the third hierarchical index image data.

At this time, for example, the detection word instructed by the user is displayed on the upper side of the third hierarchical index image 73. For example, in the third hierarchical index image 73, the page number and the front character position information indicating the identical structure word position in the whole book text of the identical structure word retrieved with the detection word are displayed on the lower side of the detection words which are displayed in the arrangement sequence of the identical structure word position list in the image vertical direction.

Thus, the control unit 20 can give a notification of the identical structure word position of the identical structure word in the electronic book retrieved with the instructed detection word, so as to confirm the identical structure word position by the third hierarchical index image 72.

At this time, the display control unit 26 generates position display region information indicating the display regions of the page number and the front character position information indicating the identical structure word position of the identical structure word in the third hierarchical index image 72 being displayed on the display unit 21 with the coordinates of the pixel position of the display surface of the display unit 21.

Then, the display control unit 26 transmits the position display region information of the identical structure word together with the identical structure word position information of the identical structure word to the control unit 20.

During the display of the third hierarchical index image 72, the control unit 20 maintains the position display region information and the identical structure word position information of the identical structure word transmitted from the display control unit 26 by matching the position display region information with the identical structure word position information.

When the user taps the surface of the touch panel during the display of the third hierarchical index image 72, the control unit 20 compares the touch position of the tap operation to the display region of the identical structure word position of the identical structure word indicated by the position display region information.

As a consequence, for example, when the control unit 20 detects that the user taps the display region of the identical structure word position of the identical structure word, the control unit 20 determines that the identical structure word position of the identical structure word is instructed for displaying the identical structure word by the tap operation.

At this time, the control unit 20 reads, from the storage unit 25, the electronic book data of the electronic book selected so as to be displayed and transmits the electronic book data to the display control unit 26.

At this time, the control unit 20 generates emphasis display control data used to perform control of displaying the identical structure word in the emphasis manner based on the identical structure word position information of the identical structure word at the identical structure word position instructed to be displayed. Then, the control unit 20 transmits the generated emphasis display control data to the display control unit 26.

When the display control unit 26 receives the electronic book data and the emphasis display control data from the control unit 20, the display control unit 26 generates electronic book image data of a page including the identical structure word position of the instructed identical structure word based on the electronic book data.

Moreover, the display control unit 26 processes the electronic book image data based on the emphasis display control data and transmits the processed electronic book image data to the display unit 21. Thus, the display control unit 26 displays the electronic book image on the display unit 21 based on the electronic book image data so that the identical structure word at the instructed identical structure word position falls within the display range and displays the identical structure word in the emphasis manner.

Thus, the control unit 20 can display the electronic book image by jumping to an electronic book image including the part associated with the desired part already selected by the user in the electronic book based on the individual index of the user.

Even when the meaning word is instructed on the second hierarchical index image 71, the control unit 20 displays the third hierarchical index image corresponding to the meaning word.

When the identical meaning word position of the identical meaning word is instructed on the third hierarchical index image, the control unit 20 displays the electronic book image of a page where the identical meaning word is located and displays the identical meaning word included in the text in the electronic book image in the emphasis manner.

Thus, when a request for displaying the electronic book is given, the control unit 20 can display the first to third hierarchical index images 70 to 72 to view the contents of the electronic book just like the user first views a front page of a paper novel.

When the control unit 20 generates the individual index of the user for the electronic book, the control unit 20 can jump to a desired page using the first to third hierarchical index images 70 to 72 so that the user starts to read the electronic book. This is because there is a high possibility that the user reads the electronic book at least once when the index is generated.

The control unit 20 can permit easily searching for a portion of a phrase, a clause, or the like associated with the desired part in the whole book text by activating a jump function of jumping to a desired page of the electronic book using the first to third hierarchical index images 70 to 72. In the following description, the region of a phrase, a clause, or the like associated with the desired part in the whole book text is also referred to as an association portion.

Even when the control unit 20 displays the electronic book image of the electronic book generating the individual index of the user and the desired part is selected in the text of the electronic book image, as described above, the control unit 20 displays the desired part in the emphasis manner.

Therefore, when the control unit 20 displays the electronic book image of the electronic book generating the individual index of the user and, for example, the user reads the desired part, the control unit 20 can easily cope with a request for reading the association portion associated with the desired part in the electronic book.

In the association portion including the identical structure word in the electronic book, the identical structure word having the same structure as that of the detection word detected from the desired part is included and expressed.

Therefore, it is considered that relevance with the desired part used for retrieving the identical structure word is strong in the association portion including the identical structure word in the electronic book.

The association portion including the identical meaning word in the electronic book has the same meaning as the meaning of the detection word detected from the desired part and includes the identical meaning word having a structure different from that of the detection word.

Accordingly, in the association portion including the identical meaning word in the electronic book, it is considered that relevance with the desired part used for detecting the same meaning word is weaker than the relevance with the association portion including the desired portion and the same structure word detected based on the desired portion.

Accordingly, when the control unit 20 displays the identical structure word or the identical meaning word in the emphasis manner, the control unit 20 displays the identical structure word or the identical meaning word in the emphasis manner in different display states.

Thus, the control unit 20 can give a notification of the fact that the degree of the relevance with the association portion including the desired part and the identical structure word is different from the degree of the relevance with the association portion including the desired part and the identical meaning word.

The control unit 20 displays the identical structure word and the identical meaning word in the emphasis manner in the different display states, as described above, and also displays the desired part in the emphasis manner in a display state different from the display states of the identical structure word and the identical meaning word.

Accordingly, when the display control 20 displays the identical structure word or the identical meaning word included in the desired part in the emphasis manner in the text of the electronic book image being displayed on the display unit 21, the display control 20 can easily permit the user to recognize which word is the identical structure word or the identical meaning word in the desired part.

Moreover, even when the user executes a predetermined operation to select the electronic book generating the individual index of the user in order to display the electronic book, the control unit 20 does not display the first hierarchical index image 70 in a case where the user does not give a request for displaying the index and gives a request for displaying the electronic book. Then, the control unit 20 displays the electronic book image of the electronic book selected so as to be displayed on the display unit 21.

However, when the user executes a predetermined operation to give the request for displaying the index in the state where the control unit 20 displays the electronic book image of the electronic book generating the individual index of the user, the control unit 20 performs the above-described process, switches the image into the electronic book image, and displays the first hierarchical index image 70.

When the control unit 20 displays the first hierarchical index image 70, the control unit 20 then displays the second and third hierarchical index images 71 and 72 in response to the above-described operation of the user and finally displays the electronic book image of the page including the identical structure word or the identical meaning word.

When the control unit 20 displays the first to third hierarchical index images 70 to 72 on the display unit 21, the control unit 20 returns the display on the display unit 21 to the immediately previous display (that is, the display immediately before the display of the first to third hierarchical index images 70 to 72) in response to a predetermined operation of the user.

For example, only when the control unit 20 returns the display to the display of the first hierarchical index image 70 without displaying the electronic book image in response to the request for displaying the electronic book, for example, the control unit 20 displays the electronic book image of the first page of the electronic book.

Accordingly, even when the control unit 20 displays the first to third hierarchical index images 70 to 72, the control unit 20 returns the display to the immediately previous display and the user can instruct the desired part, the detection work, or the meaning word again.

Even when the control unit 20 performs the index generation process, the control unit 20 detects the keyword, generates the tag, registers the keyword or the tag, and retrieves the association information in response to the selection of the desired part, as in the case where the desired part is selected without performing the index generation process.

2-2-3. Link Generation Process

Next, a link generation process will be described in which a link of the association portion associated with the desired part is generated in the whole book text of the electronic book.

When the control unit 20 displays the electronic book image 27 on the display unit 21 in response to the request for the electronic book, as described above, the control unit 20 can also generate a link of the association portion associated with the desired part in the electronic book in response to the user selection of the desired part.

In effect, when the user executes a key operation or a tap operation to select the electronic book, in which a link is scheduled to be generated, and give a request for generating a link, the control unit 20 performs the link generation process. At this time, the control unit 20 allows the display control unit 26 to display at least a part of the electronic book image on the display unit 21, as in the above-described index generation process.

When the desired part is instructed on the electronic book image, the control unit 20 generates the region correspondence text data, as described above, and transmits both the generated region correspondence text data and the book attribute data to the selection unit 28.

The control unit 20 generates whole text data corresponding to the electronic book, in which a link is scheduled to be generated, and transmits the generated whole text data to the acquisition unit 29.

Thus, the selection unit 28 performs the same processes as those performed in the index generation process described above, selects the instruction estimated part from the text of the text of the display range or one page, and generates the instruction estimated part data indicating the instruction estimated part. Then, the selection unit 28 transmits both the instruction estimated part data and the book attribute data to the acquisition unit 29.

The acquisition unit 29 performs the same processes as those performed in the index generation process described above, transmits all of the text data to the natural language processing block 30, and gives a request for performing the natural language processing on all of the text data.

Thus, the natural language processing block 30 performs the same processes as those performed in the index generation process described above, analyzes all of the text data, generates whole passage analysis result data indicating the analysis result, and transmits both the whole passage analysis result data and the generated whole text data to the acquisition unit 29.

Accordingly, the acquisition unit 29 temporarily maintains the whole passage analysis result data and all of the text data transmitted from the natural language processing block 30 and transmits the whole passage analysis result data and all of the text data to the retrieval unit 66.

When the acquisition unit 29 receives the instruction estimated part data and the book attribute data from the selection unit 26, the acquisition unit 29 specifies information indicating the analysis results of the morpheme analysis and the syntax analysis from the temporarily maintained whole passage analysis result data and cuts out the estimated part analysis result data. Then, the acquisition unit 29 transmits the estimated part analysis result data together with the instruction estimated part data and the book attribute data to the specifying unit 33.

At this time, the specifying unit 33 also performs the same processes as those performed in the index generation process described above and specifies the desired part selected by the user in the instruction estimated part, which is based on the instruction estimated part data, based on the estimated part analysis result data.

Moreover, the specifying unit 33 generates the desired part data indicating the desired part based on instruction estimated part data and transmits both the desired part data and the book attribute data to the registration unit 34.

At this time, the specifying unit 33 generates desired part analysis result data indicating the analysis result of the desired part based on the book attribute data and the estimated part analysis result data and transmits the generated desired part analysis result data to the detection unit 35.

Here, when the registration unit 34 receives the desired part data and the book attribute data from the specifying unit 33, the registration unit 34 performs the same processes as those performed in the index generation process described above and registers the electronic book with the selected desired part in the book registration table DT1 in the storage unit 25.

At this time, the registration unit 34 also registers the desired part selected from the electronic book in the desired part registration table DT2 of the book registration database in the storage unit 25.

On the other hand, when the detection unit 35 receives the desired part analysis result data from the specifying unit 33, the detection unit 35 performs the same processes as those performed in the index generation process described above. When the detection unit 35 detects the detection words from the desired part based on the desired part analysis result data, the detection unit 35 also detects the meanings of the detection words.

Moreover, the detection unit 35 extracts the detection words without repetition from the desired part analysis result data and also extracts the meaning words expressing the meanings of the detection words without repetition. Furthermore, the detection unit 35 acquires the desired part identification information used to identify the desired part used for detecting the detection words by the retrieval unit 66.

At this time, the detection unit 35 stores the detection words together with the book identification information and the desired part identification information for each of the detection words extracted without repetition from the desired part analysis result data and generates the word detection data indicating the detection result of the detection words. Then, the detection unit 35 transmits the word detection data to the retrieval unit 66.

At this time, the detection unit 35 stores the meaning words together with the book identification information and the desired part identification information for each of the meaning words extracted without repetition from the desired part analysis result data and generates the meaning word detection data indicating the detection result of the meaning words. Then, the detection unit 35 transmits the meaning word detection data to the retrieval unit 66.

At this time, the retrieval unit 66 performs the same processes as those performed in the index generation process described above and temporarily maintains the whole passage analysis result data and all of the text data transmitted from the acquisition unit 29.

When the retrieval unit 66 receives the word detection data from the detection unit 35, the retrieval unit 66 retrieves all of the words having the same structure as that of the detection words from the whole book text based on the word detection data and all of the text data and detects the identical structure word position of the identical structure word in the whole book text.

When the retrieval unit 66 receives the meaning word detection data from the detection unit 35, the retrieval unit 66 retrieves all of the meaning words and the identical meaning words matched with the identical meaning words from the whole book text based on the meaning word detection data, the whole passage analysis result data, and all of the text data. Then, the retrieval unit 66 detects the identical meaning word positions of the retrieved identical meaning words in the whole book text.

Thus, the retrieval unit 66 retrieves the identical structure word from the whole book text based on the detection word for each of the detection words detected without repetition from the desired part by the detection unit 35 and detects the identical structure word position of the identical structure word.

The retrieval unit 66 retrieves the identical meaning word from the whole book text based on the meaning words for each of the meaning words detected without repetition from the desired part by the detection unit 35 and detects the identical meaning word position of the identical meaning word.

At this time, the retrieval unit 66 extracts the desired part identification information regarding the desired part and the book identification information from the word detection data and the meaning word detection data.

Accordingly, the retrieval unit 66 stores the identical structure word and the identical structure word position information together with the desired part identification information and the book identification information for each of the retrieved identical structure words and generates identical structure word registration request data used to give a request for registering the identical structure words.

The retrieval unit 66 transmits the identical structure word registration request data to the registration unit 34. Moreover, the retrieval unit 66 adds retrieval completion information, which indicates that the retrieval of the identical structure words is completed, to the identical structure word registration request data of the identical structure word finally retrieved among all of the identical structure words retrieved from the whole book text based on one desired part.

Moreover, the retrieval unit 66 stores the identical meaning word and the identical meaning word position information together with the desired part identification information, the book identification information, and the meaning word expressing the meaning of the corresponding detection word for each of the retrieved identical meaning words and generates identical meaning word registration request data used to give a request for registering the identical meaning words.

Then, the retrieval unit 66 also transmits the identical meaning word registration request data to the registration unit 34. Moreover, the retrieval unit 66 adds retrieval completion information, which indicates that the retrieval of the identical meaning words is completed, to the identical meaning word registration request data of the identical meaning word finally retrieved among all of the identical meaning words retrieved from the whole book text based on one desired part.

At this time, whenever the registration unit 34 receives the identical structure word registration request data from the retrieval unit 66, the registration unit 34 extracts, from the identical structure word registration data, the book identification information, the identical structure word position information (the page number, the row number, the column number, and the number of characters), the identical structure word, and the desired part identification information.

The registration unit 34 issues identical structure word identification information used to individually identify the identical structure words. At this time, even when the retrieval unit 66 retrieves the identical structure words which completely have the same configuration from a plurality of portions of the whole book text, the plurality of retrieved identical structure words is different from each other in the identical structure word position in the whole book text.

Accordingly, the registration unit 34 issues the identical structure word identification information unique for the plurality of identical structure words so as to identify the plurality of identical structure words as respective different words.

When the registration unit 34 issues the identical structure word identification information, the registration unit 34 stores the identical structure word identification information together with the book identification information, the page number, the row number, the column number, the number of characters, and the identical structure word and generates the identical structure word registration data used to register the identical structure word. Then, the registration unit 34 transmits the identical structure word registration data to the storage unit 25.

Here, in the book registration database described above, a data table (hereinafter, also referred to as an identical structure word registration table) is generated which is used to register the identical structure words so as to have the same configuration as that of the desired part registration table DT2.

The identical structure word registration table includes, as information registration items, an identical structure word identification information registration item used to register the identical structure word identification information and a book identification information registration item used to register the book identification information.

The identical structure word registration table further includes, as information registration items, a page number registration item used to register the page number of a page where the identical structure words are present and a line number registration item used to register the line number of the line where the front character of the identical structure word is located.

The identical structure word registration table further includes, as information registration items, a column number registration item used to register the column number of a column where the front character of the identical structure word is located and a character number registration item used to register the number of characters of the identical structure word.

The identical structure word registration table further includes, as an information registration item, an identical structure word registration item used to register the identical structure word itself as a character string.

Accordingly, the registration unit 34 stores the identical structure word identification information, the book identification information, the page number, the row number, the column number, the number of characters, and the identical structure word stored in the identical structure word registration data in the information registration item corresponding to the identical structure word registration table by associating the identical structure word identification information, the book identification information, the page number, the row number, the column number, the number of characters, and the identical structure word with each other.

Thus, whenever the registration unit 34 receives the request for registering the identical structure word from the retrieval unit 66, the registration unit 34 stores the identical structure word registration data indicating the identical structure word retrieved at this time in the identical structure word registration table of the book registration database and resisters the identical structure word.

Whenever the registration unit 34 registers the identical structure words, the registration unit 34 stores the identical structure word identification information and the identical structure word position information of the identical structure word together with the book identification information and the desired part identification information and generates identical structure word registration completion data indicating that the registration of the identical structure words is completed.

The registration unit 34 transmits the identical structure word registration completion data to a link generation unit 75. In this case, the registration unit 34 adds retrieval completion information to the identical structure word registration completion data of the identical structure word finally retrieved based on one desired part.

Whenever the registration unit 34 receives the identical meaning word registration request data from the retrieval unit 66, the registration unit 34 extracts, from the identical meaning word registration data, the book identification information, the identical meaning word position information (the page number, the row number, the column number, and the number of characters), the identical meaning word, the desired part identification information, and the meaning word.

The registration unit 34 issues identical meaning word identification information used to individually identify the identical meaning words. At this time, even when the retrieval unit 66 retrieves the identical meaning words which completely have the same configuration from a plurality of portions of the whole book text, the plurality of retrieved identical meaning words is different from each other in the identical meaning word position in the whole book text.

Accordingly, the registration unit 34 issues the identical meaning word identification information unique for the plurality of identical meaning words so as to identify the plurality of identical meaning words as respective different words.

When the registration unit 34 issues the identical meaning word identification information in this manner, the registration unit 34 stores the identical meaning word identification information together with the book identification information, the page number, the row number, the column number, the number of characters, and the identical meaning word and generates identical meaning word registration data used to register the identical meaning word. Then, the registration unit 34 transmits the identical meaning word registration data to the storage unit 25.

Here, in the book registration database described above, a data table (hereinafter, also referred to as an identical meaning word registration table) is generated which is used to register the identical meaning words so as to have the same configuration as that of the desired part registration table DT2.

The identical meaning word registration table includes, as information registration items, an identical meaning word identification information registration item used to register the identical meaning word identification information and a book identification information registration item used to register the book identification information.

The identical meaning word registration table further includes, as information registration items, a page number registration item used to register the page number of a page where the identical meaning words are present and a line number registration item used to register the line number of the line where the front character of the identical meaning word is located.

The identical meaning word registration table further includes, as information registration items, a column number registration item used to register the column number of a column where the front character of the identical meaning word is located and a character number registration item used to register the number of characters of the identical meaning word.

The identical meaning word registration table further includes, as an information registration item, an identical meaning word registration item used to register the identical meaning word itself as a character string.

Accordingly, the registration unit 34 stores the identical meaning word identification information, the book identification information, the page number, the row number, the column number, the number of characters, and the identical meaning word stored in the identical meaning word registration data in the information registration item corresponding to the identical meaning word registration table by associating the identical meaning word identification information, the book identification information, the page number, the row number, the column number, the number of characters, and the identical meaning word with each other.

Thus, whenever the registration unit 34 receives the request for registering the identical meaning word from the retrieval unit 66, the registration unit 34 stores the identical meaning word registration data indicating the identical meaning words retrieved at this time in the identical meaning word registration table of the book registration database and registers the identical meaning word.

Whenever the registration unit 34 registers the identical meaning words, the registration unit 34 stores the identical meaning word identification information and the identical meaning word position information of the identical meaning word together with the meaning words, the book identification information, and the desired part identification information and generates identical meaning word registration completion data indicating that the registration of the identical meaning words is completed.

The registration unit 34 transmits the identical meaning word registration completion data to the link generation unit 75. In this case, the registration unit 34 adds retrieval completion information to the identical meaning word registration completion data of the identical meaning word finally retrieved based on one desired part.

Whenever the desired part is instructed on the electronic book image being displayed on the display unit 21, the control unit 20 allows the selection unit 28, the acquisition unit 29, the specifying unit 33, the detection unit 35, the registration unit 34, and the retrieval unit 66 to perform the same processes.

Whenever the link generation unit 75 receives the identical structure word registration completion data from the registration unit 34 during the index generation process, the link generation unit 75 temporarily maintains the identical structure word registration completion data.

Moreover, whenever the link generation unit 75 receives the identical meaning word registration completion data from the registration unit 34 during the index generation process, the link generation unit 75 temporarily maintains the identical meaning word registration completion data.

When the link generation unit 75 receives identical structure word registration completion data, to which the retrieval completion information is added, from the registration unit 34 and temporarily maintains the identical structure word registration completion data, the link generation unit 75 extracts the book identification information and the desired part identification information from the identical structure word registration completion data.

Based on desired part identification information, the link generation unit 75 detects the identical structure word registration completion data of all of the identical structure words retrieved based on one desired part identified with the desired part identification information.

Moreover, the link generation unit 75 extracts the identical structure words from the detected identical structure word registration completion data and compares the extracted identical structure words to each other.

As a consequence, when the identical structure words are the same (that is, only one detection word is detected from the corresponding desired part), the link generation unit 75 does not classify the detected identical structure word registration completion data any more.

On the other hand, when the identical structure words are different (that is, two or more detection words are detected from the corresponding desired part), the link generation unit 75 classifies the detected identical structure word registration completion data for each identical structure word.

Thus, the link generation unit 75 sums up the identical structure word registration completion data of the identical structure words retrieved based on one desired part for each identical structure word with the identical structure.

The link generation unit 75 extracts the identical structure word identification information and the identical structure word position information from the identical structure word registration completion data of each of the identical structure words with the identical structure.

The link generation unit 75 generates the identical structure word position list in which the identical structure word position information of the identical structure words and the identical structure word identification information of the identical structure words are matched with each other and arranged sequentially from the identical structure word position on the front side of the whole book text to the identical structure word position on the rear side thereof.

The link generation unit 75 adds, to the identical structure word position list, the book identical information of the electronic book and the desired part identification information of the desired part used for generating the identical structure words.

Thus, the link generation unit 75 generates an identical structure word link list used to sequentially link the identical structure words to each other in the whole book text in accordance with the identical structure word list.

When two or more kinds of identical structure words are retrieved based on one desired part, the link generation unit 75 processes the respective identical structure words in the same manner and generates the identical structure word link list.

When two or more desired parts are selected in the electronic book, the link generation unit 75 also processes the desired parts and the detection words for the identical structure words retrieved based on each of the desired parts and generates the identical structure word link list.

Thus, when the link generation unit 75 generates the identical structure word link list, the link generation unit 75 transmits the identical structure word link list to the registration unit 34 and allows the registration unit 34 to store the identical structure word link list in the storage unit 25.

When the link generation unit 75 receives the identical meaning word registration completion data added with the retrieval completion information from the registration unit 34 and temporarily maintains the identical meaning word registration completion data, the link generation unit 75 also extracts the book identification information and the desired part identification information from the identical meaning word registration completion data.

Based on the desired part identification information, the link generation unit 75 detects the identical meaning word registration completion data of all of the identical meaning words retrieved based on one desired part identified with the desired part identification information.

The link generation unit 75 extracts the meaning words from the detected identical meaning word registration completion data and compares the extracted meaning words to each other.

As a consequence, when the meaning words are the same (that is, only one meaning word is detected from the corresponding desired part), the link generation unit 75 does not classify the detected identical meaning word registration completion data any more.

On the other hand, when the meaning words are different (that is, two or more meaning words are detected from the corresponding desired part), the link generation unit 75 classifies the detected identical meaning word registration completion data for each meaning word.

Thus, the link generation unit 75 sums up the identical meaning word registration completion data of the identical meaning words retrieved based on one desired part for each meaning word (that is, the meaning of the identical meaning word).

The link generation unit 75 extracts the identical meaning word identification information and the identical meaning word position information from the identical meaning word registration completion data of each of the identical meaning words with the identical meaning.

The link generation unit 75 generates the identical meaning word position list in which the identical meaning word position information of the identical meaning words and the identical meaning word identification information of the identical meaning words are matched with each other and arranged sequentially from the identical meaning word position on the front side of the whole book text to the identical meaning word position on the rear side thereof.

The link generation unit 75 adds, to the identical meaning word position list, the book identical information of the electronic book and the desired part identification information of the desired part used for generating the identical meaning words.

Thus, the link generation unit 75 generates an identical meaning word link list used to sequentially link the identical meaning words to each other in the whole book text in accordance with the identical meaning word list.

When two or more kinds of identical meaning words are retrieved based on one desired part, the link generation unit 75 processes the respective identical meaning words in the same manner and generates the identical meaning word link list.

When two or more desired parts are selected in the electronic book, the link generation unit 75 also processes the desired parts and the identical meaning words for the identical meaning words retrieved based on each of the desired parts and generates the identical meaning word link list.

Thus, when the link generation unit 75 generates the identical meaning word link list, the link generation unit 75 transmits the identical meaning word link list to the registration unit 34 and allows the registration unit 34 to store the identical meaning word link list in the storage unit 25.

In the following description, when it is not necessary to distinguish the identical structure word link list and the identical meaning word link list from each other, the identical structure word link list and the identical meaning word link list are simply referred to as ink lists.

When the link generation unit 75 stores the identical structure word link list or the identical meaning word link list in the storage unit 25, the link generation unit 75 notifies the control unit 20 of the fact that the generation of the link lists is completed.

When the control unit 20 is notified of the fact that the generation of the link list is completed from the link generation unit 75 during the display of the electronic book image of the electronic book, the control unit 20 stores the book identification information of the electronic book and generates a list retrieval request data used to give a request for retrieving the link lists. Then, the control unit 20 transmits the list retrieval request data to the retrieval unit 66.

When the retrieval unit 66 receives the list retrieval request data from the control unit 20, the retrieval unit 66 retrieves the identical structure word link list and the identical meaning word link list having the book identification information in the storage unit 25 based on the book identification information stored in the list retrieval request data.

As a consequence, when the retrieval unit 66 retrieves the identical structure word link list and the identical meaning word link list in the storage unit 25, the retrieval unit 66 reads the identical structure word link list and the identical meaning word link list from the storage unit 25 and transmits the identical structure word link list and the identical meaning word link list to the control unit 20.

Here, the control unit 20 receives the identical structure word link list and the identical meaning word link list from the retrieval unit 66, the control unit 20 determines whether the identical structure word position information including the page number is registered in the identical structure word link list based on the page number of the electronic book image being displayed.

As a consequence, when the control unit 20 detects single or a plurality of identical structure word position information including the page number from the identical structure word link list, the control unit 20 extracts both the detected identical structure word position information and the corresponding identical structure word identification information from the identical structure word link list.

The control unit 20 generates the emphasis display control data to display the corresponding identical structure words in the emphasis manner based on the identical structure word identification information and the identical structure word identification information and transmits the generated emphasis display control data to the display control unit 26.

Based on the page number of the electronic book image being displayed, the control unit 20 determines whether the identical meaning word position information including the corresponding page number is registered in the identical meaning word link list.

As a consequence, when the control unit 20 detects the single or plurality of identical meaning word position information including the page number is detected from the identical meaning word link list, the control unit 20 extracts the detected identical meaning word position information and the corresponding identical meaning word identification information from the identical meaning word link list.

The control unit 20 generates the emphasis display control data used to display the corresponding identical meaning word in the emphasis manner based on the identical meaning word identification information and the identical meaning word identification information and transmits the generated emphasis display control data to the display control unit 26.

When the display control unit 26 receives the emphasis display control data from the control unit 20, the display control unit 26 processes the electronic book image data generated for display based on the emphasis display control data and transmits the processed emphasis display control data to the display unit 21.

Thus, the display control unit 26 displays the single or plurality of identical structure words designated based on the emphasis display control data in the emphasis manner in the electronic book image being displayed on the display unit 21. Moreover, the display control unit 26 also displays the single or plurality of identical meaning words designated based on the emphasis display control data in the emphasis manner in the electronic book image being displayed on the display unit 21.

When the identical structure word or the identical meaning word is included in the text of the electronic book image being displayed on the display unit 21, the control unit 20 can display the identical structure word or the identical meaning word in the emphasis manner to exhibit the identical structure word or the identical meaning word to the user.

The control unit 20 performs the same process, when the electronic book image being displayed on the display unit 21 is switched in response to a flick operation of the user in this state.

Thus, when the identical structure word or the identical meaning word is also included in the text of the electronic book image newly displayed on the display unit 21, the control unit 20 displays the identical structure word or the identical meaning word in the emphasis manner.

In this case, when the display control unit 26 displays the single or plurality of identical structure words in the emphasis manner in the electronic book image being displayed on the display unit 21, the display control unit 26 generates the word display region information indicating the display region of the identical structure word with the coordinates of the pixel position of the display surface of the display unit 21 for each identical structure word.

Then, the display control unit 26 transmits both the word display region information for each identical structure word and the identical structure word identification information of this identical structure word to the control unit 20.

Moreover, when the display control unit 26 displays the single or plurality of identical meaning words in the emphasis manner in the electronic book image being displayed on the display unit 21, the display control unit 26 also generates the word display region information indicating the display region of the identical meaning word with the coordinates of the pixel position of the display surface of the display unit 21 for each identical meaning word.

Then, the display control unit 26 transmits both the word display region information for each identical meaning word and the identical meaning word identification information of this identical meaning word to the control unit 20.

Accordingly, during the emphasis display of the identical structure words, the control unit 20 maintains the word display region information and the identical structure word identification information of the identical structure words transmitted from the display control unit 26 by matching the word display region information with the identical structure word identification information.

Moreover, during the emphasis display of the identical meaning words, the control unit 20 maintains the word display region information and the identical meaning word identification information of the identical meaning words transmitted from the display control unit 26 by matching the word display region information with the identical meaning word identification information.

For example, when the control unit 20 displays the identical structure words in the emphasis manner and the user flicks the surface of the touch panel with the tip of his or her finger or the like to move the image from the left side to the right side, the control unit 20 compares the touch position of the flick operation to the display region indicated by the word display region information.

For example, when the control unit 20 displays the identical meaning words in the emphasis manner and the user flicks the surface of the touch panel with the tip of his or her finger or the like to move the image toward the right side, the control unit 20 compares the touch position of the flick operation to the display region indicated by the word display region information.

As a consequence, when the control unit 20 detects the flick operation that the user executes the flick operation toward the light side of the image at the display region of the identical structure word with the tip of his or her finger or the like, the control unit 20 determines that the identical structure word at the display region is instructed by the flick operation.

At this time, the control unit 20 determines that an instruction is given through the flick operation to display the identical structure word prior to the instructed identical structure word and closest to the instructed identical structure word among the identical structure words at various identical structure word positions of the whole book text.

Then, based on the word display region information indicating the display region subjected to the flick operation, the control unit 20 detects the identical structure word identification information matched with the word display region information.

Based on the detected identical structure word identification information, the control unit 20 detects the identical structure word position information registered immediately before the identical structure word position information of the instructed identical structure word in accordance with the identical structure word position information in the identical structure word link list.

The control unit 20 extracts, from the identical structure word link list, both the detected identical structure word position information and the corresponding identical structure word identification information. Then, the control unit 20 compares the page number included in the identical structure word position information to the page number of the electronic book image being displayed.

As a consequence, when the previous page of the electronic book image is exhibited during the display of the page number included in the identical structure word position information, the control unit 20 gives an instruction to newly display the page of the electronic book image by the page number and generates display switch control data used to control display switch.

Based on the identical structure word identification information and the identical structure word identification information, the control unit 20 generates emphasis display control data used to display the instructed identical structure word in the emphasis manner. Then, the control unit 20 transmits the display switch control data and the emphasis display control data to the display control unit 26.

When the display control unit 26 receives the display switch control data and the emphasis display control data from the control unit 20, the display control unit 26 generates the electronic book image data of the instructed page based on the display switch control data and the electronic book data.

At this time, based on the emphasis display control data, the display control unit 26 processes the generated electronic book image data and transmits the processed electronic book image data to the display unit 21. Thus, the display control unit 26 performs switch to the electronic book image displayed on the display unit 21, displays the electronic book image of the instructed page, such as the instructed identical structure word, so as to be located in the middle of the display surface as near as possible, and displays the identical structure word in the emphasis manner.

When the control unit 20 switches the display of the electronic book image, the control unit 20 determines whether both the instructed identical structure word and the identical structure word are included in the text of the electronic book image newly displayed based on the identical structure word link list.

As a consequence, when the control unit 20 determines that both the instructed identical structure word and the identical structure word are included in the text of the electronic book image newly displayed, the control unit 20 also displays the identical structure word other than the instructed identical structure word in the emphasis manner, as described above.

When the control unit 20 compares the page number included in the identical structure word position information to the page number of the electronic book image being displayed and determines that the page number indicates the page of the electronic book image being displayed, the control unit 20 does not generate the display switch control data.

Based on the identical structure word identification information, the control unit 20 generates display range control data used to control the display range so that the instructed identical structure word is located in the middle of the display surface as near as possible. Then, the control unit 20 transmits the display range control data to the display control unit 26.

When the display control unit 26 receives the display range control data from the control unit 20, the display control unit 26 changes a portion of the electronic book image data to be transmitted to the display unit 21 in accordance with the display range control data.

Thus, the display control unit 26 does not switch the electronic book image being displayed on the display unit 21, the display control unit 26 changes the display range of the electronic book image so that the instructed identical structure word is located in the middle of the display surface as near as possible.

For example, when the flick operation is operated toward the right side, as described above, and the control unit 20 detects that the user flicks the display region of the identical meaning word toward the right side with the tip of his or her finger or the like, the control unit 20 determines that the identical meaning word at the display region is instructed through the flick operation.

At this time, the control unit 20 determines that an instruction is given through the flick operation to display the identical meaning word prior to the instructed identical meaning word and closest to the instructed identical meaning word among the identical meaning words at various identical meaning word positions of the whole book text.

Then, based on the word display region information indicating the display region subjected to the flick operation, the control unit 20 detects the identical meaning word identification information matched with the word display region information.

Thus, the control unit 20 performs the same process as the process performed using the identical structure word link list described above by using the identical meaning word link list.

Accordingly, the control unit 20 switches the electronic book image being displayed into the electronic book image of the appropriate previous page and displays the electronic book image of the appropriate previous page. Alternatively, the control unit 20 changes the display range of the electronic book image being displayed and displays the instructed identical meaning word included in the text of the electronic book image in the emphasis manner.

Whenever the user executes the flick operation toward the right side on the identical structure word included in the text of the electronic book image being displayed, the control unit 20 can newly switches the display of the electronic book image appropriately and can exhibit the identical structure word located before the instructed identical structure word.

Moreover, whenever the user executes the flick operation toward the right side on the identical meaning word included in the text of the electronic book image being displayed, the control unit 20 can newly switches the display of the electronic book image and can exhibit the identical meaning word located before the instructed identical meaning word.

For example, when the control unit 20 displays the identical structure words in the emphasis manner and the user flicks the surface of the touch panel with the tip of his or her finger or the like to move the image from the right side to the left side, the control unit 20 compares the touch position of the flick operation to the display region indicated by the word display region information.

When the control unit 20 displays the identical meaning words in the emphasis manner and the user flicks the surface of the touch panel with the tip of his or her finger or the like to move the image toward the left side, the control unit 20 compares the touch position of the flick operation to the display region indicated by the word display region information.

As a consequence, when the control unit 20 detects the flick operation that the user executes the flick operation toward the left side of the image at the display region of the identical structure word with the tip of his or her finger or the like, the control unit 20 determines that the identical structure word at the display region is instructed by the flick operation.

At this time, the control unit 20 determines that an instruction is given through the flick operation to display the identical structure word subsequent to the instructed identical structure word and closest to the instructed identical structure word among the identical structure words at various identical structure word positions of the whole book text.

Then, based on the word display region information indicating the display region subjected to the flick operation, the control unit 20 detects the identical structure word identification information matched with the word display region information.

Based on the detected identical structure word identification information, the control unit 20 detects the identical structure word position information registered immediately after the identical structure word position information of the instructed identical structure word in accordance with the identical structure word position information in the identical structure word link list.

The control unit 20 extracts, from the identical structure word link list, both the detected identical structure word position information and the corresponding identical structure word identical information. Then, the control unit 20 compares the page number included in the identical structure word position information to the page number of the electronic book image being displayed.

As a consequence, when the subsequent page of the electronic book image is exhibited during the display of the page number included in the identical structure word position information, the control unit 20 gives an instruction to newly display the page of the electronic book image by the page number and generates display switch control data used to control display switch.

Based on the identical structure word identification information and the identical structure word identification information, the control unit 20 generates emphasis display control data used to display the instructed identical structure word in the emphasis manner. Then, the control unit 20 transmits the display switch control data and the emphasis display control data to the display control unit 26.

When the display control unit 26 receives the display switch control data and the emphasis display control data from the control unit 20, the display control unit 26 generates the electronic book image data of the instructed page based on the display switch control data and the electronic book data.

At this time, based on the emphasis display control data, the display control unit 26 processes the generated electronic book image data and transmits the processed electronic book image data to the display unit 21. Thus, the display control unit 26 performs switch to the electronic book image displayed on the display unit 21, displays the electronic book image of the instructed page, such as the instructed identical structure word, so as to be located in the middle of the display surface as near as possible, and displays the identical structure word in the emphasis manner.

When the control unit 20 switches the display of the electronic book image in this manner, the control unit 20 determines whether the identical structure word as well as the instructed identical structure word is included in the text of the electronic book image newly displayed based on the identical structure word link list.

As a consequence, when the control unit 20 determines that the instructed identical structure word and the identical structure word are included in the text of the electronic book image newly displayed, the control unit 20 also displays the identical structure word other than the instructed identical structure word in the emphasis manner, as described above.

When the control unit 20 compares the page number included in the identical structure word position information to the page number of the electronic book image being displayed and determines that the page number indicates the page of the electronic book image being displayed, the control unit 20 does not generate the display switch control data.

Based on the identical structure word identification information, the control unit 20 generates display range control data used to control the display range so that the instructed identical structure word is located in the middle of the display surface as near as possible. Then, the control unit 20 transmits the display range control data to the display control unit 26.

When the display control unit 26 receives the display range control data from the control unit 20, the display control unit 26 changes a portion of the electronic book image data to be transmitted to the display unit 21 in accordance with the display range control data.

Thus, the display control unit 26 does not switch the electronic book image being displayed on the display unit 21, the display control unit 26 changes the display range of the electronic book image so that the instructed identical structure word is located in the middle of the display surface as near as possible.

For example, when the flick operation is operated toward the left side, as described above, and the control unit 20 detects that the user flicks the display region of the identical meaning word toward the left side with the tip of his or her finger or the like, the control unit 20 determines that the identical meaning word at the display region is instructed through the flick operation.

At this time, the control unit 20 determines that an instruction is given through the flick operation to display the identical meaning word prior to the instructed identical meaning word and closest to the instructed identical meaning word among the identical meaning words at various identical meaning word positions of the whole book text.

Then, based on the word display region information indicating the display region subjected to the flick operation, the control unit 20 detects the identical meaning word identification information matched with the word display region information.

Thus, the control unit 20 performs the same process as the process performed using the identical structure word link list described above by using the identical meaning word link list.

Accordingly, the control unit 20 newly switches the electronic book image being displayed into the electronic book image of the appropriate subsequent page and displays the electronic book image of the appropriate previous page. Alternatively, the control unit 20 changes the display range of the electronic book image being displayed and displays the instructed identical meaning word included in the text of the electronic book image in the emphasis manner.

Whenever the user executes the flick operation toward the left side on the identical structure word included in the text of the electronic book image being displayed, the control unit 20 can appropriately switch the display of the electronic book image and can exhibit the identical structure word located after the instructed identical structure word.

Moreover, when the user executes the flick operation toward the left side on the identical meaning word included in the text of the electronic book image being displayed, the control unit 20 can appropriately switches the display of the electronic book image and can exhibit the identical meaning word located after the instructed identical meaning word.

Accordingly, when the control unit 20 generates the link for the electronic book, the control unit 20 can permit easily searching for the association portion such as a phrase or a clause associated with the desired part by utilizing the link function.

Even when the control unit 20 displays the identical structure word or the identical meaning word in the emphasis manner based on the link list, the control unit 20 displays the identical structure word and the identical meaning word in mutually different display states in the emphasis manner, as in the index described above.

Thus, the control unit 20 can give a notification of the fact that the degree of the relevance with the association portion including the desired part and the identical structure word is different from the degree of the relevance with the association portion including the desired part and the identical meaning word.

Even when the control unit 20 executes the link generation process, as in the case where the desired part is selected without performing the link generation process, the control unit 20 detects the keyword in response to the selection of the desired part, generates the tag, registers the desired part, and retrieves the association information.

Accordingly, when the desired part is selected in the text of the electronic book image even in a case where the electronic book image of the electronic book in which the link is generated is displayed, as described above, the control unit 20 displays the desired part in the emphasis manner.

The control unit 20 displays the identical structure word and the identical meaning word in the emphasis manner in the mutually different display states, as described above, and also displays the identical structure word and the identical meaning word in the emphasis manner in a display state different from the display states of the desired part.

Accordingly, when the control unit 20 displays the identical structure word or the identical meaning word of the desired part included in the desired part in the text of the electronic book image being displayed on the display unit 21 in the emphasis manner, the control unit 20 can easily exhibit the identical structure word or the identical meaning word in the desired part so that the user can recognize the identical structure word or the identical meaning word.

When the control unit 20 displays the electronic book image of the electronic book in which the link is generated, and for example, the user reads the desired part, the control unit 20 can easily cope with a request for reading the association portion associated with the desired part in the electronic book.

When the control unit 20 displays the identical structure word in the emphasis manner in the electronic book image being displayed, the control unit 20 can allow the user to execute a predetermined operation of instructing the identical structure word and can allow the user to delete the identical structure word from the identical structure word link list.

In effect, when the control unit 20 receives the instruction to delete the identical structure word in the electronic book image being displayed from the identical structure word link list by a predetermined operation of the user, the control unit 20 stops displaying the instructed identical structure word in the emphasis manner.

The control unit 20 detects and deletes the identical structure word position information and the identical structure word identification information of the instructed identical structure word in the identical structure word link list. Thus, the control unit 20 invalidates the search for the identical structure word instructed by the user and then may not display the identical structure word in the emphasis manner.

Even when the control unit 20 displays the identical meaning word in the emphasis manner in the electronic book image being displayed, the control unit 20 can allow the user to execute a predetermined operation of instructing the identical meaning word and can allow the user to delete the identical meaning word from the identical meaning word link list.

Moreover, when the control unit 20 receives the instruction to delete the identical meaning word in the electronic book image being displayed from the identical meaning word link list by a predetermined operation of the user, the control unit 20 stops displaying the instructed identical meaning word in the emphasis manner.

The control unit 20 detects and deletes the identical meaning word position information and the identical meaning word identification information of the instructed identical meaning word in the identical meaning word link list. Thus, the control unit 20 invalidates the search for the identical meaning word instructed by the user and then may not display the identical meaning word in the emphasis manner.

Accordingly, the control unit 20 can prevent the identical structure word or the identical meaning word, which is included in the association portion determined not to be associated with the desired part in the electronic book image for the user, from being unnecessarily displayed in the emphasis manner to search for the association portion.

The control unit 20 can prevent a situation where it is difficult for the user to read the text itself due to the numerous identical structure words or the identical meaning words displayed in the emphasis manner in the electronic book image.

When the control unit 20 displays the electronic book image of the electronic book in which the link list is generated and displays the desired part selected in the generation of the link list in the emphasis manner, the control unit 20 can allow the user to execute a predetermined operation of instructing the desired part and cancel the selection.

In effect, when the control unit 20 receives the instruction of cancelling the selection of the desired part in the electronic book image being displayed by the predetermined operation of the user, the control unit 20 stops displaying the desired part in the emphasis manner.

At this time, the control unit 20 stores the desired part identification information of the instructed desired part and transmits deletion request data used to give a request for deleting the registration of the desired part to the registration unit 34.

Accordingly, at this time, the registration unit 34 extracts the desired part identification information from the deletion request data transmitted from the control unit 20. Then, based on the desired part identification information, the registration unit 34 detects and deletes the desired part registration data corresponding to the desired part identification information in the desired part registration table DT2 in the storage unit 25.

Thus, the control unit 20 cancels the selection of the desired part instructed by the user in order not to subsequently display the desired part in the emphasis manner.

At this time, based on the desired part identification information extracted from the deletion request data, the registration unit 34 detects and deletes the identical structure word link list and the identical meaning word link list including the desired part identification information in the storage unit 25.

The control unit 20 thus invalidates the retrieval of the identical structure word and the identical meaning word searched based on the desired part instructed by the user in order not to subsequently display the identical structure word and the identical meaning word in the emphasis manner.

Accordingly, when the control unit 20 determines that it is not necessary to select the desired part selected once by the user in the electronic book image, the control unit 20 cancel the selection in order not to subsequently display the desired part in the emphasis manner unnecessarily.

When it is not necessary to search for the association portion associated with the desired part in response to the cancellation of the selection of the desired part, the control unit 20 can prevent the identical structure word and the identical meaning word sued to search for the association portion associated with the desired part from being unnecessarily displayed in the emphasis manner.

2-2-4. Classification Process

Next, a classification process of classifying the desired parts selected in various electronic books will be described. First, the desired part selected in the electronic book by the user can be said to be a part which the user is particularly interested in the whole book text of the electronic book.

Accordingly, the control unit 20 does not classify the desired parts in accordance with genre, for example, but classifies the desired parts in accordance with an interest of the user. Therefore, the classified electronic books can easily be used subsequently in the search of the desired part.

Since the control unit 20 realizes the classification of the desired parts, the meanings of the keywords detected from the desired parts are used. Moreover, the control unit 20 hierarchically classifies the desired parts to easily use the classification result when the desired parts are subsequently searched.

In effect, when the user executes a predetermined operation to give a request for classifying the desired parts, the control unit 20 performs the classification process in response to the predetermined operation in cooperation with each circuit unit. At this time, for example, the control unit 20 allows the user to arbitrarily select the folder name of single or a plurality of first hierarchical holders which is the highest folder among hierarchical folders used to hierarchically classify the desired parts.

At this time, for example, the control unit 20 allows the display unit 21 to exemplify the hierarchical meanings (for example, the meanings of a word "COOKING POT" and higher hierarchical concept words "COOKING" and "FOOD") of the superordinate concept for a predetermined word included in the desired part.

Thus, the control unit 20 allows the user having already read the electronic book to select one or more words such as "COOKING" or "HISTORY, HISTORICAL FIGURES" expressing the meaning of the superordinate concept considered to be suitable to classify the desired part as the folder name of the first hierarchical folder.

Thus, when the user select the folder name of the single or plurality of first hierarchical folders, the control unit 20 generates folder name data indicating the selected folder names for each first hierarchical folder and transmits the folder name data to a classification unit 77.

When an electronic book is instructed for acquisition by the user, the whole book text can be said to be the desired part. In particular, since an electronic book acquired by cutting out a text of a home page, a report, or the like as a scrap is a part which the user is interested in and gives an instruction to cut from the text of the home page, the report, or the like, the electronic book can be said to be a desired part itself.

Therefore, the selection unit 28 determines whether there is an unregistered electronic book in the book registration table DT1 in the storage unit 25 under the control of the control unit 20 based on the electronic book data stored in the storage unit 25 and the book registration data in the book registration table DT1.

That is, the selection unit 28 determines whether there is an electronic book in which a part of the text has not been selected once as the desired part after the acquisition in the storage unit 25.

As a consequence, when there is the unregistered electronic book in the book registration table DT1, the selection unit 28 selects all of the text data of the electronic book as an analysis target. Then, the selection unit 28 reads the book attribute data and all of the text data of the unregistered electronic book from the storage unit 25 and transmits the book attribute data and all of the text data to the acquisition unit 29.

When the acquisition unit 29 receives the book attribute data and all of the text data from the selection unit 28, the acquisition unit 29 temporarily maintains the book attribute data and transmits all of the text data to the natural language processing block 30 to give a request for natural language processing.

At this time, the natural language processing block 30 analyzes the morpheme and syntax of the whole book text based on all of the text data, as described above, and returns the whole passage analysis result data obtained as the analysis result and all of the text data to the acquisition unit 29.

When the acquisition unit 29 receives the whole passage analysis result data and all of the text data from the natural language processing block 30, the acquisition unit 29 transmits the whole passage analysis result data and all of the text data together with the temporarily maintained book attribute data to the detection unit 35.

When the detection unit 35 receives the whole passage analysis result data and all of the text data together with the book attribute data from the acquisition unit 29, the detection unit 35 detects the keywords from the whole book text, which is based on all of the text data, based on the whole analysis result data, as in the case where the detection unit 35 detects the keywords from the desired part.

Moreover, the detection unit 35 also detects the meanings of the detected keywords based on the whole passage analysis result data. Then, the detection unit 35 extracts the page number of the page, in which the keywords are detected, for each of the detected keywords from all of the text data.

Moreover, the detection unit 35 extracts the keywords (that is, the character codes of the plurality of characters expressing the keywords) and the character position information (of the plurality of characters expressing the keywords) corresponding to the keywords for each of the detected keywords from all of the text data.

The detection unit 35 sets the score of the keywords to 1 for each keyword. Moreover, the detection unit 35 extracts the meaning words expressing the meanings of the keywords from all of the text data for each keyword.

Thus, the detection unit 35 stores the page numbers, the keywords, the character position information, the meaning words, and the scores for each keyword and generates keyword data indicating the keywords. Then, the detection unit 35 transmits both the keyword data and the book attribute data to the registration unit 34.

At this time, when the registration unit 34 receives the keyword data and the book attribute data from the detection unit 35, as described above, the registration unit 34 generates book registration data based on the book attribute data and registers the electronic book in which the keywords are detected in the book registration table DT1.

The registration unit 34 issues the keyword identification information, as in the case where the registration unit 34 registers the desired part described above, and generates the keyword registration data having the same configuration as that of the desired part registration data based on the keyword identification information, the keyword data, and the book attribute data.

Thus, the registration unit 34 transmits the keyword registration data to the storage unit 25 and registers the keywords in the desired part registration table DT2 as in the desired part.

At this time, the registration unit 34 generates the keyword registration data having the above-described configuration based on the keyword identification information and the keyword data again using the keyword identification information. Then, the registration unit 34 transmits the keyword registration data to the storage unit 25 and registers the keywords in the keyword registration table DT3.

Moreover, since the registration unit 34 uses the same keyword identification information in the registration of the keywords in the desired part registration table DT2 and in the registration of the keywords in the keyword registration table DT3, the association unit 60 does not perform the association process.

Thus, the control unit 20 automatically specifies the keywords important to the understanding of the contents of an electronic book, in which the desired part is not selected, from the whole book text of the electronic book. The control unit 20 considers the keywords as the desired part and classifies the keywords together with the desired part selected by the user.

The association comment input as the association information of the desired part is described to show the item that the user is interested in for the desired part. Therefore, although the association comment is not the electronic book, the association comment can be said to be the desired part indicating the interest of the user.

Accordingly, the selection unit 28 also determines whether the association comment input as the association information of the desired part by the user is stored in the storage unit 25 under the control of the control unit 20. As a consequence, when the selection unit 28 determines that the association comment is stored in the storage unit 25, the selection unit 28 selects the association comment to be analyzed.

Then, the selection unit 28 reads the association comment and the tag identification information associated with the association comment from the storage unit 25, adds the tag identification information to the read association comment, and transmits the association comment to the acquisition unit 29.

When the acquisition unit 29 receives the association comment from the selection unit 28, the acquisition unit 29 transmits the association comment to the natural language processing block 30 to give a request for natural language processing.

As a consequence, when the natural language processing block 30 analyzes the association comment, as in the instruction estimated part data or all of the text data described above, and the acquisition unit 29 receives the association comment and the comment analysis result data from the natural language processing block 30, the acquisition unit 29 transmits the association comment and the comment analysis result data to the detection unit 35.

When the detection unit 35 receives the association comment and the comment analysis result data from the acquisition unit 29, as described above, the detection unit 35 detects the keywords from the association comment based on the comment analysis result data and detects the meanings of the detected keywords without overlap. Then, the detection unit 35 transmits both the detected meaning words of the keywords and the tag identification information added to the association comment to the classification unit 77.

Thus, the selection unit 28 also considers the association comment stored in the storage unit 25 as the desired part and the association comment is processed as the desired part and can be classified together with the desired part selected by the user.

Hereinafter, a process of classifying the desired part by the classification unit 77 will be described. Hereinafter, a case will be described in which the keywords and the association comment prepared as the classification target, as described above, are classified together with the desired part selected by the user.

When the classification unit 77 receives the single or plurality of folder name data from the control unit 20, the classification unit 77 generates the first hierarchical folder to which the folder name indicated by the folder name data is added for each folder name data.

Based on the folder names of any one of the first hierarchical folders, the classification unit 77 searches for the meaning words including the words identical to the folder name or the meaning words including the word similar to the folder name in the keyword registration table DT3 of the storage unit 25 in disregard of the overlap in accordance with a fuzzy retrieval method.

As a consequence, when the classification unit 77 searches for the meaning word corresponding to the folder name in the keyword registration table DT3, the classification unit 77 reads the meaning word retrieved from the storage unit 25 and reads the keyword identification information corresponding to the retrieved meaning word.

Based on the keyword identification information read from the storage unit 25, the classification unit 77 searches for the desired part identification information corresponding to the keyword identification information in the keyword association table DT5 of the storage unit 25.

As a consequence, when the classification unit 77 searches for the desired part identification information associated with the keyword identification information in the keyword association table DT5 of the storage unit 25, the classification unit 77 reads the retrieved desired part identification information from the storage unit 25.

That is, the classification unit 77 reads, from the storage unit 25, the retrieved desired part identification information as information indicating the desired part classified to the first hierarchical folder of the folder name used in the retrieval.

The classification unit 77 determines whether there is the keyword identification information (that is, the keyword identification information of the keyword registered in the desired part registration table DT2) with which the desired part identification information may not be searched in the keyword association table DT5 of the storage unit 25.

As a consequence, when the classification unit 77 determines that there is the keyword identification information with which the desired part identification information may not be searched in the keyword association table DT5, the classification unit 77 detects the keyword identification information as information indicating the keyword classified to the first hierarchical folder of the folder name used in the retrieval.

Moreover, based on the folder name, the classification unit 77 searches for the meaning word including the word identical to the folder name or the meaning words including the word similar to the folder name among the meanings, to which the tag identification information is added, in disregard of the overlap in accordance with the fuzzy retrieval method.

As a consequence, when the classification unit 77 searches for the meaning word corresponding to the folder name among the meaning words to which the tag identification information is added, the classification unit detects the tag identification information added to the meaning words without overlap.

The classification unit 77 detects the detected tag identification information as information indicating the association comment classified to the first hierarchical folder of the folder name used in the retrieval.

Here, the classification unit 77 sums up the number of retrieved desired part identification information, the number of detected keyword identification information, and the number of detected tag identification information and calculates the classification number of desired parts, keywords, and association comments to the first hierarchical folder.

The classification unit 77 determines whether the classification number is equal to greater than a predetermined number set in advance. As a consequence, when the summed classification number is less than the predetermined number, the classification unit 77 generates one second hierarchical folder lower by one layer than the first hierarchical folder in association with the first hierarchical folder.

Based on the retrieved desired part identification information, the classification unit 77 retrieves and reads the desired part registration data including the desired part identification information in the desired part registration table DT2 from the storage unit 25.

Moreover, based on the detected keyword identification information, the classification unit 77 retrieves and reads the keyword registration data including the keyword identification information in the desired part registration table DT2 from the storage unit 25.

The classification unit 77 stores all of the retrieved desired part registration data in the second hierarchical folder. Moreover, the classification unit 77 also stores all of the retrieved keyword registration data in the second hierarchical folder.

The classification unit 77 stores the detected tag identification information in the second hierarchical folder and also stores classification number information indicating the obtained classification number.

Thus, the classification unit 77 completes the classification of the desired parts, the keywords, and the association comments to the first hierarchical folder of the folder name used in the retrieval.

On the other hand, when the classification number is equal to or greater than the predetermined number, the classification unit 77 separates the words expressing one meaning from the respective meanings retrieved with the folder name without overlap.

The classification unit 77 generates the second hierarchical folders of the same number as the number of the words (words separated from the meaning words without overlap) in the folder lower than the first hierarchical folder by one layer in association with the first hierarchical folder. Moreover, the classification unit 77 adds the words separated without overlap from the meaning words as folder names to the second hierarchical folder.

For example, as for the folders for classifying the desired parts or the like, the user selects and sets the degree that the lower hierarchical folders are generated from the first hierarchical folder.

For example, when the folders are set to be generated up to the third hierarchical folder lower than the second hierarchical folder by one layer, the classification unit 77 searches for the meaning words based on the folder name of any one of the second hierarchical folders, as in the first hierarchical folder described above.

As a consequence, when the classification unit 77 searches for the meaning word corresponding to the folder name in the keyword registration table DT3, the classification unit 77 reads the meaning word retrieved from the storage unit 25 and reads the keyword identification information corresponding to this meaning word.

The classification unit 77 searches for the desired part identification information in the keyword association table DT5 based on the keyword identification information read from the storage unit 25. As a consequence, when the classification unit 77 searches for the desired part identification information associated with the keyword identification information, the classification unit 77 reads the retrieved desired part identification information from the storage unit 25.

When there is the keyword identification information for which the desired part identification information may not be retrieved, the classification unit 77 detects this keyword identification information as information indicating the keyword classified to the second hierarchical folder.

When the classification unit 77 retrieves the meaning word corresponding to the folder name among the meaning words to which the tag identification information is added, the classification unit 77 detects the tag identification information added to this retrieved meaning word as information indicating the association comment classified to the second hierarchical folder without overlap.

The classification unit 77 detects the desired part, the keyword, and the association comment classified to the second hierarchical folder of the folder name used in the retrieval based on the search result of the meaning word, as described above.

Moreover, the classification unit 77 sums up the number of retrieved desired part identification information, the number of detected keyword identification information, and the number of detected tag identification information and calculates the classification number of desired parts, keywords, and association comments to the second hierarchical folders.

In this case, the classification unit 77 generates one third hierarchical folder lower than the second hierarchical folder by one layer in association with the second hierarchical folder without comparing the summed classification number to a predetermined number.

Based on the detected desired part identification information, the classification unit 77 retrieves and reads the desired part registration data including the desired part identification information in the desired part registration table DT2 from the storage unit 25.

Moreover, based on the detected keyword identification information, the classification unit 77 retrieves and reads the keyword registration data including the keyword identification information in the desired part registration table DT2 from the storage unit 25.

The classification unit 77 stores all of the retrieved desired part registration data in the third hierarchical folder and also stores all of the retrieved keyword registration data in the third hierarchical folder.

The classification unit 77 stores the detected tag identification information in the third hierarchical folder and also stores classification number information indicating the obtained classification number.

Thus, the classification unit 77 completes the classification of the desired parts, the keywords, and the association comments to the second hierarchical folder of the folder name used in the retrieval.

Moreover, the classification unit 77 classifies the desired parts, the keywords, and the association comments to the second hierarchical folders by performing the same process on the remaining second hierarchical folders.

When the classification unit 77 completes the above-described series of processes on one first hierarchical folder, the classification unit 77 performs the above-described processes on the remaining first hierarchical folders to classify the desired parts, the keywords, and the association comments.

Thus, the classification unit 77 classifies the desired parts, the keywords, and the association comments based on the meanings of the corresponding keywords. Therefore, for example, when the classification unit 77 detects only one keyword from the desired part, the classification unit 77 classifies the desired part to any one of the first hierarchical folders.

On the other hand, for example, when the classification unit 77 detects the plurality of keywords from the desired part, the classification unit 77 classifies the desired part to the plurality of first hierarchical folders in an overlap manner based on the meanings of these keywords.

Figure 31:
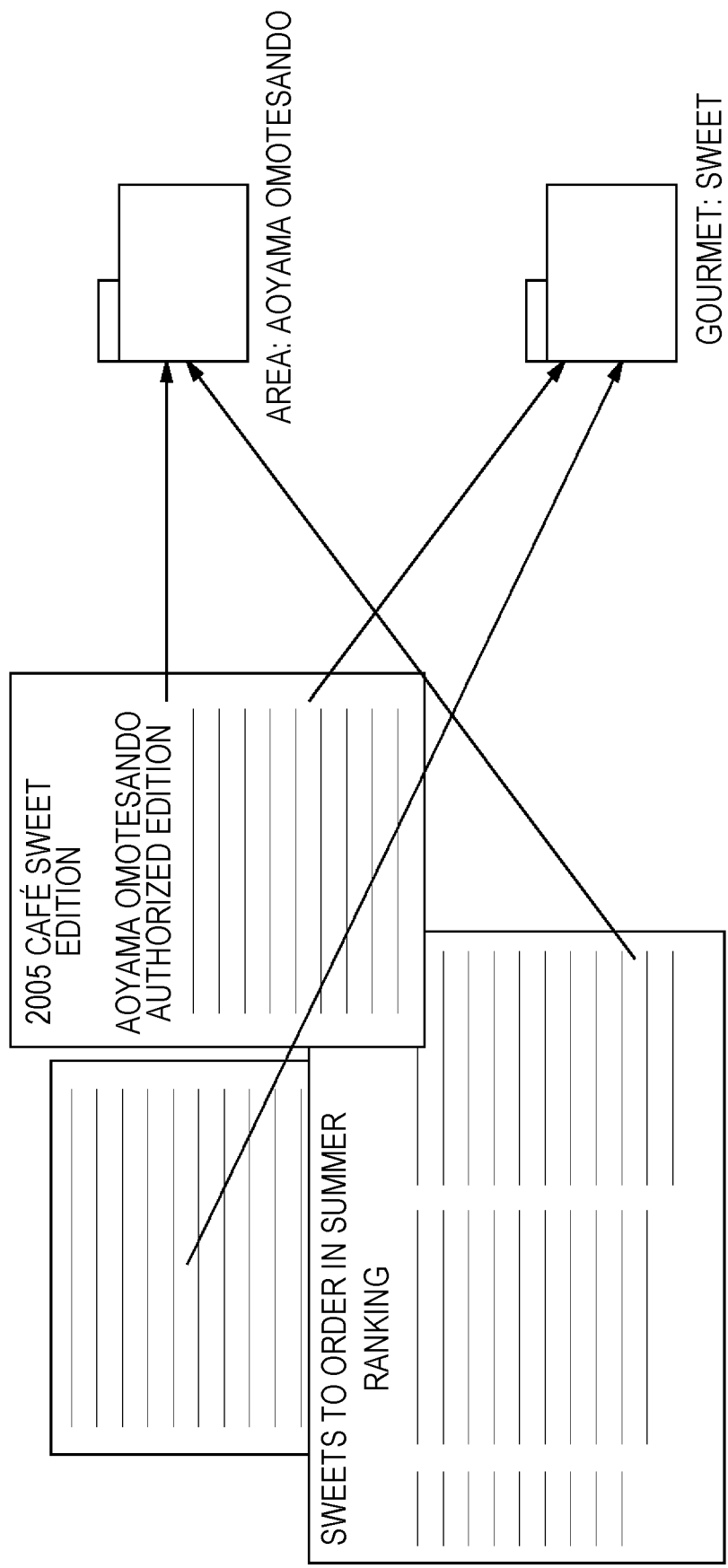
FIG. 31 is a diagram schematically illustrating classification of desired parts.

That is, as shown in FIG. 31, the classification unit 77 can classify the desired part so as to sum up the items associated with the contents irrespective of the kinds of selected electronic book.

The classification unit 77 can classify the keywords detected like the desired parts based on the meanings of the keywords from the electronic book so as to sum up the items identical or similar to the meaning irrespective of the electronic book.

The classification unit 77 can also classify the association comments added to the desired part so as to sum up the items associated with the contents irrespective of the electronic book, as in the desired part.

When the classification unit 77 classifies the desired parts, the keywords, and the association comments in this manner, the classification unit 77 determines whether the third hierarchical folders are associated with the second hierarchical folder automatically generated for the classification of the desired parts, the keywords, and the association comments.

As a consequence, when one third hierarchical folder is associated with the second hierarchical folders, the classification unit 77 stores the classification number information stored in the third hierarchical folder even in the second hierarchical folders.

Moreover, when two or more third hierarchical folders are associated with the second hierarchical folders, the classification unit 77 sums up the classification number indicated by the classification number information stored in the third hierarchical folders and stores the classification number information indicating the summed classification number in the second hierarchical folders.

When the classification number information is completely stored in the second hierarchical folders, the classification unit 77 continues detecting the classification number of the second hierarchical folders associated with the first hierarchical folders.

As a consequence, when one second hierarchical folder is associated with the first hierarchical folders, the classification unit 77 stores the classification number information stored in the second hierarchical folder even in the first hierarchical folders.

Moreover, when two or more second hierarchical folders are associated with the first hierarchical folders, the classification unit 77 sums up the classification number indicated by the classification number information stored in the second hierarchical folders and stores the classification number information indicating the summed classification number in the first hierarchical folders.

Thus, the classification unit 77 can detect the classification number of desired parts, keywords, and association comments respectively classified to the first to third hierarchical folders.

When the classification unit 77 appropriately generates the first to third hierarchical folders and classifies the desired parts, the keywords, and the association comments, the classification unit 77 stores the generated first to third hierarchical folders in the storage unit 25. Thus, the classification unit 77 ends all of the classification of the desired parts, the keywords, and the association comments and notifies the control unit 20 of the fact that the classification ends.

When the control unit 20 is notified of the fact that the classification of the desired parts, the keywords, and the association comments ends from the classification unit 77, for example, the control unit 20 allows the display unit 21 to notify the user of the fact that the classification ends and the fact that the result of the classification is subsequently used in the retrieval of the desired parts, the keywords, and the association comments.

Moreover, the control unit 20 performs the classification process described above, whenever the user gives a request. Thus, the control unit 20 can reclassify the desired parts, the keywords, and the association comments, for example, by newly adding or deleting the first hierarchical folder and automatically adding the second and third hierarchical folders appropriately.

When the user executes a predetermined operation to give a request for displaying the classification result of the desired parts, the keywords, and the association comments, the control unit 20 reads all of the first to third hierarchical folders from the storage unit 25 in response to the request.

In the following description, when it is not necessary to distinguish the desired parts, the keywords, and the association comments from each other, the desired parts, the keywords, and the association comments are simply referred to as classification information.

The control unit 20 generates introduction classification result data by tracing the classification result of the classification information sequentially from the higher hierarchy classification result to the lower hierarchy classification result based on the first to third hierarchical folders.

In effect, the control unit 20 extracts the classification number information from each first hierarchical folder. Moreover, based on the classification number information, the control unit 20 calculates a ratio of the classification number of classification information regarding each first hierarchical folder to the classification number (the total number including the kinds of overlapping classification information) regarding classification information of all the first hierarchical folders.

Based on the calculation result, the control unit 20 generates first hierarchy classification result data indicating a ratio of the classification number of classification information to each first hierarchical folder using, for example, a circular graph as the first hierarchy classification result of the classification information. The control unit 20 transmits the first hierarchy classification result data to the display control unit 26.

Figure 32:
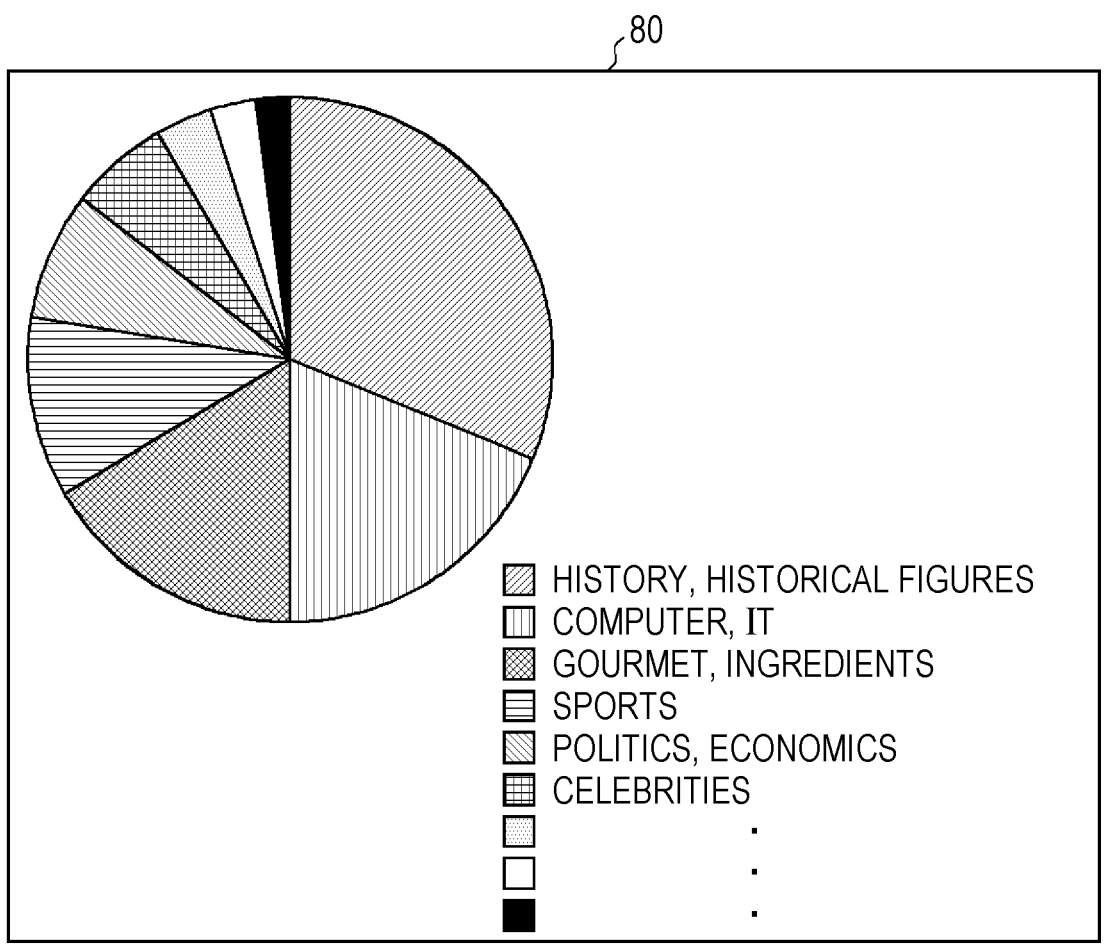
FIG. 32 is a diagram schematically illustrating a display of a first hierarchical classification result image.

At this time, the display control unit 26 transmits the first hierarchy classification result data transmitted from the control unit 20 to the display unit 21. Thus, the display control unit 26 displays a first hierarchy classification result image 80 shown in FIG. 32 on the display unit 21 based on the first hierarchy classification result data.

The first hierarchy classification result image 80 shows the circular graph indicating a ratio of the classification number of classification information regarding each first hierarchical folder to the classification number of classification information regarding all the first hierarchical folders. The first hierarchy classification result image 80 also shows the folder names of the first hierarchical folders by matching the folder names with the individual regions of the circular graph.

Thus, the control unit 20 can introduce the classification result of the classification information regarding the individual first hierarchical folders using the first hierarchy classification result image 80.

In the first hierarchy classification result image 80, the control unit 20 expresses the classification result of each first hierarchical folder, to which the folder names expressing the meaning of the superordinate concept are added, not using the specific classification number but using the ratio to the classification number of the classification information of all the first hierarchical folders.

Therefore, the control unit 20 can show the first hierarchy classification result image 80 so that the user can easily recognize and confirm which items the user is interested in and how much the user is interested in.

In this state, for example, when the user instructs one of the first hierarchical folders as a separation region of the circular graph with the first hierarchy classification result image 80, the control unit 20 detects all of the second hierarchical folders associated with the instructed first hierarchical folder.

As a consequence, when the control unit 20 can associate the plurality of second hierarchical folders with the instructed first hierarchical folder, the control unit 20 extracts the classification number information from each of the second hierarchical folders.

Moreover, based on the classification number information, as in the first hierarchical folders, the control unit 20 calculates a ratio of the classification number of classification information regarding each second hierarchical folder to the classification number (the total number including the kinds of overlapping classification information) of classification information regarding all the second hierarchical folders.

Based on the calculation result, the control unit 20 generates second hierarchy classification result data indicating a ratio of the classification number of classification information to each second hierarchical folder using, for example, the circular graph as the second hierarchy classification result of the classification information. The control unit 20 transmits the second hierarchy classification result data to the display control unit 26.

Thus, the control unit 20 allows the display control unit 26 to show a second hierarchy classification result image (not shown) with the same configuration of that of the first hierarchy classification result image 80 on the display unit 21 and can introduce the classification result of the classification information regarding the individual second hierarchical folders.

Therefore, the control unit 20 can show the second hierarchy classification result image so that the user can further easily recognize and confirm which items the user is interested in and how much the user is interested in.

At this time, the control unit 20 can permit the user to instruct one of the second hierarchical folders as the separation region of the circular graph with the second hierarchy classification result image.

The control unit 20 extracts data regarding the classification number information when the control unit 20 can associate only one of the first hierarchical folders (or the second hierarchical folders) with the second hierarchical folder (or the third hierarchical folder) instructed by the user.

That is, when the layer lower than the first hierarchical folder (or the second hierarchical folder) instructed by the user by one layer is the lowest hierarchical layer, the control unit 20 extracts the desired part registration data or the keyword registration data, or the like from the second hierarchical folder (or the third hierarchical folder) to the lowest hierarchical layer.

Based on the desired part registration data or the keyword registration data, or the like, the control unit 20 generates classification information selection image data used to select the classification information (the desired parts, the keywords, and the association comments) classified to the second hierarchical folders (or the third hierarchical folders) in the lowest hierarchical layer. Then, the control unit 20 transmits the classification information selection image data to the display control unit 26.

At this time, the display control unit 26 transmits the classification information selection image data transmitted from the control unit 20 to the display unit 21 and displays a classification information selection image (not shown) having nearly the same configuration as that of the third hierarchical index image described above with reference to FIG. 30 on the display unit 21.

The classification information selection image shows the book title of the electronic book including the desired parts or the keywords classified to the corresponding second hierarchical folders (or the third hierarchical folders).

The classification information selection image shows the page number indicating the position of the desired parts or the keywords in the whole book text classified to the corresponding second hierarchical folders (or the third hierarchical folders) or the row number, the column number, and the like of the front character.

The classification information selection image shows a character string line such as "Comment 1" or "Comment 2" indicating that the association comments are classified, when the association comments are classified to the corresponding second hierarchical folders (or the third hierarchical folders).

When one of the desired parts is instructed as information regarding the corresponding book title or the like on the classification information selection image, the control unit 20 reads the electronic book data including the instructed desired part from the storage unit 25 based on the desired part registration data corresponding to the instructed desired part.

Then, the control unit 20 transmits both the desired part registration data and the electronic book data to the display control unit 26. Thus, the display control unit 26 displays the electronic book image of the page including the instructed desired part based on the desired part registration data and the electronic book data on the display unit 21 and displays the desired part in the emphasis manner.

When one of the keywords is instructed as information regarding the corresponding book title or the like on the classification information selection image, the control unit 20 reads the electronic book data including the instructed keyword from the storage unit 25 based on the keyword registration data corresponding to the instructed keyword.

Then, the control unit 20 transmits both the keyword registration data and the electronic book data to the display control unit 26. Thus, the display control unit 26 displays the electronic book image of the page including the instructed keyword based on the keyword registration data and the electronic book data on the display unit 21 and displays the keyword in the emphasis manner.

When one of the association comments is instructed as the corresponding character string such as "Comment 1" on the classification information selection image, the control unit 20 generates comment retrieval request data storing the tag identification information corresponding to the instructed association comment and transmits the comment retrieval request data to the retrieval unit 66.

As a consequence, when the retrieval unit 66 retrieves and transmits the instructed association comment, the control unit 20 transmits the association comment to the display control unit 26. Then, the display control unit 26 displays the association comment on the display unit 21.

Thus, the control unit 20 introduces the classification result of the classification information and also retrieves and displays the classification information using the classification result. Accordingly, the control unit 20 can introduce the classification information to the user.

2-2-5. Introduction Sharing Process

Next, an instruction sharing process will be described in which the control unit 20 receives an instruction of another user with a preference similar to that of a user using the information sharing apparatus 14.

For example, the control unit 20 performs user registration to the information sharing apparatus 14 in advance to share various kinds of information regarding an electronic book with the information display terminals 11 and 12 of other users using the information sharing apparatus 14.

For example, when the user gives a request for displaying the electronic book and gives a request for supplying the book association data to the information sharing apparatus 14 whenever selecting the desired part, the control unit 20 asks the retrieval unit 66 to retrieve the book association data whenever the selection of the desired part ends.

That is, when the selection of one desired part instructed in the text of the electronic book image ends, the control unit 20 asks the retrieval unit 66 to retrieve the electronic book used to select the desired part or the book association data regarding the desired part.

Here, the book association data is information including the book registration data, the desired part registration data, the keyword registration data, the tag registration data, and the association comment generated in response to the selection of the desired part.

When the retrieval unit 66 retrieves the book association data of the electronic book and the control unit 20 receives the book association data, the control unit 20 transmits both the book association data of the electronic book and user registration information used in the user registration to the transmission unit 23. Thus, the transmission unit 23 transmits the book association data and the user registration information transmitted from the control unit 20 to the information sharing apparatus 14 via the network 13.

Figure 33:
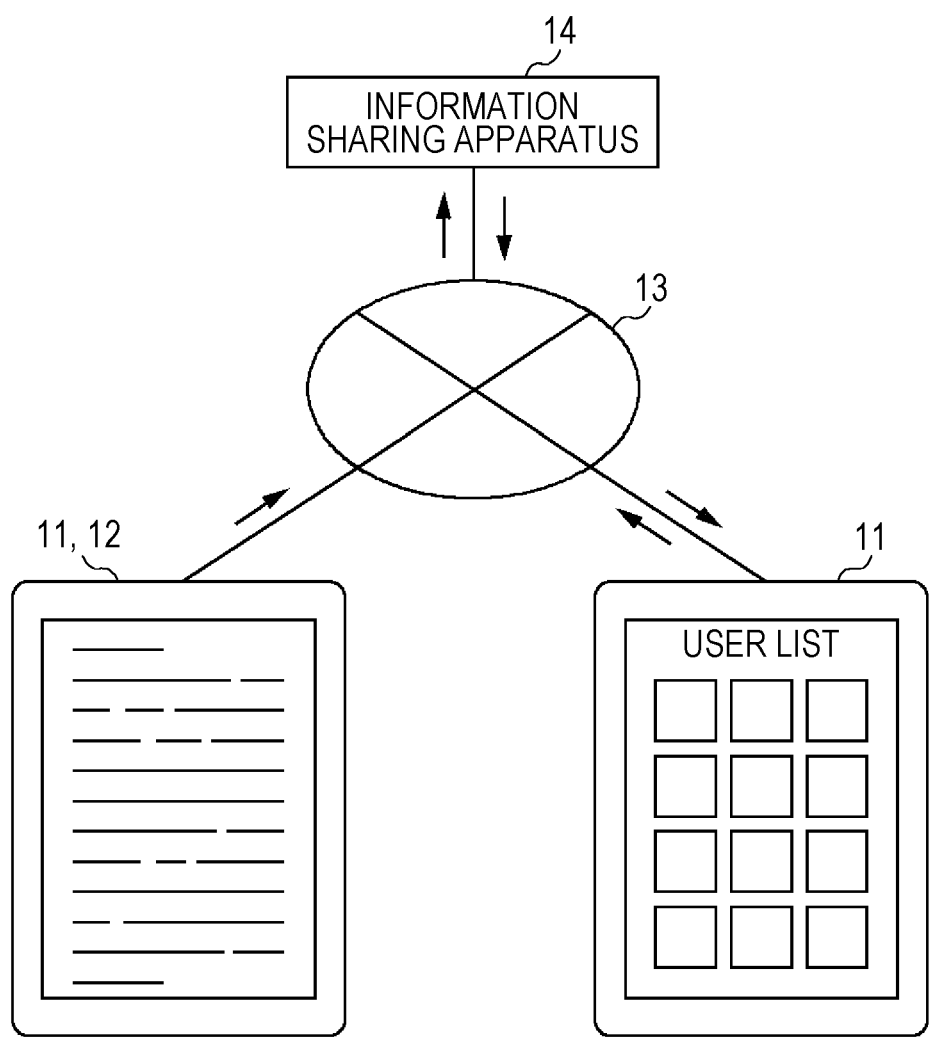
FIG. 33 is a diagram schematically illustrating an introduction of a user by an information sharing apparatus.

Whenever the information sharing apparatus 14 receives the book association data and the user registration information transmitted from the plurality of information display terminals 11 and 12, as shown in FIG. 33, the information sharing apparatus 14 accumulates the book association data and the user registration information in association with the book association data and the user registration information.

When the control unit 20 receives a request for receiving an instruction of another user with a reference similar to that of the user from the information sharing apparatus 14 by a predetermined operation of the user, the control unit 20 stores registration information used in the user registration, generates instruction request data used to give a request for the instruction of another user, and transmits the instruction request data to the transmission unit 23. Thus, the transmission unit 23 transmits the instruction request data transmitted from the control unit 20 to the information sharing apparatus 14 via the network 13.

When the information sharing apparatus 14 receives the instruction request data transmitted from the information display terminal 11, the information sharing apparatus 14 extracts the user registration information from the received instruction request data and specifies the book association data associated with the user registration information.

The information sharing apparatus 14 performs a cooperation filtering process using the specified book association data and the plurality of other book association data accumulated at this time.

Thus, the information sharing apparatus 14 specifies other users that acquire the electronic book and is the same as the user (hereinafter, also referred to as an instruction request user) giving the instruction request.

The information sharing apparatus 14 narrows, from the specified other users, other users that shows an interest in the same items or similar items with the instruction request user (that is, has a similar preference) and acquires the electronic book different from that of the instruction request user.

The information sharing apparatus 14 generates user instruction data indicating the narrowed other users and returns the generated user instruction data to the information display terminal 11 of the instruction request user via the network 13.

At this time, the reception unit 24 of the user display terminal 11 of the instruction request user receives the user instruction data transmitted from the information sharing apparatus 14 and transmits the user instruction data to the control unit 20.

Then, the control unit 20 transmits the user instruction data to the display control unit 26. Thus, the display control unit 26 transmits the user instruction data to the display unit 21 and displays an instruction user list image 81 on the display unit 21 based on the user instruction data.

At this time, in the instruction user list image 81, information (names, nicknames, or the like) regarding plurality of other users to whom the information sharing apparatus 14 introduces the introduction request user is displayed.

Accordingly, the control unit 20 can introduce, to the introduction request user, the plurality of other users introduced from the information sharing apparatus 14 using the instruction user list image 81.

At this time, when the introduction request user selects one of the other users as corresponding information on the instruction user list image 81, the control unit 20 stores the user registration information of the introduction request user and generates other user notification data indicating the selected other user.

Then, the control unit 20 transmits the other user notification data to the transmission unit 23. In addition, the transmission unit 23 transmits the other user notification data to the information sharing apparatus 14 via the network 13.

When the information sharing apparatus 14 receives the other user notification data transmitted from the information display terminal 11, the information sharing apparatus 14 specifies the other users indicated by the other user notification data and the introduction request user.

Based on the book association data between the specified other users and the introduction request user, the information sharing apparatus 14 generates book introduction data used to introduce single or a plurality of electronic books that the introduction request user has not yet acquired among the electronic books that the other users have acquired. Then, the information sharing apparatus 14 transmits the book introduction data to the information display terminal 11 via the network 13.

Accordingly, the reception unit 24 of the information display terminal 11 of the introduction request user receives the book introduction data transmitted from the information sharing apparatus 14 and transmits the book introduction data to the control unit 20.

When the control unit 20 receives the book introduction data from the reception unit 24, the control unit 20 transmits the book introduction data to the display control unit 26. In addition, the display control unit 26 transmits the book introduction data to the display unit 21 and displays a book introduction image (not shown) on the display unit 21 based on the book introduction data.

At this time, the book introduction image includes a book title, a publisher, a book kind, and book identification information of the electronic book for each electronic book introduced from the information sharing apparatus 14.

Accordingly, the control unit 20 can notifies the introduction request user of the single or plurality of electronic books introduced from the information sharing apparatus 14 through the book introduction image.

When the user selects a desired electronic book as information regarding the book title or the like on the book introduction image, the control unit 20 acquires the book attribute data such as the book title, the publisher, the book kind, and the book identification information of the selected electronic book from the book introduction image.

Then, the control unit 20 stores the book attribute data, generates acquisition request data used to give a request for acquiring the selected electronic book, and transmits the acquisition request data to the transmission unit 23. In addition, the transmission unit 23 transmits the acquisition request data to the information sharing apparatus or the electronic book supply apparatus via the network 13.

As a consequence, when the electronic book data of the requested electronic book is transmitted from the information sharing apparatus or the electronic book supply apparatus via the network 13, the transmission unit 24 receives the electronic book data and transmits the electronic book data to the control unit 20.

At this time, when the control unit 20 receives the electronic book data from the reception unit 24, the control unit 20 transmits the electronic book data to store the electronic book data in the storage unit 25. Thus, the control unit 20 can newly acquire the electronic book using the book introduction image.

For example, when the control unit 20 receives a request for displaying the electronic book from the user, the control unit 20 asks the information sharing apparatus 14 to supply the book association data in response to the end of the display of the electronic book.

In this case, in response to the end of the display of the electronic book, the control unit 20 asks the retrieval unit 66 to sum up and retrieve the book association data of each desired part selected during the display of the electronic book.

Then, the control unit 20 allows the transmission unit 23 to transmit the book association data regarding all of the desired parts selected during the display of the electronic book to the information sharing apparatus 14. Thus, the control unit 20 can sum up the book association data regarding the desired parts, transmits the book association data to the information sharing apparatus 14 to some degree to accumulate the book association data.

2-2-6. Information Sharing Process

Next, an information sharing apparatus process will be described in which the control unit 20 shares various kinds of information regarding the information display terminals 11 and 12 and the electronic books of other users using the information sharing apparatus 14.

When the control unit 20 receives a request for acquiring information regarding the desired parts selected by other users in the electronic book in which the desired part is selected by the user, the control unit 20 stores both the book identification information of the electronic book and the user registration information and generates desired part information request data used to give a request for information regarding the desired part. In the following description, the information regarding the desired part is also referred to as desired part information.

Then, the control unit 20 transmits the desired part information request data to the transmission unit 23. Thus, the transmission unit 23 transmits the desired part information request data to the information sharing apparatus 14 via the network 13.

At this time, when the information sharing apparatus 14 receives the desired part information request data, the information sharing apparatus 14 extracts the book identification information and the user registration information stored in the desired part information request data.

Moreover, the information sharing apparatus 14 specifies the book association data of the other users based on the book identification information and the user registration information and also specifies single or a plurality of book association data of the electronic books identified with the book identification information among the specified book association data.

The information sharing apparatus 14 finally returns the single or plurality of specified book association data to the information display terminal 11 via the network 13.

At this time, the reception unit 24 of the information display terminal 11 receives the single or plurality of book association data transmitted from the information sharing apparatus 14 and transmits the single or plurality of book association data to the control unit 20. When the control unit 20 receives the single or plurality of book association data from the reception unit 24, the control unit 20 extracts the desired part registration data and the book identification information from one of the book association data.

Then, the control unit 20 extracts, from the desired part registration data, the page number and the desired part position information indicating the position of a single or one of plurality of desired parts in the whole book text. Moreover, the control unit 20 generates emphasis display control data used to control emphasis and display of the desired part based on the desired part position information.

Then, the control unit 20 reads the corresponding electronic book data from the storage unit 25 based on the book identification information and transmits the read electronic book data together with the page number and the emphasis display control data to the display control unit 26.

When the display control unit 26 receives the electronic book data together with the page number and the emphasis display control data from the control unit 20, the display control unit generates electronic book image data of the page indicated by the page number based on the electronic book image data. Then, the display control unit 26 processes the electronic book image data based on the emphasis display control data and transmits the processed electronic book image data to the display unit 21.

Thus, the display control unit 26 displays the electronic book image which is based on the electronic book image data on the display unit 21 and displays the desired parts selected by the other users in the text of the electronic book image in the emphasis manner.

Thus, the control unit 20 can introduce the desired parts selected by the other users to the user using the electronic book image. At this time, when the desired part is instructed on the electronic book image, the control unit 20 displays the tags on the electronic book image, as described above.

Moreover, when the tags are instructed on the electronic book image, the control unit 20 also displays the association comments (that is, the association comments input by the other users) and the like added to the tags.

Furthermore, the control unit 20 can likewise display the different desired parts selected by the other users in the emphasis manner in response to change (change in the page) in the display of the electronic book image and can display the tags or the association comments.

Thus, the control unit 20 can show the user how the other users select the desired parts in the electronic book which the user has selected.

In particular, the information sharing apparatus 14 can accumulate the book association data regarding the same electronic book translated in each country and the control unit 20 can inform the user of the viewpoints of foreign readers when the control unit 20 can identify the accumulated book association data as the book association data of the same book.

Moreover, the control unit 20 can communicate with the other information display terminals 11 and 12. Therefore, the control unit 20 can perform a process of reflecting the selected desired parts without the information sharing apparatus 14 by directly communicating with the other information display terminals 11 and 12.

The control unit 20 can reflect the selection of the desired part in the electronic book image by communicating the own information display terminal 12 mutually acquiring the same electronic book with single or a plurality of information display terminals 11 and 12.

In this case, in response to a predetermined operation of the user, the control unit 20 sets the addresses of the single or plurality of different information display terminals 11 and 12 which are communication opponents.

The control unit 20 reads, from the storage unit 25, the electronic book data of the same electronic book as the electronic book displaying the information display terminals 11 and 12 which are the communication opponents and transmits the electronic book data to the display control unit 26.

Thus, the display control unit 26 generates the electronic book image data based on the electronic book data and transmits the generated electronic book image data to the display unit 21 to display the electronic book image on the display unit 21.

In this state, when the desired part is instructed on the electronic book image, the control unit 20 performs the series of processes, such as the process of specifying and registering the desired part from the detection of the instruction estimated part, the process of detecting the keywords, the process of generating the tags, and the process of registering and associating the keywords and the tags, in cooperation with each circuit unit, as described above.

When the series of processes is completed, the control unit 20 allows the retrieval unit 66 to retrieve and acquire the book association data regarding the selected desired parts. Then, the control unit 20 transmits the book association data to the transmission unit 23.

At this time, the transmission unit 23 adds the previously set addresses of the other information display terminals 11 and 12 to the book association data transmitted from the control unit 20. Then, the transmission unit 23 transmits the book association data, to which the addresses are added, and the user registration information to the information sharing apparatus 14 via the network 13.

At this time, the information sharing apparatus 14 receives the book association data and the user registration information transmitted from the information display terminal 11 and transmits the book association data to the other information display terminals 11 and 12 based on the addresses added to the book association data.

The control unit 20 can notify the other information display terminals 11 and 12 of the desired part selected by the user and the other keywords, tags, or the like regarding the desired part using the book association data.

On the other hand, when the book association data is transmitted from the other information display terminals 11 and 12 via the information sharing apparatus 14 in response to the user selection of the desired part, the reception unit 24 receives the book association data and transmits the book association data to the control unit 20.

When the control unit 20 receives the book association data from the reception unit 24, based on the book association data, the control unit 20 determines whether the page of the electronic book image being currently displayed on the display unit 21 is identical to the page of the electronic book image in which the desired part is selected by another user.

As a consequence, when the control unit 20 determines that the page of the electronic book image being currently displayed on the display unit 21 is identical to the page of the electronic book image in which the desired part is selected by another user, the control unit 20 generates the emphasis display control data used to display the desired part in the emphasis manner based on the book association data. Then, the control unit 20 transmits the emphasis display control data to the display control unit 26.

Thus, based on the emphasis display control data, the display control unit 26 displays the desired part selected by another user in the emphasis manner in the electronic book image being currently displayed on the display unit 21.

At this time, when the desired part selected by another user is instructed on the electronic book image, the control unit 20 displays the tag on the electronic book image, as described above.

Moreover, when the tag is instructed on the electronic book image, the control unit 20 displays the association comment (that is, the association comment input by another user) and the like added to the tag.

On the other hand, even when the page of the electronic book image being currently displayed on the display unit 21 is different from the page of the electronic book image in which the desired part is selected by another user, the control unit 20 performs the determination process performed when the electronic book image being displayed is newly switched.

Thus, the control unit 20 displays the desired part in the emphasis manner when the same electronic book image as the electronic book image in which the desired part is selected by another user is displayed on the display unit 21.

Figure 34:
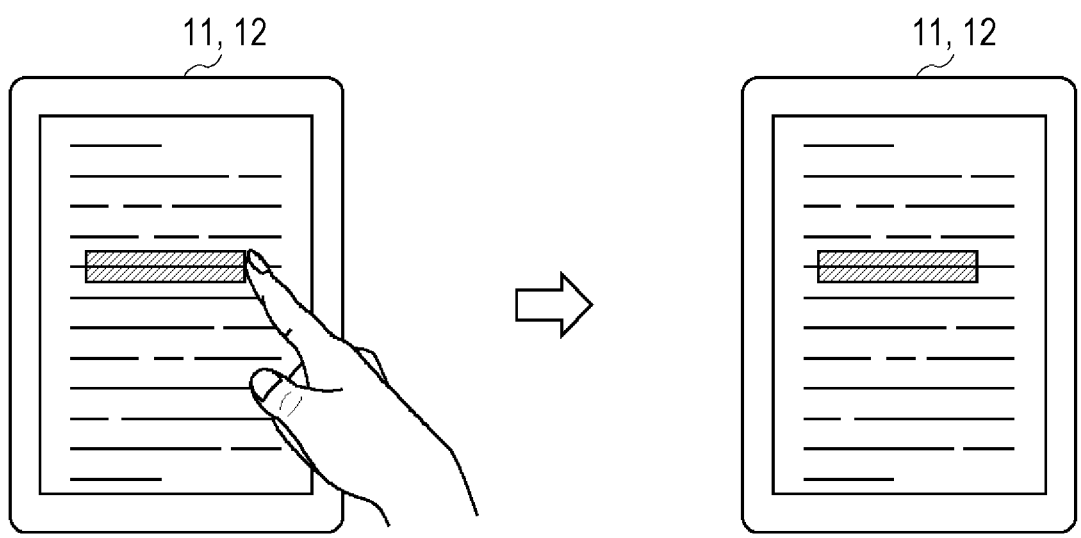
FIG. 34 is a diagram schematically illustrating selection reflection of a desired part between the information display terminals.

As shown in FIG. 34, the control unit 20 can reflect the selection of the desired part in the electronic book image of the same electronic book in nearly real time for the own information display terminal 12 and the single or plurality of other information display terminals 11 and 12.

For example, when the function of reflecting the desired part is utilized in displaying an electronic book for a learning textbook, the control unit 20 can show the users mutual learning methods, a difference in the viewpoints of the attention, or the like, thereby sufficiently exerting this function.

When the control unit 20 acquires the book association data from the information sharing apparatus 14 or the other information display terminals 11 and 12, the control unit 20 stores the book association data in the storage unit 25.

Accordingly, when the book association data is stored in the storage unit 25 and another user subsequently selects the desired part in the text of the electronic book image being displayed, the control unit 20 can display the desired part in the emphasis manner based on the book association data.

When the control unit 20 displays the desired parts in the emphasis manner in a case where there are the desired parts respectively selected by other users different from the user in the text of one electronic book image, there is the concern that it is difficult to determine who selects the desired parts.

Accordingly, when the user executes a predetermined operation to give a request for displaying an emphasis display menu image in the state where the electronic book image is displayed, the control unit 20 reads emphasis display menu image data stored in advance in the storage unit 25 and transmits the emphasis display menu image data to the display control unit 26.

Then, the display control unit 26 synthesizes the emphasis display menu image data transmitted from the control unit 20 with the generated electronic book image data and transmits the synthesized data to the display unit 21. As shown in FIG. 35, the display control unit 26 displays an emphasis display menu image 82 on a part of the electronic book image 81 in an overlapping manner on the display unit 21.

In this case, in the emphasis display menu image 82, various buttons are disposed to give instructions of classifying the desired parts based on the attributes of the desired parts and switching the display states of the emphasis displays of the desired parts in accordance with the classification.

That is, in the emphasis display menu image 82, an automatic generation tag use change button 83 is disposed to classify the desired parts added with the tags in accordance with the tags automatically generated and change the display state of the emphasis display for each tag.

In the emphasis display menu image 82, a user selection tag use change button 84 is also disposed to classify the desired parts added with the tags in accordance with the tags selected by the user and change the display state of the emphasis display for each tag.

In the emphasis display menu image 82, a person use change button 85 is also disposed to classify the desired parts in accordance with a person selecting the desired part and change the display state of the emphasis display for each person.

In the emphasis display menu image 82, an importance degree use change button 86 is also disposed to classify the desired parts in accordance with an importance degree and change the display state of the emphasis display in accordance with the importance degree.

Accordingly, when the user executes a tap operation to instruct the person use change button 85 of the emphasis display menu image 82, the control unit 20 classifies the desired parts across the whole book text of the electronic book to be displayed in accordance with the person selecting the desired part. The control unit 20 performs setting of changing the display state of the emphasis display of the desired part for each person.

Thus, the control unit 20 can easily distinguish the desired parts, even when the desired part selected by the user and the desired part selected by another user coexist in the electronic book image 81 being displayed.

When the user executes a tap operation to instruct the automatic generation tag use change button 83 of the emphasis display menu image 82, the control unit 20 classifies the desired parts across the whole book text of the electronic book to be displayed in accordance with the meaning of the automatically generated tag. The control unit 20 performs setting of changing the display state of the emphasis display of the desired part for the meaning indicated by the tag.

Thus, the control unit 20 can easily distinguish the desired parts, when the desired parts attached with different tags coexist in the electronic book image 81 being displayed.

When the user executes a tap operation to instruct the user selection tag use change button 84 of the emphasis display menu image 82, the control unit 20 classifies the desired parts across the whole book text of the electronic book to be displayed in accordance with the kinds (learning, a small terminal, and the like) of tags selected by the user. The control unit 20 performs setting of changing the display state of the emphasis display of the desired part for the kinds of tags.

In this case, as for the desired part added with no tag selected by the user, the control unit 20 displays this desired part in the emphasis manner in a display state different from the emphasis display of the desired part added with the tag selected by the user.

Thus, the control unit 20 can easily distinguish the desired parts, even when the desired parts added with the different kinds of tags arbitrarily selected by the user coexist in the electronic book image 81 being displayed.

When the user executes a tap operation to instruct the importance degree use change button 86 of the emphasis display menu image 82, the control unit 20 detects the appearance degree of the keyword identical to the keyword included in the desired part in the whole book text.

At this time, the control unit 20 also detects the number of association books detected with the keyword included in the desired part. Moreover, the control unit 20 also detects the number of keywords included in the desired part.

Based on the detection result of each desired part, the control unit 20 calculates the importance degrees (that is, which is a value serving as an index representing how important the desired part is when the user reads and comprehends the electronic book) of the respective desired parts.

The control unit 20 classifies the desired parts in accordance with the importance degrees and performs setting of changing the display state of the emphasis display of the desired parts for each importance degree.

Thus, when the plurality of desired parts coexist in the electronic book image 81 being displayed, the control unit 20 can easily determine how important the desired part is when the user reads and comprehends the electronic book.

When the user instructs the importance degree use change button 86, the control unit 20 reads relation notification image data, which indicates a relation between the importance degree and the display state of the emphasis display and is stored in advance in the storage unit 25, and transmits the relation notification image data to the display control unit 26.

When the display control unit 26 receives the relation notification image data from the control unit 20, the display control unit 26 synthesizes the electronic book image data, the emphasis display menu image data, and the relation notification image data and transmits the synthesized data to the display unit 21.

Figure 36:
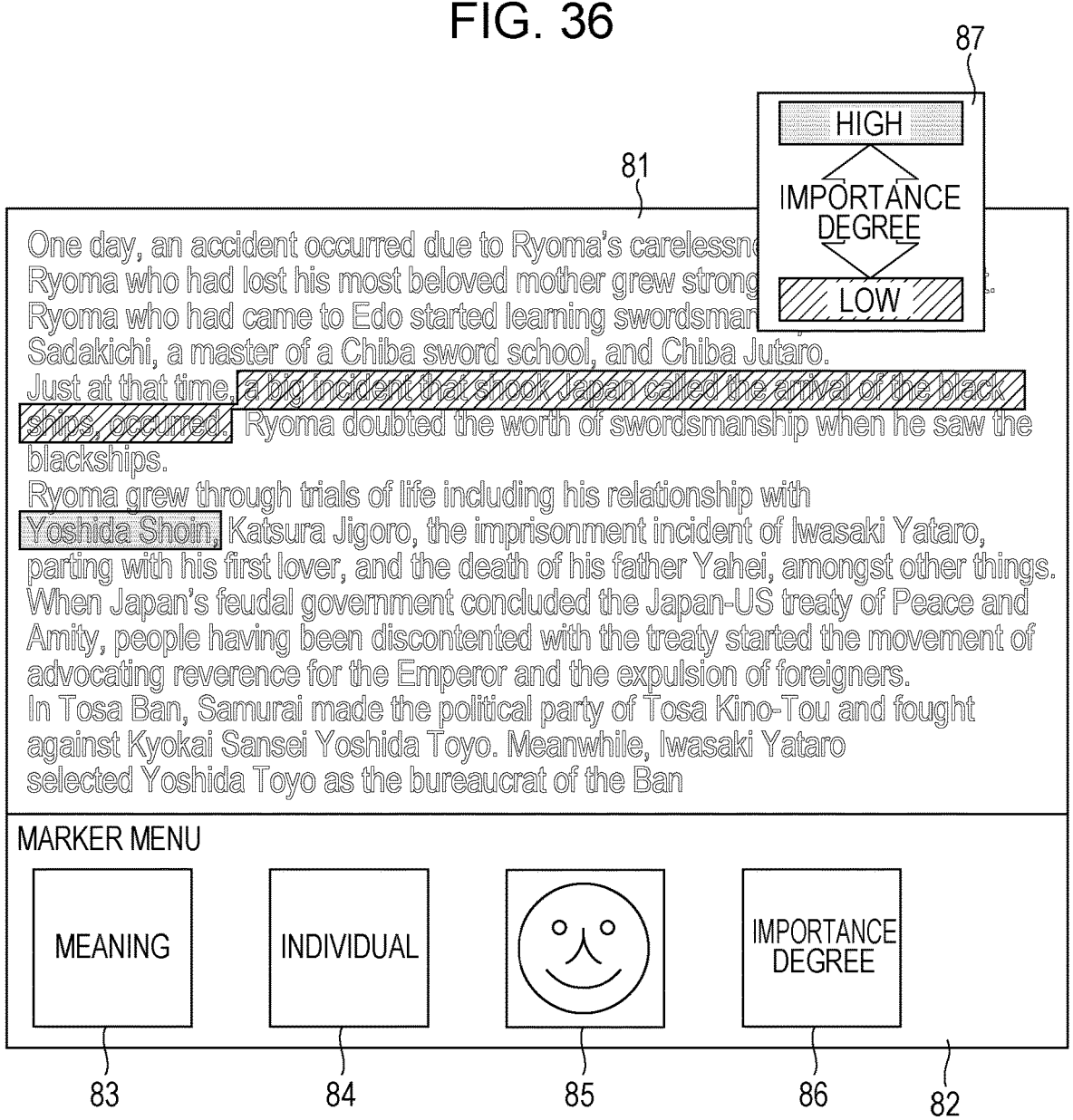
FIG. 36 is a diagram schematically illustrating a display of a relationship notification image.

As shown in FIG. 36, the display control unit 26 overlaps the emphasis display menu image 82 on a part of the electronic book image 81 on the display unit 21 and displays a relation notification image 87 in another part of the electronic book image 81 in an overlapping manner.

Accordingly, the control unit 20 can permit the user to exactly recognize which desired part is more important and which desired part is less important by the relation notification image.

For example, when the user gives a request for generating a test problem based on the desired part in the state where the display state of the emphasis display is changed in accordance with the importance degree of the desired part, the control unit 20 allows the retrieval unit 66 to detect the score of the keyword included in the desired part for each desired part.

The control unit 20 specifies the keyword to which the score equal to or greater than a predetermined number selected in advance is assigned for each desired part. In the following description, the specified keyword is also referred to as a specific keyword.

The control unit 20 generates concealing data used to conceal the specific keyword in the individual desired part using a specific character string which indicates a test problem for replying the specific keyword.

The control unit 20 compares the importance degree of the desired part with the predetermined value selected in advance. As a consequence, when the control unit 20 detects the desired part with the importance degree equal to or greater than the predetermined value (the importance degree is high), the control unit 20 selects one or more words similar to at least a part of the specific keyword of the detected desired part based on, for example, word dictionary data stored in advance in the storage unit 25.

The control unit 20 generates a character string for which at least a part of the specific keyword is substituted by a selected word. Moreover, the control unit 20 generates option introduction image data indicating the specific keyword and single or a plurality of character strings for which at least a part of the specific keyword is substituted by another word.

Thus, when the control unit 20 generates the concealing data or the option introduction image data for the test problem, the control unit 20 transmits the concealing data or the option introduction image data together with positional information indicating the disposition position in the text and the display position on the electronic book image to the display control unit 26.

When the display control unit 26 receives the concealing data or the option introduction image data together with the positional information from the control unit 20, the display control unit 26 processes the electronic book image based on the concealing data or the option introduction image data and the positional information and transmits the processed data to the display unit 21.

Figure 37:
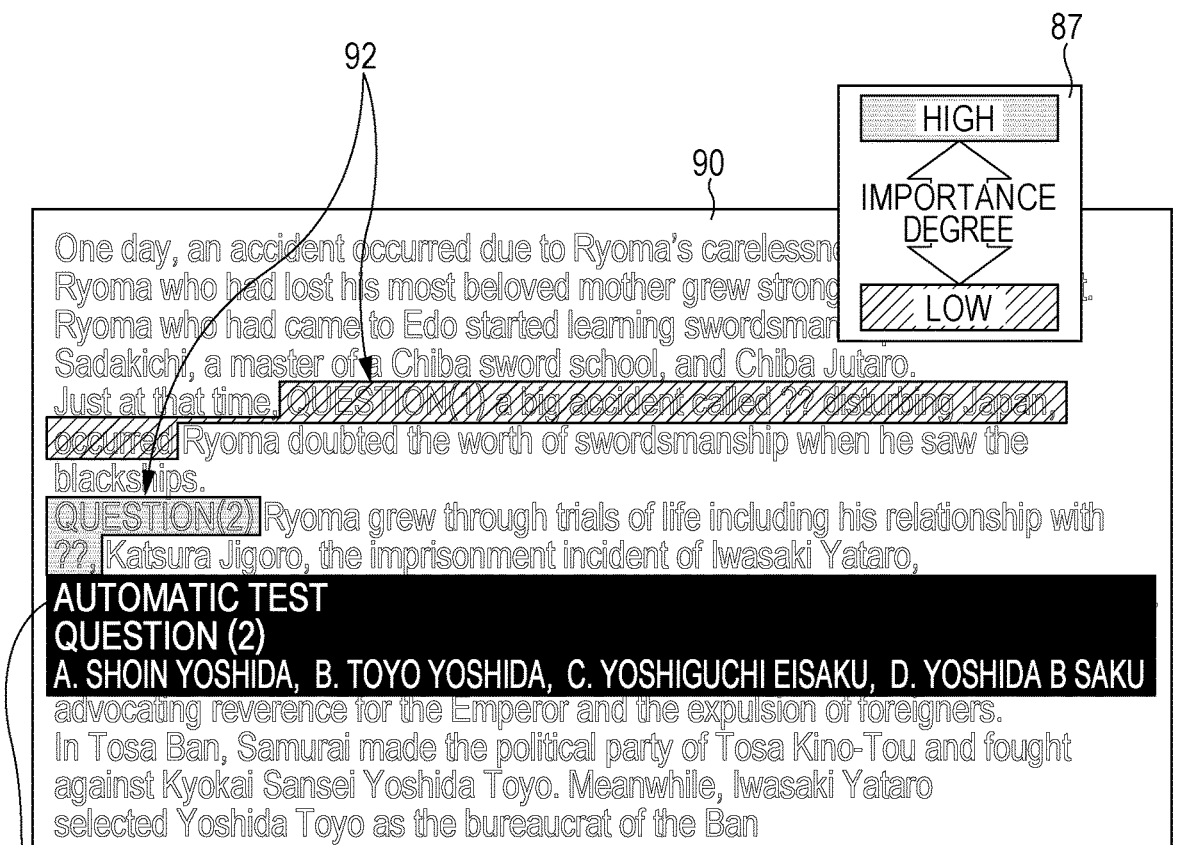
FIG. 37 is a diagram schematically illustrating a display of a test problem generated in accordance with an importance of the desired part.

Thus, the display control unit 26 displays an electronic book image 90 processed for a test problem shown in FIG. 37 on the display unit 21 and also displays an option instruction image 91 at a predetermined position on the electronic book image 90.

Here, for example, the electronic book image 90 processed for the test problem is concealed by a character string 92 indicating the test problem that expresses that the specific keyword is "Question 1?" so as to reply the specific keyword in the desired part.

On the electronic book image 90 processed for the test problem, an option introduction image 91 used to select and rely the specific keyword of the desired part among the plurality of options is displayed in an overlapping manner in the vicinity of the desired part with the high importance degree.

Thus, the control unit 20 can automatically generate and show the test problem to the user using the electronic book image so that the user can solve the test problem. In particular, when the control unit 20 performs a test problem automatic generation function of automatically generating and showing such a test problem, for example, in a case where the electronic book for a learning textbook is displayed, the test problem automatic generation function can be sufficiently utilized.

For example, when user permits display of an advertisement in a case where the control unit 20 displays the electronic book image including the desired part in the text, the control unit 20 allows the retrieval unit 66 to retrieve and read the keyword included in the desired part from the storage unit 25.

Then, the control unit 20 stores the keyword, generates advertisement request data used to give a request for the advertisement, and transmits the advertisement request data to the transmission unit 23. At this time, the transmission unit 23 transmits the advertisement request data transmitted from the control unit 20 to an advertisement supply apparatus (not shown) via the network 13.

Here, the advertisement supply apparatus stores plural kinds of advertisement image data in association with the keyword indicating the contents of the advertisement. Accordingly, when the advertisement supply apparatus receives the advertisement request data transmitted from the information display terminal 11, the advertisement supply apparatus selects the advertisement image data corresponding to the keyword among the plurality of advertisement image data based on the keyword stored in the advertisement image data. Then, the advertisement supply apparatus transmits the selected advertisement image data to the information display terminal 11 via the network 13.

At this time, the reception unit 24 of the information display terminal 11 receives the advertisement image data transmitted from the advertisement supply advertisement and transmits the advertisement image data to the control unit 20. Then, when the control unit 20 receives the advertisement image data from the reception unit 24, the control unit 20 transmits the advertisement image data to the display control unit 26.

Thus, the display control unit 26 synthesizes the advertisement image data transmitted from the control unit 20 and the electronic book image data, and transmits the synthesized data to the display unit 21, and thus displays an advertisement image based on the advertisement image data on a part of the electronic book image in an overlapping manner on the display unit 21.

In this way, the control unit 20 can show an advertisement associated with the desired part on the electronic book image to the user using the advertisement image in cooperation with the advertisement supply apparatus.

Figure 38:
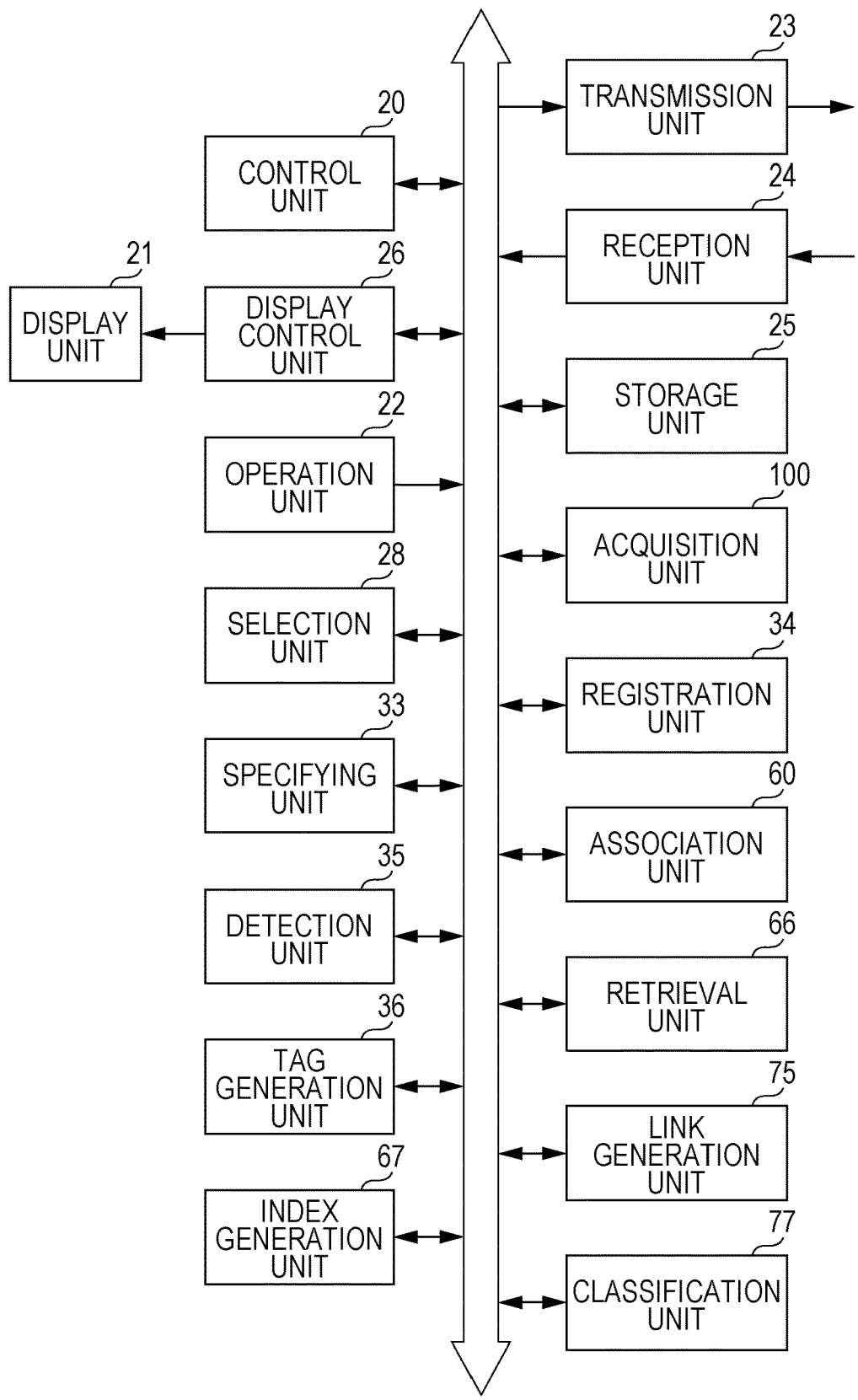
FIG. 38 is a block diagram illustrating the circuit configuration (2) of a function circuit block of the information display terminal.

2-3. Hardware Configuration of Function Circuit Block of Other Information Display Terminal Next, the hardware configuration of a function circuit block of the other information display terminal 12 between two kinds of information display terminals 11 and 12 will be described with reference FIG. 38. The reference numerals are given to the constituent elements corresponding to the elements in FIG. 3.

The information display terminal 12 has no natural language processing block and has the same configuration as that of the information display terminal 11 described above except for the configuration of an acquisition unit 100.

In this case, when the acquisition unit 100 receives the instruction estimated part data to be analyzed and the book attribute data from the selection unit 28, the acquisition unit 100 temporarily maintains the instruction estimated part data and the book attribute data. Then, the acquisition unit 100 stores the instruction estimated part data to be analyzed, generates analysis request data used to ask the information sharing apparatus 14 to analyze the instruction estimated part data, and transmits the analysis request data to the transmission unit 23.

Then, the transmission unit 23 transmits the analysis request data transmitted from the acquisition unit 100 to the information sharing apparatus 14 via the network 13. At this time, when the information sharing apparatus 14 receives the analysis request data transmitted from the information display terminal 112, the information sharing apparatus 14 analyzes the instruction estimated part data stored in the analysis request data, as in the natural language processing block 30 described above.

The information sharing apparatus 14 transmits estimated part analysis result data indicating the analysis result of the instruction estimated part data to the information display terminal 12 via the network 13. Accordingly, the reception unit 24 receives the estimated part analysis result data transmitted from the information sharing apparatus 14 and transmits the received estimated part analysis result data to the acquisition unit 100.

When the acquisition unit 100 receives the estimated part analysis result data from the reception unit 24, the acquisition unit 100 transmits the estimated part analysis result data together with the temporarily maintained instruction estimated part data and the book attribute data to the specifying unit 33.

In this way, the acquisition unit 100 basically performs the same process as that of the acquisition unit 29 of the information display terminal 11 described above, except for the fact that acquisition unit 100 asks the information sharing apparatus 14 to analyze the instruction estimated part data and the entire text data to be analyzed.

2-4. Hardware Configuration of Function Circuit Block of Information Sharing Apparatus Next, the hardware configuration of the function circuit block of an information sharing apparatus 14 will be described with reference to FIG. 39.

Figure 39:
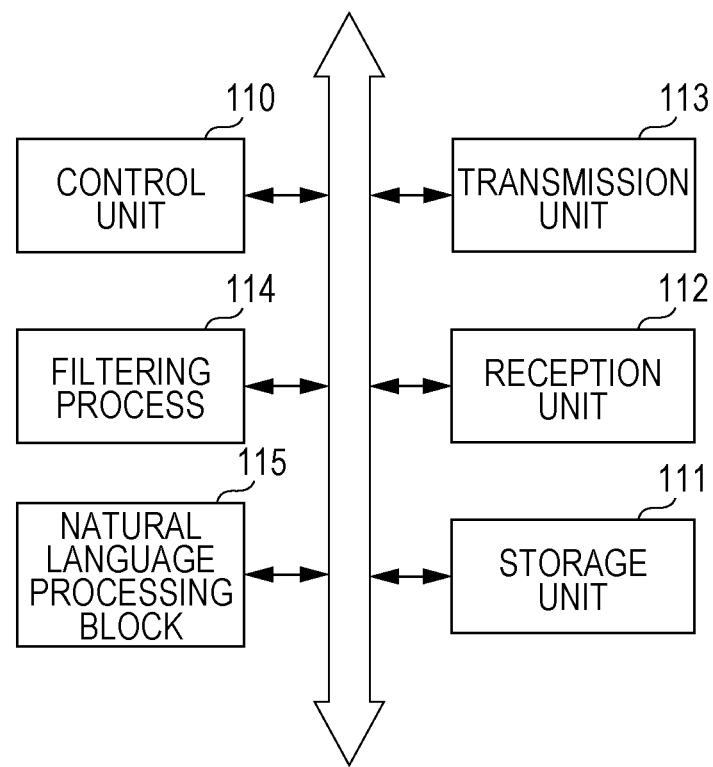
FIG. 39 is a block diagram illustrating the circuit configuration of the function circuit block of the information sharing apparatus.

As shown in FIG. 39, the other information shoring apparatus 14 includes a control unit 110 that controls the information sharing apparatus 14 as a whole. The information sharing apparatus 14 includes a storage unit 111. For example, the storage unit 111 stores the electronic book data of a plurality of electronic books.

The control unit 110 performs the user registration to register users by transmitting user registration information, such as the names or nicknames of the users giving a request for the user registration and the addresses of the information display terminals 11 and 12 used by the users, to the storage unit 111 and by storing the user registration information. Thus, the control unit 110 permits the registered users to use the information sharing apparatus 14.

In this state, when the acquisition request data are transmitted from the information display terminal 11 and the 12 via the network 13, the reception unit 112 receives the acquisition request data and transmits the acquisition request data to the control unit 110.

When the control unit 110 receives the acquisition request data from the reception unit 112, the control unit 110 reads the electronic book data of the electronic book asked by the user from the storage unit 111 and transmits the read electronic book data to a transmission unit 113.

The transmission unit 113 transmits the electronic book data transmitted from the control unit 110 to the information display terminals 11 and 12 asking the acquisition of the electronic book via the network 13. Thus, the control unit 110 can supply the electronic book data to the information display terminals 11 and 12.

When the book association data and the user registration information are transmitted from the information display terminals 11 and 12 via the network 13, the reception unit 112 receives the book association data and the user registration information and transmits the book association data and the user registration information to the control unit 110.

At this time, the control unit 110 stores the book association data and the user registration information in association with the book association data and the user registration information in the storage unit 111 by transmitting the book association data and the user registration information from the reception unit 112 to the storage unit 111.

Thus, the control unit 110 accumulates, as the book association data, information regarding the desired part selected in the text of the electronic book by each of the plurality of users or various kinds of information regarding the electronic book in a manageable state for each user.

When the instruction request data are transmitted from the information display terminals 11 and 12 via the network 13, the reception unit 112 receives the instruction request data and transmits the instruction request data to a filtering processing unit 114 via the control unit 110.

When the filtering processing unit 114 receives the instruction request data from the reception unit 112, the filtering processing unit 114 extracts the user registration information from the instruction request data. Moreover, the filtering processing unit 114 reads the book association data (of the introduction request user) associated with the user registration information from the storage unit 111.

The filtering processing unit 114 also reads the book association data of the user different from the introduction request user indicated by the user registration information from the storage unit 111. Moreover, the filtering processing unit 114 performs a cooperation filtering process using the book association data of the introduction request user and the electronic book data of another user.

Thus, the filtering processing unit 114 specifies another user having acquired the same electronic book as that of the introduction request user. Moreover, since the preference of the introduction request user is similar from the specified user, the filtering processing unit 114 narrows the other users having acquired the electronic books different from that of the introduction request user.

The filtering processing unit 114 generates the user introduction data indicating the narrowed other users and transmits the generated user introduction data to the transmission unit 113. Accordingly, the transmission unit 113 transmits the user introduction data to the information display terminals 11 and 12 via the network 13. Thus, the filtering processing unit 114 can introduce the users having the similar preference to the introduction request user.

When the other user notification data are transmitted from the information display terminals 11 and 12 via the network 13, the reception unit 112 receives the other user notification data and transmits the other user notification data to the filtering processing unit 114 via the control unit 110.

When the filtering processing unit 114 receives the other user notification data from the reception unit 112, the filtering processing unit 114 specifies the other users indicated by the other user notification data and the introduction request user. Moreover, the filtering processing unit 114 reads the book association data between the specified other users and the specified introduction request user from the storage unit 111.

Based on the book association data between the specified other users and the specified introduction request user, the filtering processing unit 114 generates the book introduction data used to introduce single or a plurality of electronic books which the introduction request user has not acquired among the electronic books which the other users have acquired.

Then, the filtering processing unit 114 transmits the book introduction data to the transmission unit 113. Thus, the transmission unit 113 transmits the book introduction data to the information display terminals 11 and 12 of the introduction request users via the network 13.

Thus, the filtering processing unit 114 can introduce, to the introduction request user, the electronic books which the introduction request user has not acquired and the other users having the similar preference have acquired.

When the desired part information request data are transmitted from the information display terminals 11 and 12 via the network 13, the reception unit 112 receives the desired part information request data and transmits the desired part information request data to the control unit 110.

When the control unit 110 receives the desired part information request data from the reception unit 112, the control unit 110 extracts the book identification information and the user registration information stored in the desired part information request data.

Based on the book identification information and the user registration information, the control unit 110 retrieves and reads single or a plurality of book association data identified with the book identification information among the book association data of the other users from the storage unit 111. Then, the control unit 110 transmits the single or plurality of book association data to the transmission unit 113.

The transmission unit 113 transmits the single or plurality of book association data transmitted from the control unit 110 to the information display terminals 11 and 12 via the network 13. Thus, the control unit 110 can inform the user how the other users selects the desired part from the electronic book in which the own user has selected the desired part.

When the reception unit 112 receives the book association data, the control unit 110 stores and accumulates the book association data in the storage unit 111, as described above. However, when the addresses are added to the book association data, the control unit 110 also transmits the book association data to the transmission unit 113.

The transmission unit 113 transmits the book association data transmitted from the control unit 110 to the information display terminals 11 and 12 indicated by the addresses via the network 13 in accordance with the addresses added to the book association data.

Thus, the control unit 20 can reflect and share the desired part, when the desired part is selected by the respective users between the plurality of information display terminals 11 and 12.

2-5. Emphasis Display Processing Sequence

Next, an emphasis display processing sequence RT1 will be described in which the control unit 20 of the information display terminals 11 and 12 displays the desired part in the emphasis manner in response of the selection of the desired part in the text of the electronic book with reference to FIGS. 40 to 45.

Figure 40:
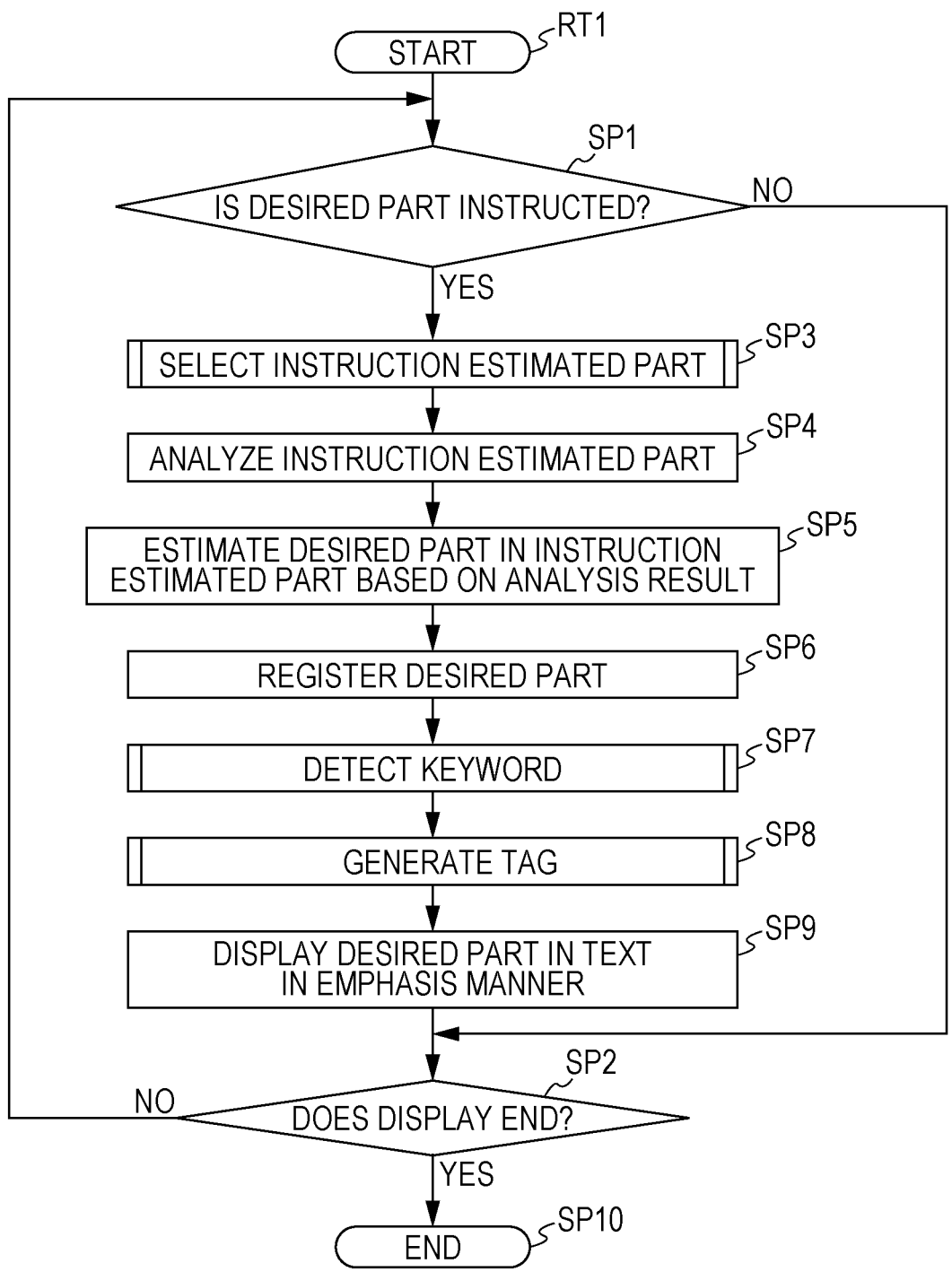
FIG. 40 is a flowchart illustrating an emphasis display processing sequence.

For example, when the control unit 20 displays an electronic book image on the display unit 21 in response of a request for displaying an electronic book, the control unit 20 starts the emphasis display processing sequence RT1 shown in FIG. 40 in cooperation with each circuit unit.

When the control unit 20 starts the emphasis display processing sequence RT1, the control unit 20 determines whether the desired part is instructed in the text of the electronic book image being displayed on the display unit 21.

When a negative result is obtained in step SP1, for example, the negative result indicates that the user is reading the text of the electronic book image. When the control unit 20 obtains the negative result in step SP1, the process proceeds to step SP2.

In step SP2, the control unit 20 determines whether the display of the electronic book ends. When a negative result is obtained in step SP2, for example, the negative result indicates the user continues reading that the text of the electronic book image. When the control unit 20 obtains the negative result in step SP2, the process returns to step SP1.

While the control unit 20 displays the electronic book image, step SP1 and step SP2 are circularly repeated. In addition, the control unit 20 waits until the desired part is instructed in the text of the electronic book image being displayed or a request for ending the display of the electronic book is given.

On the other hand, when a positive result is obtained in step SP1, the positive result indicates that the user reading the text of the electronic book being displayed executes a slide operation to instruct the desired part which the user is interested in.

When the control unit 20 obtains the positive result in step SP1, the control unit 20 generates the region correspondence text data based on the electronic book image and transmits the region correspondence text data together with the determination result of the kind of the slide operation and the touch position information to the selection unit 28.

Accordingly, in step SP3, the selection unit 28 performs an instruction estimated part selection process of selecting the instruction estimated part instructed by the user from the text of the electronic book indicated by the region correspondence text data based on the determination result of the kind of the slide operation and the touch position information.

Thus, the selection unit 28 selects the instruction estimated part from the text, generates the instruction estimated part data indicating the selection result of the instruction estimated part, and transmits the generated instruction estimated part data to the acquisition unit 29.

In step SP4, the acquisition unit 29 acquires the analysis result of the instruction estimated part data for the natural language processing using the natural language processing block 30 or the information sharing apparatus 14 and transmits the analysis result to the specifying unit 33.

In step SP5, the specifying unit 33 specifies the desired part in the instruction estimated part based on the analysis result of the instruction estimated part obtained based on the instruction estimated part data.

The specifying unit 33 generates the desired part data indicating the specified desired part and generates the desired part analysis result data indicating the analysis result of the desired part based on the estimated part analysis result data.

The specifying unit 33 transmits the desired part data to the registration unit 34 and transmits the desired part data and the desired part analysis result data to the detection unit 35.

In step SP6, the registration unit 34 registers the desired part selected by the user in the desired part registration table DT2 of the storage unit 25 based on the desired part data.

In step SP7, the detection unit 35 performs a keyword detection process of detecting the keywords from the desired part, which is based on the desired part data, based on the analysis result of the desired part obtained based on the desired part analysis result data. Then, the detection unit 35 transmits the keyword detection data indicating the detection result of the keywords detected from the desired part to the tag generation unit 36.

In step SP8, the tag generation unit 36 performs a tag generation process of generating the tag of the desired part based on the keyword detection data. Thus, the tag generation unit 36 generates the tag of the desired part.

In step SP9, the control unit 20 displays the desired part selected in the text of the electronic book image being displayed in the emphasis manner in response to the specifying of the desired part performed by the instruction of the desired part, the detecting of the keyword, and the ending of the tag generation. Then, the process proceeds to step SP2.

Thus, whenever the user instructs the desired part in the text of the electronic book image, the control unit 20 sequentially performs the processes from step SP3 to step SP9 in cooperation with each circuit unit.

When a positive result is obtained in step SP2, the positive result indicates that the user gives a request for ending the display of the electronic book. When the control unit 20 obtains the positive result in step SP2, the process proceeds to step SP10 and the emphasis display processing sequence RT1 ends.

Figure 41:
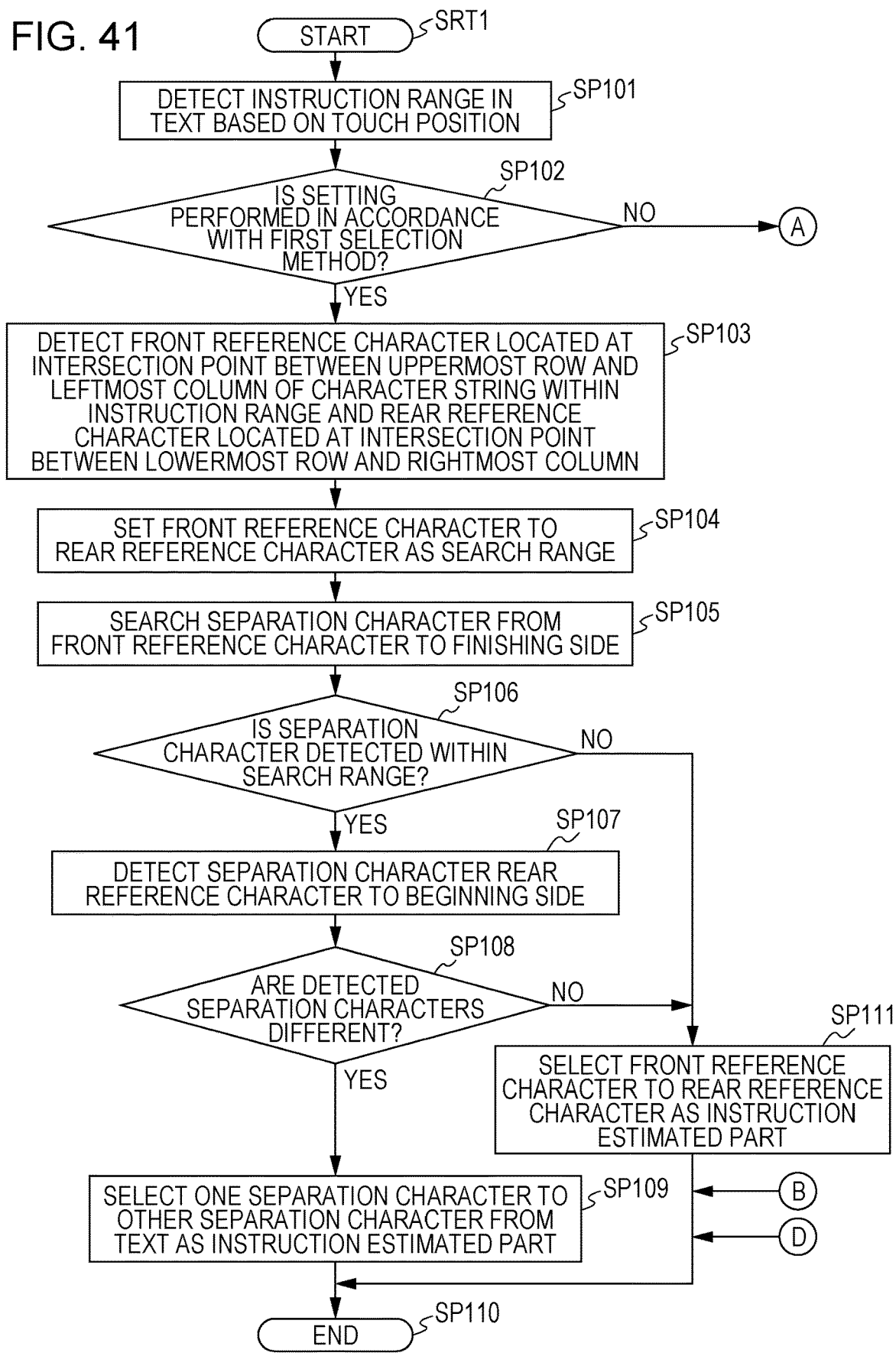
FIG. 41 is a flowchart illustrating a sub-routine (1) of an instruction estimation part selection process.
Figure 42:
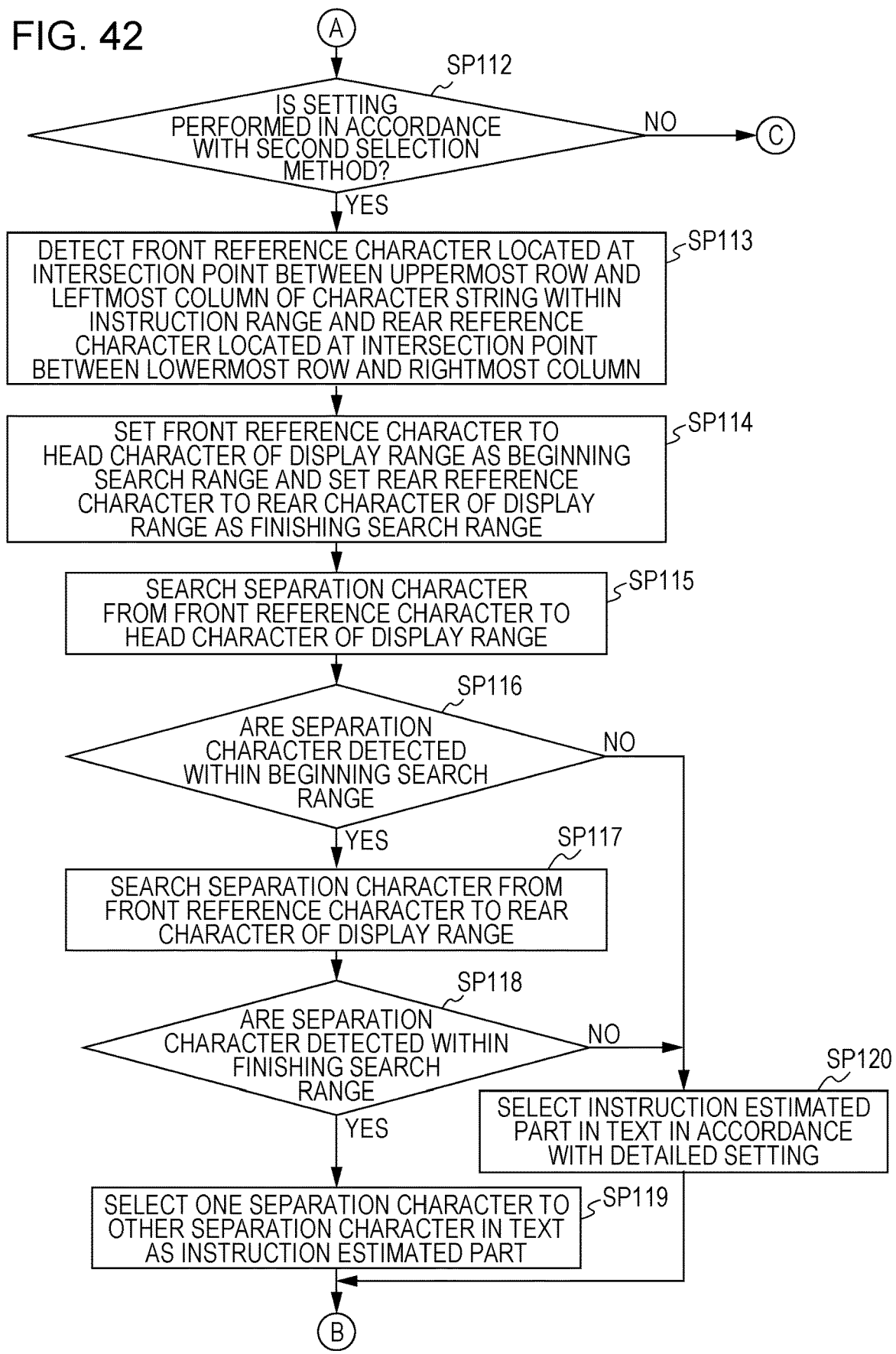
FIG. 42 is a flowchart illustrating a sub-routine (2) of the instruction estimation part selection process.
Figure 43:
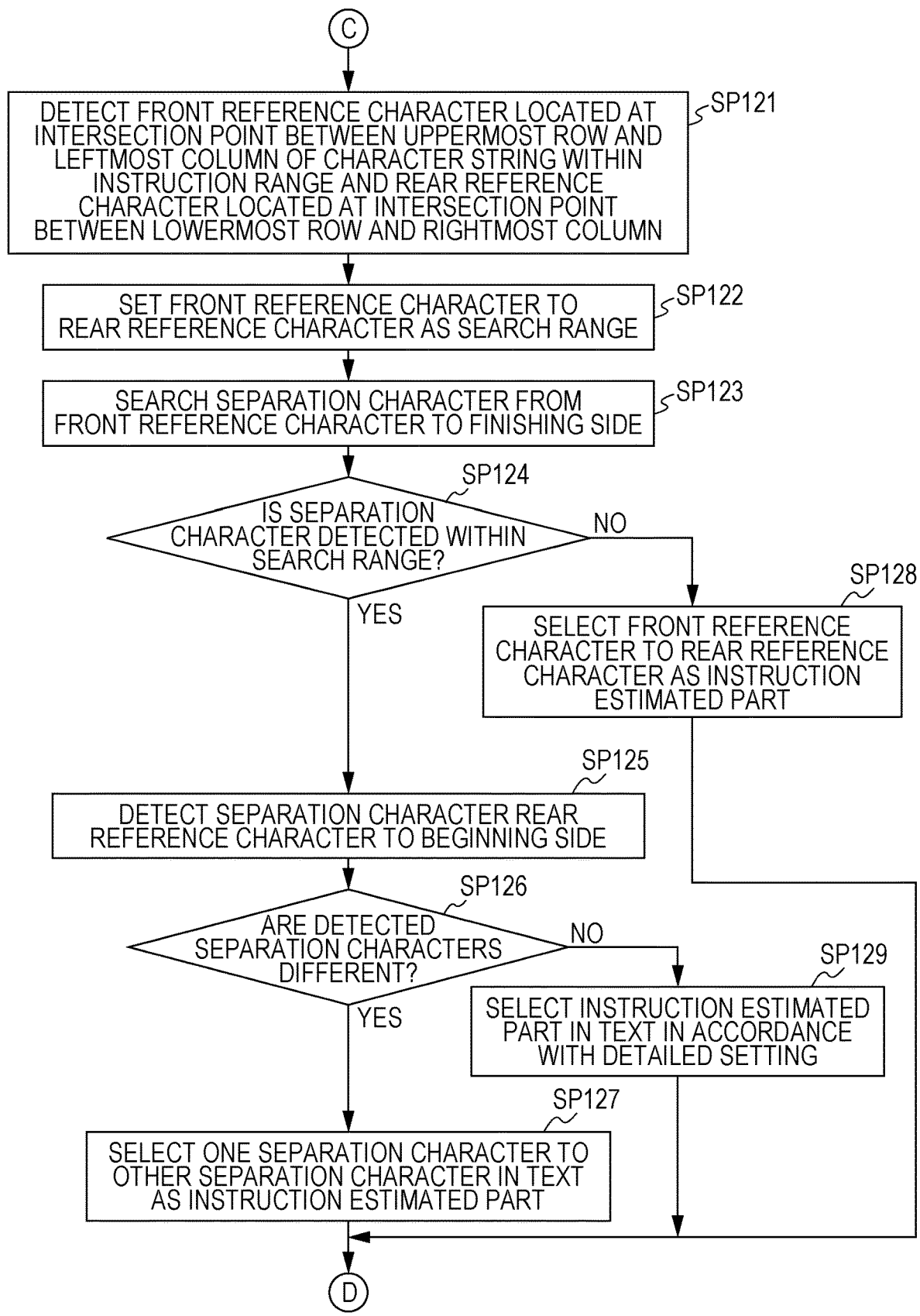
FIG. 43 is a flowchart illustrating a sub-routine (3) of the instruction estimation part selection process.

When the process proceeds from step SP1 to step SP2 in the emphasis display processing sequence RT1 described above, the selection unit 28 starts a sub-routine SRT1 of the instruction estimated part selection process shown in FIGS. 41 to 43.

When the sub-routine SRT1 of the instruction estimated part selection process starts, the selection unit 28 detects the instruction range in the text of the electronic book image based on the kind of slide operation and the touch position at the time at which the desired part is instructed in step SP101. Next, the process proceeds to step SP102.

In step SP102, the selection unit 28 determines whether the method of selecting the instruction estimated part is set currently in accordance with the first selection method. When a positive result is obtained in step SP102, the positive result indicates that the user tends to instruct a part larger than the actual desired part in the text. When the selection unit 28 obtains the positive result in step SP102, the process proceeds to step SP103.

In step SP103, the selection unit 28 detects the front reference character located at the intersection point between the uppermost one row and the leftmost one column of the character string of the instruction range. The selection unit 28 also detects the rear reference character located at the intersection point between the lowermost one row and the rightmost one column of the character string of the instruction range. Next, the process proceeds to step SP104.

In step SP104, the selection unit 28 sets the search range from the front reference character to the rear reference character of the text of the electronic book image as the search range. Next, the process proceeds to step SP105.

In step SP105, the selection unit 28 searches for the separation character while sequentially determining the kinds of character from the front reference character to the finishing side. Next, the process proceeds to step SP106.

In step SP106, the selection unit 28 determines whether the separation character is detected within the search range. At this time, when the selection unit 28 detects the separation character within the search range and thus obtains a positive result, the process proceeds to step SP107.

In step SP107, the selection unit 28 searches for the separation character while sequentially determining the kinds of characters from the rear reference character to the beginning side. When the selection unit 28 detects the separation character, the process proceeds to step SP108.

In step SP108, the selection unit 28 determines whether the separation character detected in the search from the front reference character is different from the separation character detected in the search from the rear reference character. When a positive result is obtained in step SP108, the positive result indicates that at least one phrase or clause is included within the search range. When the selection unit 28 obtains the positive result in step SP108, the process proceeds to step SP109.

In step SP109, the selection unit 28 selects the character string from one separation character to the other separation character detected in the search of the search range from the text, and then process proceeds to step SP110. In step SP110, the selection unit 28 ends the sub-routine SRT1 of the instruction estimated selection process.

On the other hand, when the selection unit 28 does not detect the separation character within the search range and thus obtains a negative result in step SP106, the process proceeds to step SP111.

When a negative result is obtained in step SP108, for example, the negative result indicates that only one separation character is included in the sentence or the phrase within the search range. When the selection unit 28 obtains the negative result in step SP108, the process also proceeds to step SP111.

In step SP111, the selection unit 28 selects the character string from the front reference character to the rear reference character as the instruction estimated part from the text, and then the process proceeds to step SP110. In step SP110, the selection unit 28 ends the sub-routine SRT1 of the instruction estimated selection process.

On the other hand, when a negative result is obtained in step SP102, the negative result indicates that the user tends to instruct a part narrower than the actual desired part in the text or the user tends to instruct a part narrower or larger than the desired part. When the selection unit 28 obtains the negative result in step SP102, the process proceeds to step SP112.

In step SP112, the selection unit 28 determines whether the method of selecting the instruction estimated part is set currently in accordance with the second selection method. When a positive result is obtained in step SP112, the positive result indicates that the user tends to instruct a part narrower than the actual desired part in the text. When the selection unit 28 obtains the positive result in step SP112, the process proceeds to step SP113.

In step SP113, the selection unit 28 detects the front reference character located at the intersection point between the uppermost one row and the leftmost one column of the character string of the instruction range. The selection unit 28 also detects the rear reference character located at the intersection point between the lowermost one row and the rightmost one column of the character string of the instruction range. Next, the process proceeds to step SP114.

In step SP114, the selection unit 28 sets the search range from the front reference character of the text of the electronic book image to the front character of the display range as the beginning search range. Moreover, the selection unit 28 sets the rear reference character in the text of the electronic book image to the rear character of the display range as the finishing search range. Next, the process proceeds to step SP115.

In step SP115, the selection unit 28 searches for the separation character while sequentially determining the kinds of character from the front reference character to the front character of the display range. Next, the process proceeds to step SP116.

In step SP116, the selection unit 28 determines whether the separation character is detected within the beginning search range. At this time, when the selection unit 28 detects the separation character within the beginning search range and thus obtains a positive result, the process proceeds to step SP117.

In step SP117, the selection unit 28 searches for the separation character while sequentially determining the kinds of characters from the rear reference character to the rear character of the display range. Next, the process proceeds to step SP118.

In step SP118, the selection unit 28 determines whether the separation character is detected in the finishing search range. When the selection unit 28 detects the separation character within the finishing search range and thus obtains a positive result, the process proceeds to step SP119.

In step SP119, the selection unit 28 selects the character string from the separation character detected within the beginning search range to the separation character detected in the finishing search range from the text, and then process proceeds to step SP110. In step SP110, the selection unit 28 ends the sub-routine SRT1 of the instruction estimated selection process.

On the other hand, when the selection unit 28 does not detect the separation character within the beginning search range and thus obtains a negative result in step SP116, the process proceeds to step SP120.

On the other hand, when the selection unit 28 does not detect the separation character within the finishing search range and thus obtains a negative result in step SP118, the process proceeds to step SP120.

In step SP120, the selection unit 28 selects the character string of a predetermined range as the instruction estimated part from the text in accordance with the detailed setting of the second selection method, and then the process proceeds to step SP110. In step SP110, the selection unit 28 ends the sub-routine SRT1 of the instruction estimated selection process.

On the other hand, when a negative result is obtained in step SP112, the negative result indicates that the user tends to instruct a part narrower or larger than the actual desired part in the text and thus the third selection method is set in consideration of this tendency. When the selection unit 28 obtains the negative result in step SP112, the process proceeds to step SP121.

In step SP121, the selection unit 28 detects the front reference character located at the intersection point between the uppermost one row and the leftmost one column of the character string of the instruction range. The selection unit 28 also detects the rear reference character located at the intersection point between the lowermost one row and the rightmost one column of the character string of the instruction range. Next, the process proceeds to step SP122.

In step SP122, the selection unit 28 sets the search range from the front reference character to the rear reference character of the text of the electronic book image as the search range. Next, the process proceeds to step SP123.

In step SP123, the selection unit 28 searches for the separation character while sequentially determining the kinds of character from the front reference character to the finishing side. Next, the process proceeds to step SP124.

In step SP124, the selection unit 28 determines whether the separation character is detected within the search range. At this time, when the selection unit 28 detects the separation character within the search range and thus obtains a positive result, the process proceeds to step SP125.

In step SP125, the selection unit 28 searches for the separation character while sequentially determining the kinds of characters from the rear reference character to the beginning side. When the selection unit 28 detects the separation character, the process proceeds to step SP126.

In step SP126, the selection unit 28 determines whether the separation character detected in the search from the front reference character is different from the separation character detected in the search from the rear reference character. When a positive result is obtained in step SP126, the positive result indicates that at least one phrase or clause is included within the search range. When the selection unit 28 obtains the positive result in step SP126, the process proceeds to step SP127.

In step SP127, the selection unit 28 selects the character string from one separation character to the other separation character detected in the search of the search range from the text, and then process proceeds to step SP110. In step SP110, the selection unit 28 ends the sub-routine SRT1 of the instruction estimated selection process.

On the other hand, when the selection unit 28 does not detect the separation character within the search range and thus obtains a negative result in step SP124, the process proceeds to step SP128. At this time, in step SP128, the selection unit 28 selects the character string from front reference character to the rear reference character from the text as the instruction estimated part, and then process proceeds to step SP110. In step SP110, the selection unit 28 ends the sub-routine SRT1 of the instruction estimated selection process.

When a negative result is obtained in step SP126, for example, the negative result indicates that only one separation character is included in the sentence or the phrase within the search range. When the negative result is obtained in step SP126, the selection unit 28 also allows the process to proceed to step SP129.

In step SP129, the selection unit 28 selects the character string of a predetermined range as the instruction estimated part from the text in accordance with the setting of the third selection method, and then the process proceeds to step SP110. In step SP110, the selection unit 28 ends the sub-routine SRT1 of the instruction estimated selection process.

Figure 44:
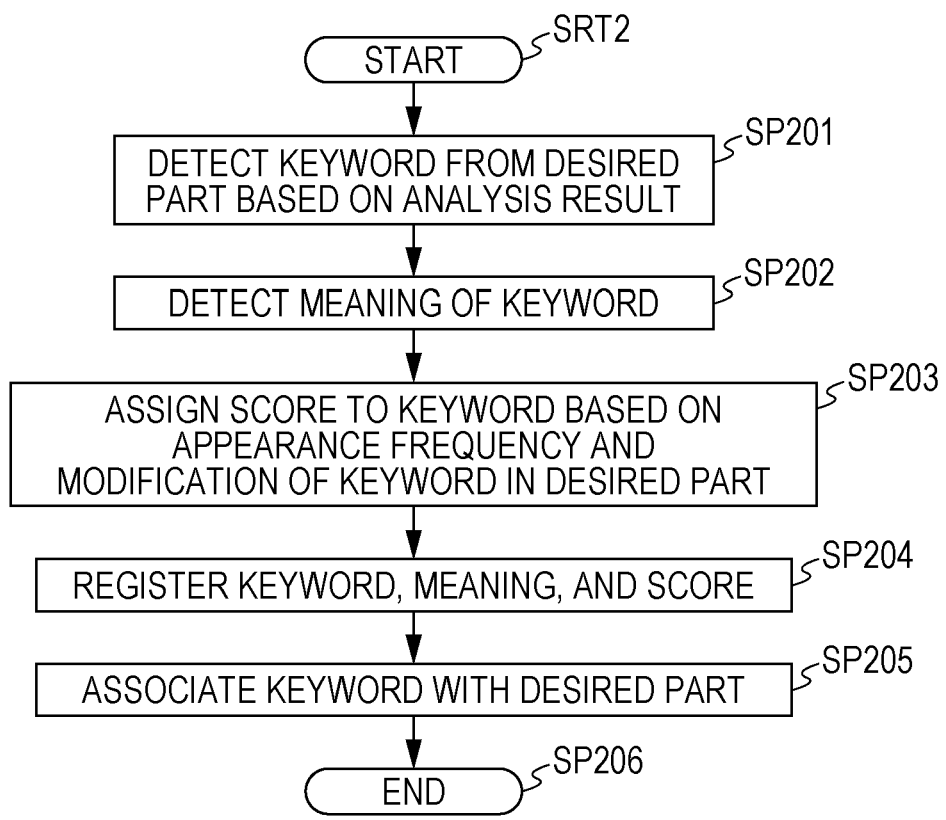
FIG. 44 is a flowchart illustrating a sub-routine of a keyword detection process.

When the process proceeds from sep SP6 to step SP7 in the emphasis display processing sequence RT1 described above, the detection unit 35 starts a sub-routine SRT2 of a keyword detection process shown in FIG. 44.

When the sub-routine SRT2 of the keyword detection process starts, the detection unit 35 detects the keyword from the desired part based on the analysis result of the desired part in step SP201. Next, the process proceeds to step SP202.

In step SP202, the detection unit 35 detects the meaning of the keyword based on the analysis result of the desired part. Next, the process proceeds to step SP203.

In step SP203, the detection unit 35 assigns the score to the keyword based on the appearance frequency and the modification of the keyword in the desired part.

In step SP204, the registration unit 34 registers the keyword, the meaning, and the score detected by the detection unit 35 in the keyword registration table DT3 of the storage unit 25.

In step SP205, the association unit 60 associates the keyword registered by the registration unit 34 with the desired part using the keyword association table DT5 of the storage unit 25. Thus, the detection unit 35 allows the process to proceed to the step SP206 and ends the sub-routine SRT2 of the keyword detection process.

Figure 45:
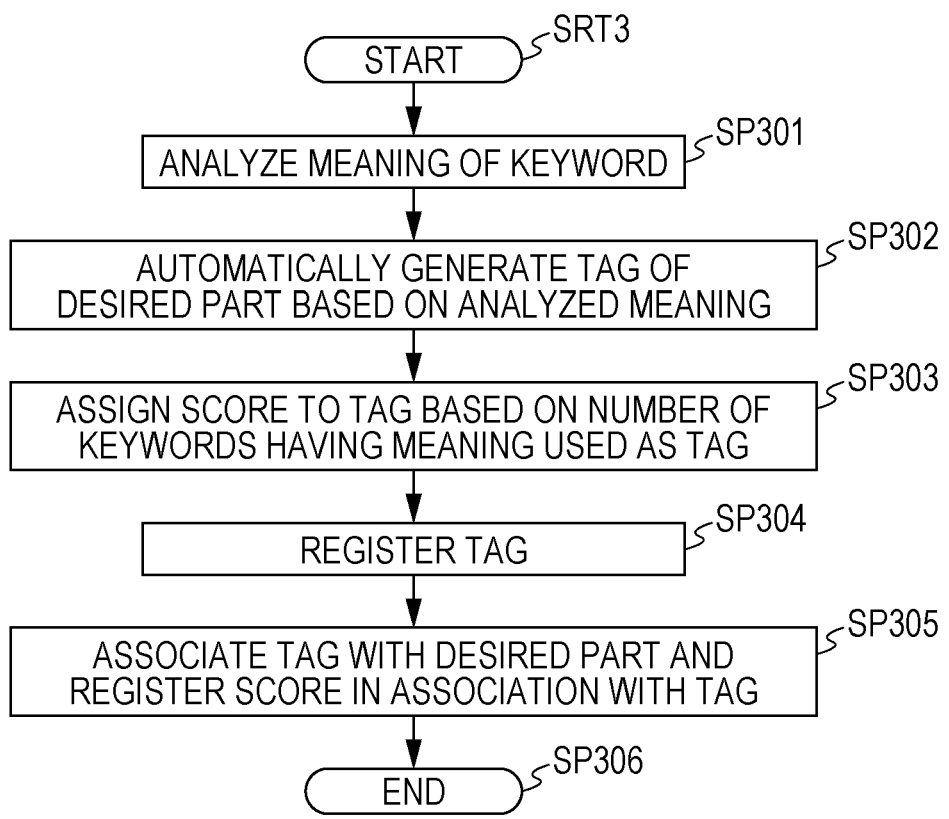
FIG. 45 is a flowchart illustrating a sub-routine of a tag generation process.

When the process proceeds from step SP7 to step SP8 in the emphasis display processing sequence RT1 described above, the tag generation unit 36 starts a sub-routine SRT3 of the tag generation process shown in FIG. 45.

When the sub-routine SRT3 of the tag generation process starts, the tag generation unit 36 analyzes the meaning of the keyword detected by the detection unit 35 in step SP301. Next, the process proceeds to step SP302.

In step SP302, the tag generation unit 36 automatically generates the tag of the desired part based on the analyzed meaning. Next, the process proceeds to step SP303.

In step SP303, the tag generation unit 36 assigns the score to the tag based on the number of keywords having the meaning used as the tag.

In step SP304, the registration unit 34 registers the tag generated by the tag generation unit 36 in the tag registration table DT4 of the storage unit 25.

In step SP305, the association unit 60 associates the tag registered by the registration unit 34 with the desired part using the tag registration table DT6 of the storage unit 25 and registers the score and the tag in association with associates the score of the tag and the tag. Thus, the tag generation unit 36 allows the process to proceed to step SP306 and ends sub-routine SRT3 of the tag generation process.

2-6. Information Introduction Processing Sequence

Next, an information introduction processing sequence performed by the plurality of information display terminals 11 and 12 and the information sharing apparatus 14 will be described with reference FIGS. 46 and 47. The reference numerals are given to the constituent elements corresponding to the elements in FIG. 40.

Figure 46:
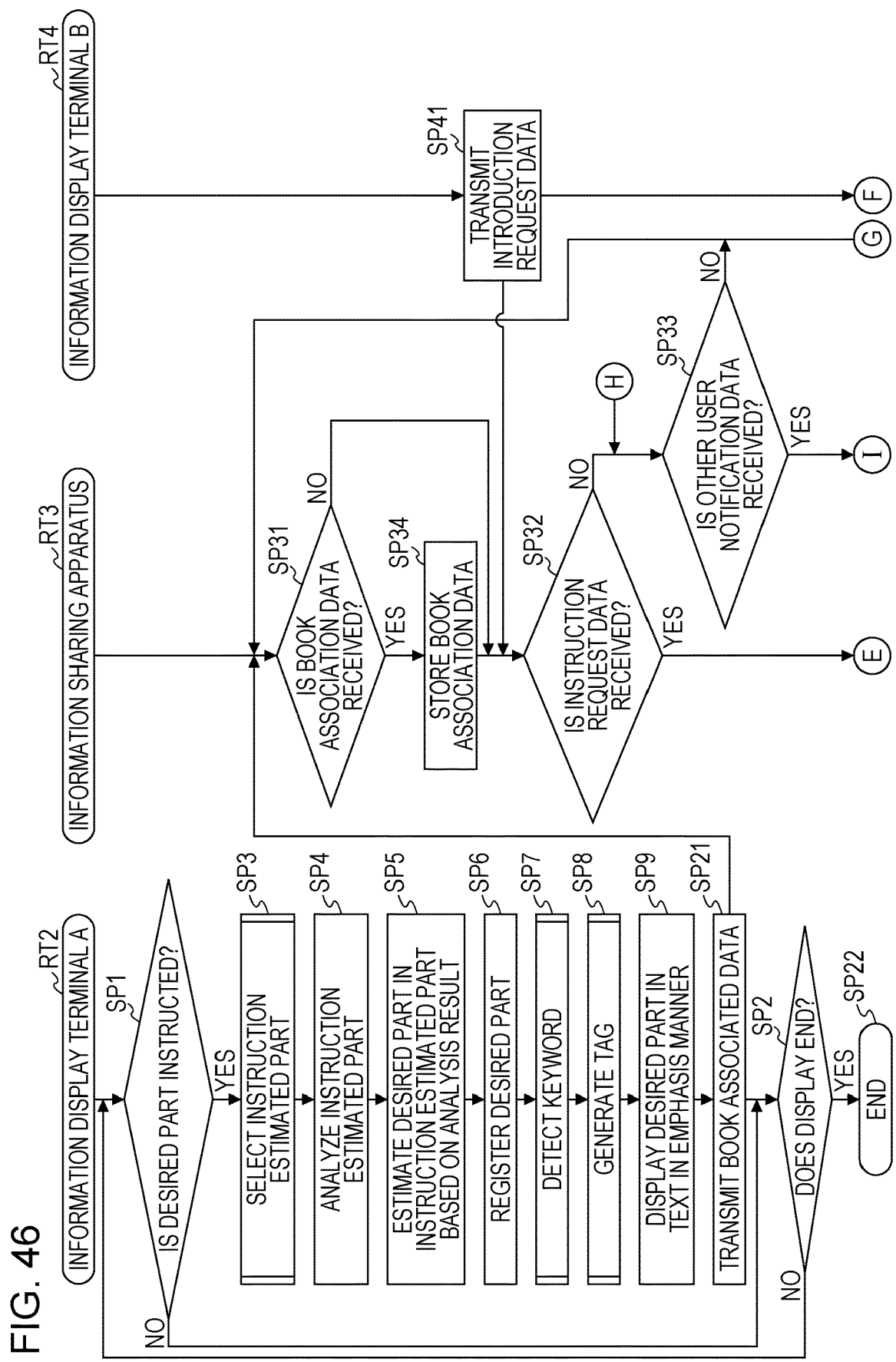
FIG. 46 is a flowchart illustrating an information introduction processing sequence (1).

At this time, the control unit 20 of the plurality of information display terminals 11 and 12 starts a data supply processing sequence RT2 shown in FIG. 46 in cooperation with each circuit unit, for example, when the user gives a request for displaying ht electronic book and gives a request for transmitting the book association data whenever selecting the desired part.

At this time, when the control unit 20 of the plurality of information display terminals 11 and 12 starts the data supply processing sequence RT3, the control unit 20 performs the processes of step SP1 and step SP2 and waits until the desired part is instructed in the text of the electronic book image being displayed.

When the desired part in the text of the electronic book image being displayed is instructed, the control unit 20 sequentially performs step SP3 to step SP9. Then, the process proceeds to step SP21.

Then, in step SP21, the control unit 20 allows the retrieval unit 66 to retrieve the book association data regarding the selected desired part. In addition, the control unit 20 transmits both the retrieved book association data and the user registration information from the transmission unit 23 to the information sharing apparatus 14 via the network 13. Then, the process proceeds to step SP2.

For example, the control unit 20 transmits the book association data regarding the desired part to the information sharing apparatus 14, for example, whenever the desired part is instructed in the text of the electronic book image being displayed.

For example, when a request for ending the display of the electronic book ends, the process proceeds to step SP22 and the control unit 20 ends the data supply processing sequence RT2.

Figure 47:
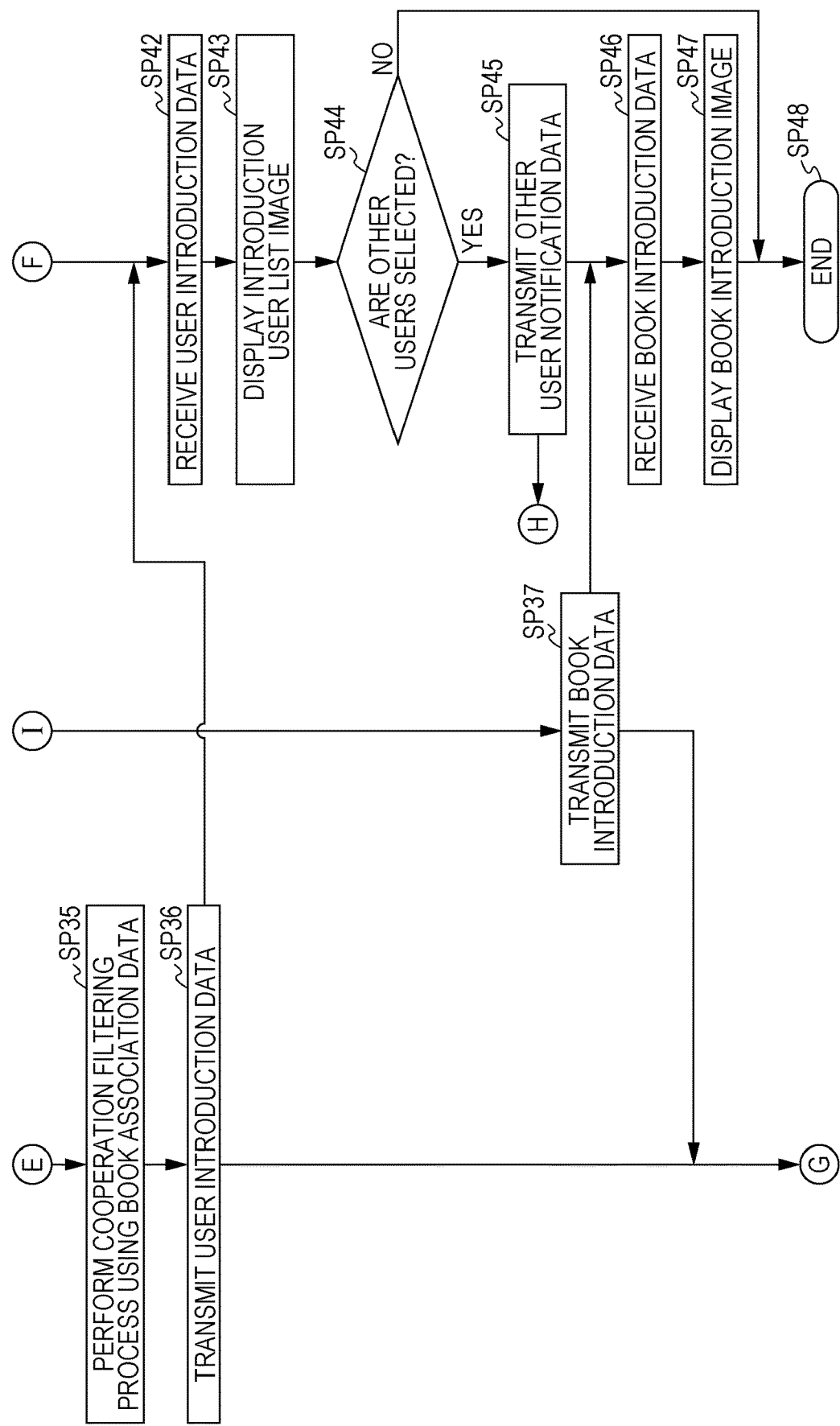
FIG. 47 is a flowchart illustrating an information introduction processing sequence (2).

On the other hand, the control unit 110 of the information sharing apparatus 14 starts a user introduction processing sequence RT3 shown in FIGS. 46 and 47. When the control unit 110 of the information sharing apparatus 14 starts the user introduction processing sequence RT3, the control unit 110 receives determines whether the book association data are transmitted from the information display terminals 11 and 12 and are received in step SP31.

As a consequence, when the book association data are not transmitted from the information display terminals 11 and 12 and thus the control unit 110 of the information sharing apparatus 14 obtains a negative result in step SP31, the process proceeds to step SP32.

In step SP32, the control unit 110 of the information sharing apparatus 14 determines whether the introduction request data are transmitted from the information display terminals 11 and 12 and are received. As a consequence, when the introduction request data are not transmitted from the information display terminals 11 and 12 and thus the control unit 110 of the information sharing apparatus 14 obtains a negative result in step SP32, the process proceeds to step SP33.

In step SP33, the control unit 110 of the information sharing apparatus 14 determines whether the other user notification data are transmitted from the information display terminals 11 and 12 and are received. As a consequence, when the other user notification data are not transmitted from the information display terminals 11 and 12 and thus the control unit 110 of the information sharing apparatus 14 obtains a negative result in step SP32, the process returns to step SP31.

Thereafter, the control unit 110 of the information sharing apparatus 14 repeatedly performs the processes from step SP31 to step SP33, until the control unit 110 receives the book association data, the introduction request data, or the other user notification data.

Thus, the control unit 110 of the information sharing apparatus 14 waits to receive the book association data, the introduction request data, and the other user notification data transmitted from the information display terminals 11 and 12.

When the control unit 110 of the information sharing apparatus 14 allows the reception unit 112 to receive the book association data and the user registration information transmitted from the information display terminals 11 and 12 and thus obtains a positive result in step SP31, the process proceeds to step SP34.

In step SP34, the control unit 110 of the information sharing apparatus 14 stores the received book association data and the received user registration information in association with the book association data and the user registration information in the storage unit 111, and then the process proceeds to step SP32.

Thus, when the book association data and the user registration information are transmitted from the information display terminals 11 and 12, the control unit 110 of the information sharing apparatus 14 receives and stores the book association data and the user registration information in the storage unit 111 to accumulate the book association data for each user in a manageable manner.

Here, when the control unit 20 of the information display terminals 11 and 12 receives a request for introducing other users with a preference similar to that of the own user from the user, the control unit 20 starts an information sharing processing sequence RT4 shown in FIGS. 46 and 47.

When the control unit 20 of the information display terminals 11 and 12 starts the information sharing processing sequence RT4, the control unit 20 generates the introduction request data and transmits the introduction request data from the transmission unit 23 to the information sharing apparatus 14 via the network 13 in step SP41.

At this time, the control unit 110 of the information sharing apparatus 14 waits to receive the introduction request data. Therefore, when the control unit 110 receives the introduction request data and thus obtains a positive result in step SP32, the process proceeds to step SP35.

In step SP35, the filtering processing unit 114 of the information sharing apparatus 14 performs the emphasis filtering process using the book association data between the introduction request user and the other users. Then, the process proceeds to step SP36.

In step SP36, the filtering processing unit 114 of the information sharing apparatus 14 generates the user introduction data indicating the other users introduced to the introduction request user based on the result of the emphasis filtering process. Then, the filtering processing unit 114 of the information sharing apparatus 14 transmits the user introduction data from the transmission unit 113 to the information display terminals 11 and 12 via the network 13.

At this time, in step SP42, the reception unit 24 of the information display terminals 11 and 12 receives the user introduction data transmitted from the information sharing apparatus 14 and transmits the user introduction data to the control unit 20.

Accordingly, in step SP43, the control unit 20 of the information display terminals 11 and 12 allows the display control unit 26 to display the user introduction list image on the display unit 21 based on the user introduction data. Then, the process proceeds to step SP44.

In step SP44, the control unit 20 of the information display terminals 11 and 12 determines whether the introduction request user selects one of the users from the user introduction list image. As a consequence, when the introduction request user selects one of the users from the user introduction list image and thus the control unit 20 of the information display terminals 11 and 12 obtains a positive result in step SP44, the process proceeds to step SP45.

In step SP45, the control unit 20 of the information display terminals 11 and 12 transmits the other user notification data indicating the other user selected by the introduction request user from the transmission unit 23 to the information sharing apparatus 14 via the network 13.

At this time, when the control unit 110 of the information sharing apparatus 14 receives the other user notification data transmitted from the information display terminals 11 and 12 and thus obtains a positive result in step SP33, the control unit 110 allows the process to proceed to step SP37.

In step SP37, the filtering processing unit 114 of the information sharing apparatus 14 generates the book introduction data used to introduce single or a plurality of electronic books among the electronic books acquired by the other users with the preference similar to that of the introduction request user based on the other user notification data.

Then, the filtering processing unit 114 of the information sharing apparatus 14 transmits the book introduction data from the transmission unit 113 to the information display terminals 11 and 12 via the network 13, and then the process proceeds to step SP31.

At this time, in step SP46, the control unit 20 of the information display terminals 11 and 12 allows the reception unit 24 to receive the book introduction data transmitted from the information sharing apparatus 14. Then, the process proceeds to step SP47.

In step SP47, the control unit 20 of the information display terminals 11 and 12 allows the display control unit 26 to display the book introduction image on the display unit 21 based on the book introduction data. Then, the process proceeds to step SP48. Thus, in step SP48, the control unit 20 of the information display terminals 11 and 12 ends the introduction sharing processing sequence RT4.

When the control unit 110 of the information sharing apparatus 14 receives the introduction request data transmitted from the information display terminals 11 and 12 while accumulating the book association data transmitted from the information display terminals 11 and 12, the control unit 110 introduces the other users with the similar preference to the introduction request user.

When the control unit 110 of the information sharing apparatus 14 receives the book introduction data transmitted from the information display terminals 11 and 12 at the time of the introduction of the other users, the control unit 110 can introduce the electronic book suggested by the other users with the preference similar to that of the introduction request data.

2-7. Information Sharing Processing Sequence

Next, information sharing processing sequences RT5 and RT6 of mutually reflecting the desired parts selected by the users of the plurality of information display terminals 11 and 12 will be described with reference to FIG. 48. The reference numerals are given to the constituent elements corresponding to the elements in FIG. 40.

Hereinafter, a case will be described in which the information display terminals 11 and 12 share information by executing direct communication one another without using the information sharing apparatus 14.

Figure 48:
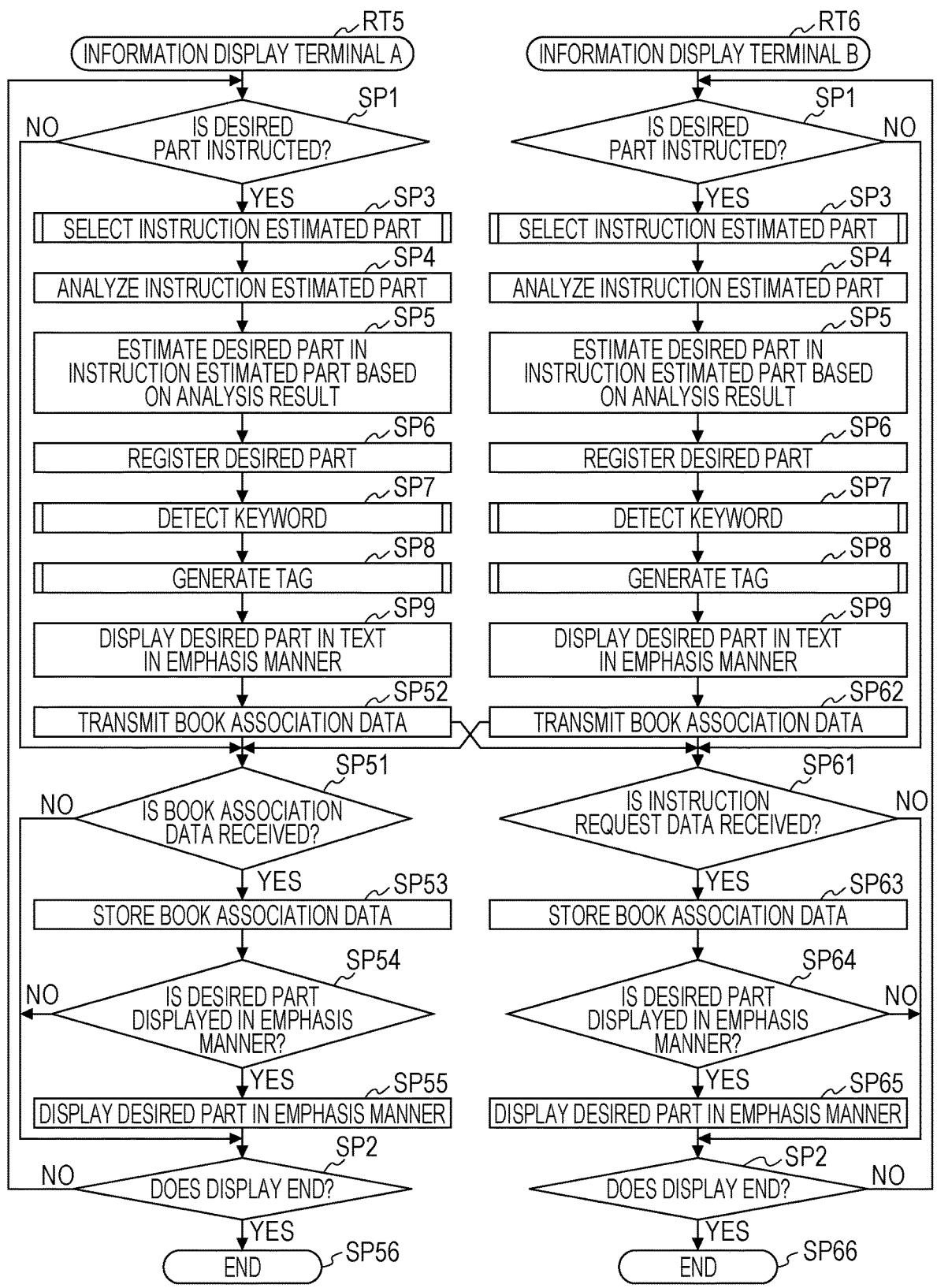
FIG. 48 is a flowchart illustrating an information sharing processing sequence.

When the user gives a request for displaying the electronic book and a request for sharing information between the other information display terminals 11 and 12, the control unit 20 of one of the information display terminals 11 and 12 starts the information sharing processing sequence RT5 shown in FIG. 48.

When the information sharing processing sequence RT5 starts, the control unit 20 of one of the information display terminals 11 and 12 determines whether the desired part is instructed in the text of the electronic book image being displayed in step SP1.

When a negative result is obtained in step SP1, for example, the negative result indicates that the user is reading the text of the electronic book image. When the control unit 20 of one of the information display terminals 11 and 12 obtains the negative result in step SP1, the process proceeds to step SP51.

In step SP51, the control unit 20 of one of the information display terminals 11 and 12 determines whether the book association data transmitted in response to the selection of the desired part of the same electronic book is received from the other of the information display terminals 11 and 12.

When a negative result is obtained in step SP51, for example, the negative result indicates that the user of the other of the information display terminals 11 and 12 is reading the text of the electronic book image being displayed. When the control unit 20 of the one of the information display terminals 11 and 12 obtains the negative result in step SP51, the process proceeds to step SP2.

Then, in step SP2, the control unit 20 of the one of the information display terminals 11 and 12 determines whether the display of the electronic book ends. When the control unit 20 obtains a negative result in step SP2, for example, the negative result indicates that the user is reading the text of the electronic book image being displayed. Accordingly, when the control unit 20 of the one of the information display terminals 11 and 12 obtains the negative result in step SP2, the process returns to step SP1.

Thereafter, the control unit 20 of the one of the information display terminals 11 and 12 circularly and repeatedly performs the processes of step SP1, step SP51, and step SP2, until the control unit 20 obtains a positive result in step SP1, step SP51, and step SP2.

Thus, the control unit 20 of the one of the information display terminals 11 and 12 receives the desired part in the text of the electronic book image, receives the book association data transmitted from the other of the information display terminals 11 and 12, and waits until the control unit 20 receives a request for ending the display of the electronic book.

When the control unit 20 of the one of the information display terminals 11 and 12 obtains the positive result due to the fact that the desired part is instructed in the text of the electronic book image being displayed in step SP1, the control unit 20 sequentially performs the processes of step SP3 to step SP9. Then, the process proceeds to step SP52.

In step SP52, the control unit 20 of the one of the information display terminals 11 and 12 allows the retrieval unit 66 to retrieve the book association data regarding the selected desired part. Then, the control unit 20 of the one of the information display terminals 11 and 12 transmits the book association data from the transmission unit 23 to the other of the information display terminals 11 and 12. Then, the process proceeds to step SP51.

At this time, the control unit 20 of the other of the information display terminals 11 and 12 also starts an information sharing processing sequence RT6 shown in FIG. 48 in response to the user request for displaying the electronic book and the user request of sharing the information between the other information display terminals 11 and 12.

When the control unit 20 of the other of the information display terminals 11 and 12 starts the information sharing processing sequence RT6, the control unit 20 also determines whether the desired part is instructed in the text of the electronic book image being displayed in step SP1.

When a negative result is obtained in step SP1, for example, the negative result indicates that the user is reading the text of the electronic book image. When the control unit 20 of the other of the information display terminals 11 and 12 obtains the negative result in step SP1, the process proceeds to step SP61.

In step SP61, the control unit 20 of the other of the information display terminals 11 and 12 determines whether the book association data transmitted in response to the selection of the desired part of the same electronic book is received from the one of the information display terminals 11 and 12.

When a negative result is obtained in step SP61, for example, the negative result indicates that the user of the one of the information display terminals 11 and 12 is reading the text of the electronic book image being displayed. When the control unit 20 of the other of the information display terminals 11 and 12 obtains the negative result in step SP61, the process proceeds to step SP2.

In step SP2, the control unit 20 of the other of the information display terminals 11 and 12 determines whether the display of the electronic book ends. When a negative result is obtained in step SP2, for example, the negative result also indicates that the user is reading the text of the electronic book image being displayed. Accordingly, when the control unit 20 of the other of the information display terminals 11 and 12 obtains the negative result in step SP2, the process returns to step SP1.

Thereafter, the control unit 20 of the other of the information display terminals 11 and 12 circularly and repeatedly performs the processes of step SP1, step SP61, and step SP2, until the control unit 20 obtains a positive result in SP1, step SP61, and step SP2.

Thus, the control unit 20 of the other of the information display terminals 11 and 12 receives the desired part in the text of the electronic book image, receives the book association data transmitted from the other of the information display terminals 11 and 12, and waits until the control unit 20 receives a request for ending the display of the electronic book.

When the control unit 20 of the other of the information display terminals 11 and 12 obtains the positive result due to the fact that the reception unit 24 receives the book association data transmitted from the one of the information display terminals 11 and 12 in step SP61, the process proceeds to step SP63.

In step SP63, the control unit 20 of the other of the information display terminals 11 and 12 stores the book association data in the storage unit 25. Then, the process proceeds to step SP64.

In step SP64, the control unit 20 of the other of the information display terminals 11 and 12 determines whether the desired part selected in the one of the information display terminals 11 and 12 is displayed in the emphasis manner.

When a positive result is obtained in step SP64, the positive result indicates that the same page of the same electronic book is currently being displayed in both of the information display terminals 11 and 12.

When the control unit 20 of the other of the information display terminals 11 and 12 obtains the positive result in step SP64, the process proceeds to step SP65.

In step SP65, based on the acquired book association data, the control unit 20 of the other of the information display terminals 11 and 12 displays the desired part selected by the one of the information display terminals 11 and 12 in the emphasis manner in the text of the electronic book image being displayed. Then, the process proceeds to step SP2.

On the other hand, when a negative result is obtained in step SP64, the negative result indicates that different pages of the same electronic book are currently being displayed in both of the information display terminals 11 and 12.

When the control unit 20 of the other of the information display terminals 11 and 12 obtains the negative result in step SP64, the process proceeds to step SP2.

When the control unit 20 of the other of the information display terminals 11 and 12 obtains the negative result again in step SP2, the process returns to step SP1.

Then, when the control unit 20 of the other of the information display terminals 11 and 12 obtains the positive result in step SP1 due to the fact that the desired part is instructed in the text of the electronic book image being displayed, the control unit 20 sequentially performs the process from step SP3 to step SP9. Then, the process proceeds to step SP62.

In step SP62, the control unit 20 of the other of the information display terminals 11 and 12 allows the retrieval unit 66 to retrieve the book association data regarding the selected desired part. Then, the control unit 20 of the other of the information display terminals 11 and 12 transmits the book association data from the transmission unit 23 to the one of the information display terminals 11 and 12. Then, the process proceeds to step SP61.

When the control unit 20 of the one of the information display terminals 11 and 12 obtains the positive result due to the fact that the reception unit 24 receives the book association data transmitted from the other of the information display terminals 11 and 12 in step SP51, the process proceeds to step SP53.

In step SP53, the control unit 20 of the one of the information display terminals 11 and 12 stores the book association data in the storage unit 25. Then, the process proceeds to step SP54.

In step SP54, the control unit 20 of the one of the information display terminals 11 and 12 determines whether the desired part selected in the other of the information display terminals 11 and 12 is displayed in the emphasis manner.

When a positive result is obtained in step SP54, the positive result indicates that the same page of the same electronic book is currently being displayed in both of the information display terminals 11 and 12.

When the control unit 20 of the one of the information display terminals 11 and 12 obtains the positive result in step SP54, the process proceeds to step SP55.

In step SP55, based on the acquired book association data, the control unit 20 of the one of the information display terminals 11 and 12 displays the desired part selected by the other of the information display terminals 11 and 12 in the emphasis manner in the text of the electronic book image being displayed. Then, the process proceeds to step SP2.

On the other hand, when a negative result is obtained in step SP54, the negative result indicates that different pages of the same electronic book are currently being displayed in both of the information display terminals 11 and 12.

When the control unit 20 of the one of the information display terminals 11 and 12 obtains the negative result in step SP54, the process proceeds to step SP2.

When the control unit 20 of the one of the information display terminals 11 and 12 obtains the negative result again in step SP2, the process returns to step SP1.

Thus, the control units 20 of both one and the other of the information display terminals 11 and 12 repeatedly perform the process from step SP1 to SP9, the process from step SP51 to step SP55, the process from step SP1 to SP9, and the processes from step SP61 to SP65.

The control units 20 of both one and the other of the information display terminals 11 and 12 can transmit and share the book association data regarding the selected desired part in the state where the electronic book image of the same electronic book is displayed, whenever the desired part is mutually selected.

When a positive result is obtained in step SP2, the positive result indicates that the user gives a request of ending the display of the electronic book. When the control unit 20 of the one of the information display terminals 11 and 12 obtains the positive result in step SP2, the process proceeds to step SP56 to end the information sharing processing sequence RT5.

When the control unit 20 of the other of the information display terminals 11 and 12 also obtains the positive result in step SP2, the process proceeds to step SP66 to end the information sharing processing sequence RT6.

2-8. Operations and Advantages of First Embodiment

When the electronic book image of the electronic book is displayed on the display unit 21 and the desired part is instructed in the text of the electronic book image, the information display terminal 11 and 12 with the above-described configuration selects the instruction estimated part in the text based on the instruction position.

The information display terminal 11 and 12 specify the desired part in the instruction estimated part based on the processing result (that is, the analysis result) obtained by performing the natural language processing on the instruction estimated part. The information display terminal 11 and 12 detects the keyword from the desired part based on the processing result of the natural language processing.

The information display terminal 11 and 12 automatically generate the tag as a word expressing the meaning of the superordinate concept of the keyword and associate the generated tag with the desired part.

Accordingly, the information display terminal 11 and 12 can easily identify which part the desired part is using the tag by associating the tag with the desired part.

According to the above-described configuration, when the desired part is instructed in the text of the electronic book, the information display terminals 11 and 12 select the instruction estimated part based on the instruction position, perform the natural language processing, specify the desired part in the instruction estimated part based on the processing result, detects the keyword from the desired part, generate the tag corresponding to the detected keyword, and associate the tag with the desired part. Thus, the information display terminal 11 and 12 can easily identify which part of the desired part is using the tag by associating the tag with the desired part. Accordingly, the information display terminals 11 and 12 can considerably improve usability.

The information display terminal 11 and 12 are configured to classify the desired parts in accordance with the meaning of the superordinate concept of the keywords detected from the desired parts. Accordingly, the information display terminal 11 and 12 can classify the desired parts selected by the user into the items which the users are interest in.

That is, the information display terminal 11 and 12 can again recognize the items which the users themselves are interest in based on the classification result of the desired parts selected by the users.

Moreover, the information display terminal 11 and 12 perform the natural language processing on the association comments, detect the keyword from the association comments based on the processing result, and also classify the association comments in accordance with the meaning of the superordinate concept of the keywords.

Accordingly, based on the classification result, the information display terminal 11 and 12 can easily retrieve not only the desired parts which the users are interest in but also the association comments which the users are interested in.

The information display terminal 11 and 12 detect the keywords from the whole book text, in which the desired part is not selected, and also classify the detected keywords in accordance with the meaning of the superordinate concept.

Accordingly, based on the classification result, the information display terminal 11 and 12 can easily retrieve phrases, clauses, or the like, which indicate the items which the users are interest in for the text of the electronic book in which the desired part is not selected.

3. Second Embodiment

3-1. Configuration of Information Display System

Figure 49:
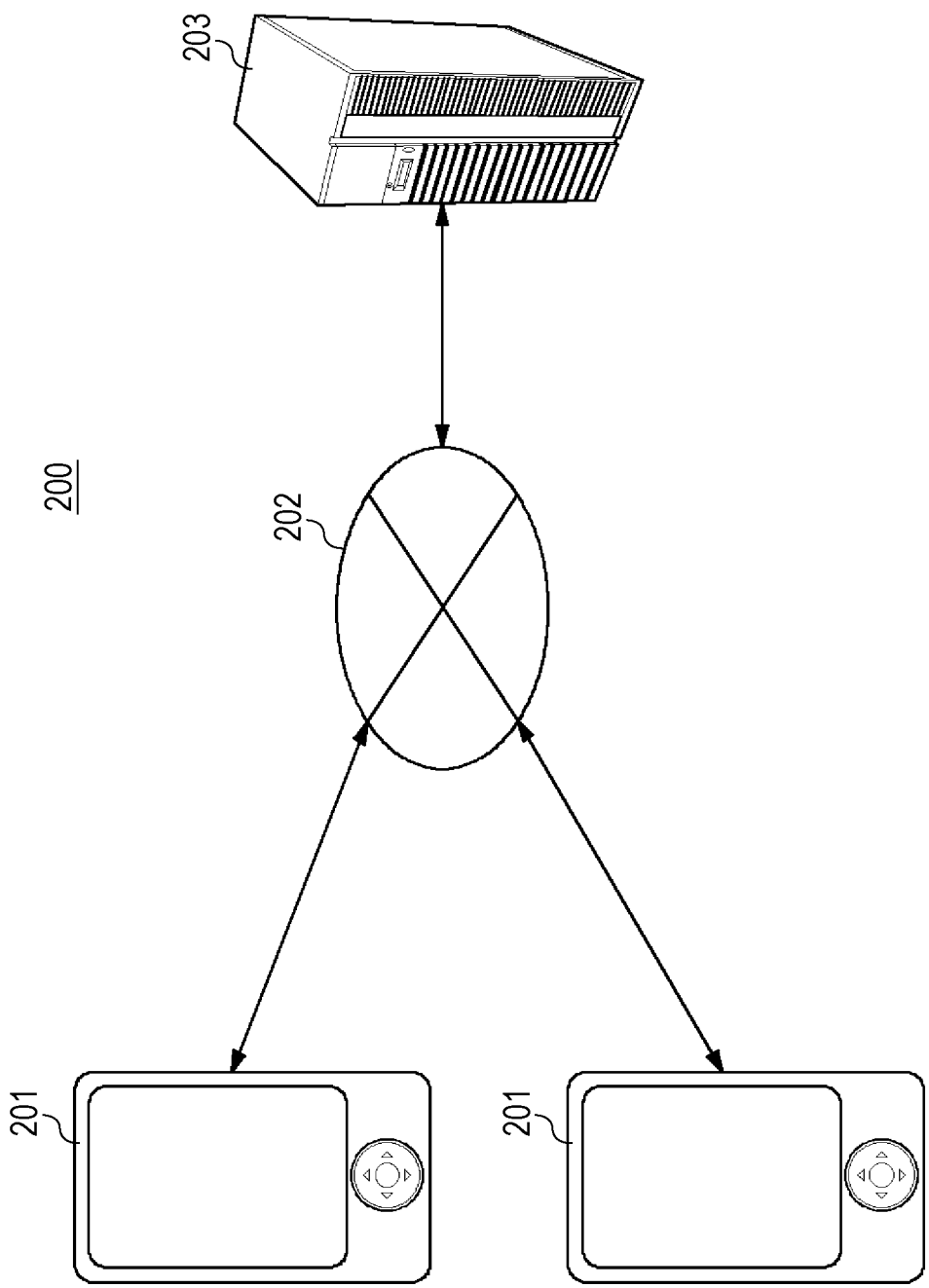
FIG. 49 is a block diagram illustrating the configuration of an information display system according to a second embodiment.

In FIG. 49, Reference Numeral 200 denotes an information display system according to a second embodiment. In the information display system 200, a plurality of information display terminals 201 with a communication terminal configuration, which is a specific example of the above-described information processing apparatus 1, are configured to communicate with an information sharing apparatus 203 with a server configuration via a network 202 such as the Internet or a LAN (Local Area Network).

Figure 50:
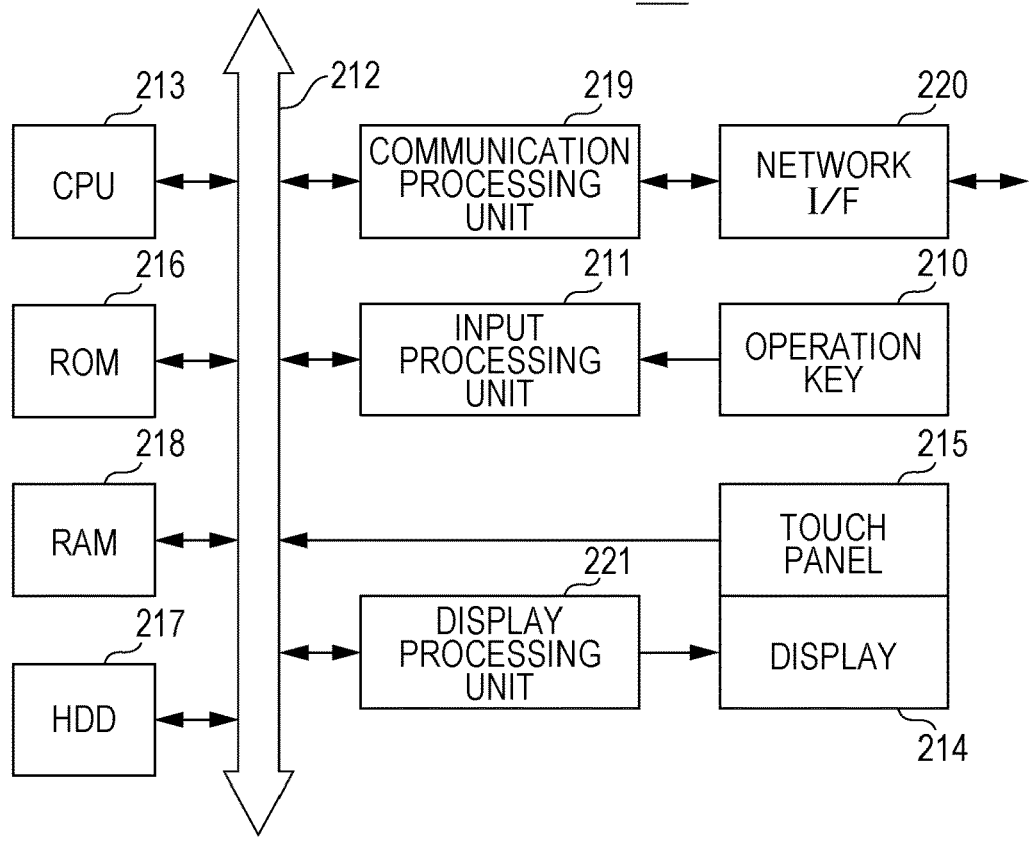
FIG. 50 is a block diagram illustrating the circuit configuration of a hardware circuit block of the information display terminal.

3-2. Hardware Configuration of Hardware Circuit Block of Information Display Terminal Next, the hardware circuit configuration of a hardware circuit block of the information display terminal 201 will be described with reference to FIG. 50.

In the information display terminal 201, when a user operates an operation input unit 210 including various kinds of operation keys installed a casing surface of the information display terminal 201 or a remote controller, the operation input unit 210 recognizes the operation and an operation input signal is transmitted to an input processing unit 211 in response to the operation.

The input processing unit 211 converts the operation input signal into an operation command by performing a predetermined process on the supplied operation input signal and transmits the operation command to a central processing unit (CPU) 213 via a bus 212.

The information display terminal 201 includes a touch panel 215 which is installed on the display surface of a display 214. When a touch operation (that is, a tap operation, a flick operation, and a slide operation) is executed on the surface of the touch panel 215, the touch panel 215 detects the touch position of the touch operation in response to the touch operation and notifies the central processing unit 213 via the bus 212.

The central processing unit 213 reads various kinds of programs such as basic programs or application programs stored in advance in a ROM (read Only Memory) 216 or a hard disk drive 217 to a RAM (Random Access Memory) 218 via the bus 212.

The central processing unit 213 controls all of the various kinds of programs developed on the RAM 218 and performs various kinds of processes in response to predetermined arithmetic processing, an operation command transmitted from the input processing unit 211, and the touch position of the surface of the touch panel 215.

The central processing unit 213 accesses the network 202 sequentially through a communication processing unit 219 and a network interface 220 and is connected to the network 202 and accesses the information sharing apparatus 203, an electronic book supply apparatus, or the like on the network 202.

When the user gives a request for acquiring the electronic book data of an electronic book via the operation input unit 210 or the touch panel 215, the central processing unit 213 accesses the information sharing apparatus 203, the electronic book supply apparatus, or the like in response to the request for acquiring the electronic book of the electronic book to give a request of the electronic book data.

As a consequence, when the electronic book data is transmitted from the information sharing apparatus 203, the electronic book supply apparatus, or the like via the network 202, the central processing unit 213 allows the network interface 220 and the communication processing unit 219 to receive and acquire the electronic book data. Then, the central processing unit 213 transmits the electronic book data to the hard disk drive 217 to store the electronic book data.

When the user gives a request for displaying the electronic book through the operation input unit 210 or the touch panel 215, the central processing unit 213 reads the electronic book data from the hard disk drive 217 in response to the request for displaying the electronic book. Then, the central processing unit 213 displays the electronic book which is based on the electronic book data on the display 214 by transmitting the electronic book data to the display processing unit 221.

In the information display terminal 201, as described above, the central processing unit 213 basically performs various kinds of processes in accordance with various kinds of programs stored in the ROM 216 or the hard disk drive 217 and controls each hardware unit.

Accordingly, in the information display terminal 201, the various kinds of programs stored in the ROM 216 or the hard disk drive 217 are appropriately selected so as to correspond to the functions of the information display terminals 11 and 12 with the hardware configuration of the function circuit block described above with reference to FIGS. 3 and 38.

That is, in the information display terminal 201, various kinds of programs are appropriately selected as information processing programs configured to execute the emphasis display processing sequence RT1, the data supply processing sequence RT2, the introduction sharing processing sequence RT4, and the information sharing processing sequences RT5 and RT6 described above.

Thus, in the information display terminal 201, the central processing unit 213 can function as the control unit 20, the selection unit 28, the acquisition units 29 and 100, the natural language processing block 30, the specifying unit 33, the registration unit 34, the detection unit 35, and the tag generation unit 36 described above.

In the information display terminal 201, the central processing unit 213 also can function as the association unit 60, the retrieval unit 66, the index generation unit 67, the link generation unit 75, and the classification unit 77 described above.

In the information display terminal 201, the operation input unit 210, the input processing unit 211, and the touch panel 215 can function as the operation unit 22 described above. Moreover, the hard disk drive 217 can function as the storage unit 25 described above.

In the information display terminal 201, the communication processing unit 219 and the network interface 220 can function as the transmission unit 23 and the reception unit 24 described above.

In the information display terminal 201, the display processing unit 221 can function as the display control unit 26 described above. Moreover, the display 214 can function as the display unit 21 described above.

Thus, as in the information display terminals 11 and 12, the information display terminal 201 can perform the emphasis display processing sequence RT1, the data supply processing sequence RT2, the introduction sharing processing sequence RT4, and the information sharing processing sequences RT5 and RT6 described above by appropriately selecting the various kinds of programs stored in the ROM 216 or the hard disk drive 217 so as to correspond to the functions of the information display terminals 11 and 12. Accordingly, the information display terminal 201 can obtain the same advantages as those of the information display terminals 11 and 12 of the first embodiment described above.

In the information display terminal 201, an information processing program may be stored in advance in the ROM 216 or the hard disk drive 217. Moreover, in the information display terminal 201, the information processing program may be installed using a program storage medium which stores the information processing program.

In the information display terminal 201, the information processing program may be installed using a wired or wireless communication medium such as a local area network, the Internet, or digital satellite broadcasting.

A computer readable storage medium which stores the information processing program installed and executed in the information display terminal 201 may be realized by a package medium such as a flexible disk.

Moreover, the computer readable storage medium which stores the information processing program installed and executed in the information display terminal 201 may be realized by a package medium such as a CD-ROM (Compact Disc-Read Only Memory).

Furthermore, the computer readable storage medium which stores the information processing program installed and executed in the information display terminal 201 may be realized by a package medium such as a DVD (Digital Versatile Disc).

The computer readable storage medium may be realized not only by the package medium but also a semiconductor memory, a magnetic disk, or the like which temporarily or permanently various kinds of programs.

As a mechanism for storing the information processing program in the computer readable storage medium, a wired or wireless communication medium such as a local area network, the Internet, or digital satellite broadcasting may be used.

The information processing program may also be stored in the computer readable storage medium via various kinds of communication interfaces such as routers or modems.

Figure 51:
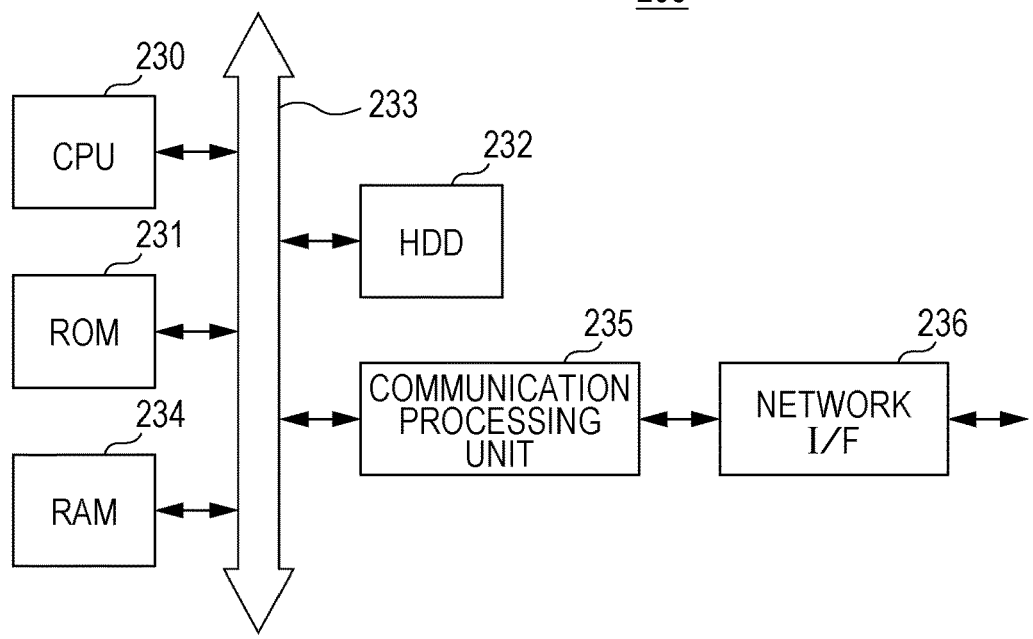
FIG. 51 is a block diagram illustrating the circuit configuration of a hardware circuit block of the information sharing apparatus.

3-3. Hardware Configuration of Hardware Circuit Block of Information Sharing Apparatus Next, the hardware circuit configuration of the hardware circuit block of the information sharing apparatus 203 will be described with reference to FIG. 51.

A central processing unit 230 of the information sharing apparatus 203 reads various kinds of programs such as basic programs or application programs stored in advance in a ROM 231 or a hard disk drive 232 to a RAM 234 via a bus 233. Moreover, the central processing unit 230 controls all of the various kinds of programs developed on the RAM 234 and performs various kinds of processes.

The central processing unit 230 stores the electronic book data in the hard disk drive 232. When a request for the electronic book data is given from the information display terminal 201, the central processing unit 230 reads the electronic book data from the hard disk drive 232 in response to the request for the electronic book data.

Thus, the central processing unit 230 transmits the read electronic book data to the information display terminal 201 sequentially through a communication processing unit 235 and a network interface 236 via the network 202.

In the information sharing apparatus 203, as described above, the central processing unit 230 basically executes various kinds of processes in accordance with the various kinds of programs stored in the ROM 231 or the hard disk drive 232 and controls each hardware unit.

Accordingly, in the information sharing apparatus 203, the various kinds of programs stored in the ROM 231 or the hard disk drive 232 are appropriately selected so as to correspond to the functions of the information sharing apparatus 14 with the hardware configuration of the function circuit block described above with reference to FIG. 39.

That is, in the information sharing apparatus 203, various kinds of programs stored in the ROM 231 or the hard disk drive 232 are appropriately selected as information processing programs configured to execute the user introduction processing sequence RT3 described above.

Thus, in the information sharing apparatus 203, the central processing unit 230 can function as the control unit 110 and the filtering processing unit 114 described above. In the information sharing apparatus 203, the hard disk drive 232 can function as the storage unit 111 described above.

In the information sharing apparatus 203, the communication processing unit 235 and the network interface 236 can function as the transmission unit 113 and the reception unit 112 described above.

Thus, as in the information sharing apparatus 14, the information sharing apparatus 203 can perform the user introduction processing sequence RT3 described above by appropriately selecting the various kinds of programs stored in the ROM 231 or the hard disk drive 232 so as to correspond to the functions of the information sharing apparatus 14. Accordingly, the information sharing apparatus 203 can obtain the same advantages as those of the information sharing apparatus 14 of the first embodiment described above.

In the information sharing apparatus 203, an information processing program may be stored in advance in the ROM 231 or the hard disk drive 232. Moreover, in the information sharing apparatus 203, the information processing program may be installed using a program storage medium which stores the information processing program.

In the information sharing apparatus 203, the information processing program may be installed using a wired or wireless communication medium such as a local area network, the Internet, or digital satellite broadcasting.

A computer readable storage medium which stores the information processing program installed and executed in the information sharing apparatus 203 may be realized by a package medium such as a flexible disk, a CD-ROM, a DVD.

The computer readable storage medium may be realized not only by the package medium but also a semiconductor memory, a magnetic disk, or the like which temporarily or permanently various kinds of programs.

As a mechanism for storing the information processing program in the computer readable storage medium, a wired or wireless communication medium such as a local area network, the Internet, or digital satellite broadcasting may be used.

The information processing program may also be stored in the computer readable storage medium via various kinds of communication interfaces such as routers or modems.

4. Modification Examples

4-1. Modification Example 1

In the above-described first and second embodiments, the case has hitherto been described in which the desired part is selected from the body text (text) of an electronic book and the identical structure word, the identical meaning word, or the like is retrieved.

Embodiments of the disclosure are not limited thereto. Instead, the characters included in a photo image, or an illustration image, or the like as well as the body text may be extracted, the desired part may be selected from the extracted characters, and the identical structure word, the identical meaning word, or the like may be retrieved.

4-2. Modification Example 2

In the above-described first and second embodiments, the case has hitherto been described in which the instruction estimated part is selected from the text using the separation character when the desired part is instructed.

Embodiments of the disclosure are not limited thereto. Instead, when the desired part is instructed, the search range may be subjected to natural language processing and the instruction estimated part may be selected based on the processing result. Even in this configuration, it is possible to accurately select the instruction estimated part, as in the above-described case.

4-3. Modification Example 3

In the above-described first and second embodiments, the case has hitherto been described in which the desired part is instructed in the text through the touch panel.

Embodiments of the disclosure are not limited thereto. Instead, the desired part may be instructed by moving a cursor on the text through a pointing device such as a joystick or a mouse or a keyboard.

4-4. Modification Example 4

In the above-described first and second embodiments, the case has hitherto been described in which the display state of the emphasis display of the desired part is changed by the importance degree of the desired part, the person instructing the desired part, or the like.

Embodiments of the disclosure are not limited thereto. Instead, a time at which the desired part is instructed may be stored as an instruction history and the display state of the emphasis display of the desired part may be changed in accordance with the instruction time based on the instruction history.

4-5. Modification Example 5

In the above-described first and second embodiments, the case has hitherto been described in which when the desired part instructed in the text is specified, the association information such as a home page is retrieved using the retrieval apparatus based on the keywords detected from the specified desired part.

Embodiments of the disclosure are not limited thereto. Instead, when the desired part instructed in the text is specified, the associated electronic book may be retrieved based on the keywords detected from the specified desired part using the retrieval apparatus from the electronic books which the user has not yet acquired.

In the modified example of the disclosure, at this time, not only the electronic book may be just retrieved, but also a part associated with the desired part in the whole book text of the retrieved electronic book may also be retrieved and introduced.

4-6. Modification Example 6

In the above-described first and second embodiments, the case has hitherto been described in which the association comment input by the user is associated, as the association information of the desired part, with the tag of the desired part.

Embodiments of the disclosure are not limited thereto. Instead, a video may be associated, as the association information of the desired part, with the tag of the desired part and the video may be reproduced when the tag is instructed.

The video associated with the tag may be stored in the storage unit 25 of the information display terminals 11 and 12 or may be reproduced in a streaming manner via the network 13.

4-7. Modification Example 7

In the above-described first and second embodiments, the case has hitherto been described in which the identical structure word and the identical meaning word are retrieved from the whole book text based on the keywords included in the desired part and the index or the link list is generated.

Embodiments of the disclosure are not limited thereto. Instead, an index or a link list of a phrase, a clause, or the like including the identical structure word or the identical meaning word may be generated.

According to the modified example of the disclosure, when the identical structure word is retrieved from the whole book text based on the keywords included in the desired part, a phrase, a clause, or the like including the retrieved identical structure word is specified in the whole book text based on the processing result of the natural language processing on the whole book text, the separation character, or the like.

According to the modified example of the disclosure, when the identical meaning word is retrieved from the whole book text based on the keywords included in the desired part, a phrase, a clause, or the like including the retrieved identical meaning word is specified in the whole book text based on the processing result of the natural language processing on the whole book text, the separation character, or the like.

According to the modified example of the disclosure, the index generation unit 67 generates an index of association portions specified and including the identical structure word and an index of association portions including the identical meaning word.

According to the modified example of the disclosure, the link generation unit 75 generates a link list of association portions specified and including the identical structure word and a link list of association portions including the identical meaning word.

According to the modified example of the disclosure, when the identical structure word, the identical meaning word, or the association portion itself is instructed using the index, the text including the association portion is displayed and the association portion is displayed in the emphasis manner.

According to the modified example of the disclosure, when the identical structure word, the identical meaning word, or the association portion itself is instructed using the link list, the text including the association portion is displayed and the association portion is displayed in the emphasis manner.

With such a configuration, according to the modified example of the disclosure, the association portion associated with the desired part in the whole book text can be introduced not as the word but as a phrase, a clause, or the like, when the index or the link list is used.

According to the modified example of the disclosure, the association portion associated with the desired part can easily be recognized in the whole book text even when some range including the identical structure word or the identical meaning word on purpose is read, In the above-described first and second embodiments, the identical structure word and the identical meaning word have been displayed in the emphasis manner in different display state in accordance with the attribute in which the identical structure word or the identical meaning word is identical to the keyword in the structure or meaning.

According to the modified example of the disclosure, the association portion can be displayed in the emphasis manner in different display state in accordance with the attribute (that is, which word is included between the identical structure word or the identical meaning word). Accordingly, According to the modified example of the disclosure, it is possible to easily determine the degree that the association portion is associated with the desired part.

According to the modified example of the disclosure, when the text including the association portion is displayed based on the index or the link list, the association portion is displayed in the emphasis manner. In addition, when the electronic book image to be displayed is newly switched by the user operation, it is automatically determined whether the association portion is included in the text of the electronic book image after the display switch based on the index or the link list.

According to the modified example of the disclosure, when the association portion is included in the text of the electronic book image after the display switch, the association portion may be displayed in the emphasis manner.

4-8. Modification Example 8

In the above-described first and second embodiments, the case has hitherto been described in which the desired parts and the association comments are classified in accordance with the meaning of the corresponding keywords and the folder name.

Embodiments of the disclosure are not limited thereto. Instead, the desired parts and the association comments may be classified in accordance with the corresponding tags (that is, the meanings expressing the tags) or the tag expressing the meaning identical or similar to the folder name.

4-9. Modification Example 9

In the above-described first and second embodiments, the case has hitherto been described in which the keywords are detected from the whole book text of the electronic book, in which the desired part is not selected, and the keywords are classified based on the folder name and the meaning of the superordinate concept of the keywords.

Embodiments of the disclosure are not limited thereto. Instead, the keywords are detected from the whole book text of the electronic book in which the desired part is not selected. According to the modified example of the disclosure, among the detected keywords, the keywords having the meaning of the superordinate concept identical or similar to the meaning expressed by the tag may be classified together with the desired part based on the tag of the desired part.

According to the modified example of the disclosure, the words having the meaning of the superordinate concept identical or similar to the meaning expressed by the tag of the desired part already selected from the whole text of the electronic book are detected as the keywords irrespective of whether the desired part is selected. According to the modified example of the disclosure, the detected keywords may be classified together with the desired part.

4-10. Modification Example 10

In the above-described first and second embodiments, the case has hitherto been described in which when the electronic book image including the desired part is displayed, the keywords detected from the desired part are transmitted to the advertisement supply apparatus and an advertisement is supplied.

Embodiments of the disclosure are not limited thereto. Instead, when the electronic book image including the desired part is displayed, the tag corresponding to the desired part may be transmitted to the advertisement supply apparatus and an advertisement may be supplied. According to the modified example of the disclosure, with such a configuration, an advertisement highly associated with the desired part can be supplied, even when the desired part includes the plurality of keywords.

According to the modified example of the disclosure, when the tags (or keywords) are transmitted, not only an advertisement may be supplied, but also an association book associated with the desired part or open association information or the like associated with the desired part may be announced or supplied.

4-11. Modification Example 11

In the above-described first and second embodiments, the case has hitherto been described in which the information processing apparatus according to the embodiments of the disclosure is applied to the information display terminals 11, 12, and 201 shown in FIGS. 1 to 51.

Embodiments of the disclosure are not limited thereto. Instead, the information processing apparatus is applicable to an information processing apparatus such as a computer, a portable telephone, a PDA (Personal Digital Assistance), and a portable game console.

4-12. Modification Example 12

In the above-described first and second embodiments, the case has hitherto been described in which the selection units 2 and 28 and the central processing unit 213 described with reference to FIGS. 1 to 51 are applied as the selection unit that selects at least a part of the text forming contents.

Embodiments of the disclosure are not limited thereto. Instead, selection units are widely applicable which have various configurations such as a selection circuit, a microprocessor, and a DSP (Digital Signal Processor) with a hardware circuit configuration that selects at least a part of the text forming contents.

4-13. Modification Example 13

In the above-described first and second embodiments, the case has hitherto been described in which the acquisition units 3, 29, and 100 and the central processing unit 213 described with reference to FIGS. 1 to 51 are applied as an acquisition unit that acquires the processing result of the natural language processing on a part of the text selected by the selection unit.

Embodiments of the disclosure are not limited thereto. Instead, acquisition units are widely applicable which have various configurations such as an acquisition circuit with a hardware circuit configuration, a microprocessor, and a DSP (Digital Signal Processor) that acquires the processing result of the natural language processing on a part of the text selected by the selection unit.

4-14. Modification Example 14

In the above-described first and second embodiments, the case has hitherto been described in which the specifying units 4 and 33 and the central processing unit 213 described with reference to FIGS. 1 to 51 are applied as a specifying unit that specifies a predetermined part of the text based on the processing result acquired by the acquisition unit.

Embodiments of the disclosure are not limited thereto. Instead, specifying units are widely applicable which have various configurations such as a specifying circuit with a hardware circuit configuration, a microprocessor, and a DSP that specifies a predetermined part of the text based on the processing result acquired by the acquisition unit.

4-15. Modification Example 15

In the above-described first and second embodiments, the case has hitherto been described in which the detection units 5 and 35 and the central processing unit 213 described with reference to FIGS. 1 to 51 are applied as a detection unit that detects the keywords from a predetermined part of the text based on the processing result acquired by the acquisition unit.

Embodiments of the disclosure are not limited thereto. Instead, detection units are widely applicable which have various configurations such as a detection circuit with a hardware circuit configuration, a microprocessor, and a DSP that detects a predetermined part of the text based on the processing result acquired by the detection and acquisition units.

4-16. Modification Example 16

In the above-described first and second embodiments, the case has hitherto been described in which the tag generation units 6 and 36 and the central processing unit 213 described with reference to FIGS. 1 to 51 are applied as a tag generation unit that automatically generates the tag corresponding to the keyword detected by the detection unit.

Embodiments of the disclosure are not limited thereto. Instead, tag generation units are widely applicable which have various configurations such as a tag generation circuit with a hardware circuit, a microprocessor, and a DSP configuration that automatically generates the tag corresponding to the keyword detected by the detection unit.

4-17. Modification Example 17

In the above-described first and second embodiments, the case has hitherto been described in which the association units 7 and 60 and the central processing unit 213 described with reference to FIGS. 1 to 51 are applied as an association unit that associates the tag generated by the tag generation unit with a predetermined part of the text.

Embodiments of the disclosure are not limited thereto. Instead, association units are widely applicable which have various configurations such as an association circuit with a hardware circuit configuration, a microprocessor, and a DSP that associates the tag generated by the tag generation unit with a predetermined part of the text.

4-18. Modification Example 18

In the above-described first and second embodiments, the case has hitherto been described in which the classification unit 77 and the central processing unit 213 described with reference to FIGS. 1 to 51 are applied as a classification unit that classifies predetermined parts of the text based on the tags.

Embodiments of the disclosure are not limited thereto. Instead, classification units are widely applicable which have various configurations such as a classification circuit with a hardware circuit configuration, a microprocessor, and a DSP that classifies predetermined parts of the text based on the tags.

4-19. Modification Example 19

In the above-described first and second embodiments, the case has hitherto been described in which the display control unit 26 and the display processing unit 221 described with reference to FIGS. 1 to 51 are applied as a display control unit that controls the display of a predetermined part of the text.

Embodiments of the disclosure are not limited thereto. Instead, display control units with various configurations such as a microprocessor or a DSP performing display based on the tag are widely applicable.

4-20. Modification Example 20

In the above-described first and second embodiments, the case has hitherto been described in which the transmission unit 23, the communication processing unit 219, and the network interface 220 described with reference to FIGS. 1 to 51 are applied as a transmission unit that transmits the tag associated with the predetermined part to an external apparatus when the predetermined part is displayed.

Embodiments of the disclosure are not limited thereto. Instead, transmission units with various configurations are widely applicable in accordance with a method of communicating with the external apparatus.

4-21. Modification Example 21

In the above-described first and second embodiments, the case has hitherto been described in which the reception unit 24, the communication processing unit 219, and the network interface 220 described with reference to FIGS. 1 to 51 are applied as a reception unit that receives information associated with the tag replied from an external apparatus in response to the transmission of the tag from the transmission unit.

Embodiments of the disclosure are not limited thereto. Instead, reception units with various configurations are widely applicable in accordance with a method of communicating with the external apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing server, comprising:
   circuitry configured to:
     receive a request for a user introduction from a terminal;
     determine a plurality of similar users based on a first owned book list information of a request user of the terminal,
       wherein a second owned book list information of the plurality of similar users includes at least one first book which is included in the first owned book list information of the request user;
     generate similar user introduction information based on the determined plurality of similar users,
       wherein the similar user introduction information indicates user information of the plurality of similar users having at least one second book different from one or more books owned by the request user; and
     transmit the similar user introduction information to the terminal, wherein
       the terminal displays a similar user image based on the similar user introduction information,
       the similar user image includes the user information of the plurality of the similar users, and
       the terminal transmits a request for the at least one second book to the information processing server based on a user input;
     transmit the at least one second book to the terminal based on the request transmitted by the terminal,
       wherein the terminal transmits at least one selected part from the at least one second book to the information processing server;
     receive the at least one selected part transmitted by the terminal;
     receive user selection information from the terminal, wherein the user selection information corresponds to selection of a similar user from the plurality of similar users included in the similar user image;
     generate book introduction information based on the user selection information; and
     transmit the book introduction information to the terminal.

2. The information processing server according to claim 1, wherein the similar user introduction information comprises at least one of names, nicknames, or address of respective terminals of the plurality of similar users.

3. The information processing server according to claim 1, wherein the book introduction information is based on the first owned book list information of the request user and the second owned book list information of the plurality of similar users.

4. The information processing server according to claim 1, wherein each of the first owned book list information and the second owned book list information includes at least one of a book title, a publisher, a book kind, or book identification information.

5. The information processing server according to claim 1, wherein the circuitry is further configured to store registration information of at least one of the request user or the plurality of the similar users.

6. The information processing server according to claim 1, wherein the circuitry is further configured to acquire the second owned book list information of the plurality of similar users that is excluded from the first owned book list information of the request user for display on the terminal.

7. An information processing method, comprising:
   in one or more processors:
     receiving a request for a user introduction from a terminal;
     determining a plurality of similar users based on a first owned book list information of a request user of the terminal,
       wherein a second owned book list information of the plurality of similar users includes at least one first book which is included in the first owned book list information of the request user;
     generating similar user introduction information based on the determined plurality of similar users,
       wherein the similar user introduction information indicates user information of the plurality of similar users having at least one second book different from one or more books owned by the request user; and
     transmitting the similar user introduction information to the terminal, wherein
       the terminal displays a similar user image based on the similar user introduction information,
       the similar user image includes the user information of the plurality of the similar users, and the terminal transmits a request for the at least one second book to an information processing server based on a user input;

transmitting the at least one second book to the terminal based on the request transmitted by the terminal, wherein the terminal transmits at least one selected part from the at least one second book to the information processing server;

receiving the at least one selected part transmitted by the terminal;

receiving user selection information from the terminal, wherein the user selection information corresponds to selection of a similar user from the plurality of similar users included in the similar user image;

generating book introduction information based on the user selection information; and transmitting the book introduction information to the terminal.

8. The information processing method according to claim 7, wherein the similar user introduction information comprises at least one of names, nicknames, or address of respective terminals of the plurality of similar users.

9. The information processing method according to claim 7, wherein the book introduction information is based on the first owned book list information of the request user and the second owned book list information of the plurality of similar users.

10. The information processing method according to claim 7, wherein each of the first owned book list information and the second owned book list information includes at least one of a book title, a publisher, a book kind, or book identification information.

11. The information processing method according to claim 7, further comprising storing registration information of at least one of the request user or the plurality of the similar users.

12. The information processing method according to claim 7, further comprising acquiring the second owned book list information of the plurality of similar users that is excluded from the first owned book list information of the request user for display on the terminal.

13. A non-transitory computer-readable medium having stored thereon computer-executable instructions which, when executed by a computer, cause the computer to perform operations, the operations comprising:

receiving a request for a user introduction from a terminal;

determining a plurality of similar users based on a first owned book list information of a request user of the terminal, wherein a second owned book list information of the plurality of similar users includes at least one first book which is included in the first owned book list information of the request user;

generating similar user introduction information based on the determined plurality of similar users, wherein the similar user introduction information indicates user information of the plurality of similar users having at least one second book different from one or more books owned by the request user; and transmitting the similar user introduction information to the terminal, wherein the terminal displays a similar user image based on the similar user introduction information, the similar user image includes the user information of the plurality of the similar users, and the terminal transmits a request for the at least one second book to an information processing server based on a user input;

transmitting the at least one second book to the terminal based on the request transmitted by the terminal, wherein the terminal transmits at least one selected part from the at least one second book to the information processing server;

receiving the at least one selected part transmitted by the terminal;

receiving user selection information from the terminal, wherein the user selection information corresponds to selection of a similar user from the plurality of similar users included in the similar user image;

generating book introduction information based on the user selection information; and transmitting the book introduction information to the terminal.

14. The non-transitory computer-readable medium according to claim 13, wherein the similar user introduction information comprises at least one of names, nicknames, or address of respective terminals of the plurality of similar users.

15. The non-transitory computer-readable medium according to claim 13, wherein the book introduction information is based on the first owned book list information of the request user and the second owned book list information of the plurality of similar users.

16. The non-transitory computer-readable medium according to claim 13, wherein each of the first owned book list information and the second owned book list information includes at least one of a book title, a publisher, a book kind, or book identification information.

17. The non-transitory computer-readable medium according to claim 13, further comprising acquiring the second owned book list information of the plurality of similar users that is excluded from the first owned book list information of the request user for display on the terminal.

* * * * *